United States Patent
Kido et al.

(10) Patent No.: US 9,814,115 B2
(45) Date of Patent: Nov. 7, 2017

(54) ILLUMINATION LIGHT COMMUNICATION APPARATUS AND COMMUNICATION MODULE

(71) Applicant: Panasonic Intellectual Property Management Co., Ltd., Osaka (JP)

(72) Inventors: Shojiro Kido, Osaka (JP); Teruhito Takeda, Hyogo (JP); Hiromichi Goto, Osaka (JP); Kazuo Itoh, Osaka (JP); Hiroyuki Nishino, Osaka (JP); Shigeaki Yamasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/388,217

(22) Filed: Dec. 22, 2016

(65) Prior Publication Data
US 2017/0188420 A1    Jun. 29, 2017

(30) Foreign Application Priority Data

Dec. 25, 2015    (JP) ................ 2015-255309
Dec. 25, 2015    (JP) ................ 2015-255442
(Continued)

(51) Int. Cl.
*H04B 10/00*    (2013.01)
*H05B 33/08*    (2006.01)
(Continued)

(52) U.S. Cl.
CPC ......... *H05B 33/089* (2013.01); *H04B 10/502* (2013.01); *H04B 10/54* (2013.01);
(Continued)

(58) Field of Classification Search
CPC ... H04B 10/11; H04B 10/114; H04B 10/1141; H04B 10/116
See application file for complete search history.

(56) References Cited

U.S. PATENT DOCUMENTS

2006/0018662 A1*  1/2006  Grace ............... H04B 10/1141
                                                      398/135
2007/0273681 A1   11/2007  Mayell
(Continued)

FOREIGN PATENT DOCUMENTS

EP        2337207 A2    6/2011
JP    2005-142137 A     6/2005
(Continued)

*Primary Examiner* — Daniel Dobson
(74) *Attorney, Agent, or Firm* — McDermott Will & Emery LLP

(57) ABSTRACT

An illumination light communication apparatus includes: a light source which emits illumination light; a power supply circuit for supplying constant current to the light source; a switch which is connected in series to the light source, and intermittently interrupts current which flows through the light source; a signal generating circuit which generates a binary communication signal which controls on and off of the switch to modulate the illumination light; and a current limiting circuit which is connected in series to the light source and the switch, and limits the current which flows through the light source to prevent the current from exceeding a current set value which is variable.

17 Claims, 178 Drawing Sheets

(30) Foreign Application Priority Data

| Dec. 28, 2015 | (JP) | 2015-257417 |
|---|---|---|
| Dec. 28, 2015 | (JP) | 2015-257543 |
| Jan. 7, 2016 | (JP) | 2016-002047 |
| Jan. 7, 2016 | (JP) | 2016-002110 |
| Jan. 26, 2016 | (JP) | 2016-012833 |
| Jan. 28, 2016 | (JP) | 2016-014749 |
| Nov. 8, 2016 | (JP) | 2016-218224 |

(51) Int. Cl.
 *H04B 10/50* (2013.01)
 *H04B 10/54* (2013.01)
 *H05B 37/02* (2006.01)
 *H04J 14/00* (2006.01)

(52) U.S. Cl.
 CPC ..... *H05B 33/0818* (2013.01); *H05B 33/0866* (2013.01); *H05B 33/0872* (2013.01); *H05B 37/0218* (2013.01)

(56) References Cited

U.S. PATENT DOCUMENTS

| 2007/0296354 | A1 | 12/2007 | Okabe | |
| 2008/0258641 | A1 | 10/2008 | Nakagawa et al. | |
| 2012/0051757 | A1* | 3/2012 | Nishino | H04B 10/1149 398/201 |
| 2012/0200225 | A1 | 8/2012 | Sawada | |
| 2013/0038819 | A1 | 2/2013 | Ishikawa | |
| 2014/0321860 | A1 | 10/2014 | Kido et al. | |
| 2014/0334826 | A1 | 11/2014 | Kido et al. | |
| 2015/0108919 | A1 | 4/2015 | Van Erp | |

FOREIGN PATENT DOCUMENTS

| JP | 2006-120910 A | 5/2006 |
|---|---|---|
| JP | 2007-318983 A | 12/2007 |
| JP | 2007-324416 A | 12/2007 |
| JP | 2008-136138 A | 6/2008 |
| JP | 2009-266855 A | 11/2009 |
| JP | 2009-290361 A | 12/2009 |
| JP | 2010-283616 A | 12/2010 |
| JP | 2011-018691 A | 1/2011 |
| JP | 2011-076992 A | 4/2011 |
| JP | 2011-130557 A | 6/2011 |
| JP | 2011-198669 A | 10/2011 |
| JP | 2011-216663 A | 10/2011 |
| JP | 2011-258517 A | 12/2011 |
| JP | 2012-069505 A | 4/2012 |
| JP | 2012-147316 A | 8/2012 |
| JP | 2012-227075 A | 11/2012 |
| JP | 2013-097928 A | 5/2013 |
| JP | 2013-110599 A | 6/2013 |
| JP | 2013-110636 A | 6/2013 |
| JP | 2014-063590 A | 4/2014 |
| JP | 2014-064007 A | 4/2014 |
| JP | 2014-086689 A | 5/2014 |
| JP | 2014-116846 A | 6/2014 |
| JP | 2015-019236 A | 1/2015 |
| JP | 2015-522903 A | 8/2015 |
| JP | 2015-216580 A | 12/2015 |
| WO | 2011/105086 A1 | 9/2011 |
| WO | 2013171622 A1 | 11/2013 |

* cited by examiner

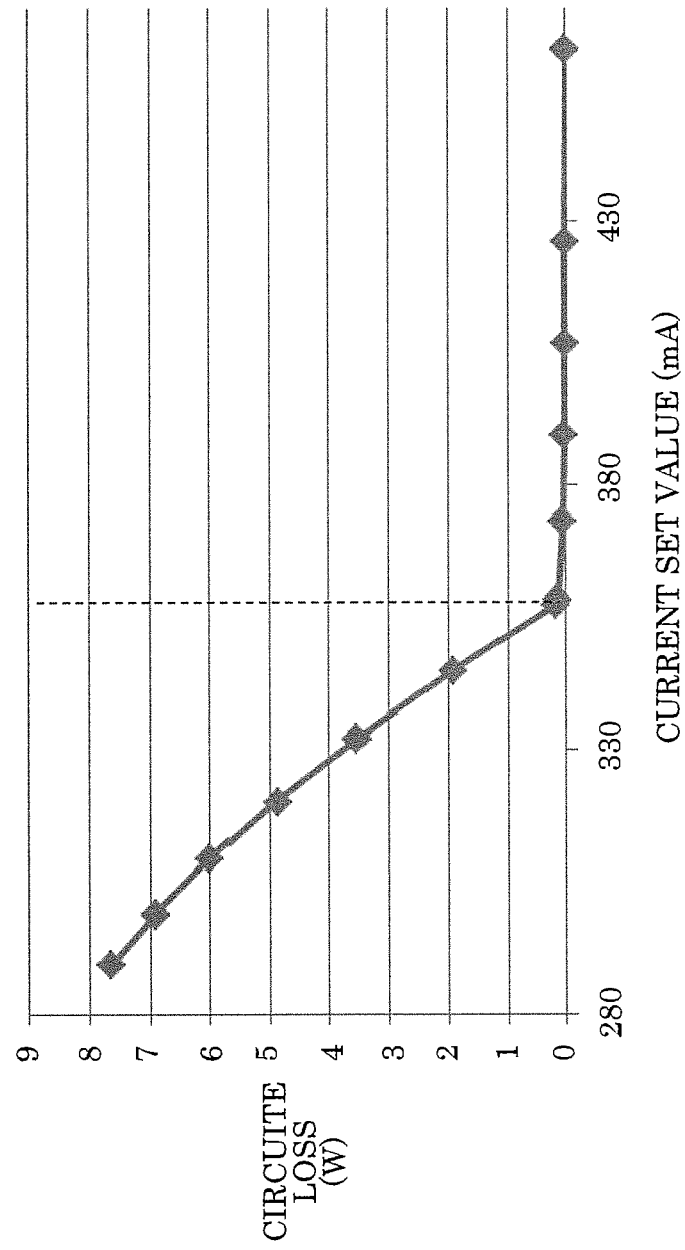

| DUTY (ON) | CURRENT SET VALUE |
|---|---|
| (%) | (mA) |
| 100 | 240 |
| 95 | 253 |
| 90 | 267 |
| 85 | 282 |
| 80 | 300 |
| 75 | 320 |
| 70 | 343 |
| 65 | 369 |
| 60 | 400 |
| 55 | 436 |
| 50 | 480 |

FIG. 50B

| SG | SW | 2 |
|----|-----|-----|
| H | OFF | *ON |
| L | ON | OFF |

| SG | B1 | B2 | 2 |
|----|-----|-----|-----|
| H | ON | OFF | *ON |
| L | OFF | ON | OFF |

| SG | B1 | B2 | 2 |
|---|---|---|---|
| H | ON | ON | *ON |
| L | OFF | OFF | OFF |

| SG | B1 | B2 | 22 | 20 |
|---|---|---|---|---|
| H | ON | ON | OFF | *ON |
| L | OFF | OFF | ON | OFF |

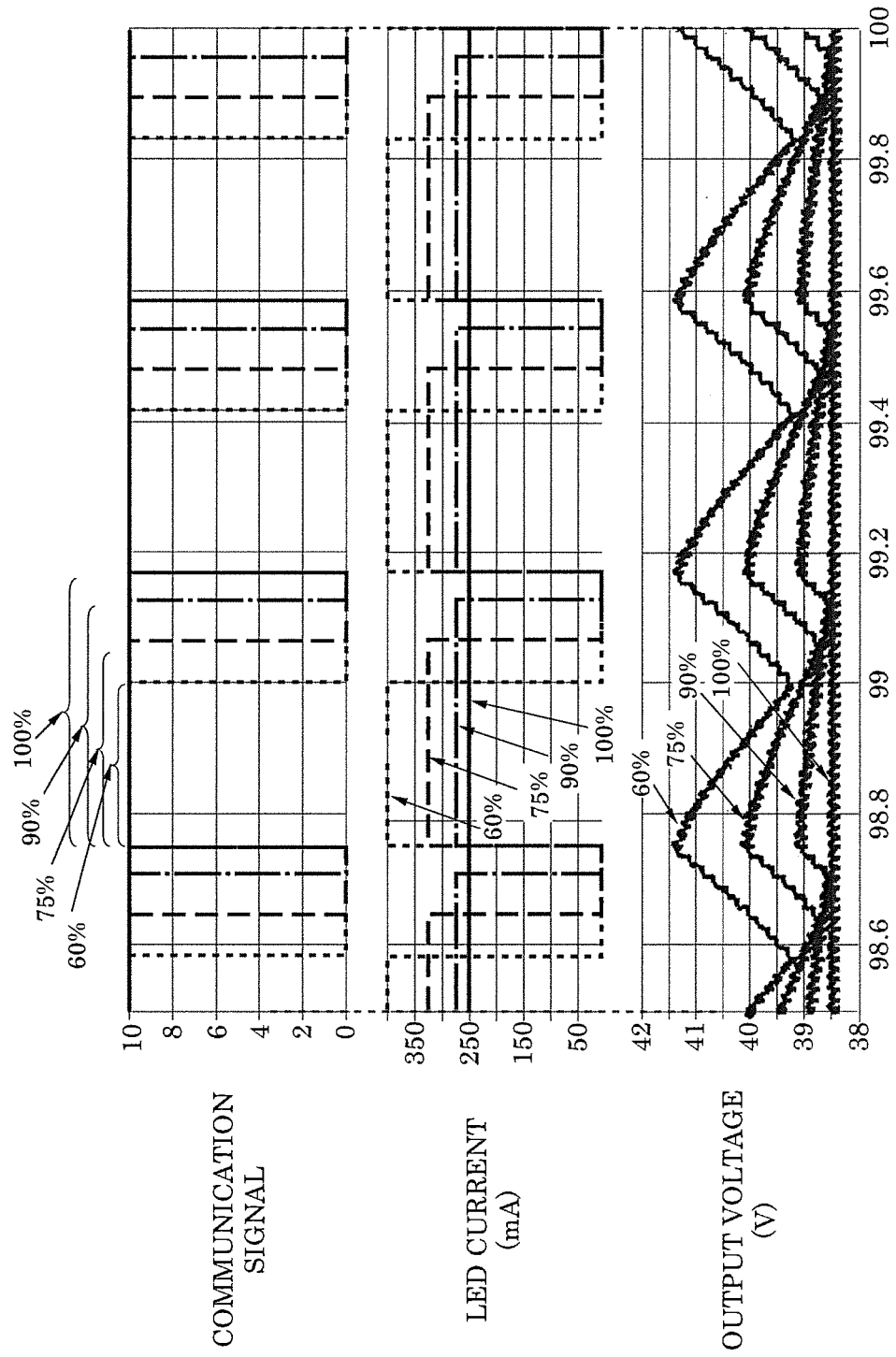

FIG. 101

| DUTY (ON) | TOTAL CURRENT SET VALUE | ADDITIONAL CURRENT SET VALUE |
|---|---|---|
| (%) | (mA) | (mA) |
| 100 | 240 | 0 |
| 95 | 253 | 13 |
| 90 | 267 | 27 |
| 85 | 282 | 42 |
| 80 | 300 | 60 |
| 75 | 320 | 80 |
| 70 | 343 | 103 |
| 65 | 369 | 129 |
| 60 | 400 | 160 |
| 55 | 436 | 196 |
| 50 | 480 | 240 |

(a) COMMUNICATION SIGNAL (INVERTED)

(b) LED CURRENT (c) PRIMARY CIRCUIT VOLTAGE (d) PRIMARY CIRCUIT LOSS (e) CLAMPING VOLTAGE DETECTION THRESHOLD C97 VOLTAGE (DETECTED VALUE)

ILLUMINATION LIGHT COMMUNICATION APPARATUS AND COMMUNICATION MODULE

CROSS REFERENCE TO RELATED APPLICATIONS

This application claims the benefit of priority of Japanese Patent Application Number 2015-255309 filed on Dec. 25, 2015, Japanese Patent Application Number 2015-255442 filed on Dec. 25, 2015, Japanese Patent Application Number 2015-257417 filed on Dec. 28, 2015, Japanese Patent Application Number 2015-257543 filed on Dec. 28, 2015, Japanese Patent Application Number 2016-002047 filed on Jan. 7, 2016, Japanese Patent Application Number 2016-002110 filed on Jan. 7, 2016, Japanese Patent Application Number 2016-012833 filed on Jan. 26, 2016, Japanese Patent Application Number 2016-014749 filed on Jan. 28, 2016, and Japanese Patent Application Number 2016-218224 filed on Nov. 8, 2016, the entire contents of which are hereby incorporated by reference.

BACKGROUND

1. Technical Field

The present disclosure relates to an illumination light communication apparatus and a communication module which perform a visible light communication by modulating illumination light.

2. Description of the Related Art

Conventionally, a visible light communication in which a signal is transmitted by modulating an intensity of illumination light is proposed for a lighting device which includes a light-emitting diode (LED) as a light source. Such an illumination light communication apparatus transmits a signal by modulating the illumination light as it is, and thus does not require a special device such as an infrared communication apparatus. Moreover, such an illumination light communication apparatus can achieve power saving by using light-emitting diodes as a light source for illumination. Thus, use of the illumination light communication apparatus for ubiquitous information systems in underground malls is contemplated.

FIG. 164A is a diagram illustrating a configuration of an illumination light communication apparatus disclosed in Japanese Unexamined Patent Application Publication No. 2012-69505 (PTL 2). In the circuit, current sensing resistor R3, load circuit 53 which includes three light-emitting diodes, inductor L1, and switching element Q1 are connected in series across DC power supply 51, and turning on/off of switching element Q1 is controlled by control circuit 54. Moreover, smoothing capacitor C3 and rectifier diode D2 are connected across a series circuit formed of load circuit 53 and inductor L1, and form a DC-to-DC converter together with inductor L1 and switching element Q1. A feedback signal is input from constant-current feedback circuit 55 to control circuit 54 to control output current of the DC-to-DC converter so that the output current is brought to be substantially constant. The DC-to-DC converter serves as a constant-current feedback power supply which is controlled so as to supply constant current. Moreover, communication signal S1 is input to control circuit 54. Control circuit 54 modulates load current I1 in a high period of the communication signal by turning on/off switching element Q1 at a high frequency.

FIG. 164B is a diagram illustrating a circuit portion including a specific example of constant-current feedback circuit 55 in FIG. 164A. Constant-current feedback circuit 55 compares, by error amplifier A1, a voltage drop in resistor R3 through which load current I1 flows, with reference source E1 as to whether the voltage drop is higher or lower than reference source E1, and amplifies and outputs a difference between the voltage drop and reference source E1 to control circuit 54. A series circuit which is formed of resistor RA and capacitor C2 and connected between an inverting input terminal and output terminal of error amplifier A1 forms a phase compensation circuit for providing the feedback system with stability. Such a phase compensation circuit, in general, uses a compensation circuit which includes an integrating element to adjust a gain and a phase in an open-loop transfer function. This is known as PI control or PID control of information theory. For example, FIG. 164C is a diagram illustrating an illumination light communication apparatus which includes the average-current sensing circuit disclosed in Japanese Unexamined Patent Application Publication No. 2006-120910 (PTL 1). Integration circuit 56 (formed of resistor R5 and capacitor C3) connected across current sensing resistor R3 can be said to be an output averaging means using the PI control mentioned above.

Moreover, Japanese Unexamined Patent Application Publication No. 2010-283616 (PTL 3) discloses an illumination light communication power supply which provides, through a visible light communication using illumination light, a constant brightness of the illumination light both during a non-communication time where a communications carrier signal is not received and a communication time where a carrier signal is received. The illumination light communication power supply is at a low cost and has high light-source utilization efficiency and high power efficiency.

Further, the illumination light communication apparatus disclosed in Japanese Unexamined Patent Application Publication No. 2011-130557 (PTL 4) includes a DC-to-DC converter having a step-up mode and a step-down mode, a constant-current clamp switch, and a constant-current clamp control circuit. PTL 4 discloses starting limiting a current when a duty cycle of the constant-current clamp switch is greater than a pre-stored maximum (or a minimum), and stopping limiting the current when the duty cycle is less than the maximum (or greater than minimum).

Still further, Japanese Unexamined Patent Application Publication No. 2015-216580 (PTL 5) discloses a dimming-type lighting apparatus which makes flicker inconspicuous even when an amount of light is small, and improves data transmission rate.

SUMMARY

FIG. 165 is a diagram schematically illustrating waveforms of an intermittent signal, output voltage at modulation, and load current (LED current) in a 100%-modulation circuit structure using a constant-current feedback power supply. The 100% modulation, as used herein, refers to modulating illumination light in two states, on-state and off-state. The intermittent signal is a modulating signal which controls on and off of a switch. The output voltage is of the constant-current feedback power supply. The LED current is a current which flows through an LED.

In the figure, the switch turns off and the LED turns off in a low-period of the intermittent signal (modulating signal). The longer the off time, the greater the output voltage across smoothing capacitor 65 increases. A great overshoot is caused in the LED current at a moment the intermittent signal (modulating signal) has changed to high. In other words, since the output voltage is high at a moment the intermittent signal (modulating signal) has changed to high, a peak value of the LED current increases. Consequently, the output voltage decreases and the LED current decreases.

The overshoot in the LED current increases as the switch turns on and off as such. In general, a light communications receiving device reads a change in light signal. A great overshoot may be a primary cause of malfunctions (e.g., reception error) of the receiving device. As such, the 100% modulation using constant-current feedback power supply can cause malfunctions of the receiving device.

An object of the present disclosure is to provide an illumination light communication apparatus and a communication module which are unlikely to cause reception error in a receiving device even when a light communication is performed by 100% modulation using a constant-current feedback power supply.

In order to achieve the above object, an aspect of an illumination light communication apparatus according to the present disclosure includes: a light source which emits illumination light; a power supply circuit for supplying constant current to the light source; a switch which is connected in series to the light source, and intermittently interrupts current which flows through the light source; a signal generating circuit which generates a binary communication signal which controls on and off of the switch to modulate the illumination light; and a current limiting circuit which is connected in series to the light source and the switch, and limits the current which flows through the light source to prevent the current from exceeding a current set value which is variable.

An aspect of a communication module according to the present disclosure is attachable to a lighting apparatus and modulates illumination light, the communication module including: a switch which is to be connected in series to a light source included in the lighting apparatus; a signal generating circuit which generates a binary communication signal which controls on and off of the switch to modulate the illumination light; and a current limiting circuit which is connected in series to the light source and the switch, and limits current which flows through the light source, to prevent the current from exceeding a current set value which is variable.

According to the illumination light communication apparatus and the communication module of the present disclosure, reception error in the receiving device is unlikely to occur even when a constant-current feedback power supply is used to perform light communication using 100% modulation.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 27C is a diagram illustrating a relation between a current set value and circuit loss, as simulation results in the case of example (3) in FIG. 16;

FIG. 50B is a diagram illustrating a truth table showing a communication signal from a signal generating circuit in FIG. 50A, and operation states of a switch and a transistor in FIG. 50A;

FIG. 89 is a circuit diagram illustrating a configuration example of an illumination light communication apparatus according to a comparative example;

FIG. 90 is a time chart of potentials at portions of the illumination light communication apparatus according to the comparative example;

FIG. 91 is a circuit diagram illustrating a variation of the illumination light communication apparatus according to Embodiments 12 and 13;

FIG. 92 is a waveform diagram illustrating threshold control of switching current by a power supply circuit in FIG. 91;

FIG. 93A is a circuit diagram illustrating a configuration of an illumination light communication apparatus according to Embodiment 14;

FIG. 93B is a circuit diagram illustrating a configuration example of a current limiting circuit in further detail;

FIG. 94A is a diagram illustrating first simulation results;

FIG. 94B is a diagram illustrating second simulation results;

FIG. 95 is a schematic diagram illustrating relations between LED current and two communication signals having different duty cycles;

FIG. 96 is a diagram illustrating a relation between a duty cycle and LED current when a current set value is fixed;

FIG. 97A is a diagram illustrating third simulation results;

FIG. 97B is a diagram illustrating fourth simulation results;

Figure 93A:
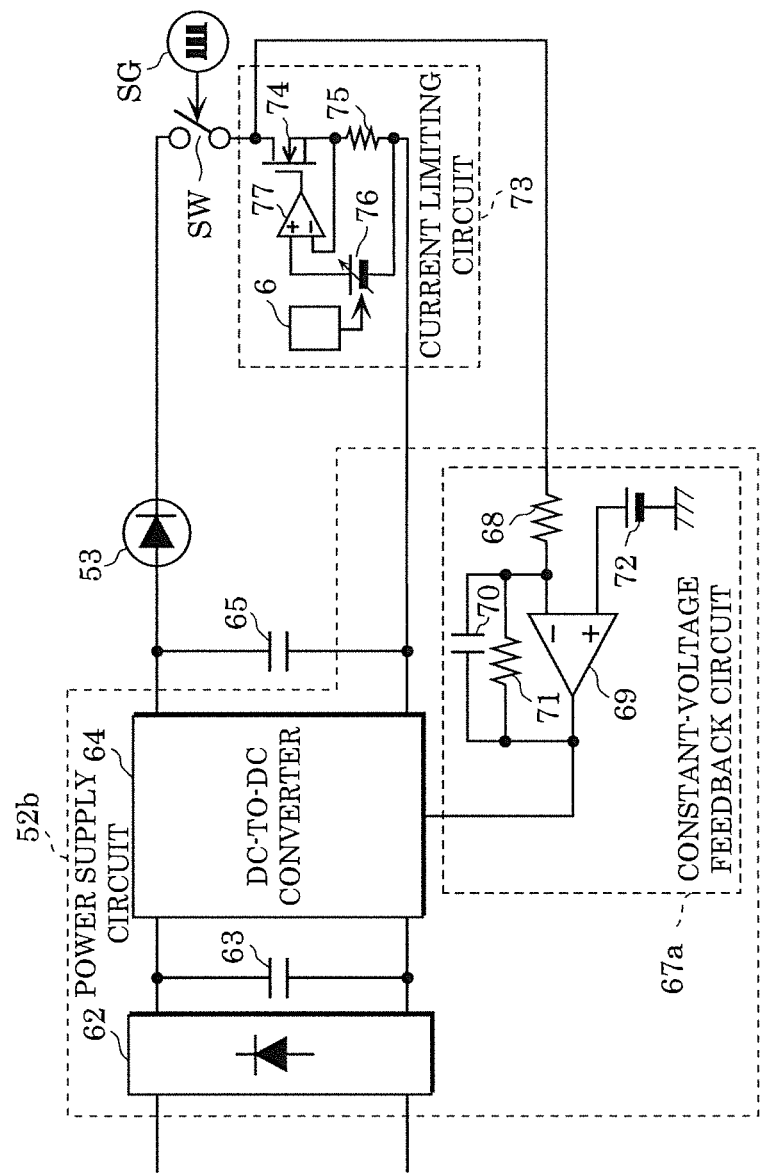
Figure 98:
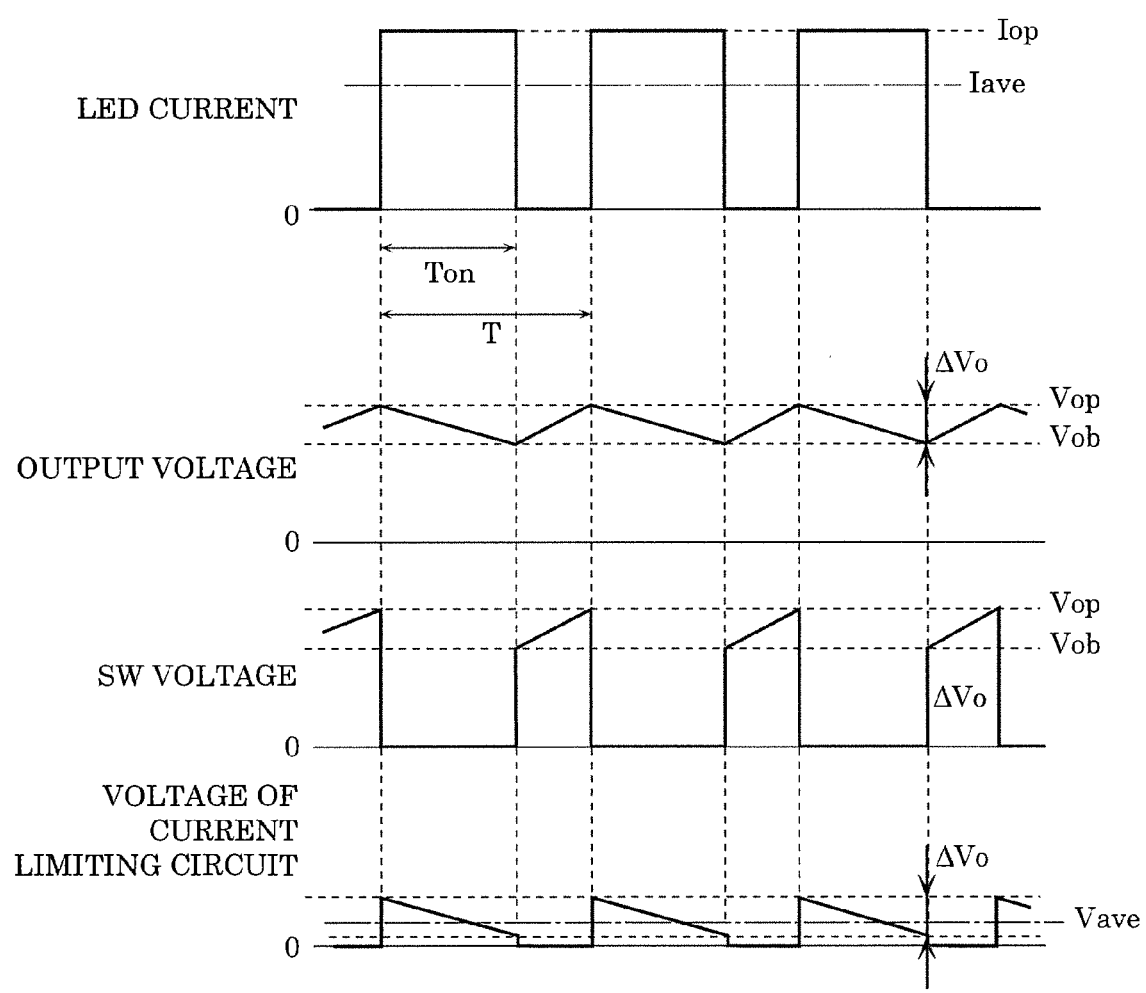
Figure 99A:
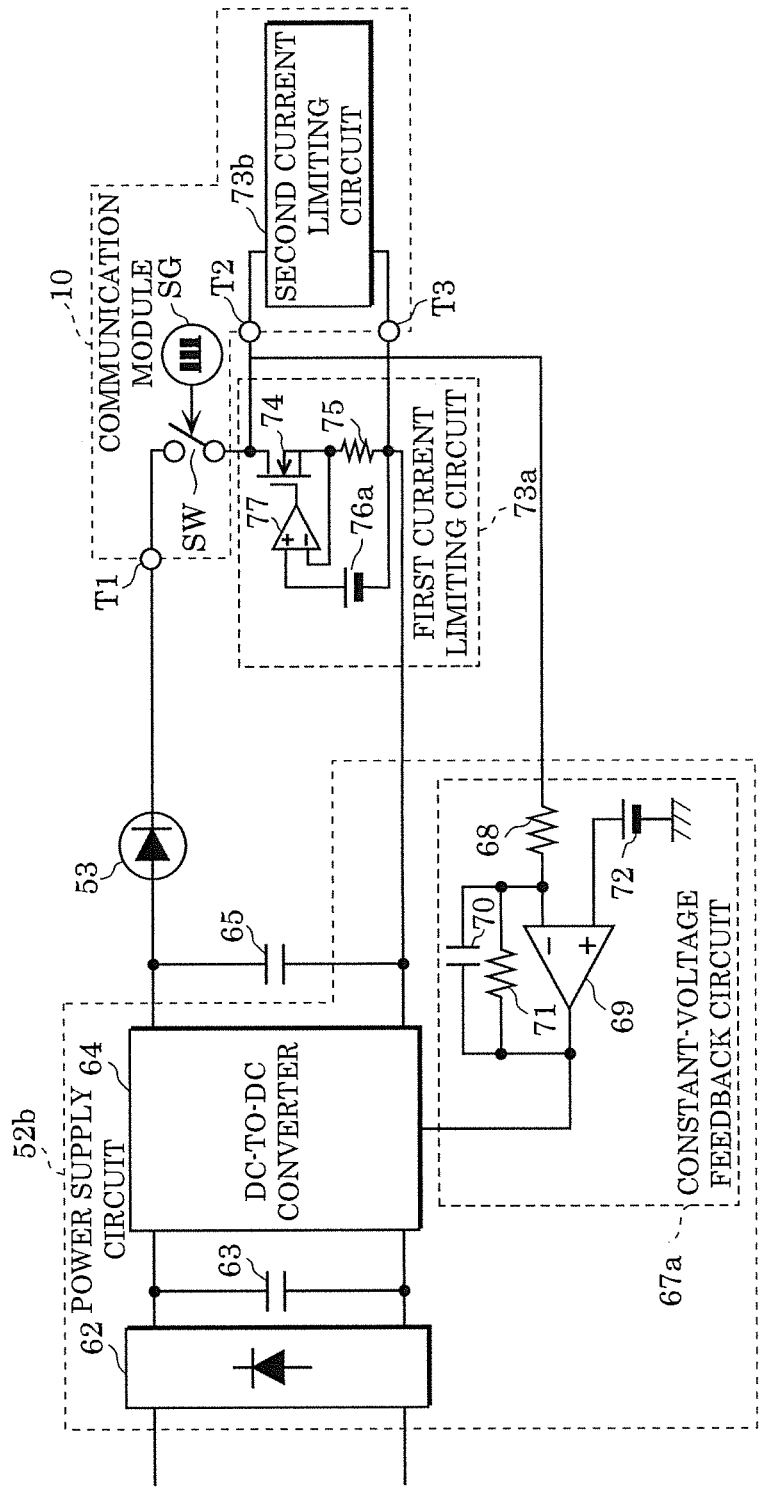
Figure 99B:
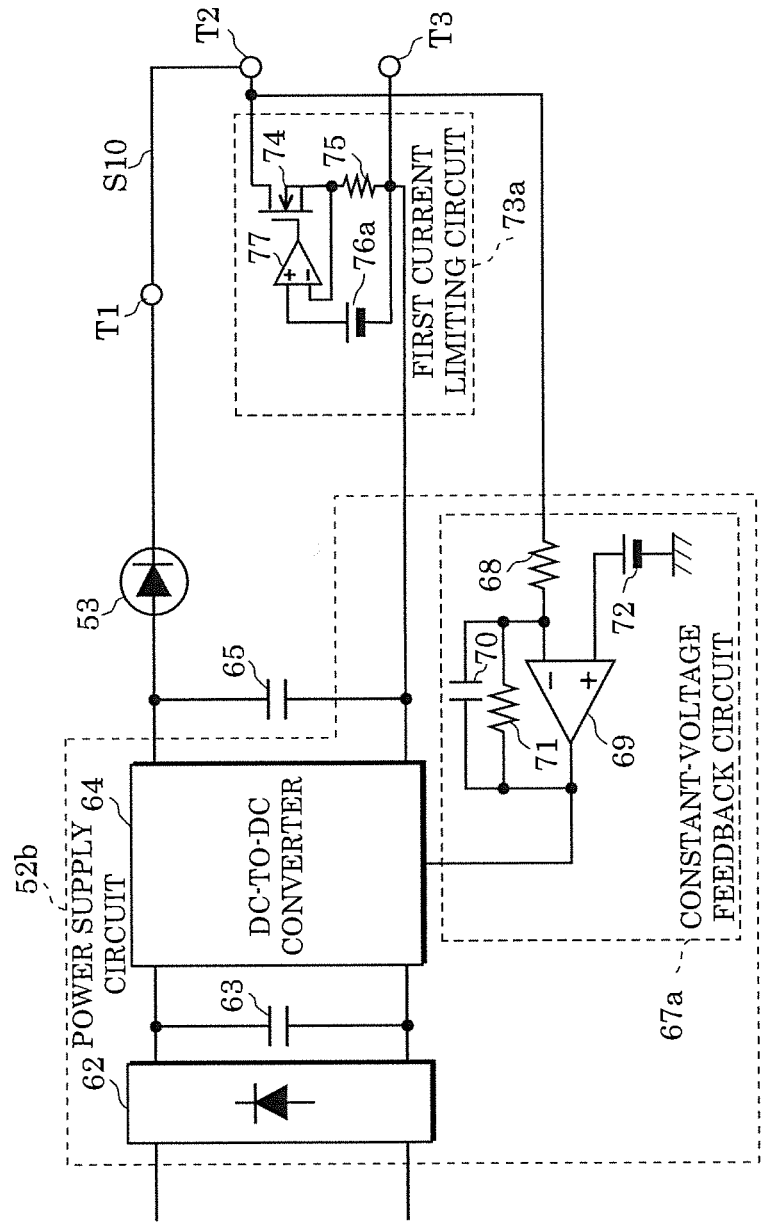
Figure 99C:
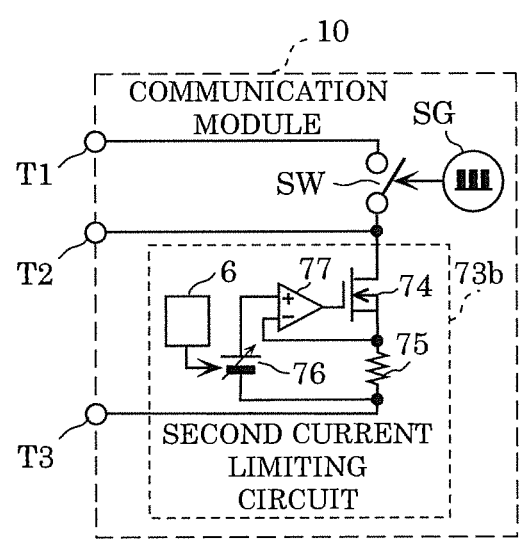
Figure 100:
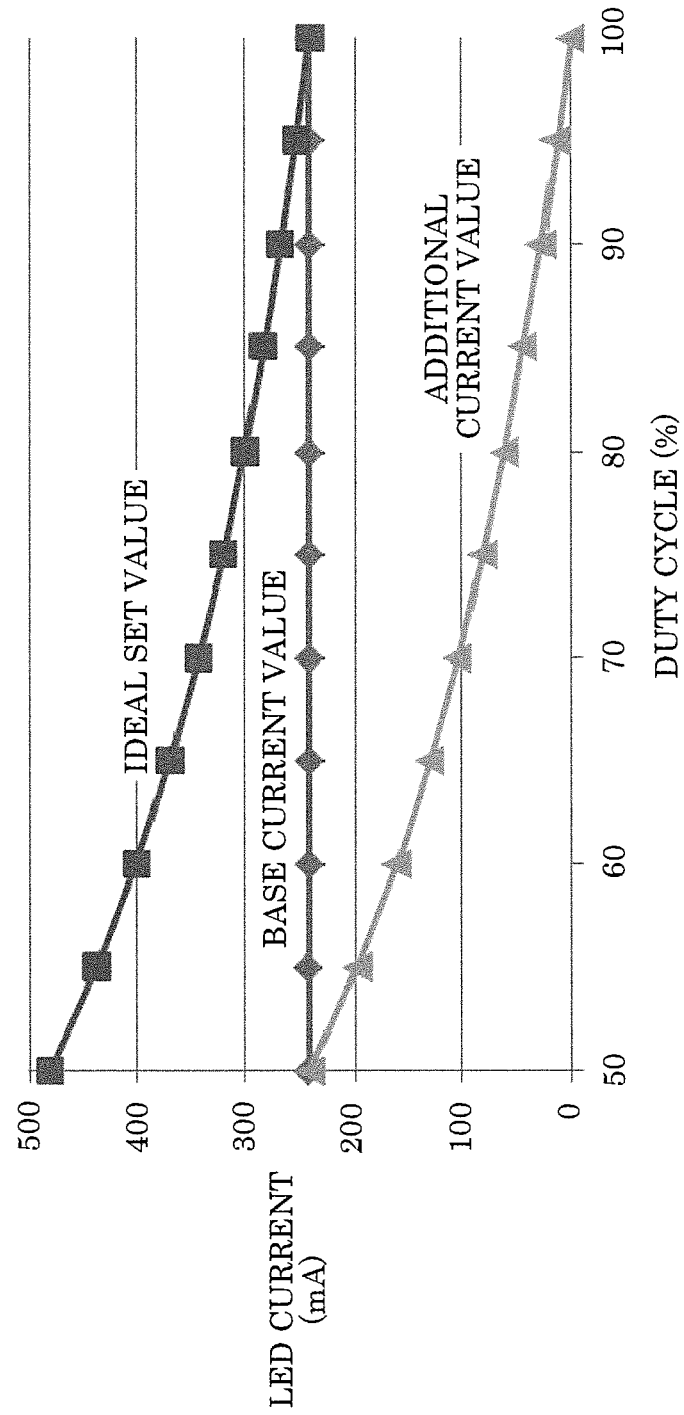
Figure 102:
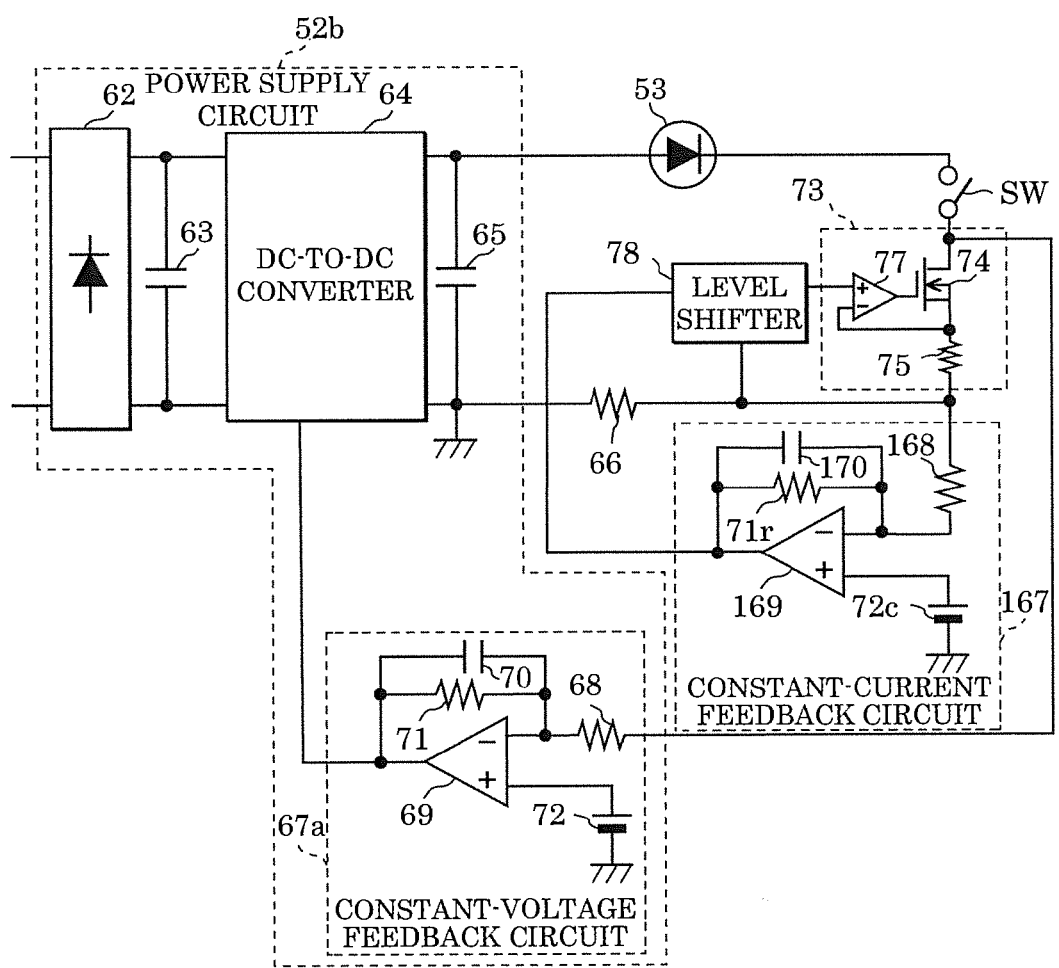
Figure 103:
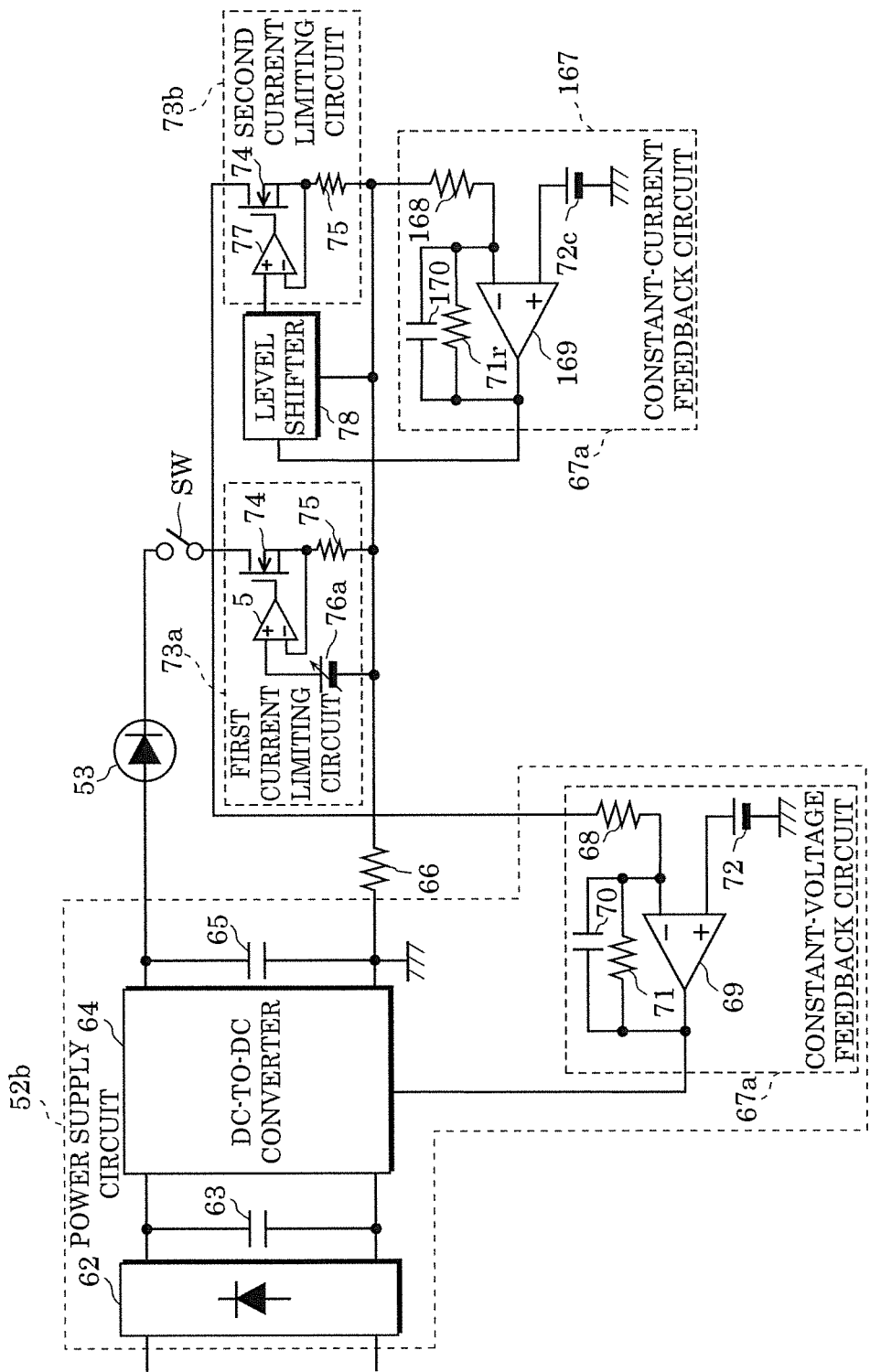
Figure 104:
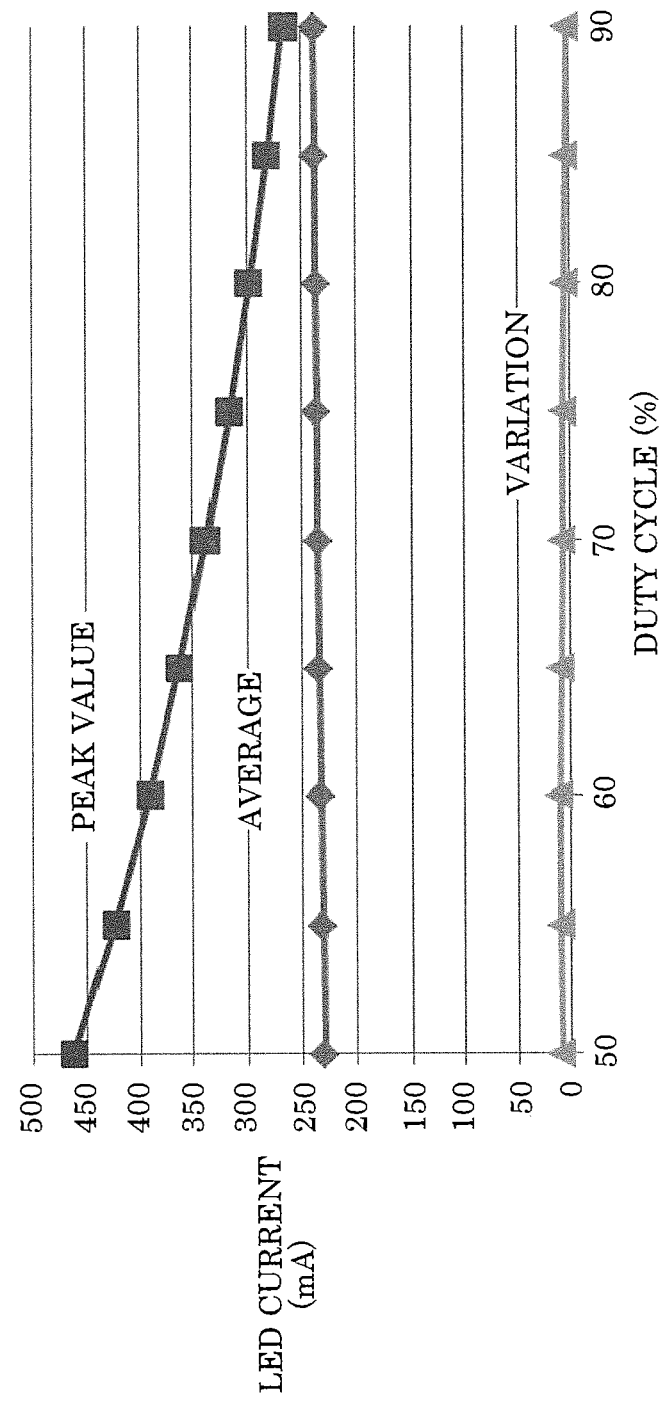
Figure 105:
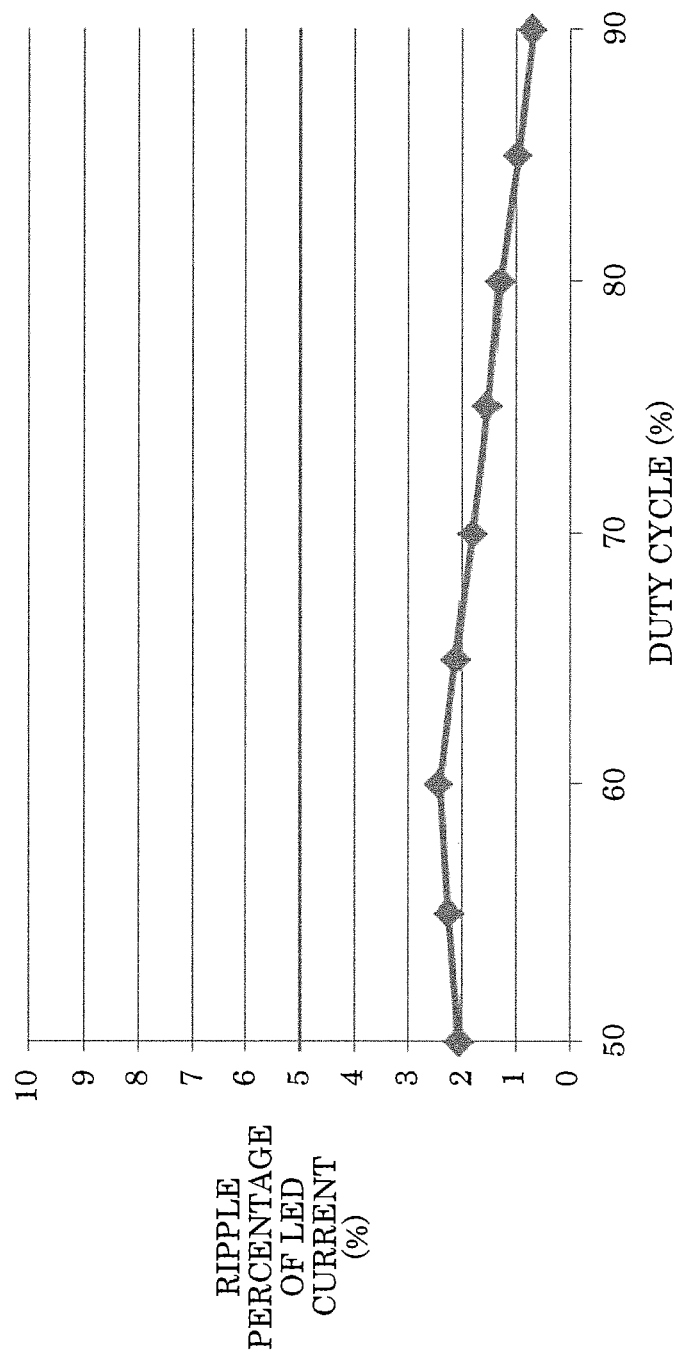
Figure 106:
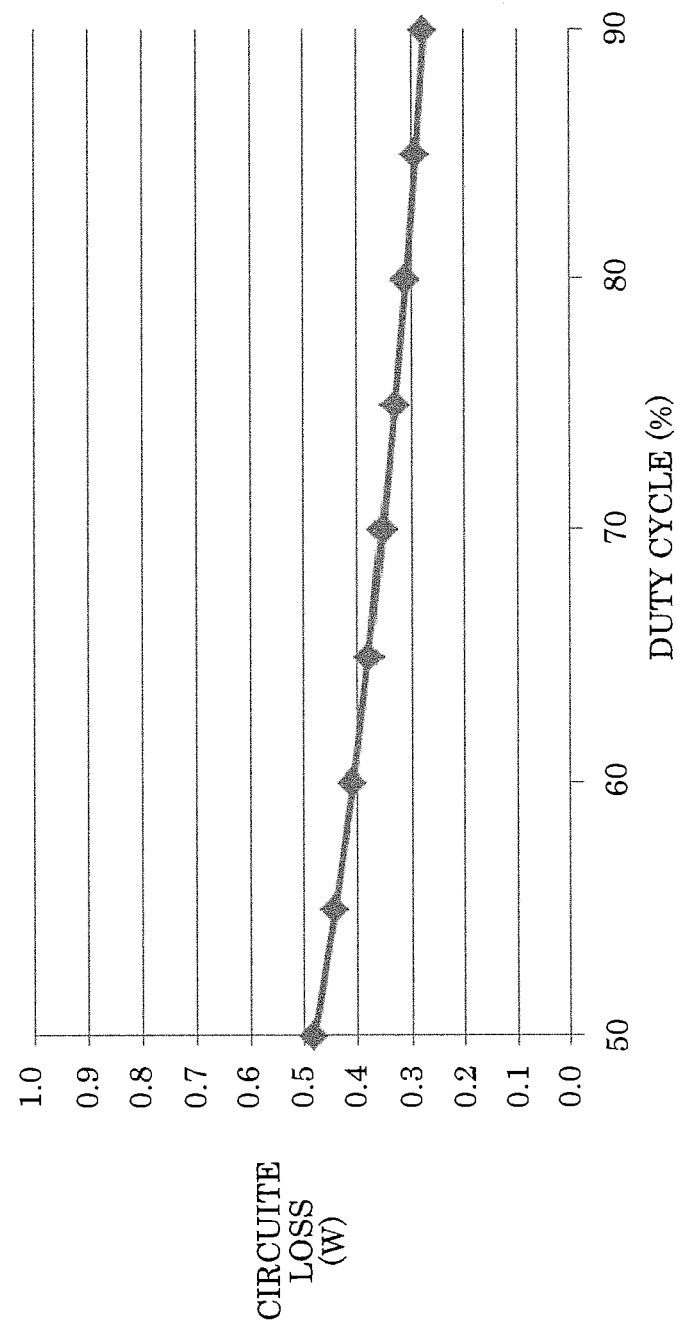
Figure 107:
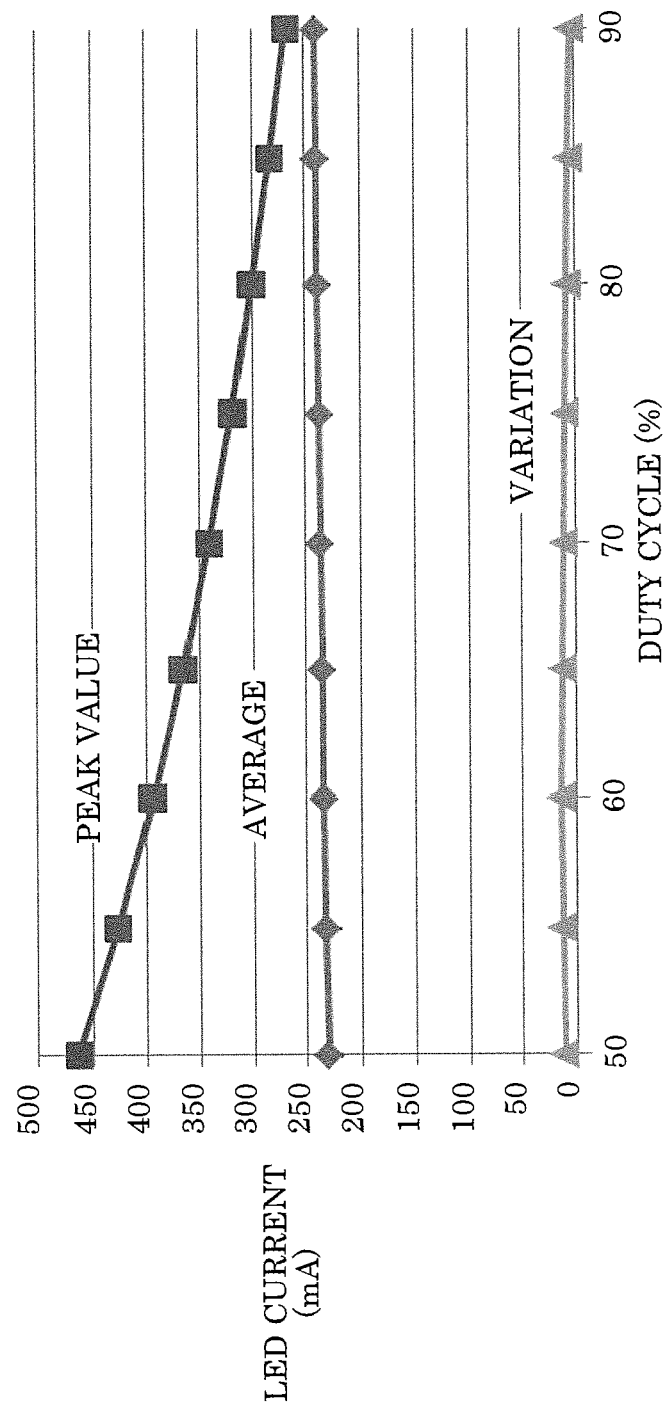
Figure 108:
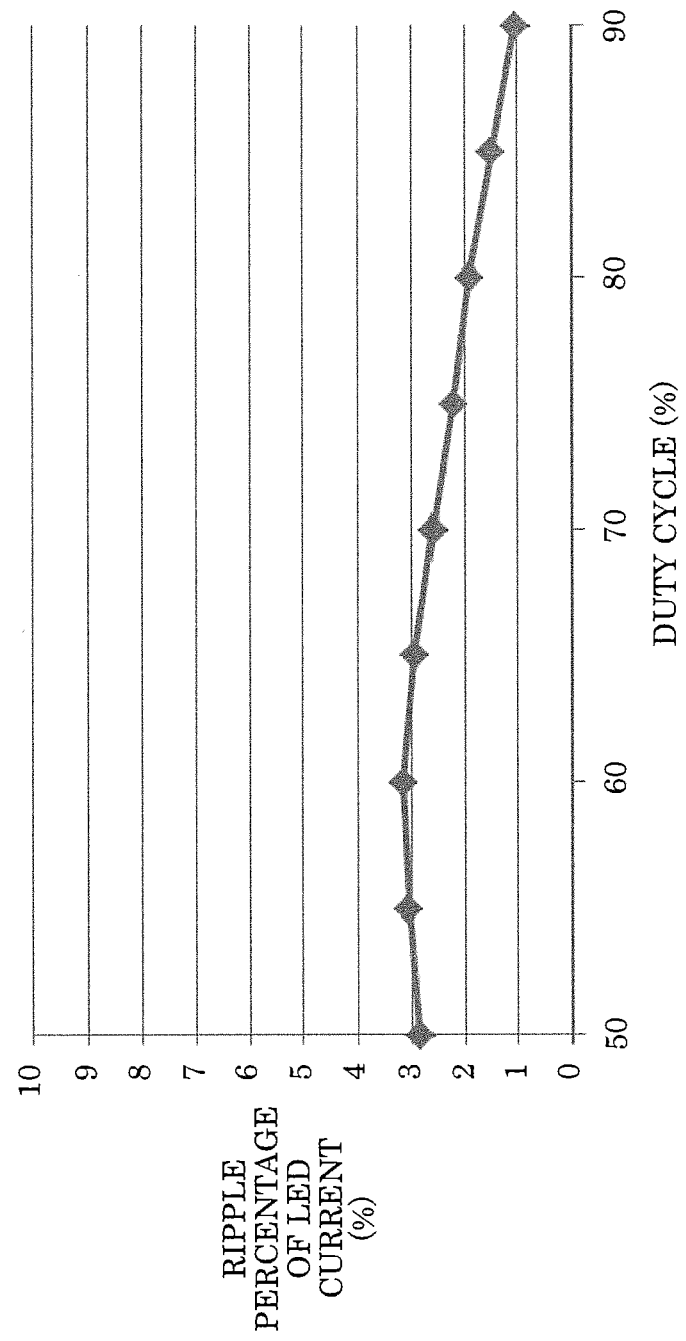
Figure 109:
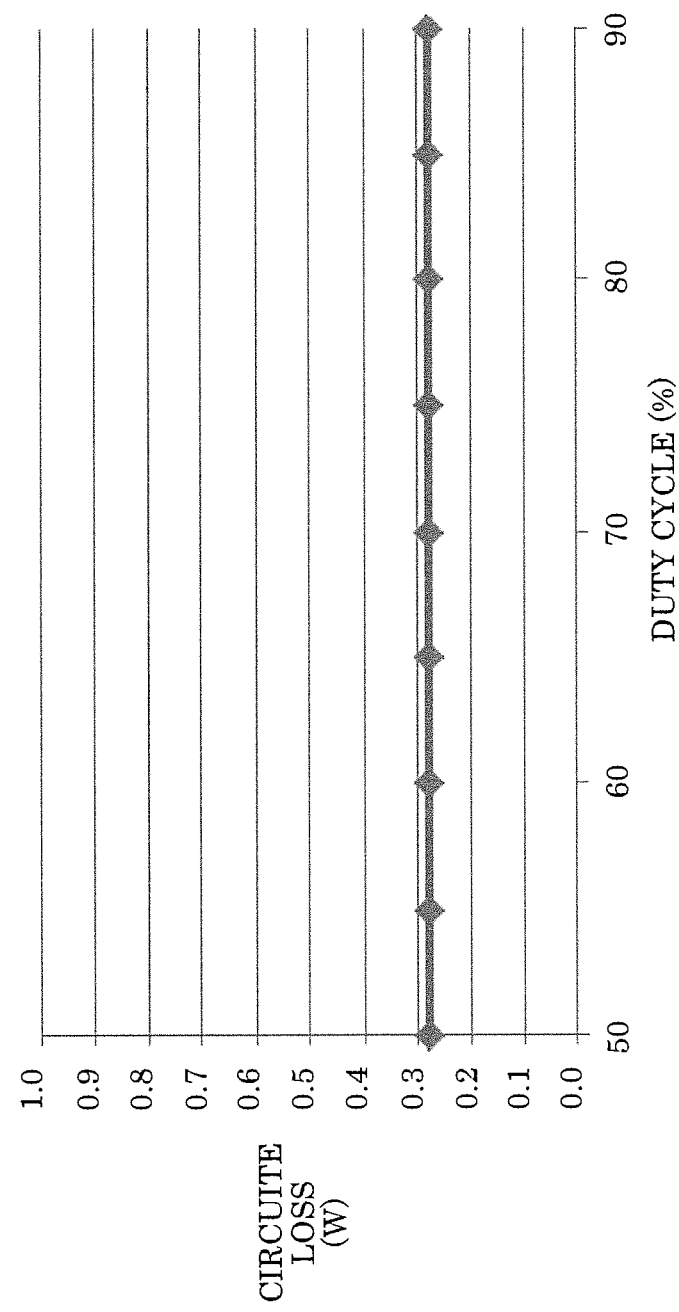
Figure 110:
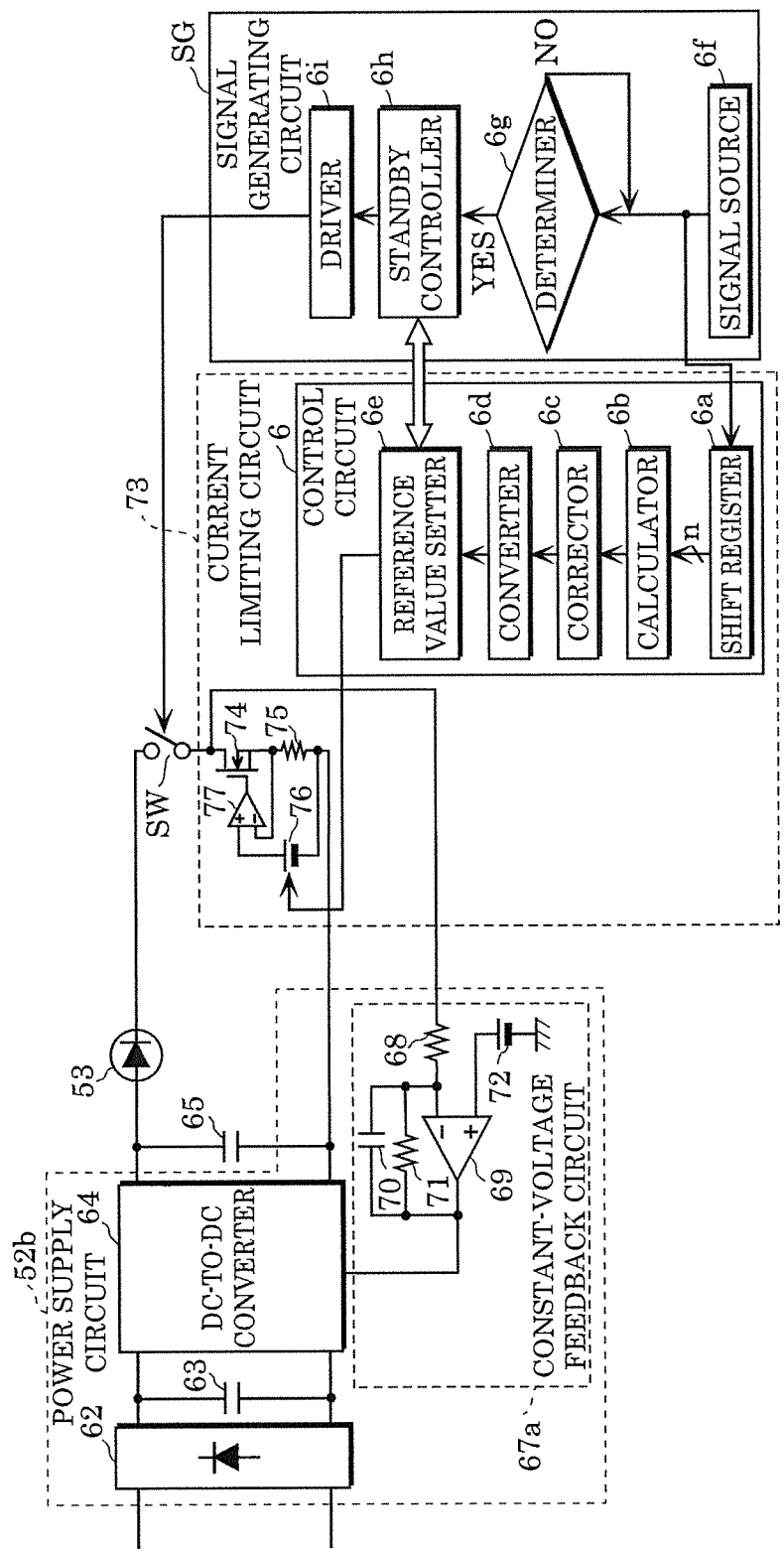
Figure 111:
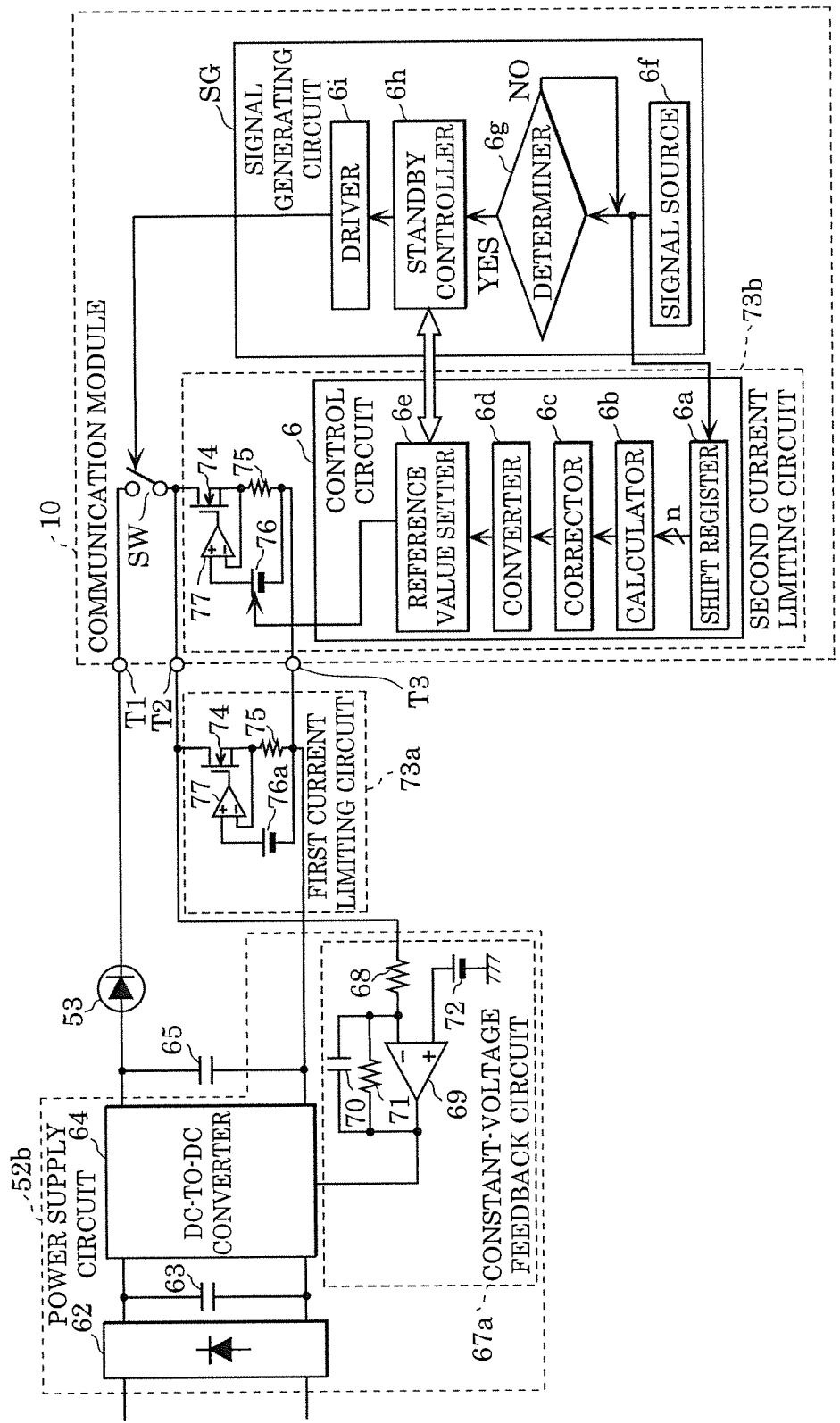
Figure 112A:
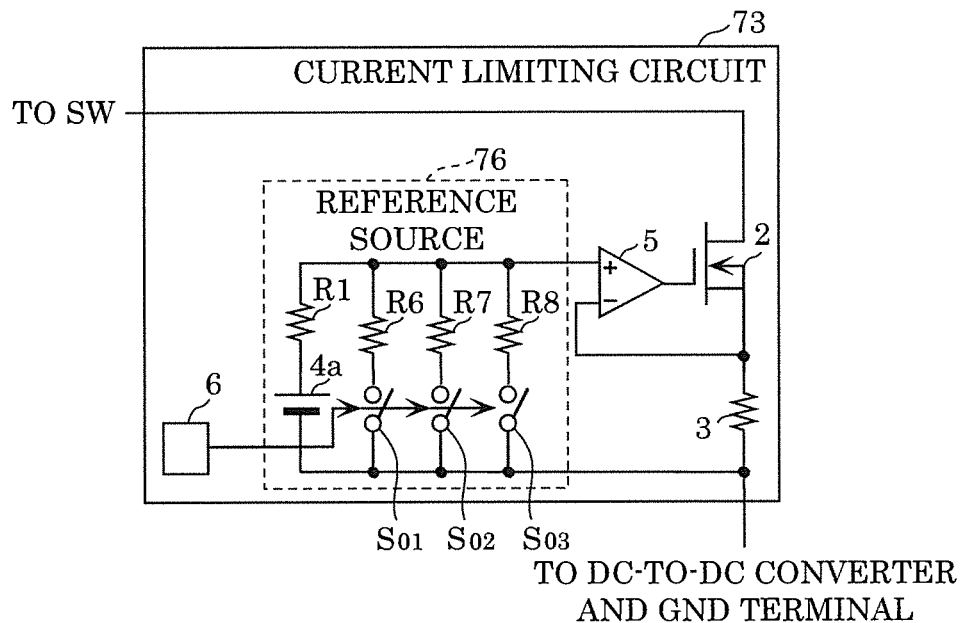
Figure 112B:
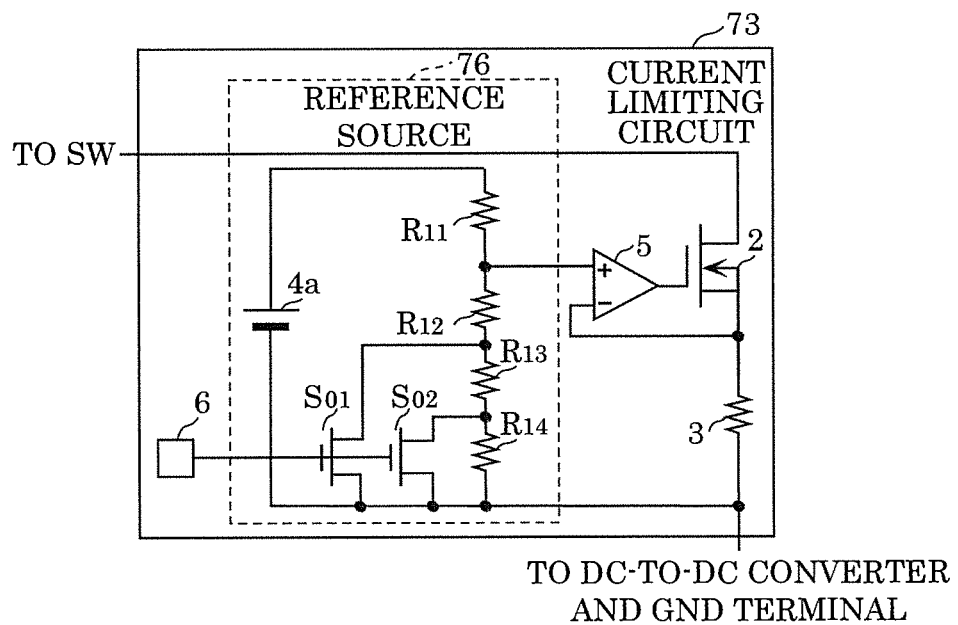
Figure 113:
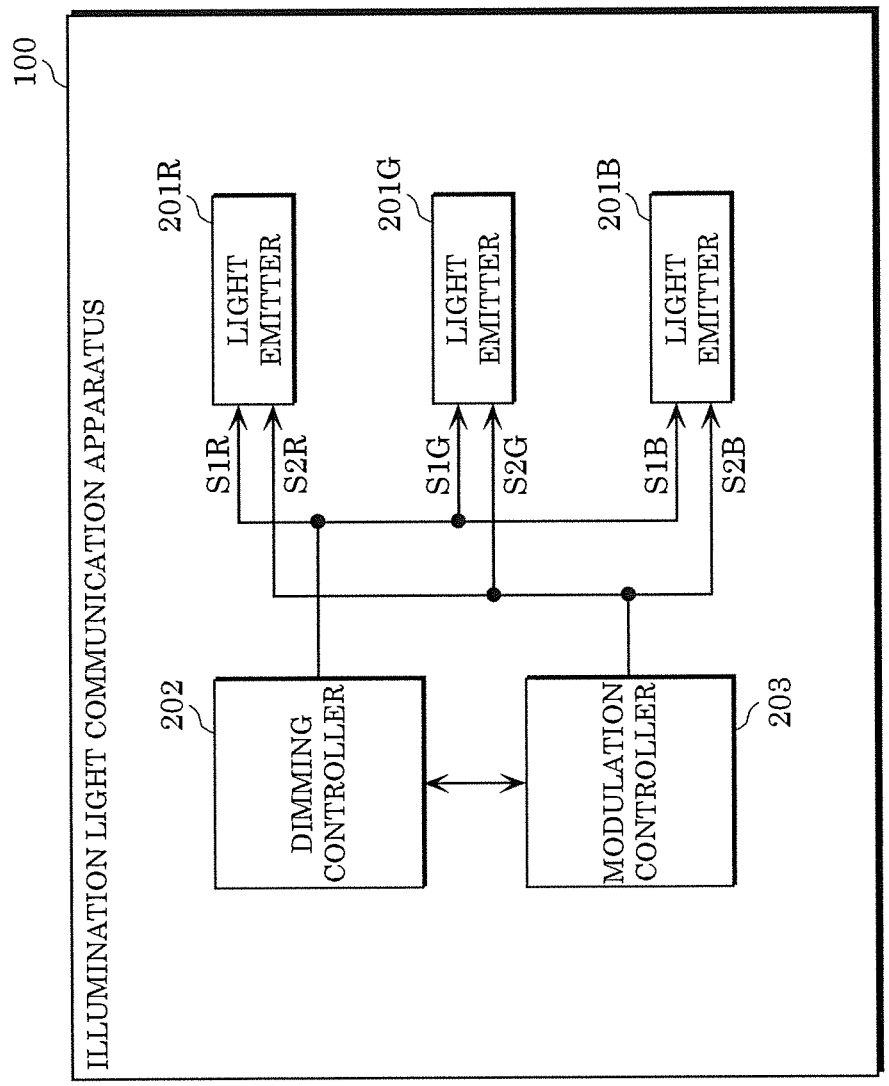
Figure 114:
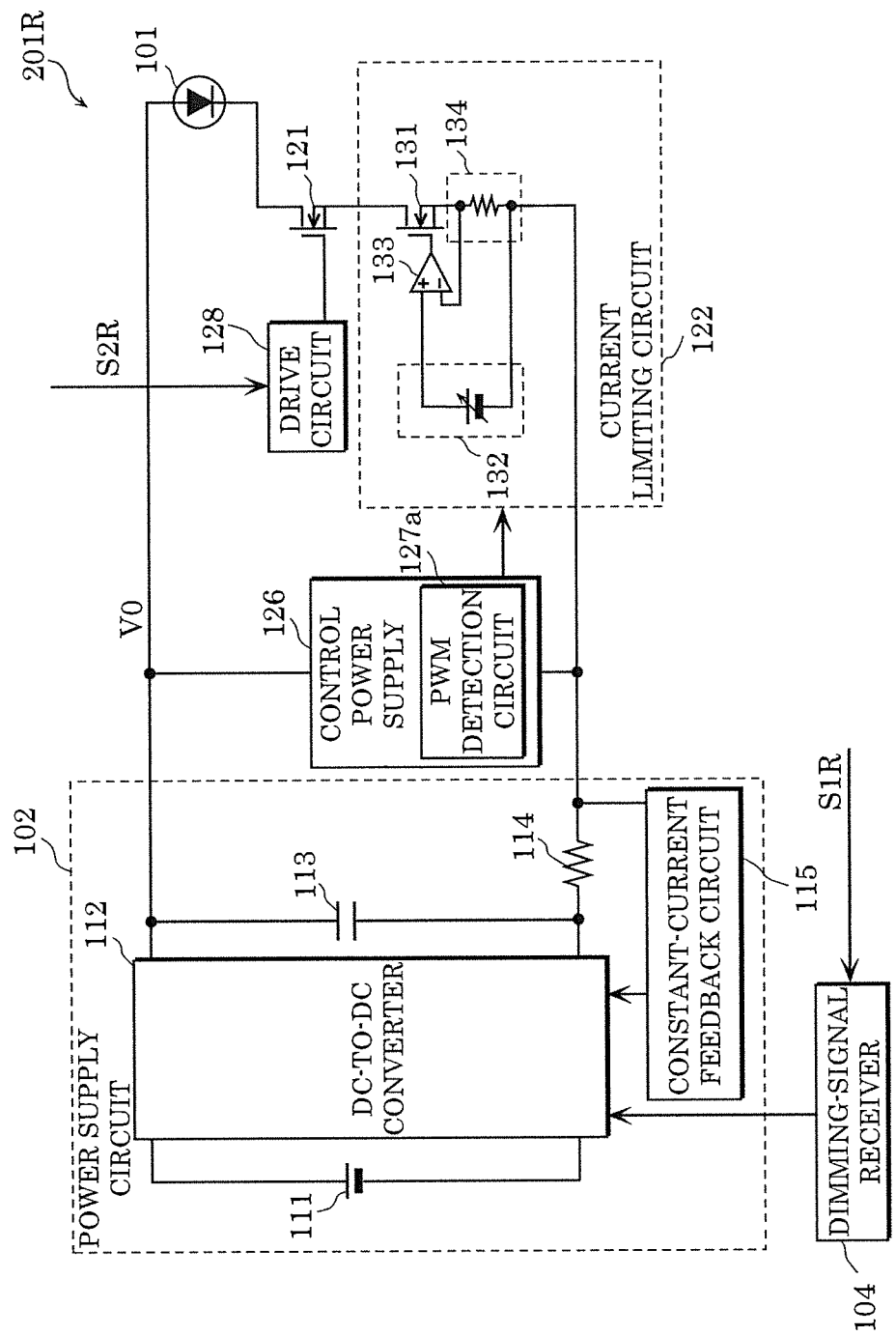
Figure 115:
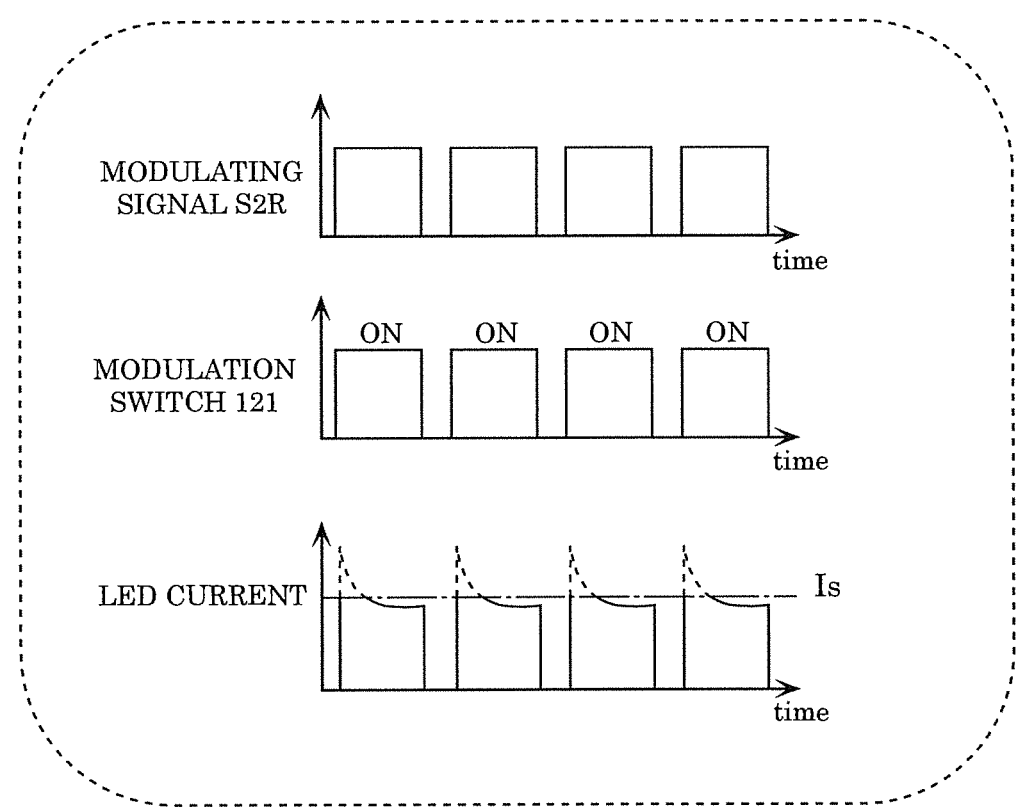
Figure 116:
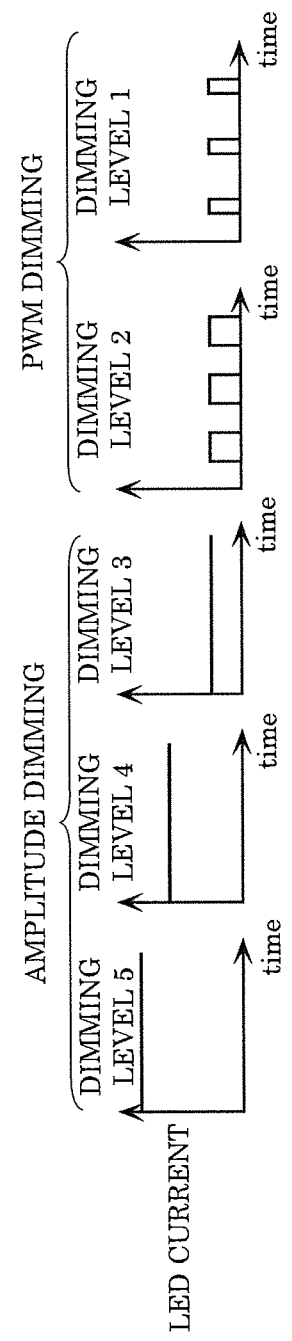
Figure 117:
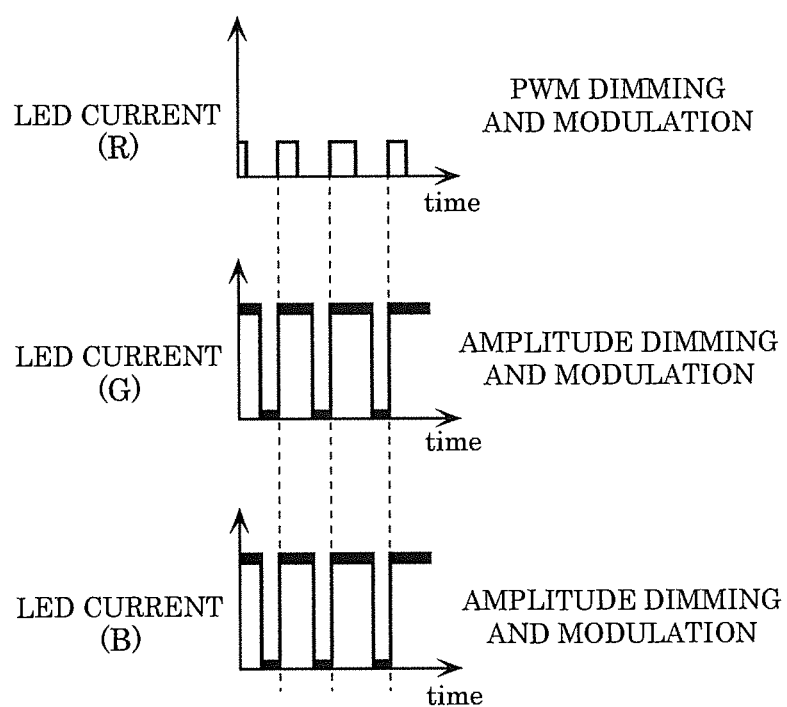
Figure 118:
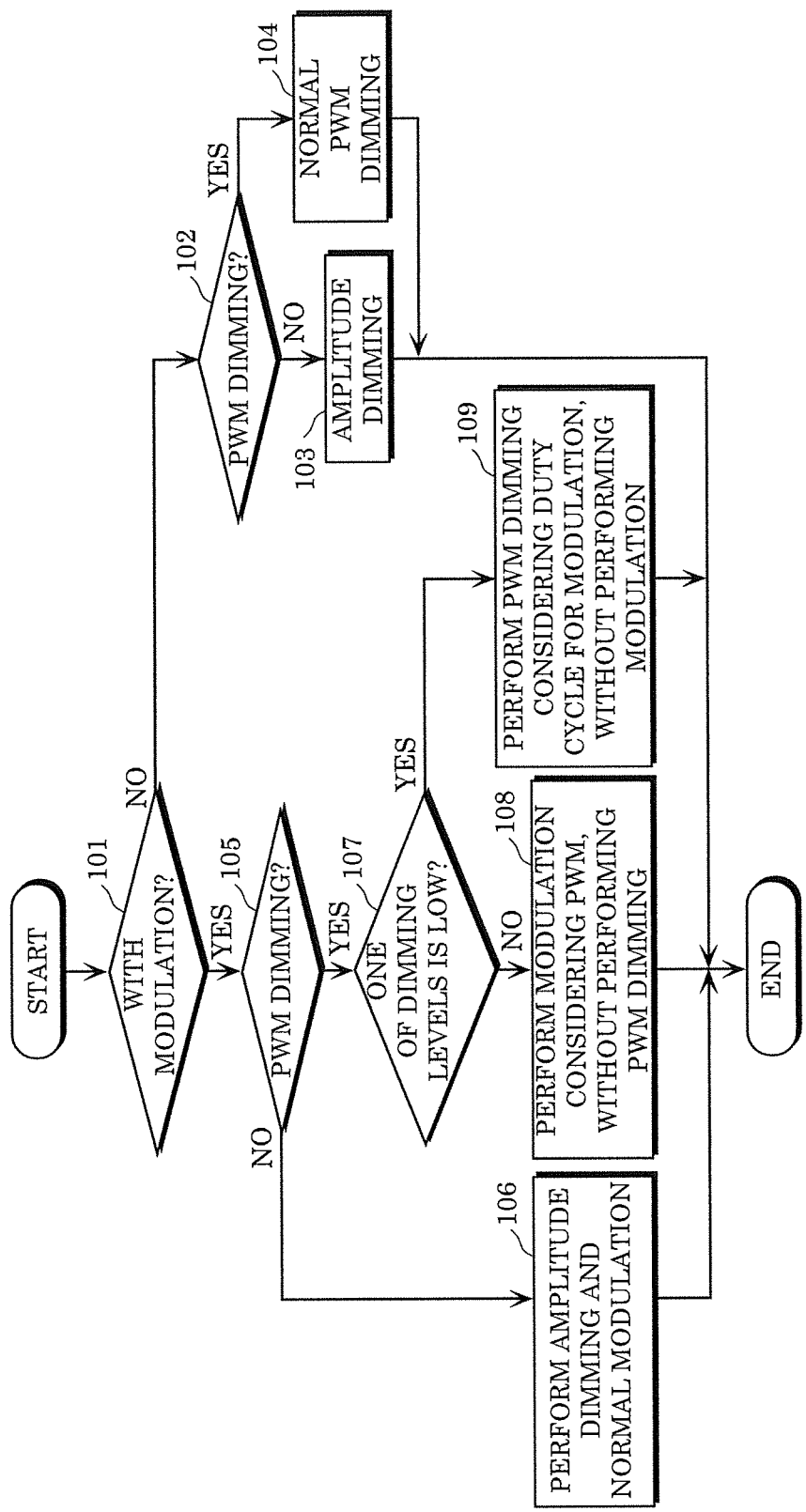
Figure 119:
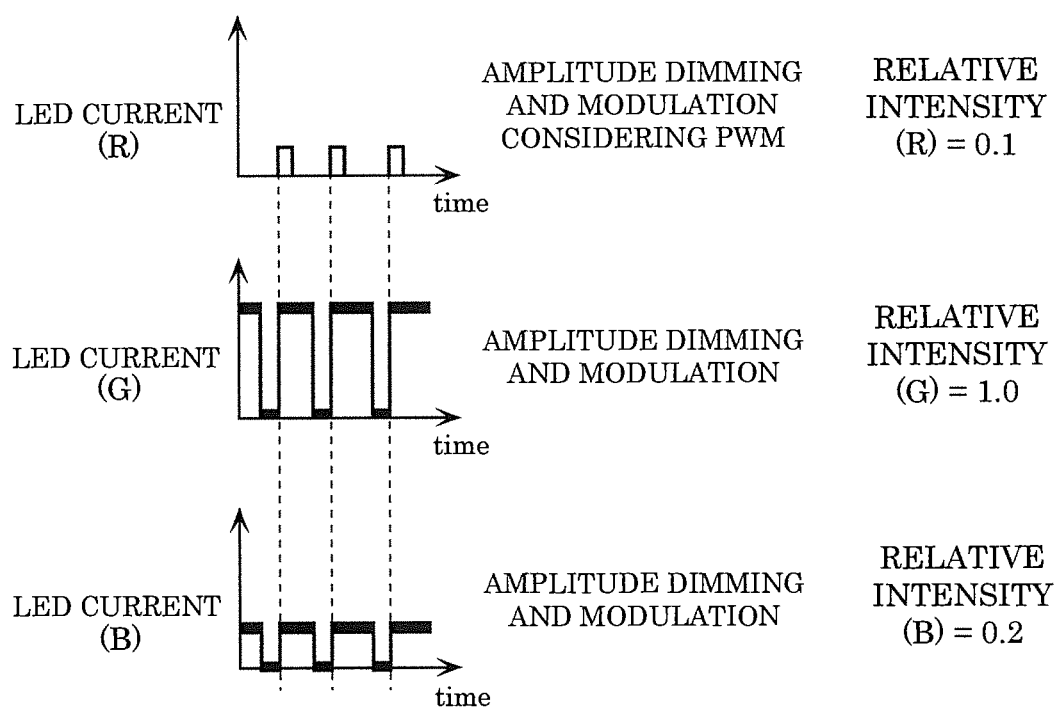
Figure 120:
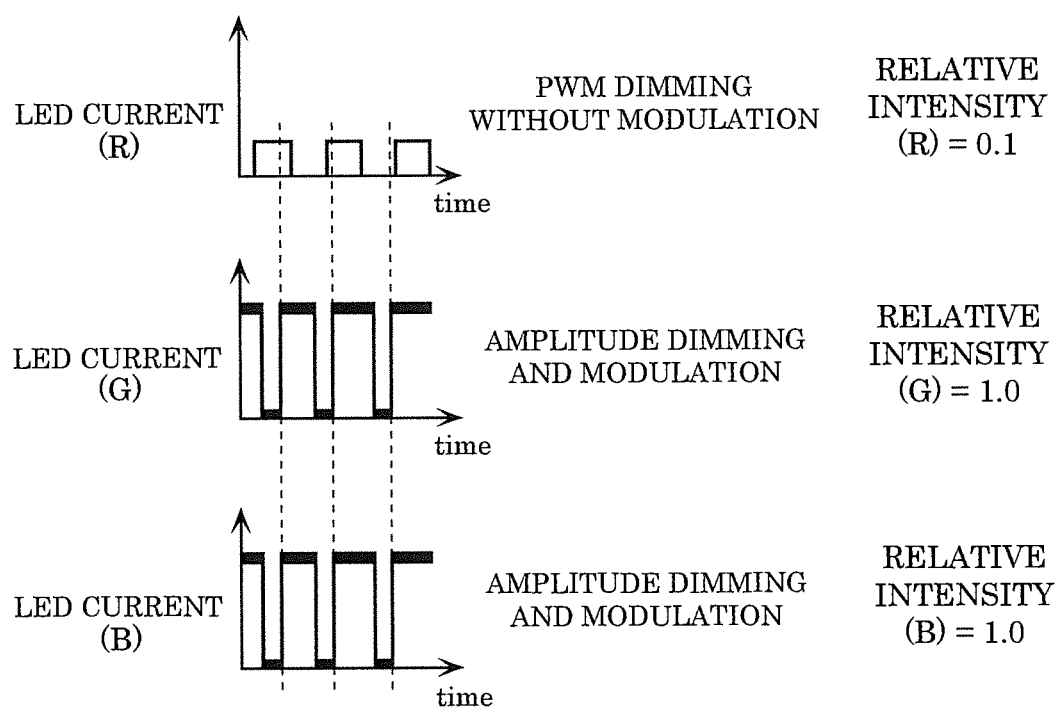
Figure 121:
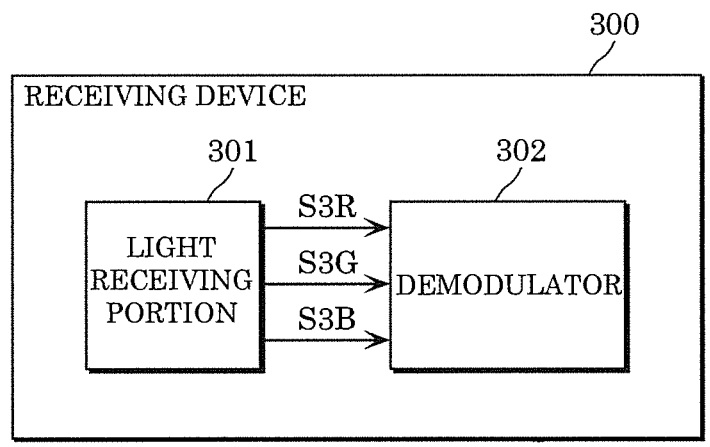
Figure 122:
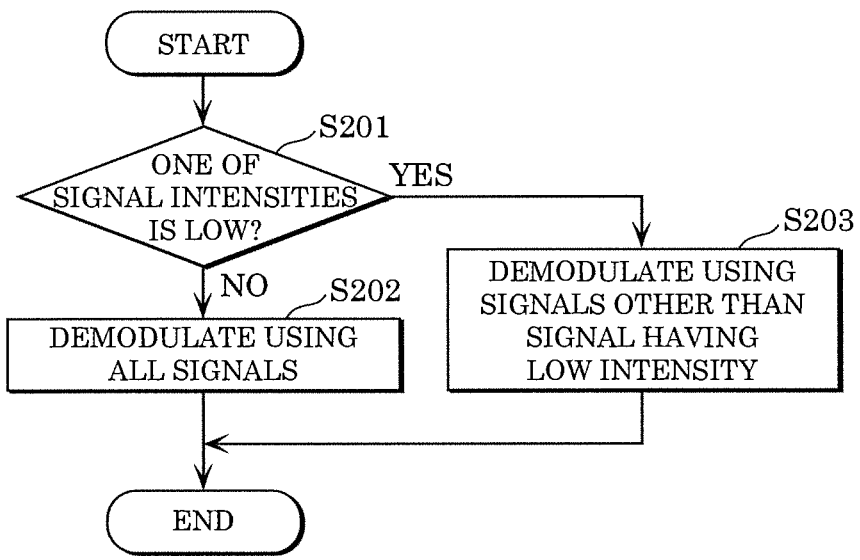
Figure 123:
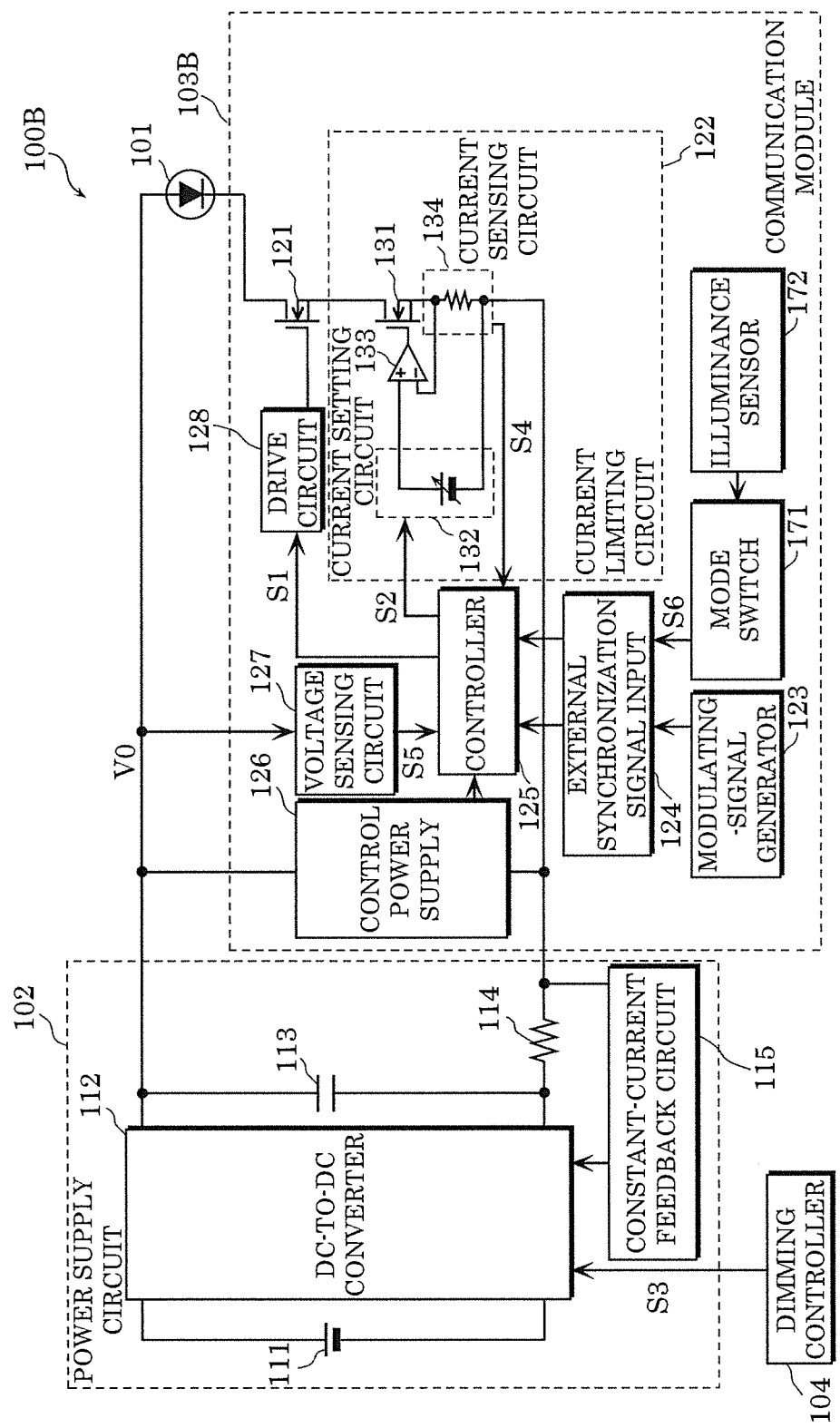
Figure 124:
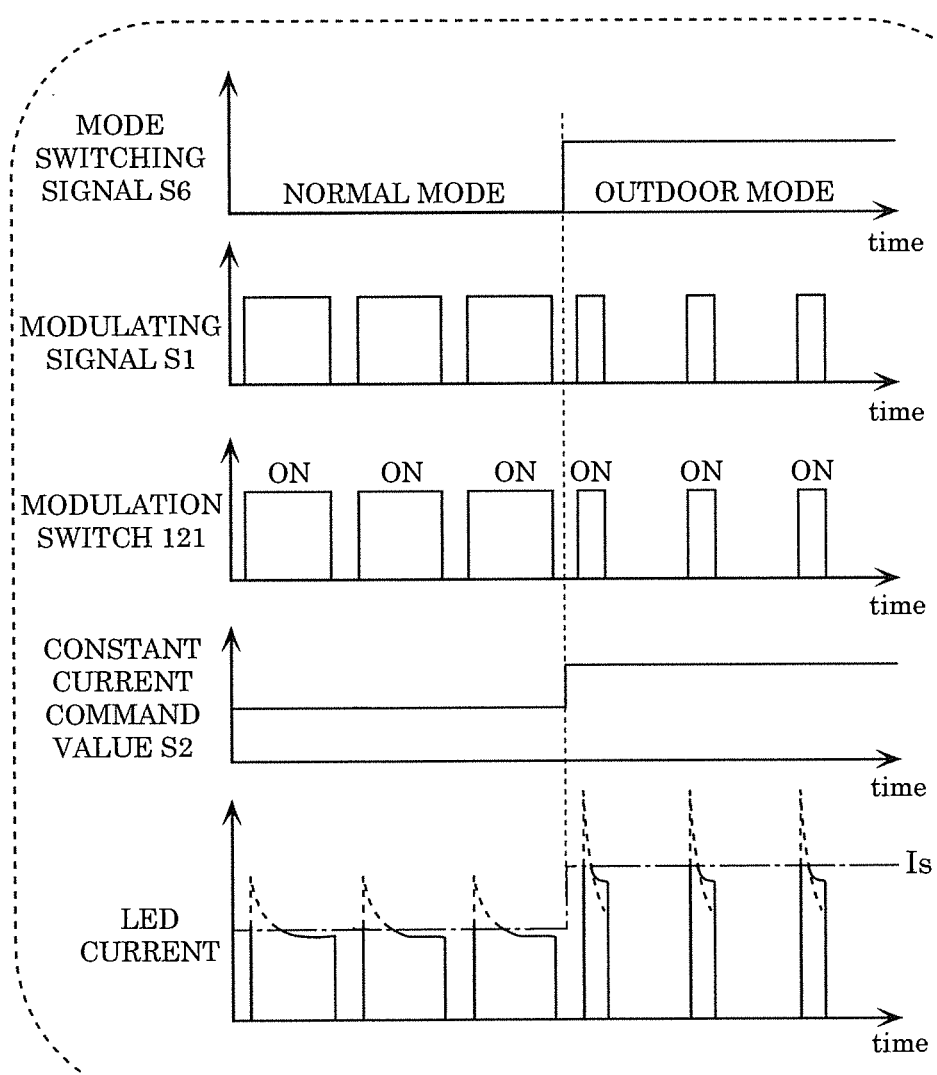
Figure 125:
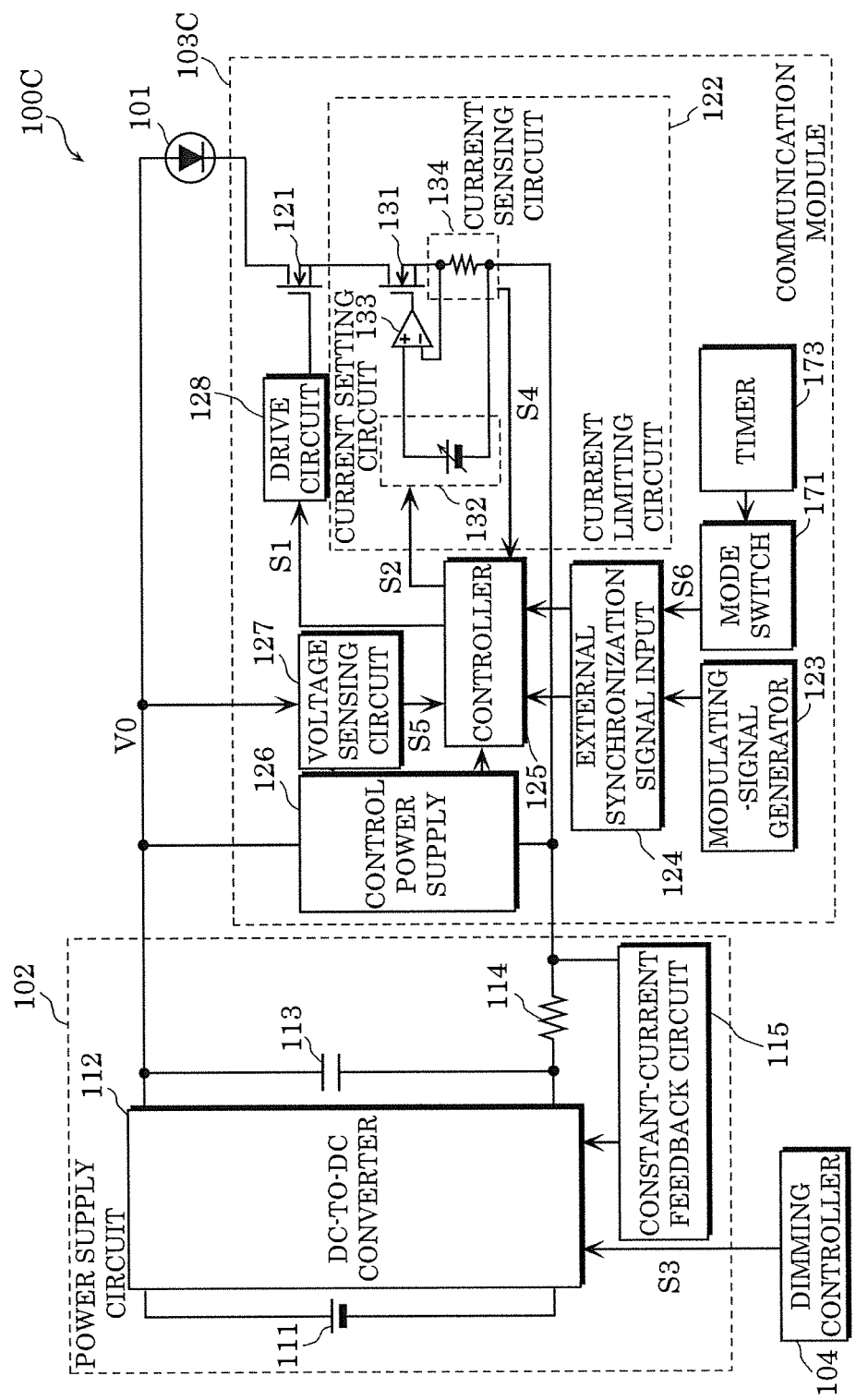
Figure 126:
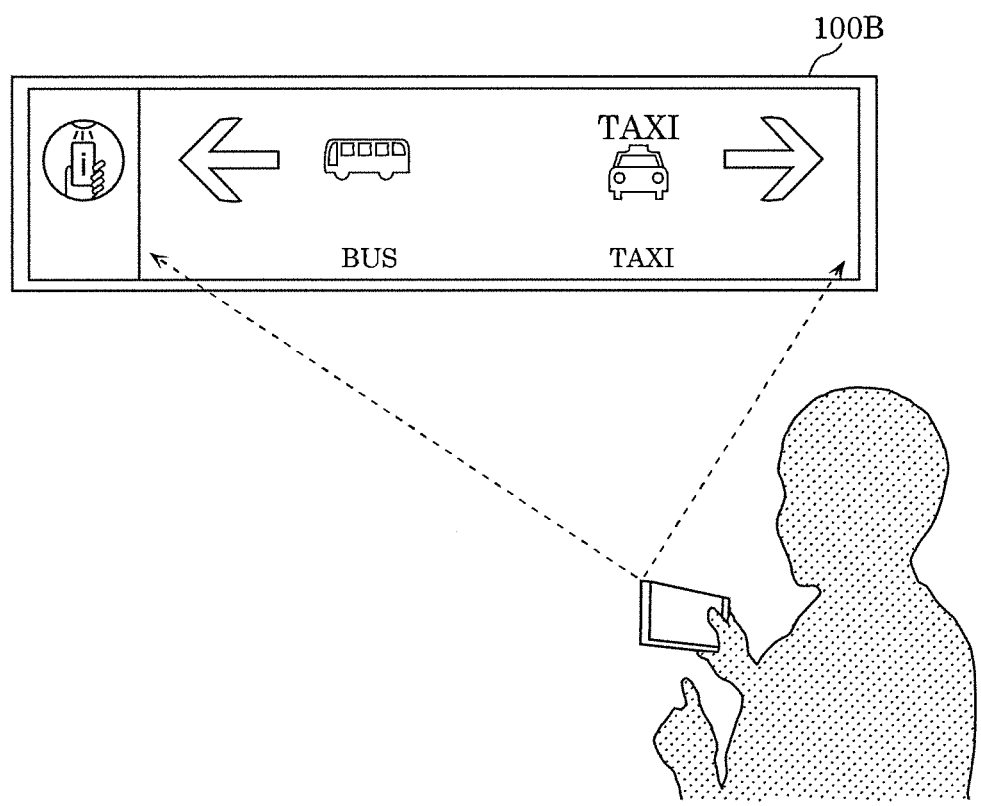
Figure 127:
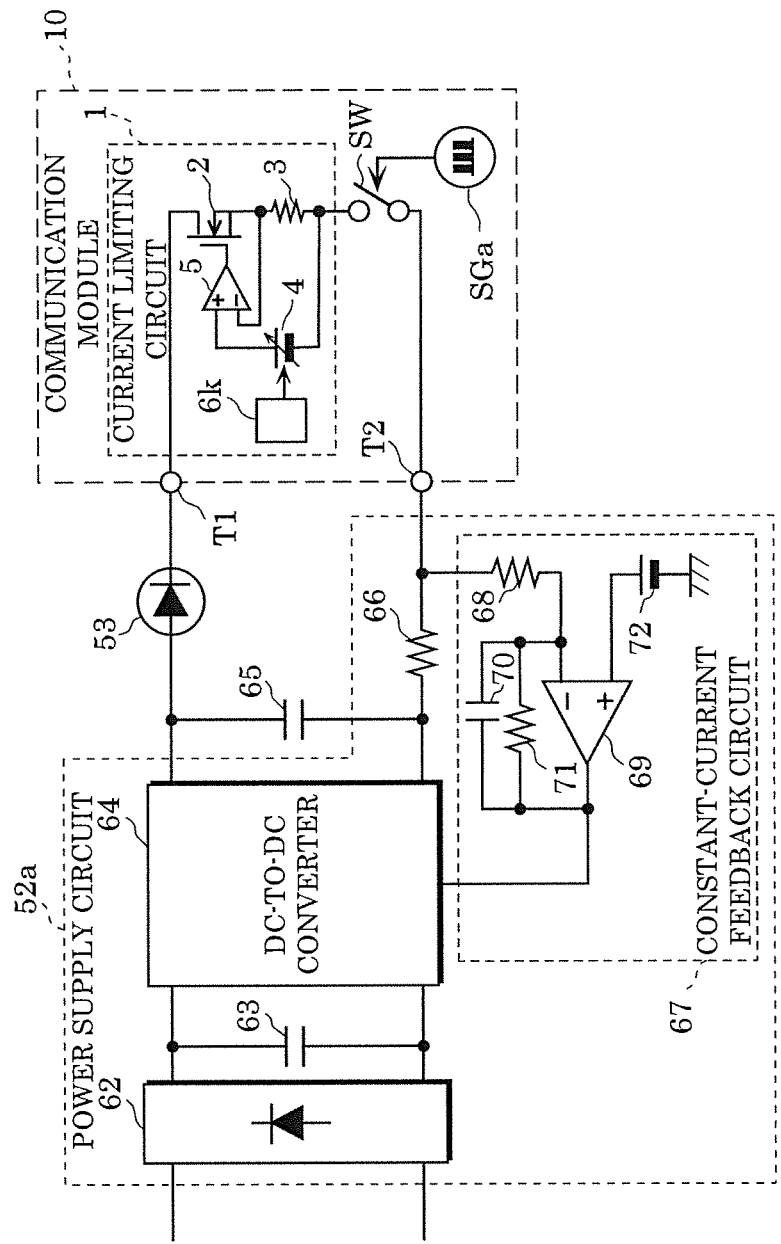
Figure 128:
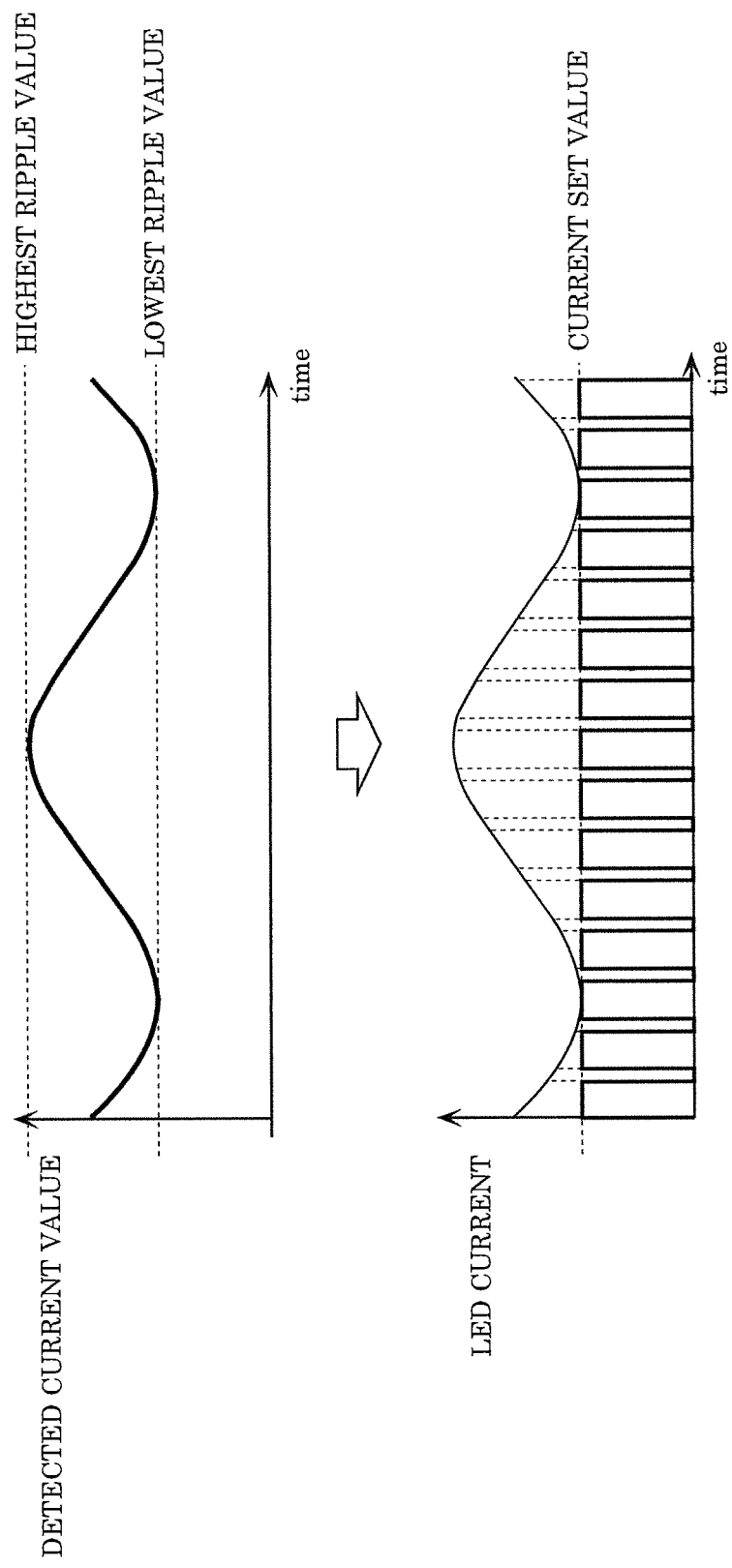
Figure 129A:
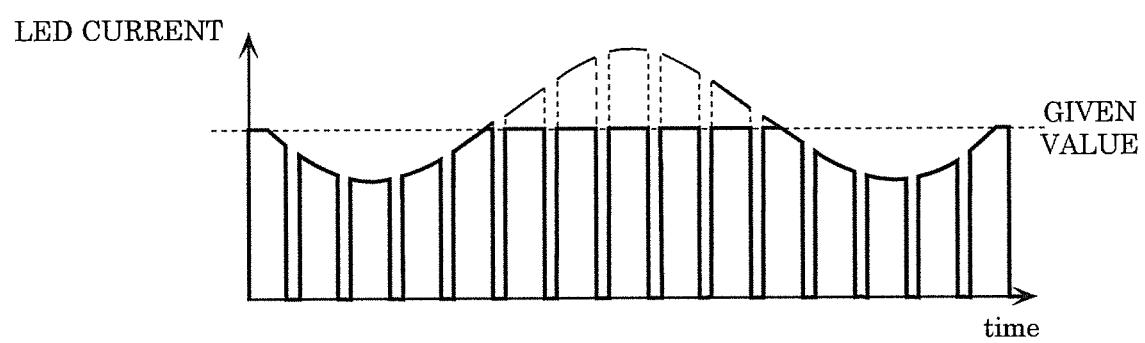
Figure 129B:
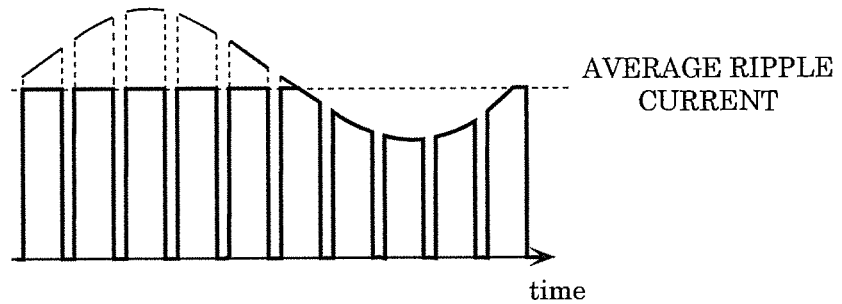
Figure 130:
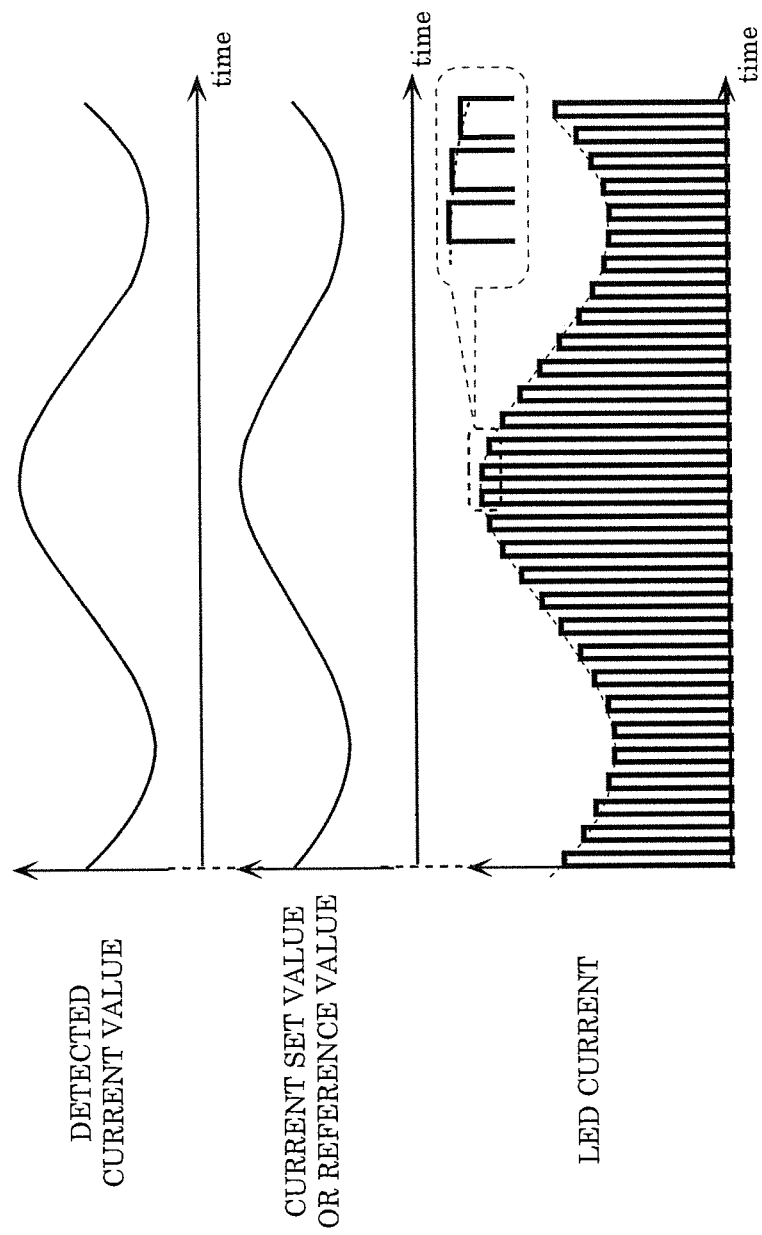
Figure 131:
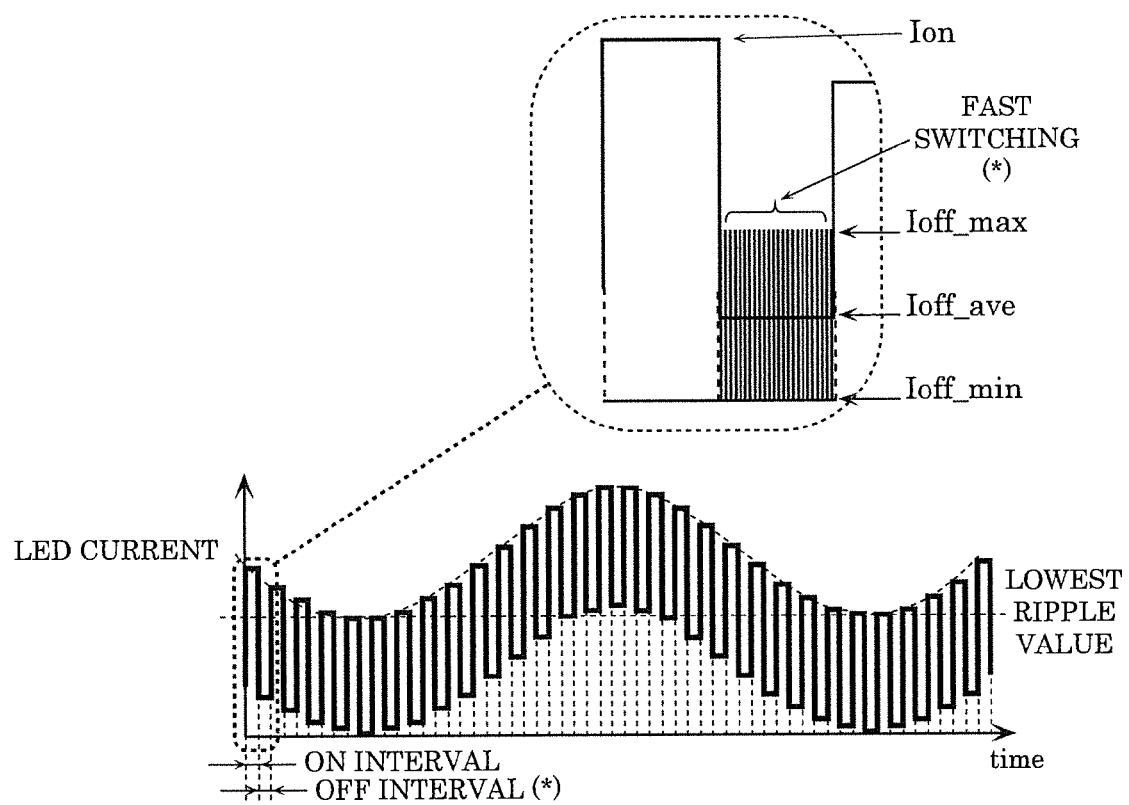
Figure 132:
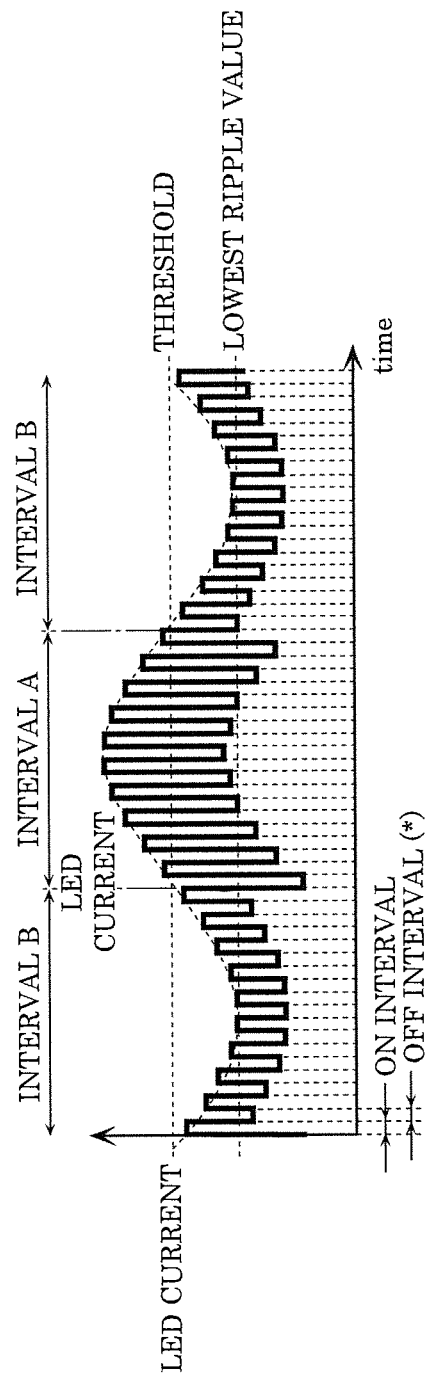
Figure 133:
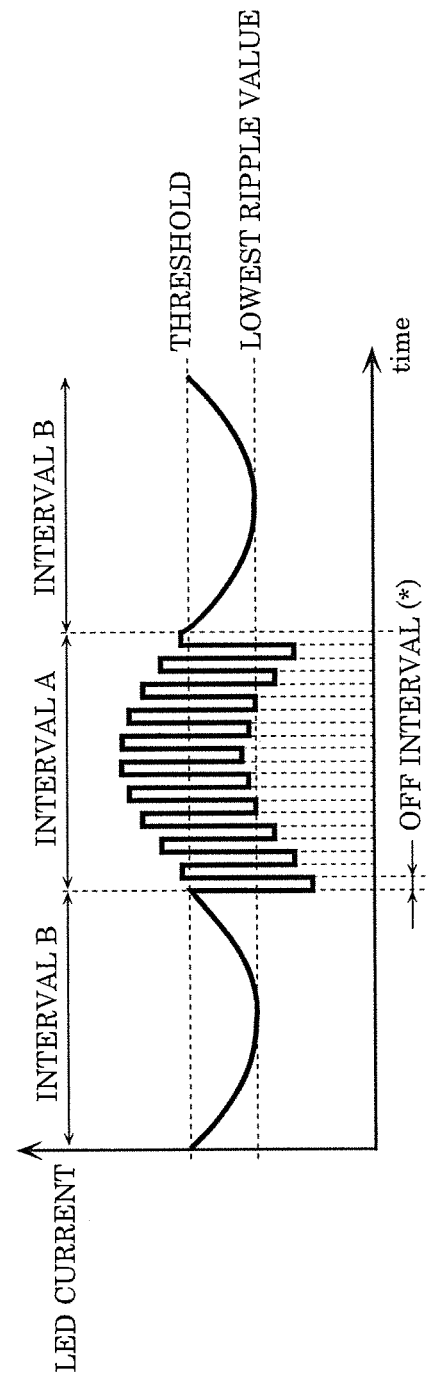
Figure 134:
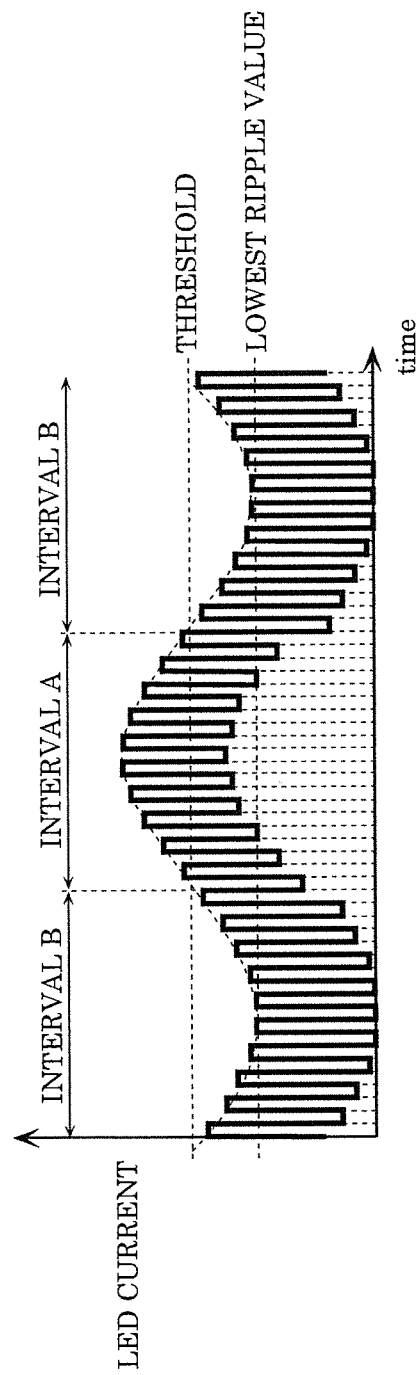
Figure 135:
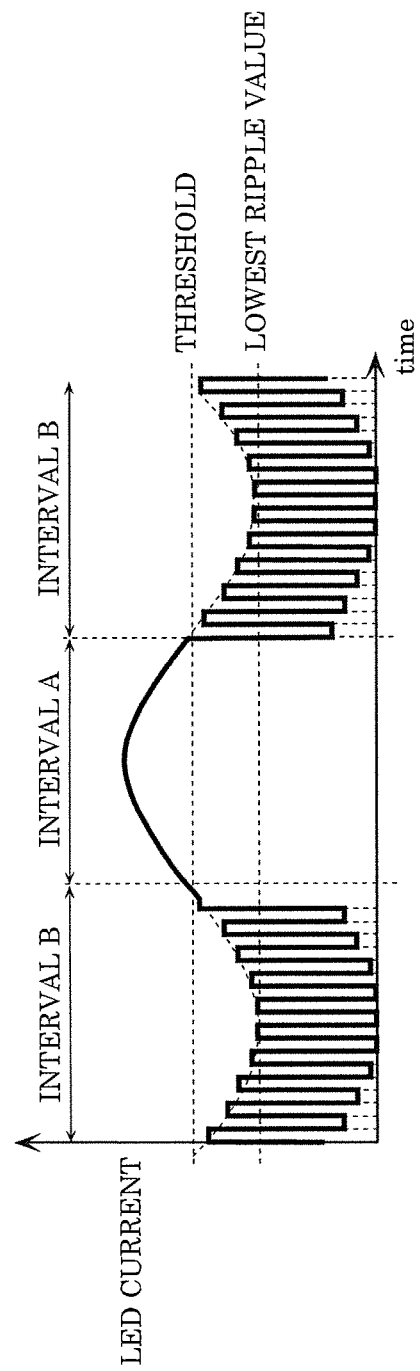
Figure 136:
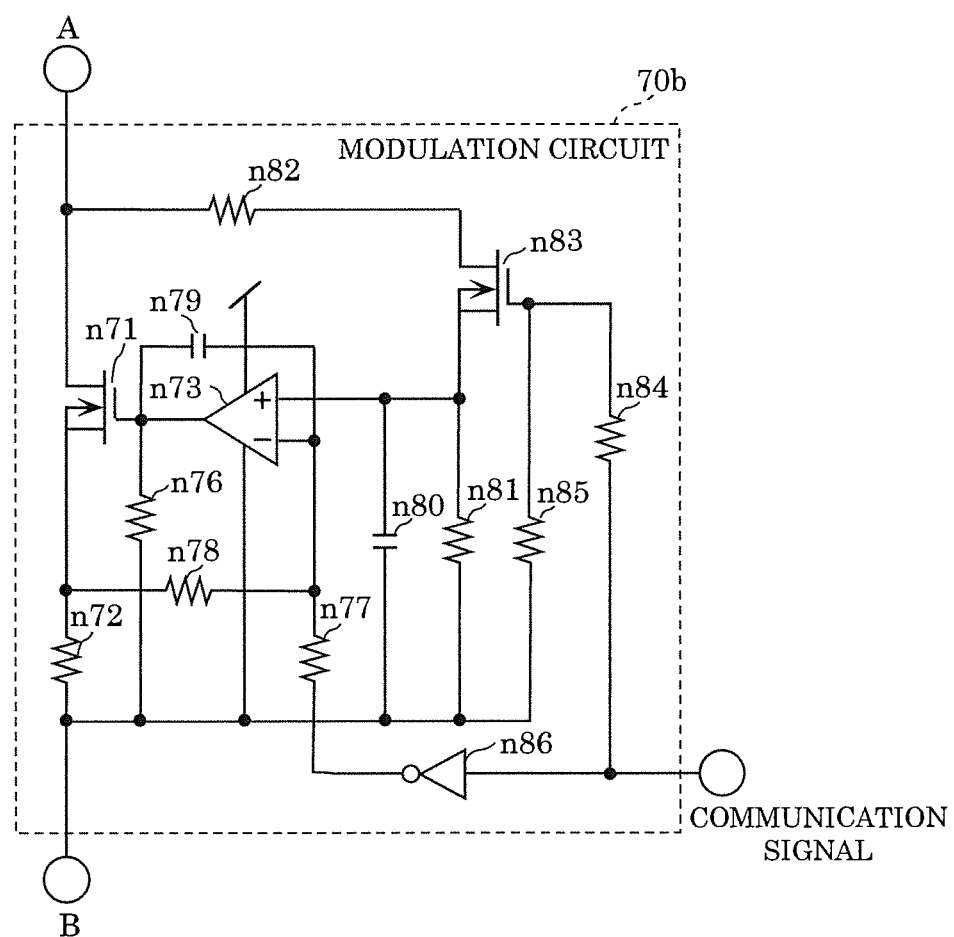
Figure 137:
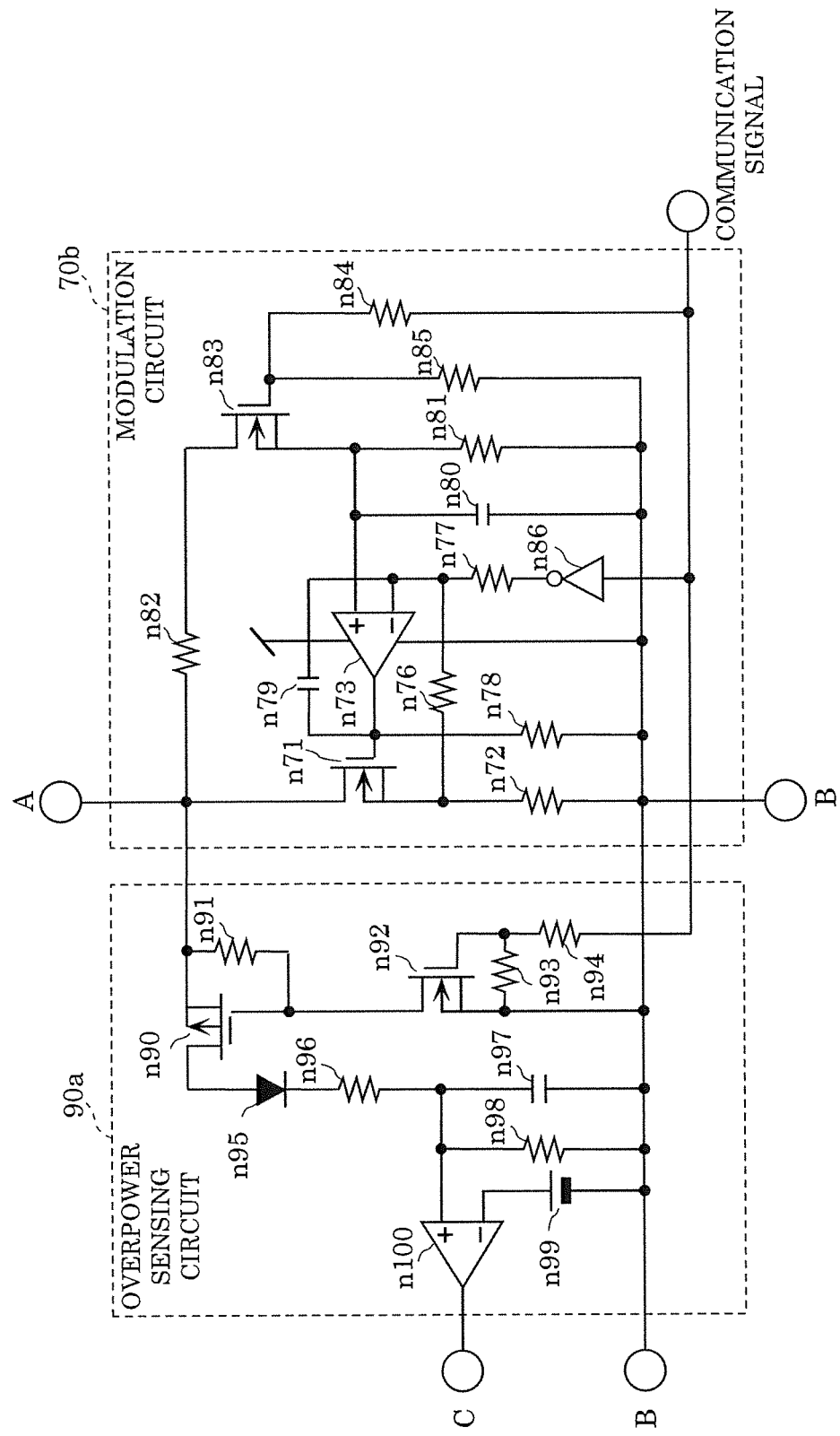
Figure 138:
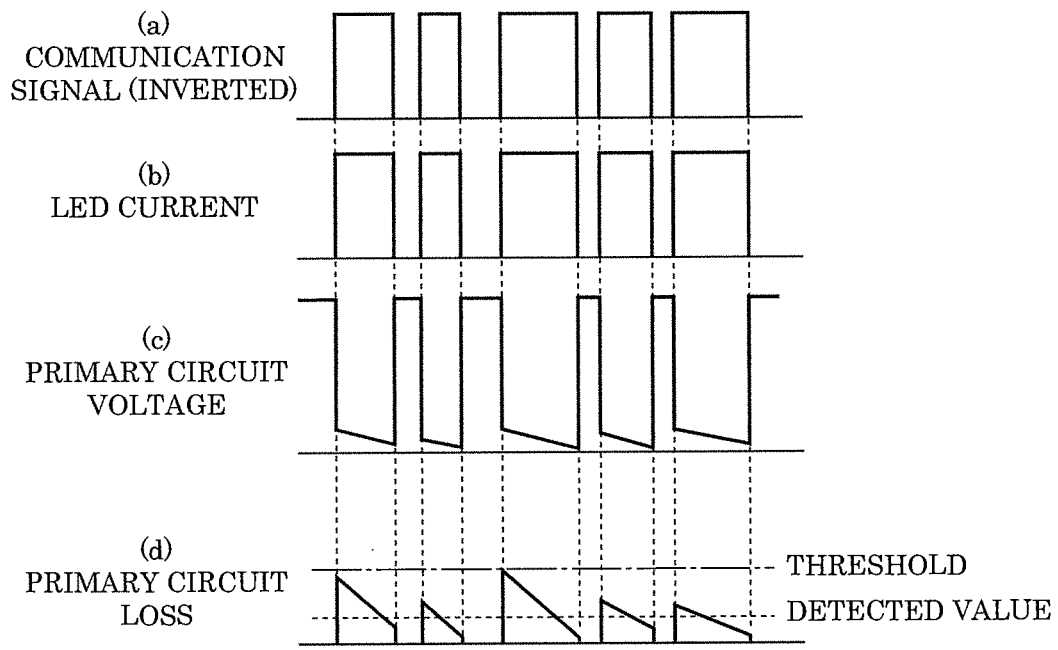
Figure 139:
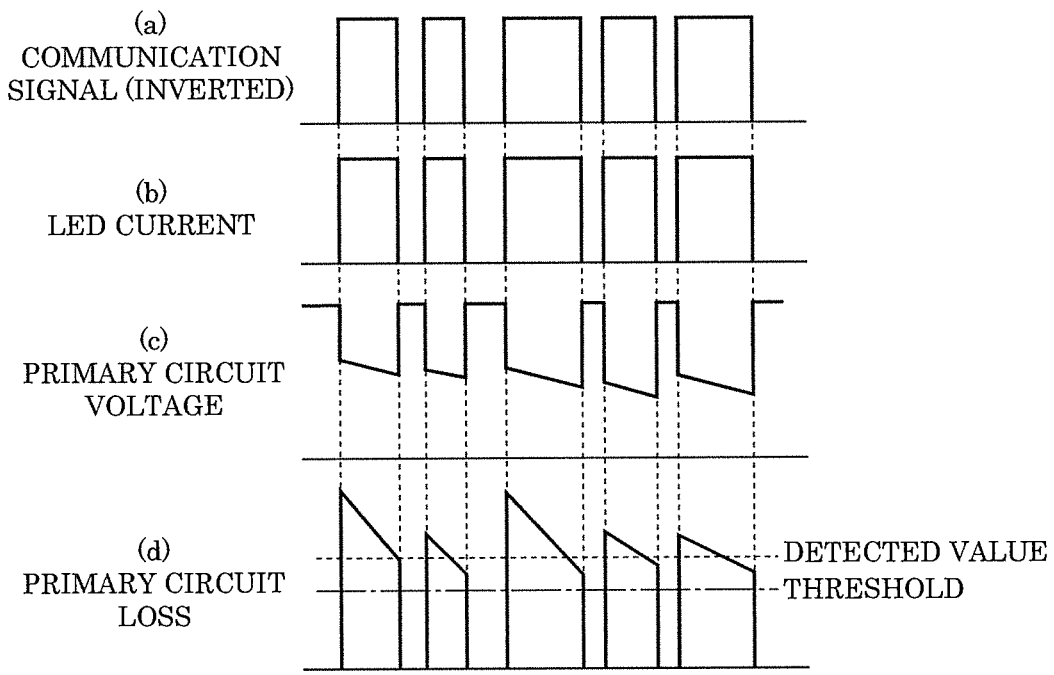
Figure 140:
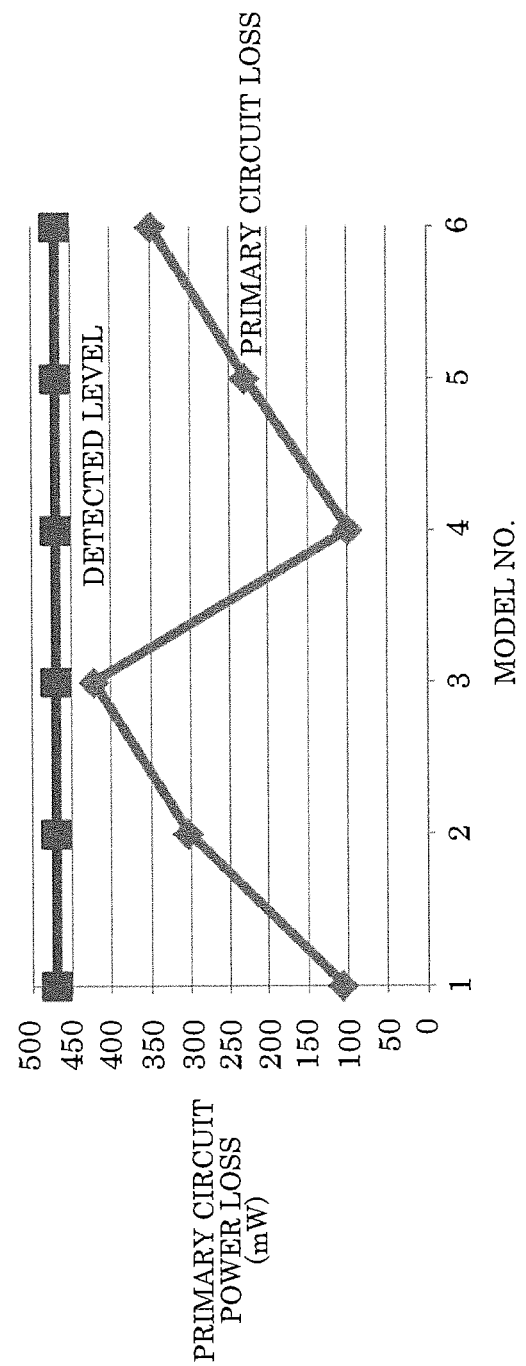
Figure 141:
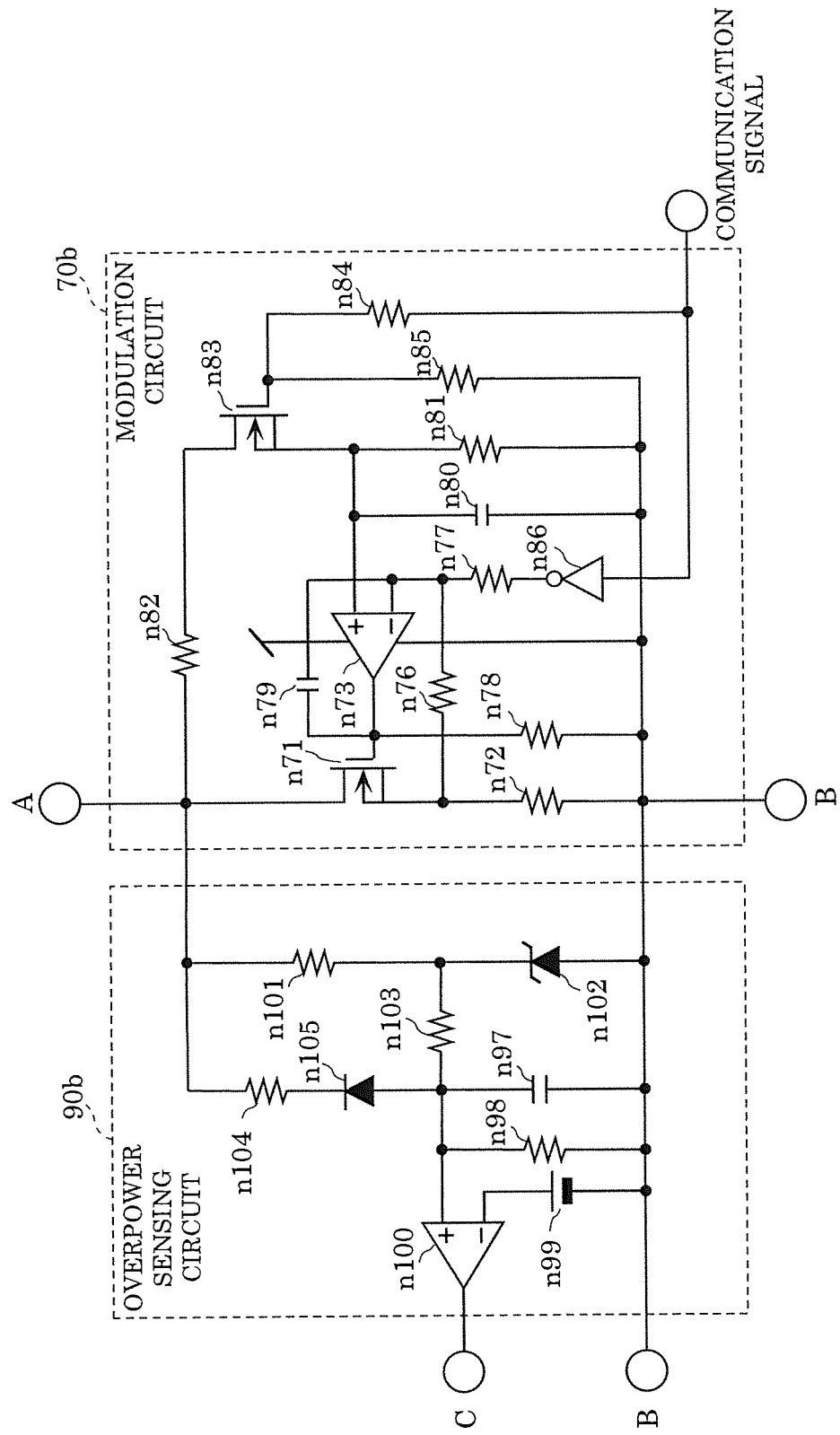
Figure 142:
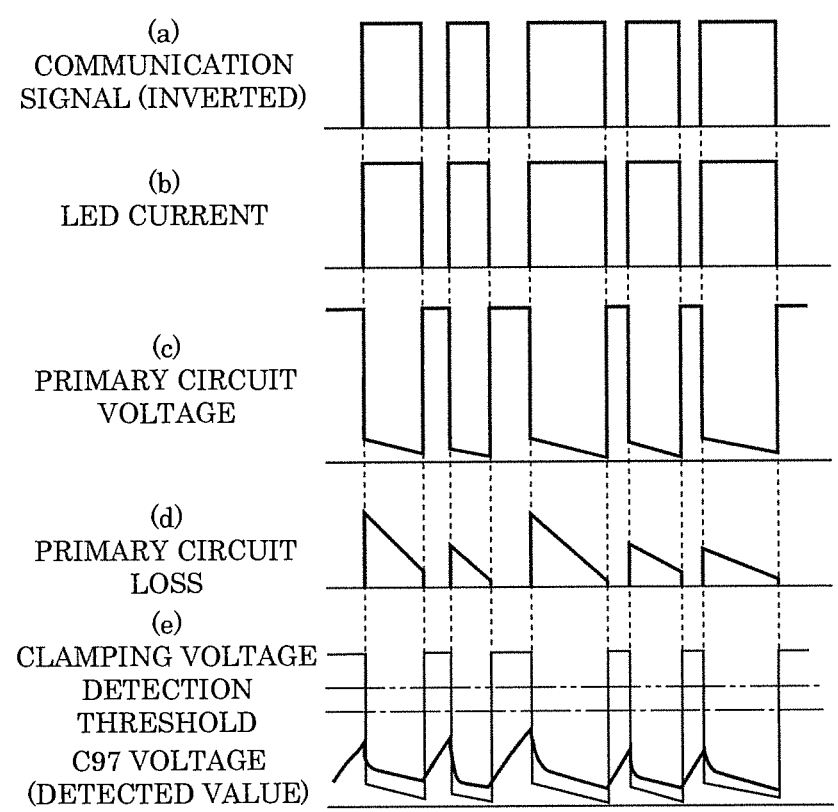
Figure 143:
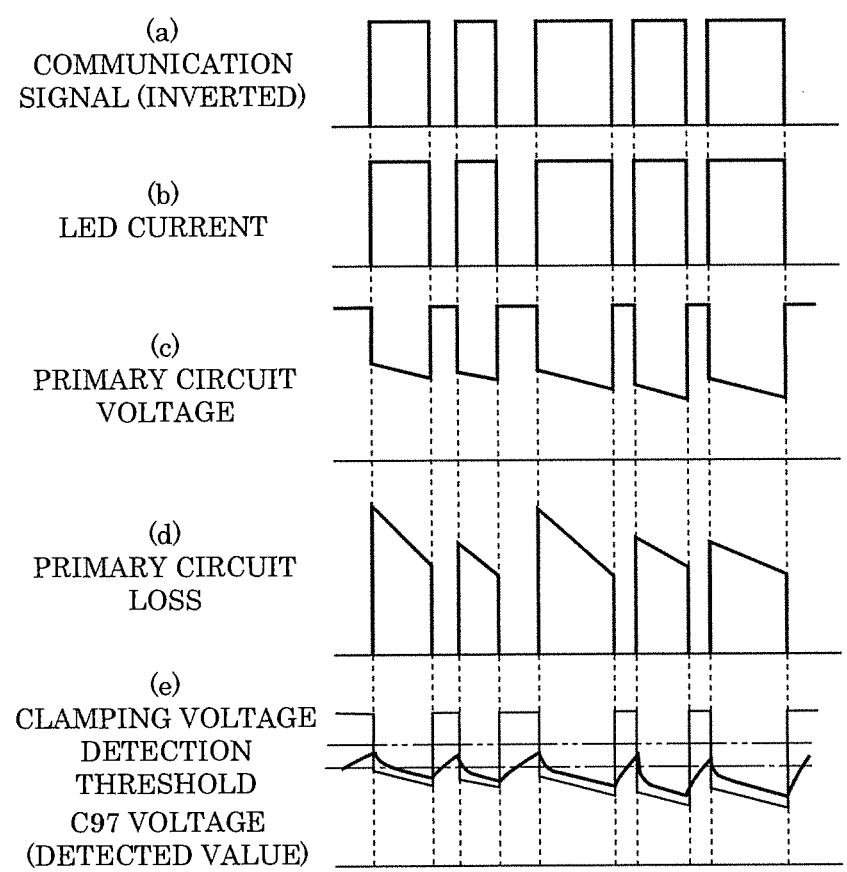
Figure 144:
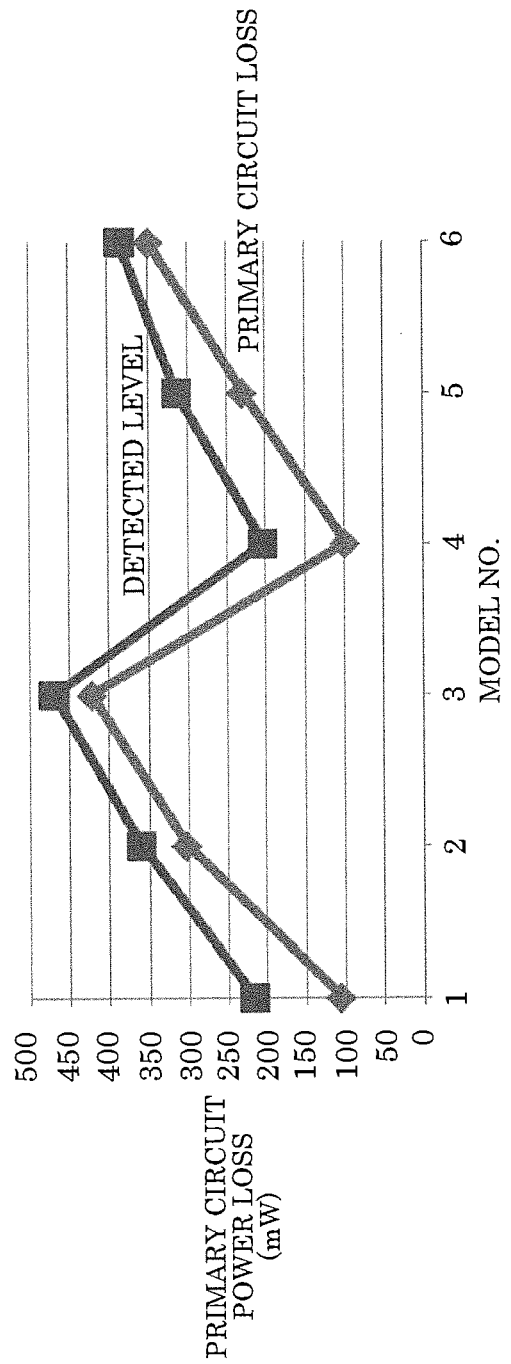
Figure 145:
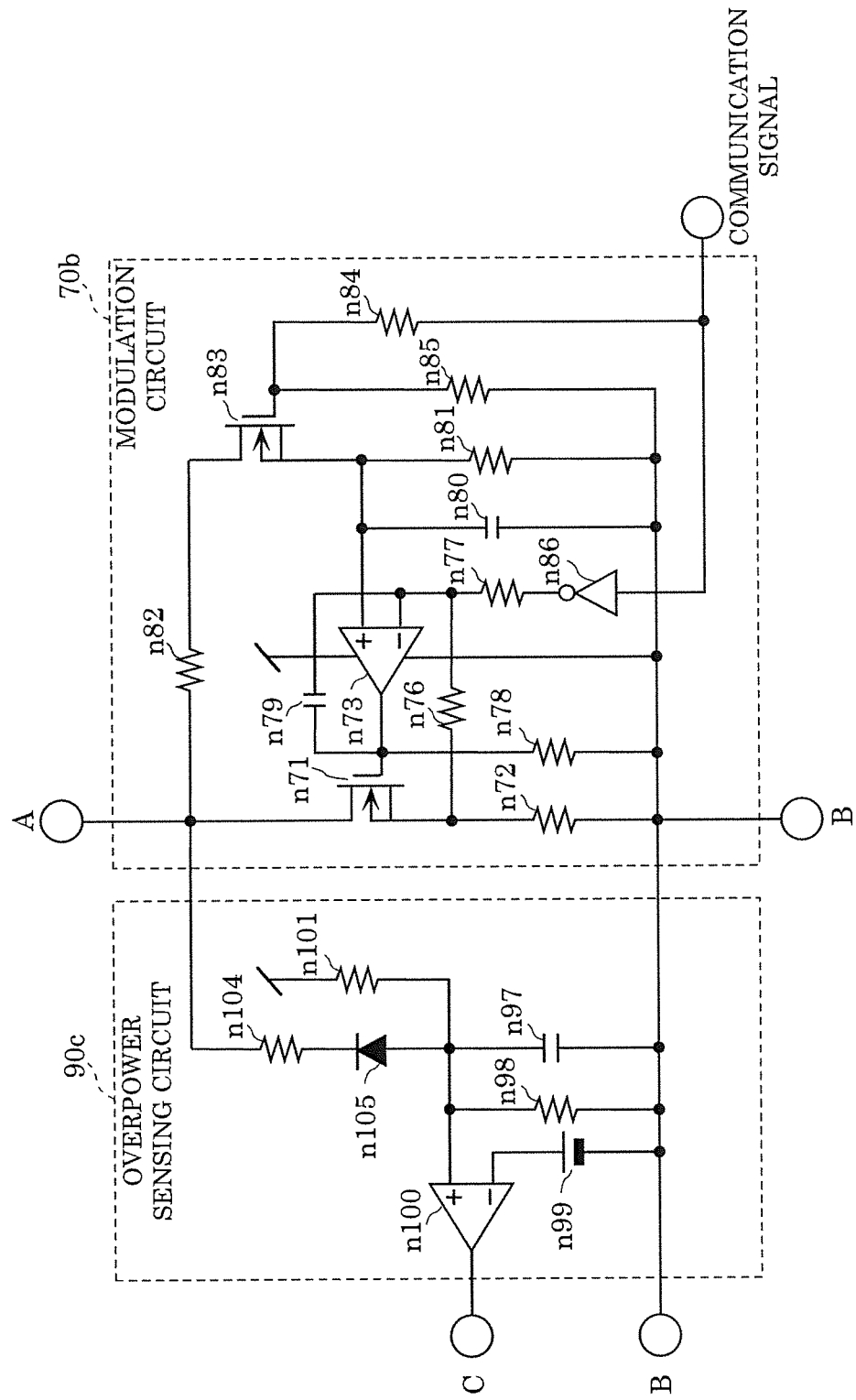
Figure 146:
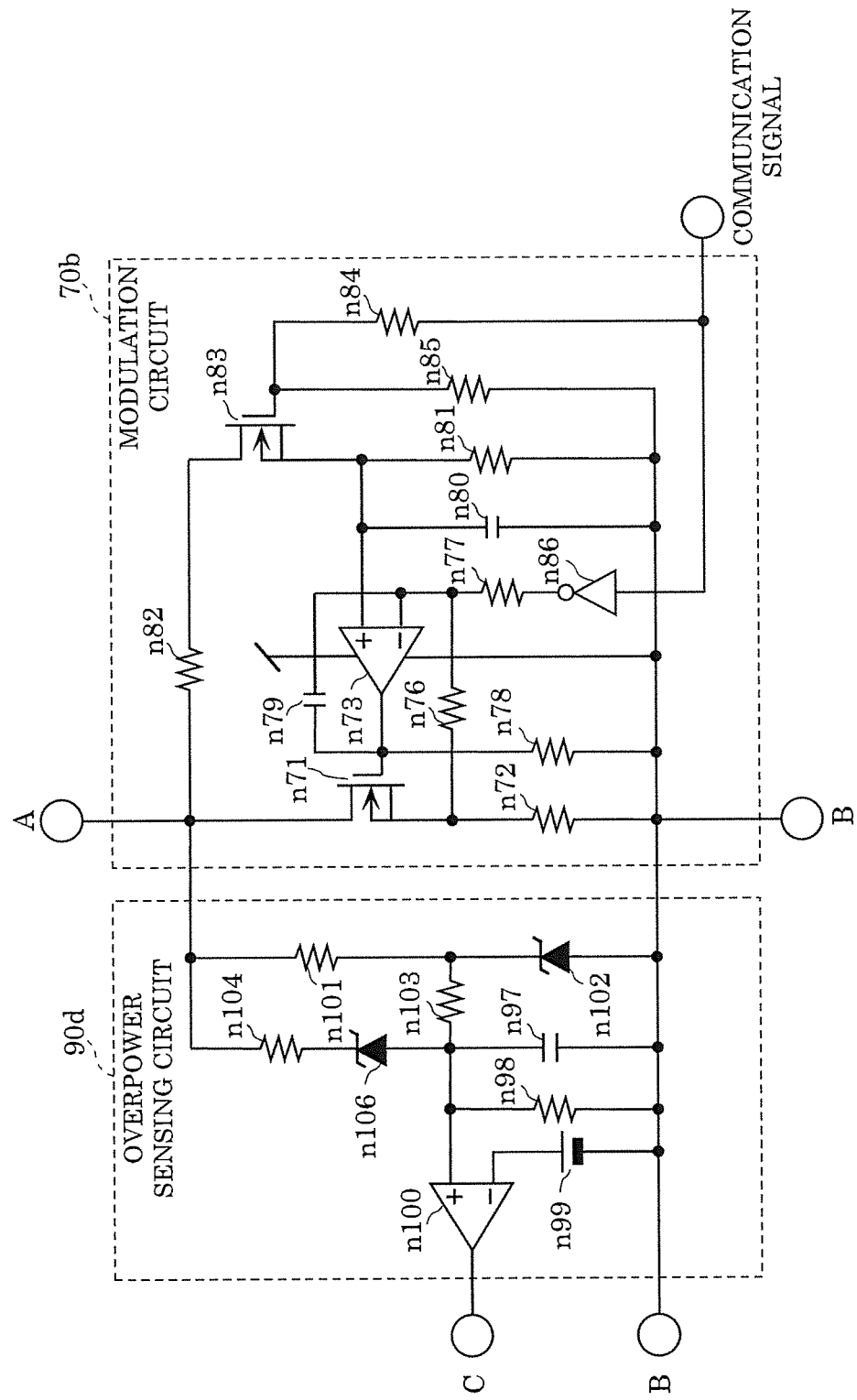
Figure 147:
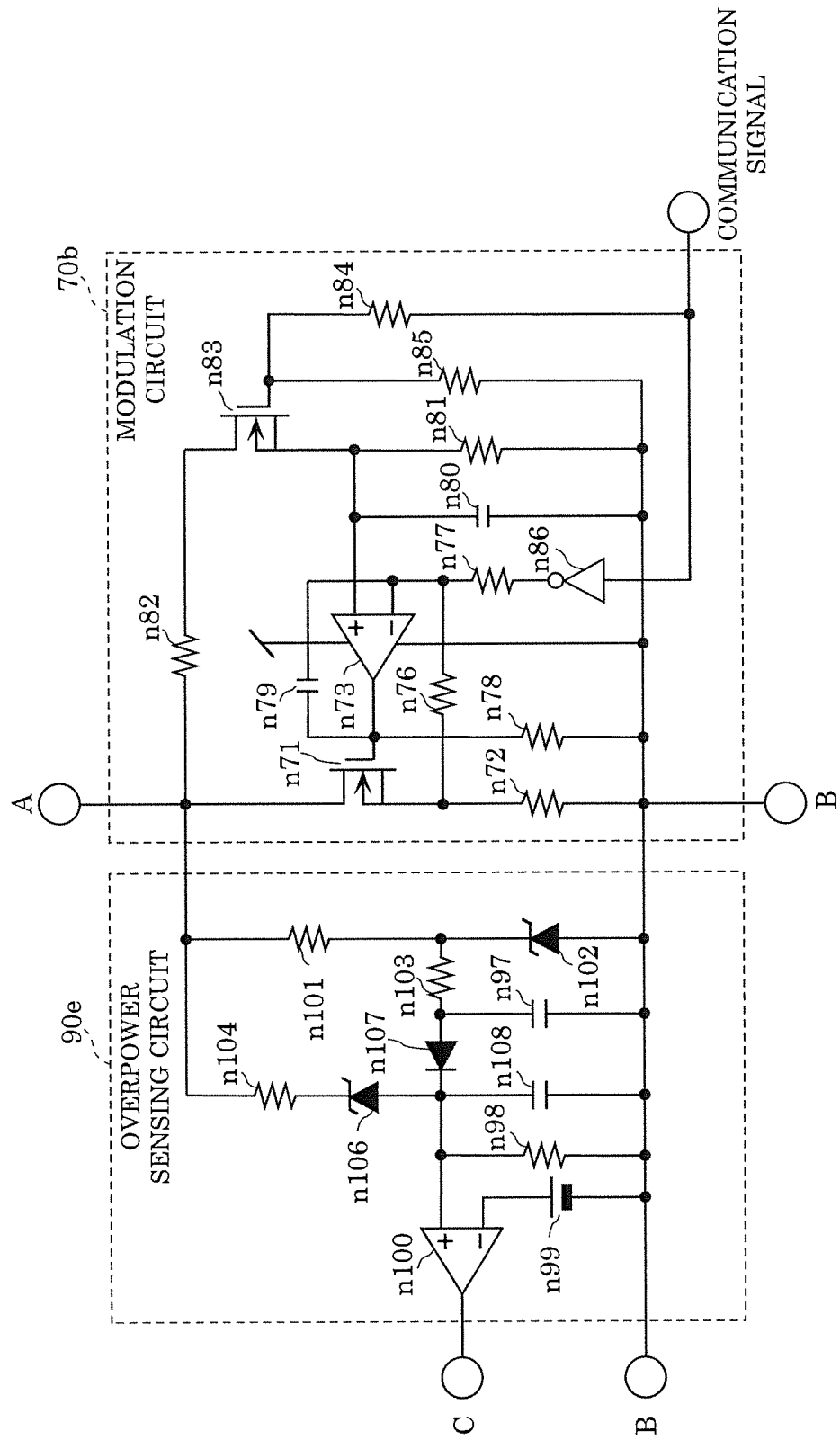
Figure 148:
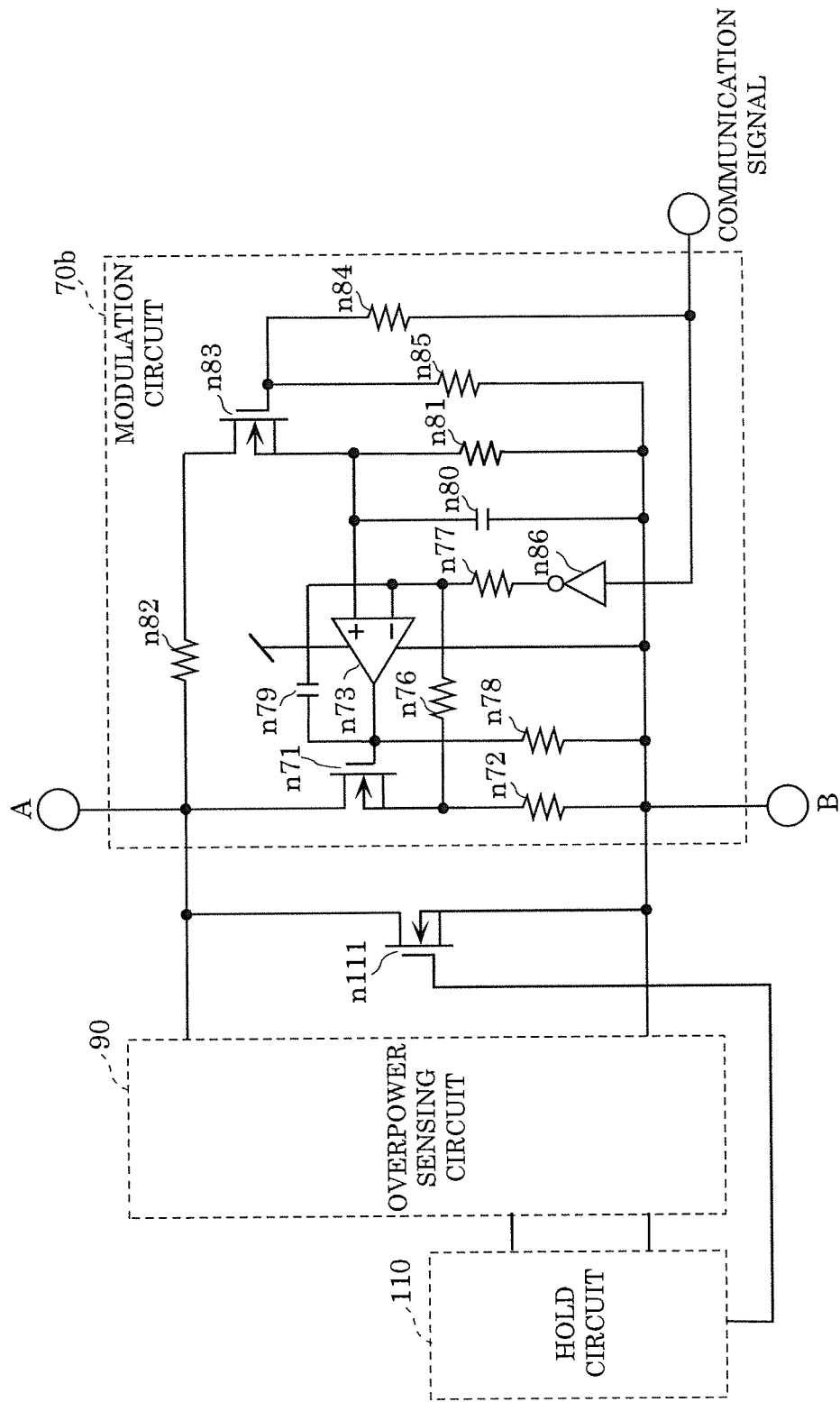
Figure 149:
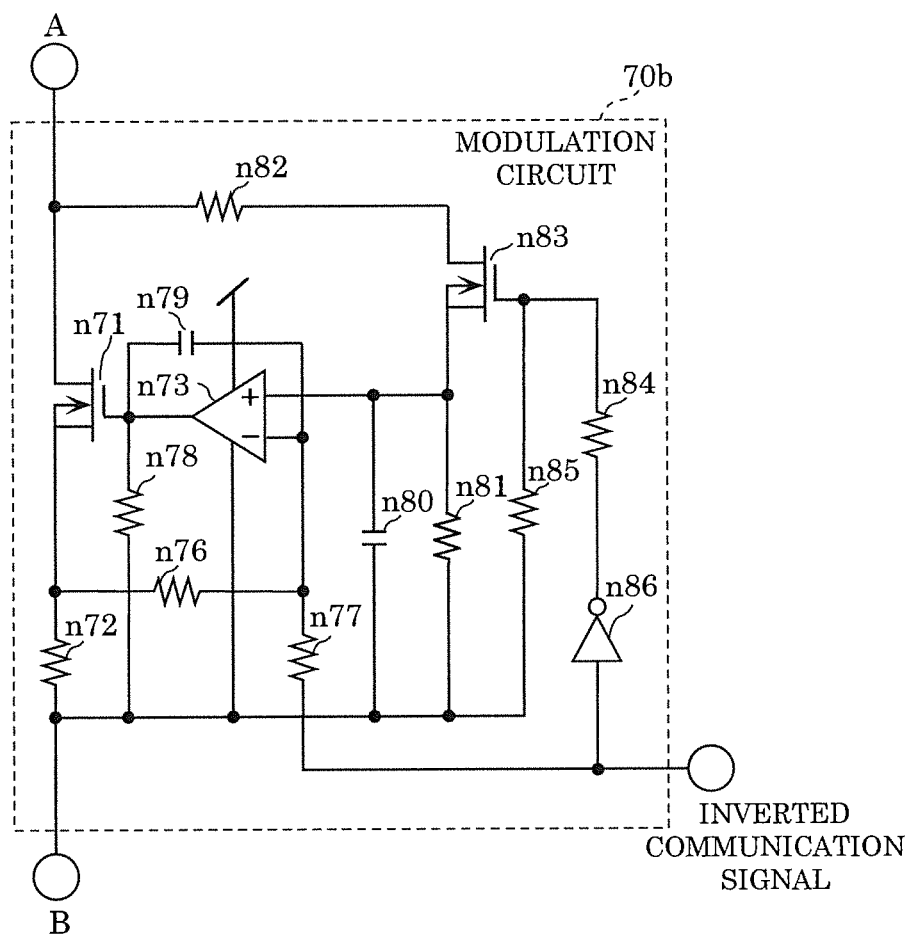
Figure 150:
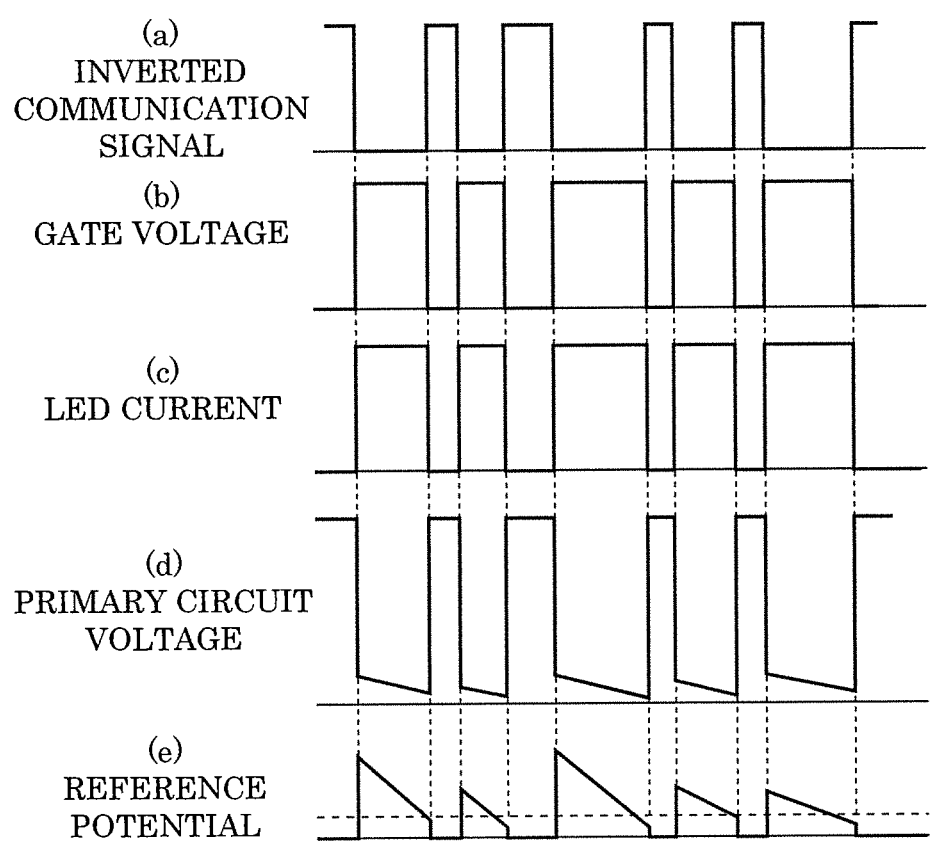
Figure 151:
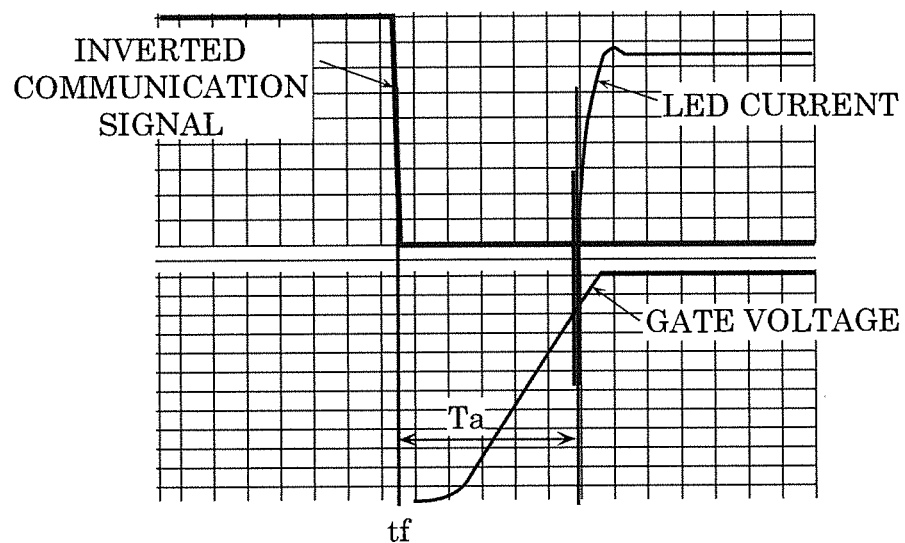
Figure 152:
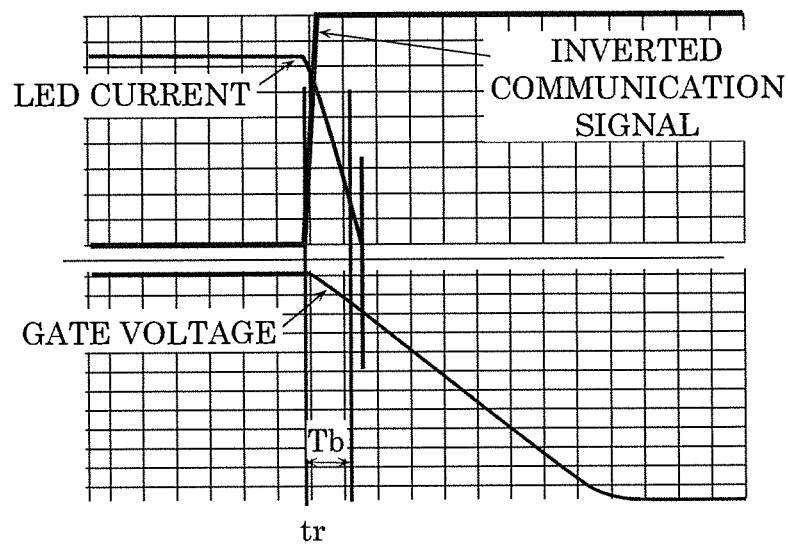
Figure 153:
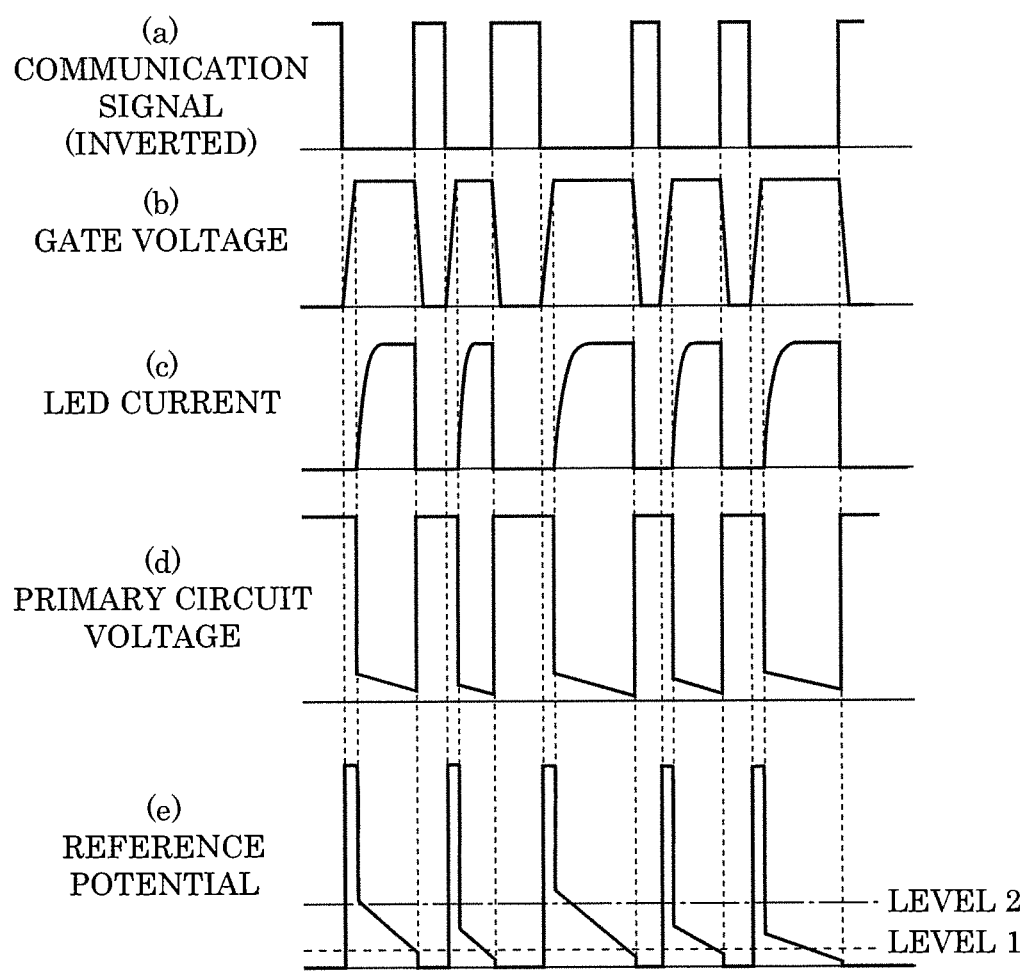
Figure 154:
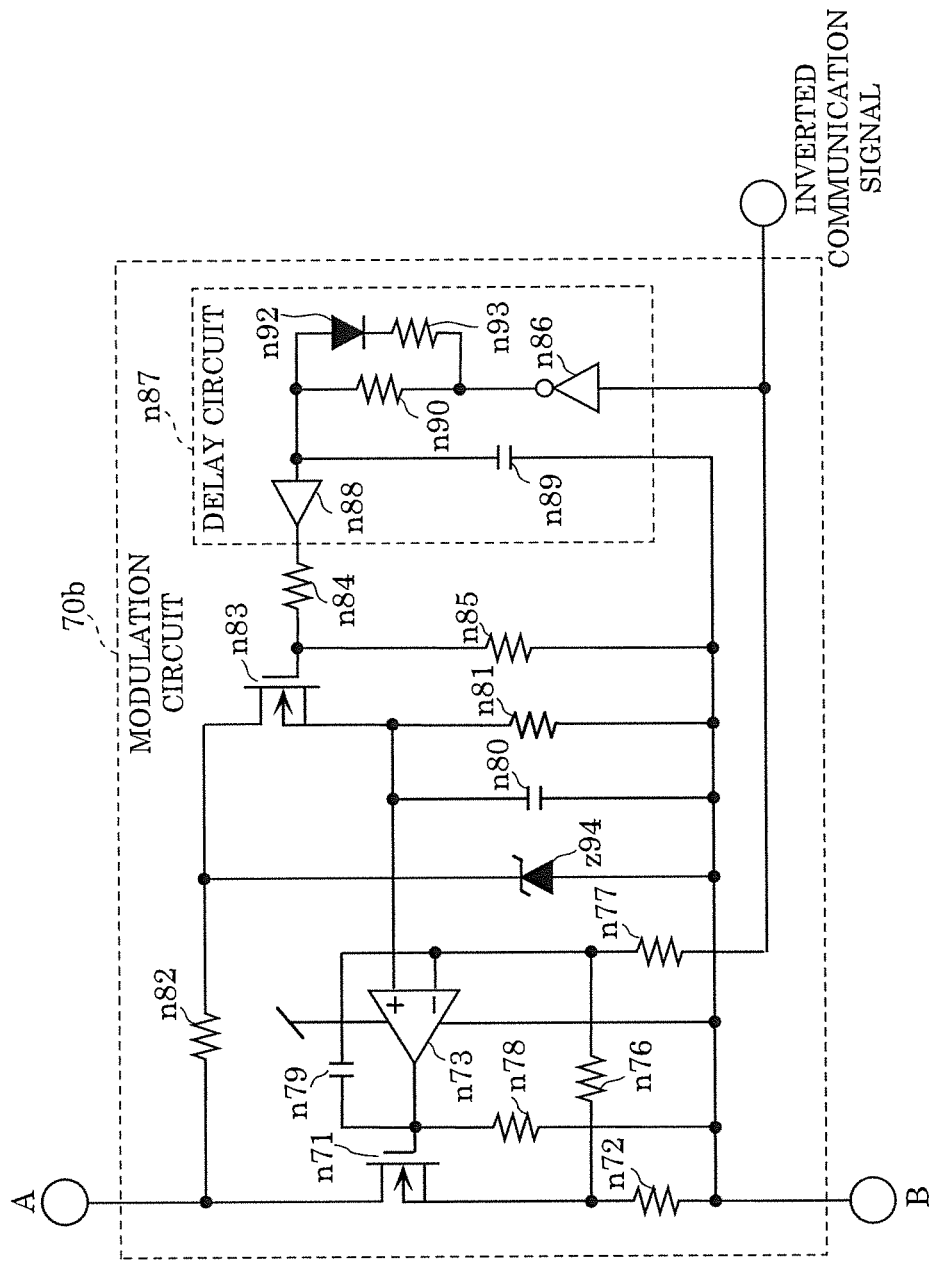
Figure 155:
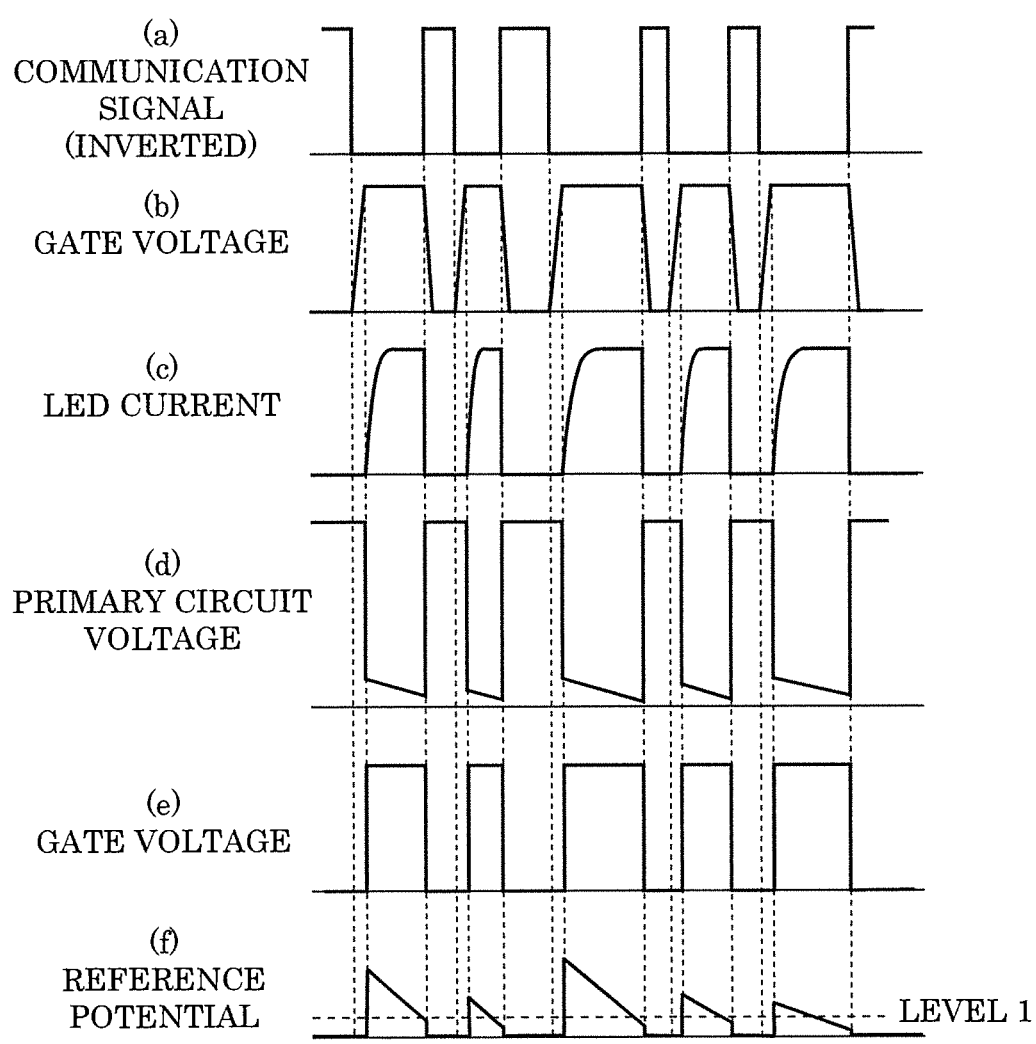
Figure 156:
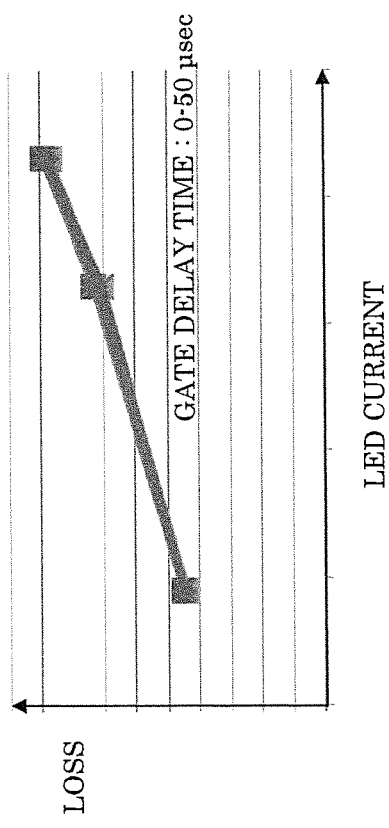
Figure 157:
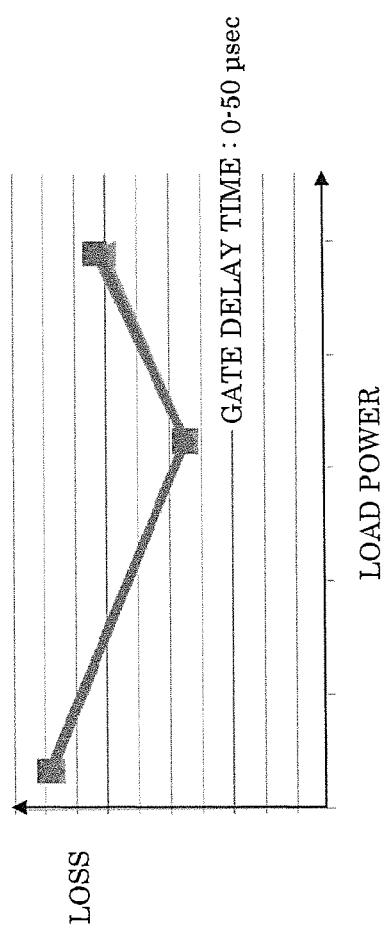
Figure 158:
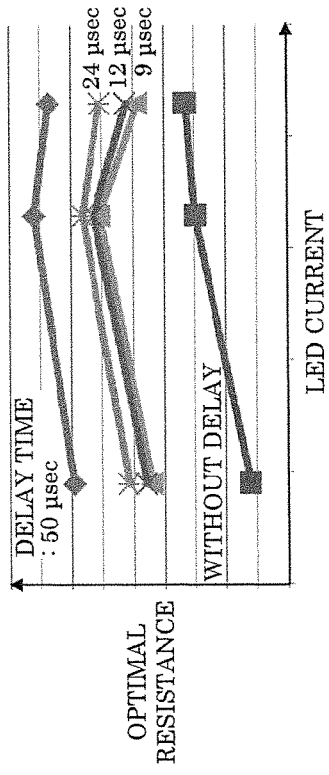
Figure 159:
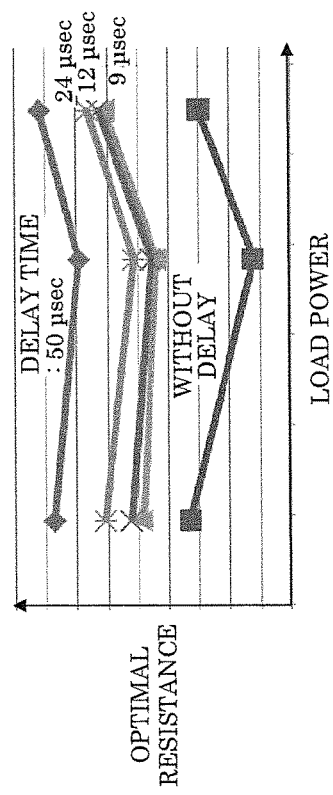
Figure 160:
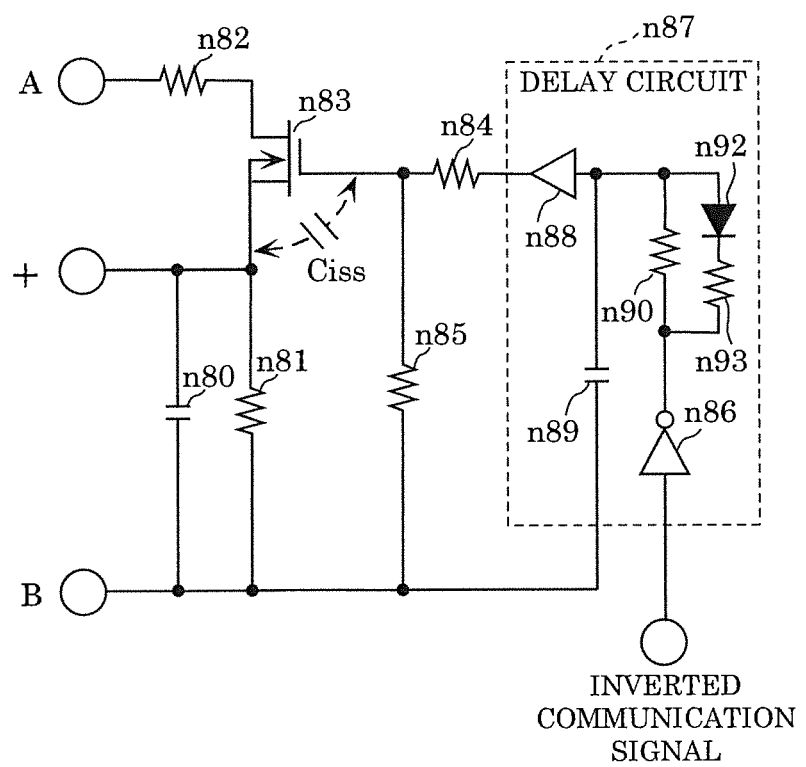
Figure 161:
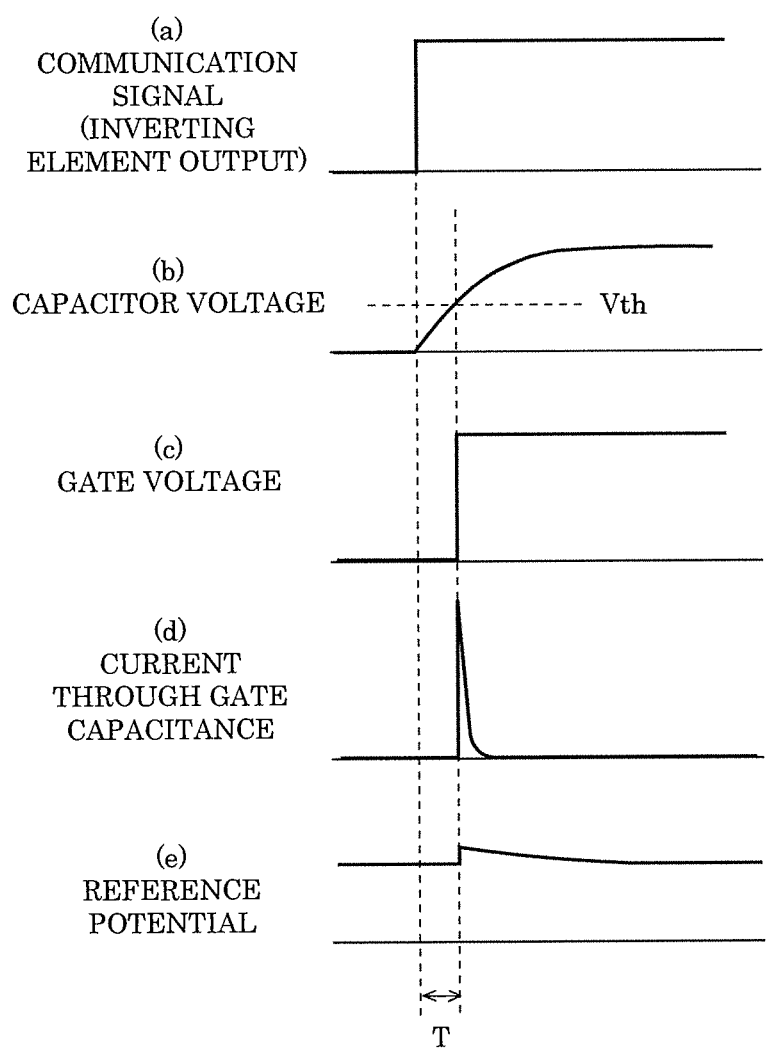
Figure 162:
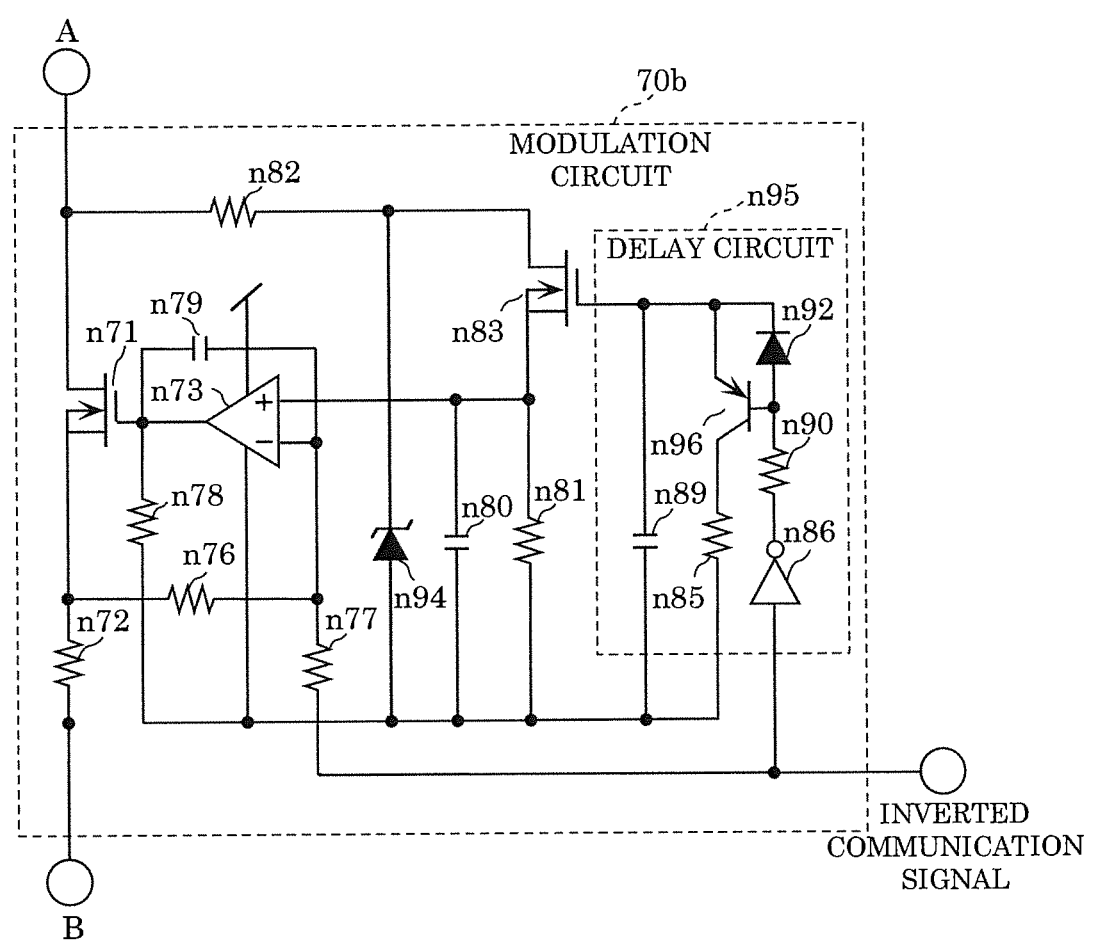
Figure 163:
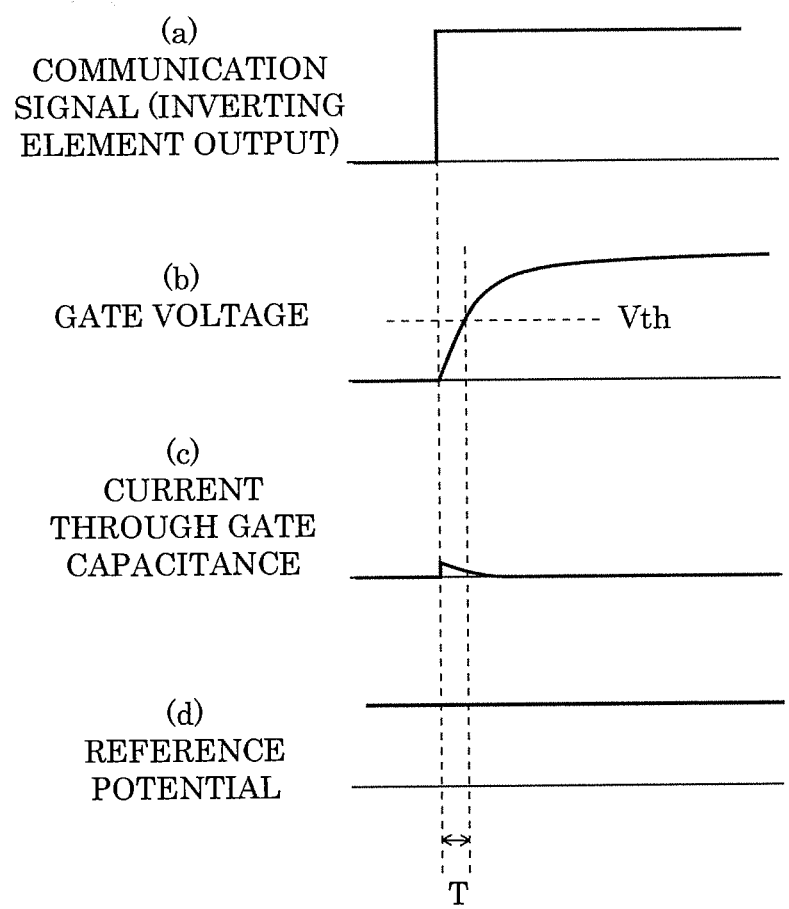
Figure 164A:
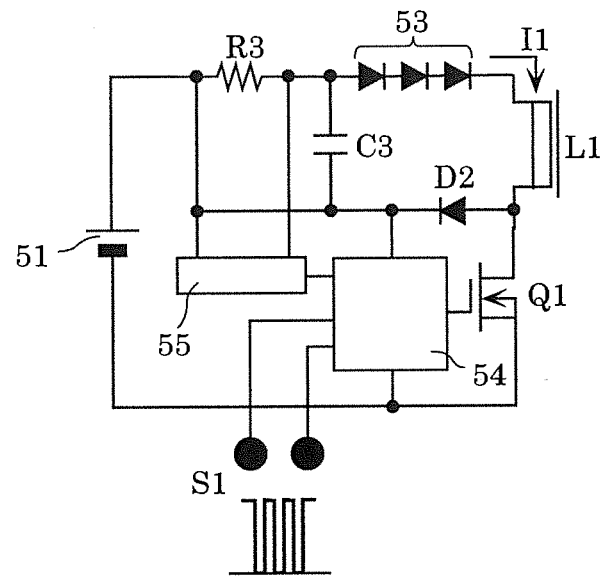
Figure 164B:
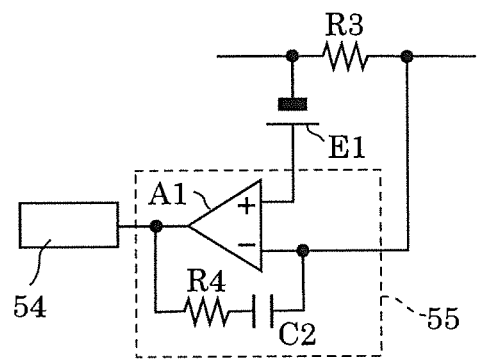
Figure 164C:
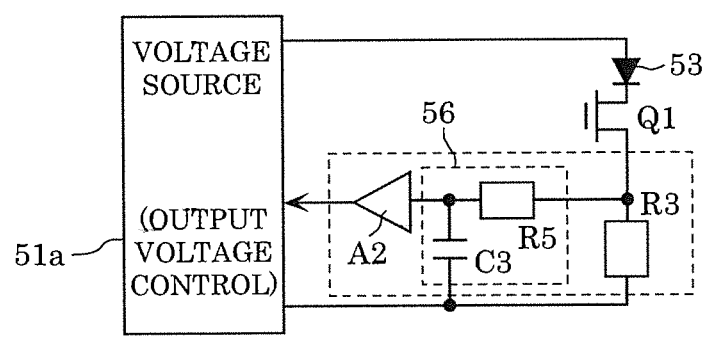
Figure 165:
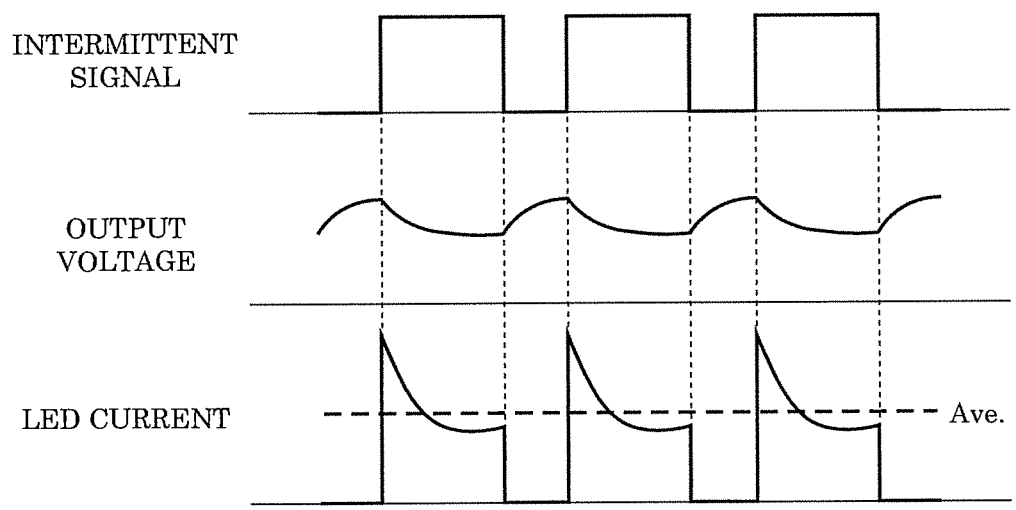

FIG. 98 is a diagram illustrating LED current, output voltage, SW voltage, and voltage of the current limiting circuit in FIG. 93A;

FIG. 99A is a circuit diagram illustrating a configuration of an illumination light communication apparatus according to Embodiment 15;

FIG. 99B is a circuit diagram illustrating a configuration of an illumination light communication apparatus according to Embodiment 15 to which communication module 10 is not added;

FIG. 99C is a circuit diagram illustrating a specific configuration example of a communication module and a second current limiting circuit according to Embodiment 15;

FIG. 100 is a diagram illustrating simulation results for the example circuits in FIGS. 99A and 99C;

FIG. 101 is a diagram illustrating current set values according to duty cycles;

FIG. 102 is a circuit diagram illustrating a configuration of an illumination light communication apparatus according to Embodiment 16;

FIG. 103 is a circuit diagram illustrating a configuration of an illumination light communication apparatus according to Embodiment 17;

FIG. 104 is a diagram illustrating first simulation results for the example circuit in FIG. 102;

FIG. 105 is a diagram illustrating second simulation results for the example circuit in FIG. 102;

FIG. 106 is a diagram illustrating third simulation results for the example circuit in FIG. 102;

FIG. 107 is a diagram illustrating first simulation results for the example circuit in FIG. 103;

FIG. 108 is a diagram illustrating second simulation results for the example circuit in FIG. 103;

FIG. 109 is a diagram illustrating third simulation results for the example circuit in FIG. 103;

FIG. 110 is a circuit diagram illustrating a configuration of an illumination light communication apparatus according to Embodiment 18;

FIG. 111 is a circuit diagram illustrating another configuration of the illumination light communication apparatus according to Embodiment 18;

FIG. 112A is a circuit diagram illustrating a current limiting circuit which includes a first variation of a reference source according to Embodiment 18;

FIG. 112B is a circuit diagram illustrating a current limiting circuit which includes a second variation of the reference source according to Embodiment 18;

FIG. 113 is a block diagram of an illumination light communication apparatus according to Embodiment 19;

FIG. 114 is a diagram illustrating a configuration of a light emitter according to Embodiment 19;

FIG. 115 is a diagram illustrating a modulation operation by the illumination light communication apparatus according to Embodiment 19;

FIG. 116 is a diagram illustrating a dimming operation by the illumination light communication apparatus according to Embodiment 19;

FIG. 117 is a diagram illustrating a problem with a combination of the modulation operation and the dimming operation;

FIG. 118 is a flowchart illustrating operation of the illumination light communication apparatus according to Embodiment 19;

FIG. 119 is a diagram illustrating a first example of operation of the illumination light communication apparatus according to Embodiment 19;

FIG. 120 is a diagram illustrating a second example of the operation of the illumination light communication apparatus according to Embodiment 19;

FIG. 121 is a block diagram of a receiving device according to Embodiment 19;

FIG. 122 is a flowchart illustrating operation of the receiving device according to Embodiment 19;

FIG. 123 is a block diagram of an illumination light communication apparatus according to Embodiment 20;

FIG. 124 is a diagram illustrating an example of operation of the illumination light communication apparatus according to Embodiment 20;

FIG. 125 is a block diagram of a variation of the illumination light communication apparatus according to Embodiment 20;

FIG. 126 is a diagram illustrating an example of use of the illumination light communication apparatus according to Embodiment 20;

FIG. 127 is a block diagram of an example of configuration of an illumination light communication apparatus according to Embodiment 21;

FIG. 128 is a waveform diagram illustrating a first example of operation of the illumination light communication apparatus according to Embodiment 21;

FIG. 129A is a waveform diagram illustrating a second example of the operation of the illumination light communication apparatus according to Embodiment 21;

FIG. 129B is a waveform diagram illustrating a second example of the operation of the illumination light communication apparatus according to Embodiment 21;

FIG. 130 is a waveform diagram illustrating a third example of the operation of the illumination light communication apparatus according to Embodiment 21;

FIG. 131 is a waveform diagram illustrating a first example of the operation of the illumination light communication apparatus according to Embodiment 21;

FIG. 132 is a waveform diagram illustrating a second example of the operation of the illumination light communication apparatus according to Embodiment 21;

FIG. 133 is a waveform diagram illustrating a third example of the operation of the illumination light communication apparatus according to Embodiment 21;

FIG. 134 is a waveform diagram illustrating a fourth example of the operation of the illumination light communication apparatus according to Embodiment 21;

FIG. 135 is a waveform diagram illustrating a fifth example of the operation of the illumination light communication apparatus according to Embodiment 21;

FIG. 136 is a diagram illustrating an example of configuration of a modulation circuit which is a precondition for Embodiment 22;

FIG. 137 is a diagram illustrating an example of configuration of the modulation circuit and an example of configuration of an overpower sensing circuit according to Embodiment 22;

FIG. 138 is a waveform diagram illustrating each component in normal operation in Embodiment 22;

FIG. 139 is a waveform diagram illustrating each component in overpower operation in Embodiment 22;

FIG. 140 is a diagram illustrating primary circuit losses and detected overpower levels in six different models of LED loads;

FIG. 141 is a diagram illustrating an example of configuration of a modulation circuit according to Embodiment 23;

FIG. 142 is a waveform diagram illustrating each component in normal operation in Embodiment 23;

FIG. 143 is a waveform diagram illustrating each component in the overpower operation in Embodiment 22;

FIG. 144 is a diagram illustrating detected level of overpower versus primary circuit loss in six different models of LED loads;

FIG. 145 is a diagram illustrating an example of configuration of a modulation circuit according to Embodiment 24;

FIG. 146 is a diagram illustrating an example of configuration of a modulation circuit according to Embodiment 25;

FIG. 147 is a diagram illustrating an example of configuration of a modulation circuit according to Embodiment 26;

FIG. 148 is a diagram illustrating an example of configuration of a modulation circuit according to Embodiment 27;

FIG. 149 is a diagram illustrating an example of configuration of a modulation circuit according to Embodiment 28;

FIG. 150 is a (normal) waveform diagram illustrating each component in normal operation in Embodiment 22;

FIG. 151 is a diagram illustrating a simulation result for rising waveforms of a gate voltage and LED current at a rising edge of an inverted communication signal;

FIG. 152 is a diagram illustrating a simulation result for falling waveforms of the gate voltage and LED current at a falling edge of the inverted communication signal;

FIG. 153 is a diagram illustrating waveforms of signals in components with rising delay times;

FIG. 154 is a diagram illustrating an example of configuration of the modulation circuit which includes a delay circuit according to Embodiment 28;

FIG. 155 is a diagram illustrating the waveforms of signals in the components illustrated in FIG. 154;

FIG. 156 is a diagram illustrating primary circuit loss versus LED current in different models having different load capacities;

FIG. 157 is a diagram illustrating primary circuit loss versus load power in different models having different load capacities;

FIG. 158 is a diagram illustrating optimal resistance versus LED current in different models having different load capacities;

FIG. 159 is a diagram illustrating optimal reference resistance versus load power in different models having different load capacities;

FIG. 160 is a circuit diagram for illustrating gate capacitance;

FIG. 161 is a diagram for illustrating effects of the gate capacitance;

FIG. 162 is a diagram illustrating an example of configuration of a modulation circuit which includes a delay circuit according to Embodiment 29;

FIG. 163 is a diagram illustrating waveforms of signals in the components illustrated in FIG. 162;

FIG. 164A is a diagram illustrating a configuration of an illumination light communication apparatus disclosed in PTL 2;

FIG. 164B is a diagram illustrating a circuit portion including a specific example of the constant-current feedback circuit illustrated in FIG. 164A;

FIG. 164C is a diagram illustrating an illumination light communication apparatus which includes an average-current sensing circuit disclosed in PTL 1; and FIG. 165 is a diagram schematically illustrating waveforms of an intermittent signal, output voltage at modulation, and load current (LED current) in a 100%-modulation circuit structure using a constant-current feedback power supply.

DETAILED DESCRIPTION OF THE EMBODIMENTS

The following describes embodiments of the present disclosure in detail, with reference to the drawings. It should be noted that the embodiments described below each show a particular example of the present disclosure. The numerical values, shapes, materials, elements, the arrangement and connection of the elements, steps, the processing order of the steps, and the like described in the following embodiments are mere examples, and thus are not intended to limit the scope of the appended Claims. Therefore, among the elements in the following embodiments, elements not recited in any of the independent claims defining the most generic part of the concept of the present disclosure are described as arbitrary elements for other embodiments. The drawings are schematic diagrams and do not necessarily show precise sizes and numerical values.

The following describes embodiments of the present disclosure, with reference to the drawings.

Embodiment 1

[1.1 Configuration of Illumination Light Communication Device]

First, a configuration of an illumination light communication device according to Embodiment 1 is described.

Figure 1A:
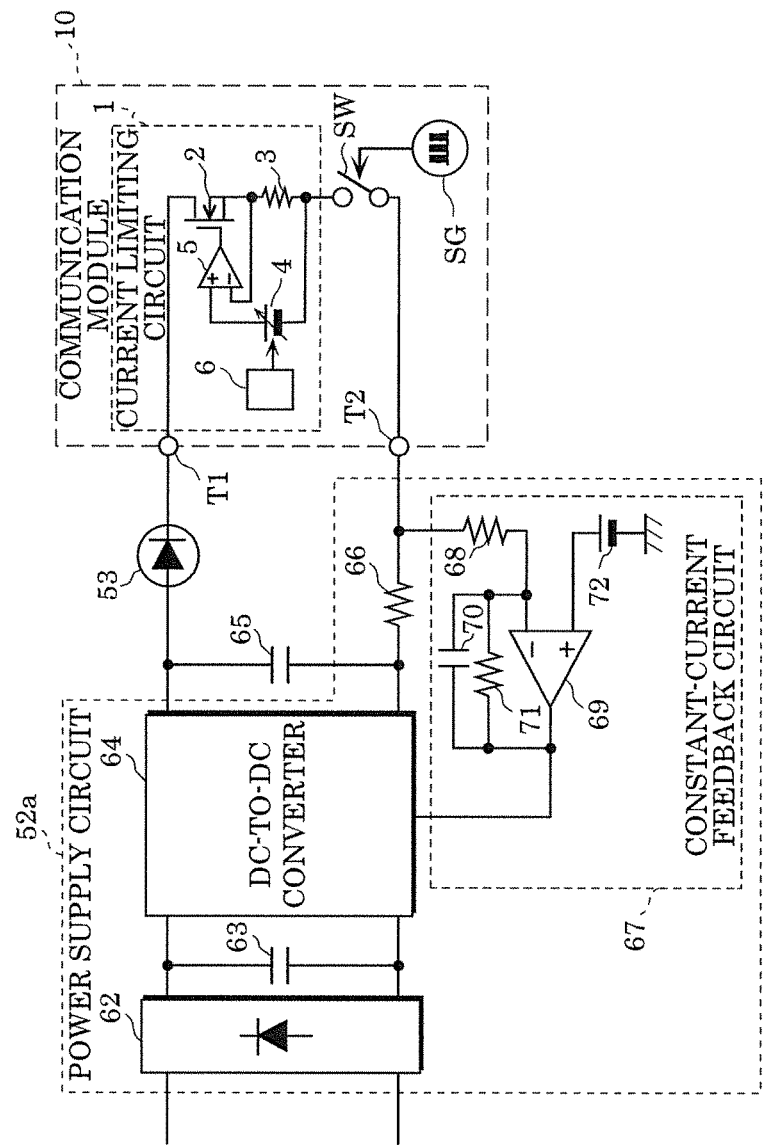
FIG. 1A is a circuit diagram illustrating a configuration of an illumination light communication apparatus according to Embodiment 1.

FIG. 1A is a circuit diagram illustrating a configuration of an illumination light communication device according to Embodiment 1. The illumination light communication device includes power supply circuit 52a having a function of maintaining output current at a constant value, smoothing capacitor (smoothing circuit) 65, load circuit 53, and communication module 10. Communication module 10 includes on/off switch SW, signal generating circuit SG, and current limiting circuit 1.

Power supply circuit 52a includes rectifier bridge 62, capacitor 63, DC-to-DC converter 64, sense resistor 66, and constant-current feedback circuit 67. Constant-current feedback circuit 67 includes input resistor 68, amplifier 69, capacitor 70, resistor 71, and reference voltage source 72.

In power supply circuit 52a, rectifier bridge 62 full-wave rectifies commercial power (for example, 100-V alternating current (AC)), capacitor 63 smoothes the resultant power, and thereafter DC-to-DC converter 64 converts the smoothed power into desired direct voltage. Smoothing capacitor 65 is connected between output terminals of DC-to-DC converter 64. A series circuit of load circuit 53, current limiting circuit 1, and on/off switch SW is connected parallel to smoothing capacitor 65.

Power supply circuit 52a has a function of directly or indirectly detecting current flowing through load circuit 53 and controlling current values to maintain the values constant. In FIG. 1A, this function is achieved by sense resistor 66 for directly detecting current through load circuit 53 and constant-current feedback circuit 67. Constant-current feedback circuit 67 includes amplifier 69, reference voltage source 72 connected to the positive input terminal of amplifier 69, input resistor 68 connected to the negative input terminal of amplifier 69, gain control resistor 71 connected between the output terminal and the negative input terminal of amplifier 69, and phase compensation capacitor 70. In constant-current feedback circuit 67, amplifier 69 compares which is higher a voltage drop across sense resistor 66 or a voltage of reference voltage source 72, amplifies the difference, and feeds back the amplified difference to the controller of DC-to-DC converter 64. In other words, constant-current feedback circuit 67 performs negative feedback control on DC-to-DC converter 64 so that the voltage drop across sense resistor 66 and the reference voltage match. A gain is set according to a voltage division ratio of input resistor 68 and resistor 71 connected between the inverting input terminal and the output terminal of amplifier 69, and capacitor 70 provided parallel to resistor 71 functions as an integral element for phase compensation.

Smoothing capacitor 65 is connected between the output terminals of power supply circuit 52a, and smoothes the output of power supply circuit 52a.

Load circuit 53 includes a plurality of light emitting diodes connected in series between the output terminals of power supply circuit 52a, and is supplied with the output from the power supply circuit. The light emitting diodes constitute a light source which emits illumination light.

On/off switch SW is connected in series to load circuit 53, and intermittently interrupts current supplied from power supply circuit 52a to load circuit 53.

Signal generating circuit SG generates a binary communication signal which controls on and off of on/off switch SW, in order to modulate illumination light. The communication signal is input to the control terminal of on/off switch SW, and turns on/off switch SW on and off. Note that signal generating circuit SG may repeatedly generate an ID signal which indicates an identifier (ID) unique to the illumination light communication apparatus as a communication signal, or may generate a communication signal according to a transmission signal input from an external apparatus.

[1.2 Configuration of Current Limiting Circuit 1]

The following describes a configuration example of current limiting circuit 1.

Current limiting circuit 1 is added in series with load circuit 53 and on/off switch SW, and limits the magnitude of current which flows through load circuit 53. For example, current limiting circuit 1 is connected in series with on/off switch SW and load circuit 53 which is a light source, and may limit current which flows through load circuit 53 according to a reference value to prevent the current from exceeding a current set value corresponding to the reference value. In this manner, overshoot which occurs in current flowing through load circuit 53 which is a light source at a moment when on/off switch SW is brought from the off state to the on state can be reduced, and thus error in reception by a receiving device can be reduced.

Current limiting circuit 1 includes transistor 2 which is a metal oxide semiconductor field effect transistor (MOSFET), resistor 3 connected to the source of transistor 2, amplifier 5, reference source 4, and control circuit 6.

Reference source 4 outputs a reference value to the positive input terminal of amplifier 5. The reference value defines the upper limit (current set value) of the current which flows through load circuit 53 which is a light source. For example, the reference value is proportional to the current set value. Reference source 4 may output a reference value as a fixed value, or may output a variable reference value, according to the arrangement pattern of a communication signal generated by signal generating circuit SG (for example, a bit pattern).

Transistor 2 is connected in series to load circuit 53 which is a light source and on/off switch SW, and limits current which flows through load circuit 53, based on the reference value.

Resistor 3 is a source resistor for detecting the magnitude of current flowing through load circuit 53. The source-side terminal of resistor 3 is connected to the negative input terminal of amplifier 5.

Reference source 4 is connected to the positive input terminal of amplifier 5, and the source of transistor 2 is connected to the negative input terminal of amplifier 5. Amplifier 5 amplifies a difference between the reference value and the current value detected by resistor 3, and outputs the amplified signal to the gate of transistor 2.

Control circuit 6 performs control for changing a reference value from reference source 4, according to the arrangement pattern of a communication signal, in order to cause reference source 4 to output a variable reference value. For example, control circuit 6 calculates a partial duty cycle of a part of a communication signal. Control circuit 6 sets the reference value to a first value when the calculated partial duty cycle is a first proportion, whereas when the partial duty cycle is a second proportion higher than the first proportion, control circuit 6 sets the reference value to a second value smaller than the first value. At this time, control circuit 6 may change the reference value so that the reference value is inversely proportional to the partial duty cycle of the communication signal. The "partial duty cycle" is, for example, a proportion of an on period immediately before the most recent off period with respect to a combination of the most recent off period and the on period. Alternatively, the "partial duty cycle" may be substituted with a moving average of most recent n-bit data in a communication signal. In this manner, if the magnitude of overshoot of current flowing through load circuit 53 depends on the partial duty cycle, the overshoot can be mitigated more appropriately.

[1.3 Variation of Current Limiting Circuit 1]

The following describes first to third variations of current limiting circuit 1.

Figure 2:
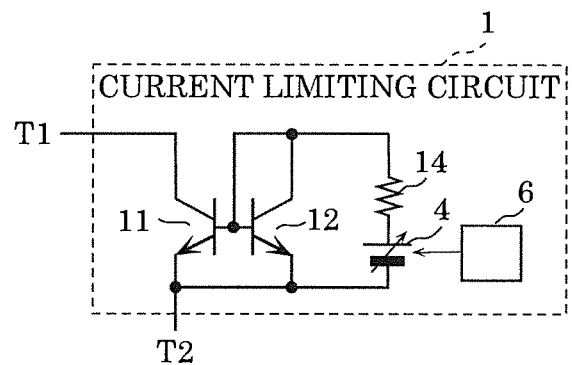
FIG. 2 is a circuit diagram illustrating a first variation of a current limiting circuit in FIG. 1A.
Figure 3:
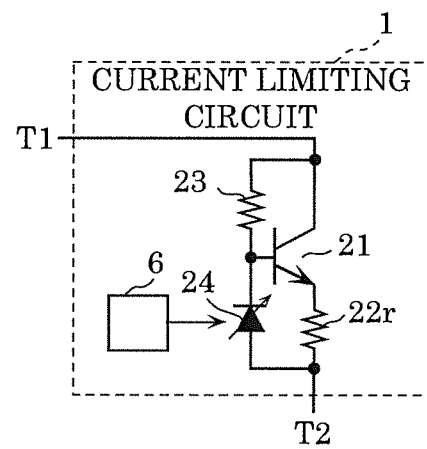
FIG. 3 is a circuit diagram illustrating a second variation of the current limiting circuit in FIG. 1A.
Figure 4:
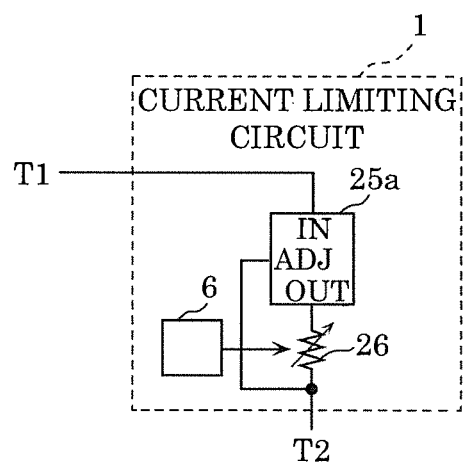
FIG. 4 is a circuit diagram illustrating a third variation of the current limiting circuit in FIG. 1A.

The configuration of current limiting circuit 1 is not limited to that illustrated in FIG. 1A, and may be those as illustrated in FIGS. 2 to 4.

FIG. 2 is a circuit diagram illustrating a first variation of current limiting circuit 1 in FIG. 1A. Current limiting circuit 1 illustrated in FIG. 2 includes bipolar transistors 11 and 12, reference source 4, resistor 14, and control circuit 6. Bipolar transistors 11 and 12 constitute a current mirror circuit. Current which flows through bipolar transistor 12 is determined by reference source 4 and resistor 14. Bipolar transistor 11 can pass current within a range of current that is a multiple of the mirror ratio of the current through bipolar transistor 12 (in other words, the current set value). Control circuit 6 changes the reference value from reference source 4 or the value of resistor 14, according to the arrangement of the communication signal output from signal generating circuit SG.

FIG. 3 is a circuit diagram illustrating a second variation of the current limiting circuit in FIG. 1A. Current limiting circuit 1 illustrated in FIG. 3 includes bipolar transistor 21, emitter resister 22r, bias resister 23, Zener diode 24, and control circuit 6.

Bipolar transistor 21 is connected in series to load circuit 53, and limits current which flows through load circuit 53, according to the base voltage (reference value) of bipolar transistor 21.

Emitter resistance 22r is for detecting the magnitude of current flowing through load circuit 53 (that is, current flowing through emitter resister 22r).

Bias resister 23 is for biasing the base voltage of bipolar transistor 21.

Zener diode 24 outputs a reference value to the base of bipolar transistor 21.

Control circuit 6 changes the reference value of Zener diode 24, according to the arrangement of a communication signal.

FIG. 4 is a circuit diagram illustrating a third variation of the current limiting circuit in FIG. 1A. Current limiting circuit 1 illustrated in FIG. 4 includes three-terminal regulator 25a, sense resistor 26, and control circuit 6.

Three-terminal regulator 25a has input terminal IN and output terminal OUT that are connected in series to load circuit 53, and according to the voltage input to adjustment terminal ADJ, regulates a current which flows between input terminal IN and output terminal OUT.

Sense resistor 26 is for detecting the magnitude of current flowing through load circuit 53 (that is, current flowing through sense resistor 26). Sense resistor 26 is a variable resistor, and the resistance of sense resistor 26 is used as a reference value. The terminal of sense resistor 26 on the on/off switch SW side is connected to adjustment terminal ADJ of three-terminal regulator 25a.

Control circuit 6 changes the resistance of sense resistor 26, according to the arrangement of a communication signal.

In this manner, current limiting circuit 1 according to the variations can more appropriately mitigate overshoot, when the magnitude of overshoot depends on a partial duty cycle (or a partial signal arrangement).

Note that in FIGS. 1A, and 2 to 4, current limiting circuit 1 may not include control circuit 6 if reference source 4 outputs a fixed reference value.

[1.4 Operation of Illumination Light Communication Device]

Operation of the illumination light communication apparatus having the above configuration is described using simulation results.

FIGS. 5 to 14 illustrate simulation results for current limiting circuit 1 in FIG. 2.

Figure 5:
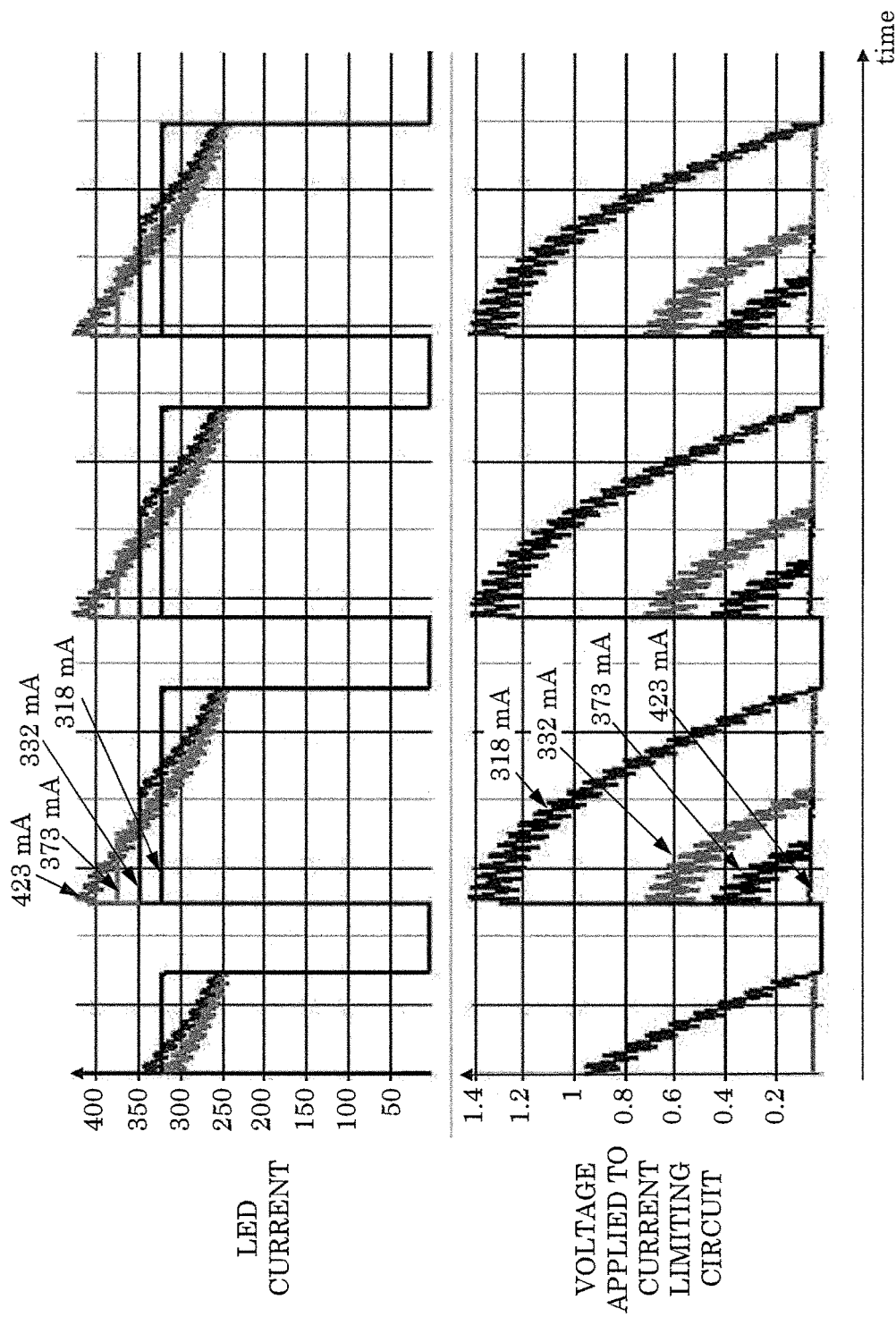
FIG. 5 is a diagram illustrating first simulation results for the example circuit in FIG. 2.

FIG. 5 is a diagram illustrating first simulation results for the example circuit in FIG. 2. In FIG. 5, the capacitance value of smoothing capacitor 65 is set to 20 µF, and the frequency of a communication signal from signal generating circuit SG is set to 2.4 kHz, and the duty cycle is set to 75%. FIG. 5 illustrates LED current and waveforms of voltages applied to current limiting circuit 1 when the current set value for current limiting circuit 1 is varied to four values under the above settings. The four current set values are 423 mA, 373 mA, 332 mA, and 318 mA. Furthermore, the operating frequency of the DC-to-DC converter is set to 65 kHz, and the average of the load current (LED current) not interrupted is set to 240 mA.

In FIG. 5, when the current set value for current limiting circuit 1 is set to 423 mA, great overshoot occurs to the LED current waveform, and the applied voltage is extremely low. Accordingly, current limiting circuit 1 does not substantially function.

When the current set value for current limiting circuit 1 is gradually lowered to 373 mA, 332 mA, and 318 mA, the overshoot portion of the LED current is eliminated, and when the current set value is 318 mA, the LED current waveform has no overshoot, and is a square wave. Accordingly, the voltage applied to current limiting circuit 1 is gradually increased, and current limiting circuit 1 starts operating as the current set value is lowered, which thus shows that current limitation by current limiting circuit 1 effectively functions during the entire on period when the current set value is 318 mA.

Figure 6:
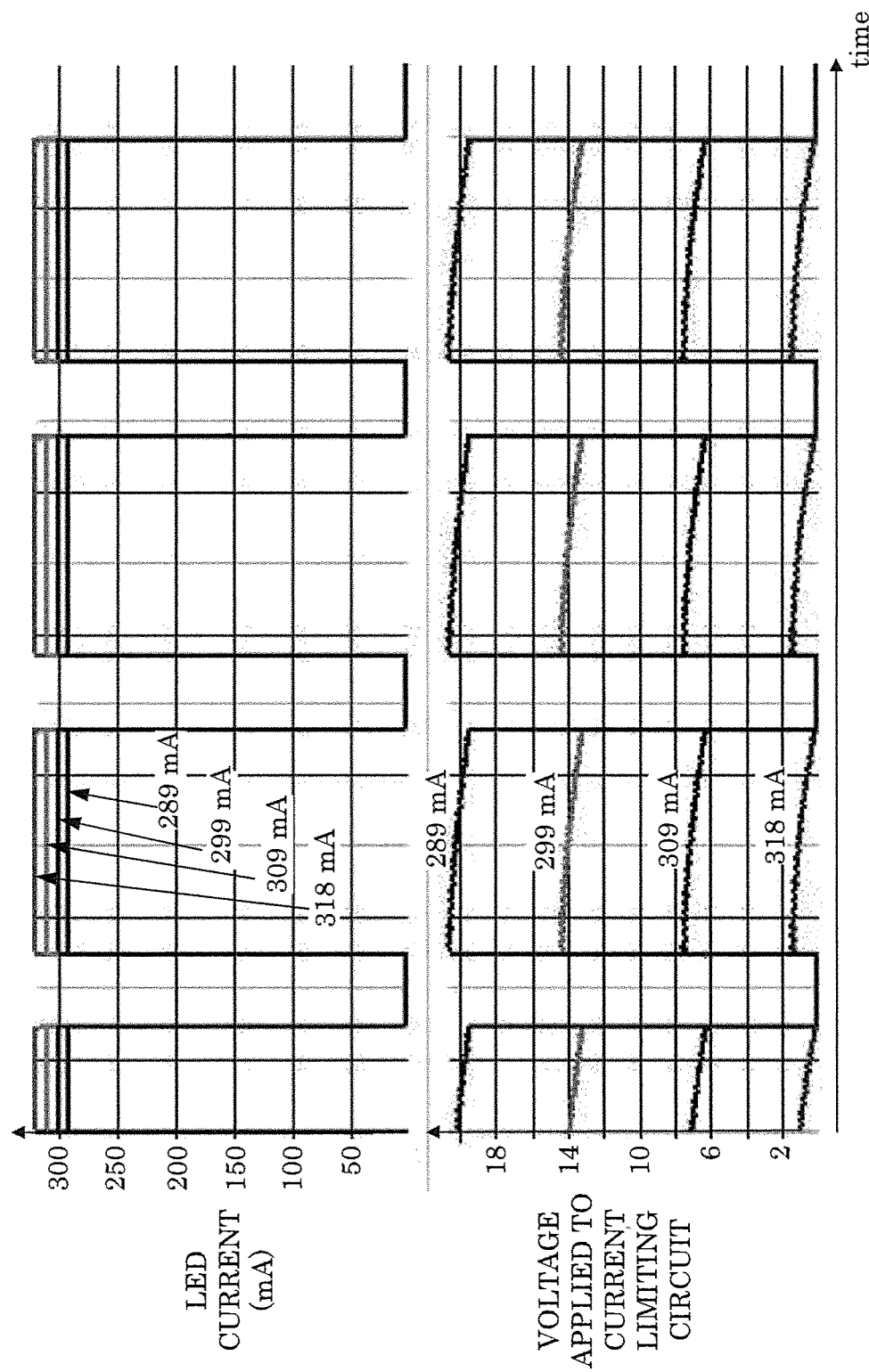
FIG. 6 is a diagram illustrating second simulation results for the example circuit in FIG. 2.

FIG. 6 is a diagram illustrating second simulation results for the example circuit in FIG. 2. FIG. 6 illustrates LED current and waveforms of voltages applied to current limiting circuit 1 when the current set value for current limiting circuit 1 is further lowered gradually from 318 mA to 309 mA, 299 mA, and 289 mA in the simulations illustrated in FIG. 5. Along with a decrease in the current set value, the peak value of the LED current decreases, yet a square waveform without overshoot is maintained. The waveform of the applied voltage is drastically raised as the current set value decreases.

Figure 7:
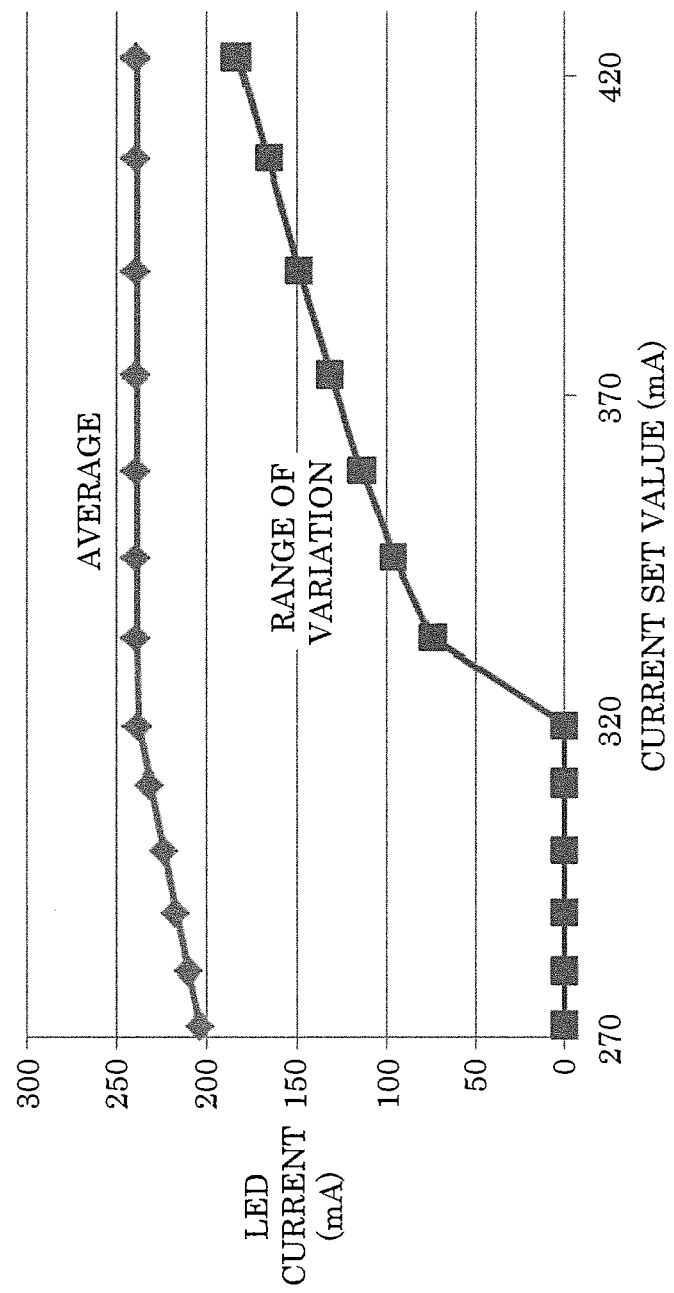
FIG. 7 is a diagram illustrating third simulation results for the example circuit in FIG. 2.
Figure 8:
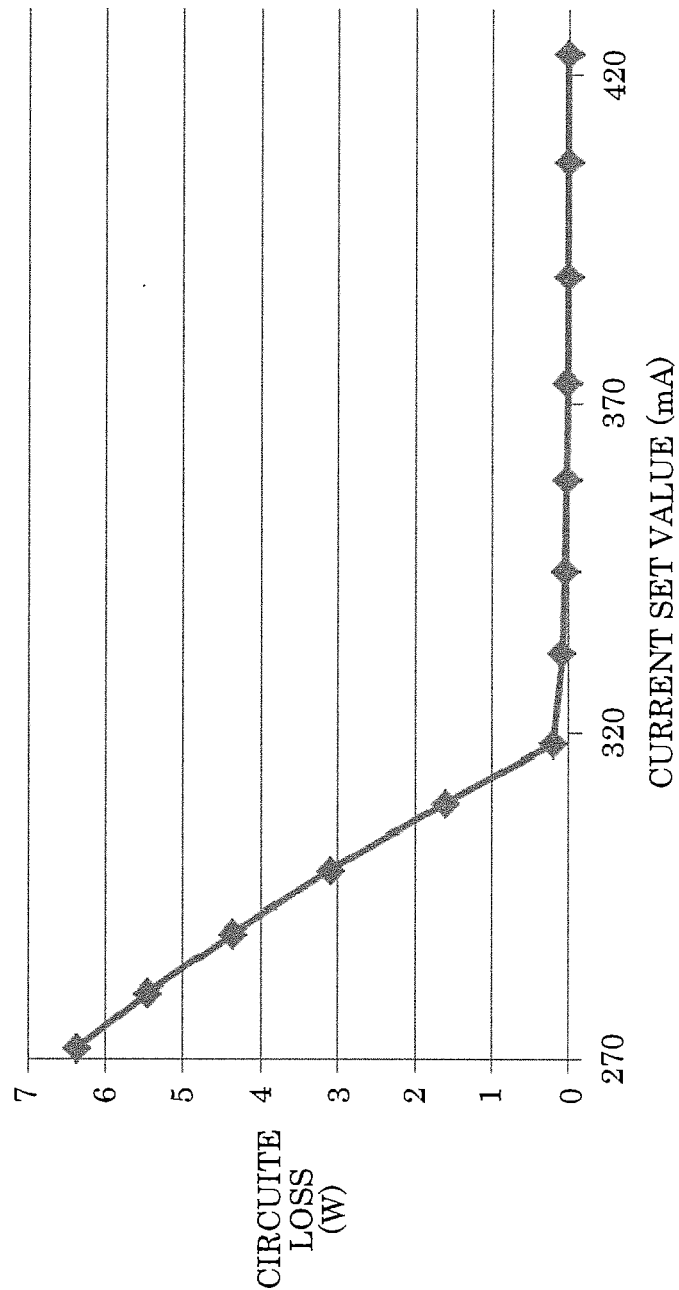
FIG. 8 is a diagram illustrating fourth simulation results for the example circuit in FIG. 2.

FIGS. 7 and 8 are graphs illustrating the above results. FIG. 7 is a diagram illustrating the results of third simulations for the example circuit in FIG. 2. FIG. 7 illustrates a relation between LED current and a current set value for current limiting circuit 1. It can be seen that when the current set value is larger than 318 mA which is considered to define the boundary, the range of variation (overshoot) in the LED current is great while the average of the LED current is maintained constant, whereas when the current set value is smaller than 318 mA, the average of the LED current decreases while the range of variation (overshoot) in the LED current is eliminated. FIG. 8 is a diagram illustrating fourth simulation results for the example circuit in FIG. 2. FIG. 8 illustrates a relation between the current set value for current limiting circuit 1 and loss caused by current limiting circuit 1 (that is, power consumption of current limiting circuit 1). It can be seen that when the current set value is larger than 318 mA which is considered to define the boundary, loss is maintained at a small value, whereas when the current set value is smaller than 318 mA, loss is drastically increased. In view of the results, under the conditions of simulations in FIG. 5 for the example circuit in FIG. 2, if the current set value for current limiting circuit 1 is set to 318 mA, overshoot of the LED current is mitigated, and also the average of the LED current is maintained at a value of the current not interrupted, and furthermore loss caused by current limiting circuit 1 can be maintained at a low value.

Figure 9:
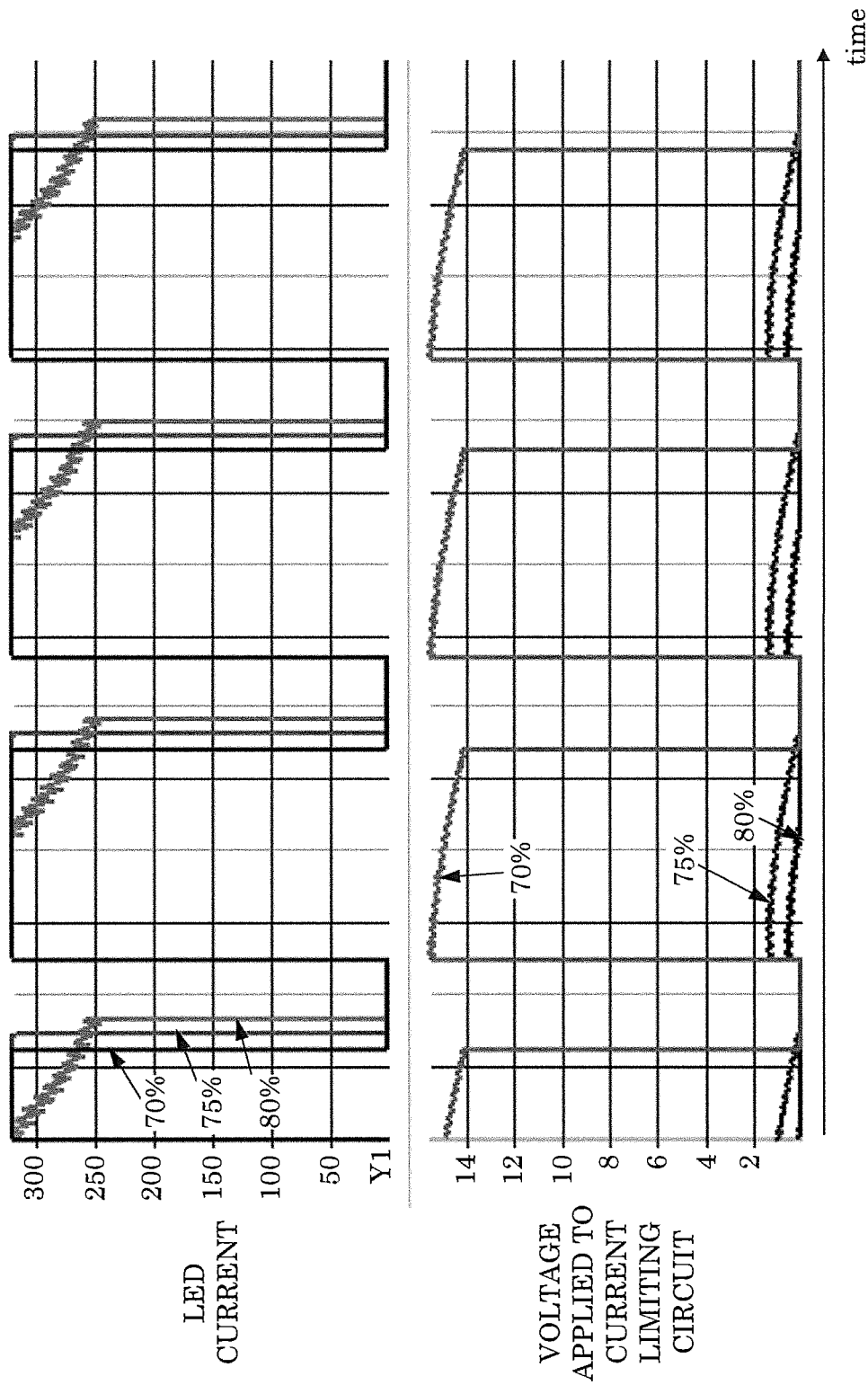
FIG. 9 is a diagram illustrating fifth simulation results for the example circuit in FIG. 2.

FIG. 9 is a diagram illustrating fifth simulation results for the example circuit in FIG. 2. FIG. 9 illustrates LED current and waveforms of voltages applied to current limiting circuit 1 in the example circuit in FIG. 2 when the current set value for current limiting circuit 1 is set to 318 mA which is an optimum value under the above conditions (in FIGS. 5 and 6), and the duty cycle of a modulating signal from signal generator SG is changed to three ratios. The three duty cycles are 70%, 75%, and 80%. Other conditions are the same (capacitance value of smoothing capacitor 65 is 20 µF, frequency of a modulating signal from signal generating circuit SG is 2.4 kHz, operating frequency of the DC-to-DC converter is 65 kHz, and average of a load current (LED current) which is not interrupted is 240 mA).

When the duty cycle is 75%, the waveform of the LED current has no overshoot, and the voltage applied to current limiting circuit 1 is low (which can be said as an optimal condition).

When the duty cycle is 80%, overshoot is not completely eliminated from the waveform of the LED current, the waveform has a slope in the latter half of the on period, and furthermore the applied voltage is extremely low, which shows that current limiting circuit 1 does not substantially function during this period.

When the duty cycle is 70%, although the overshoot of the waveform of the LED current is completely eliminated so that the waveform becomes a square wave, the applied voltage is increased, which results in an increase in loss.

Figure 10:
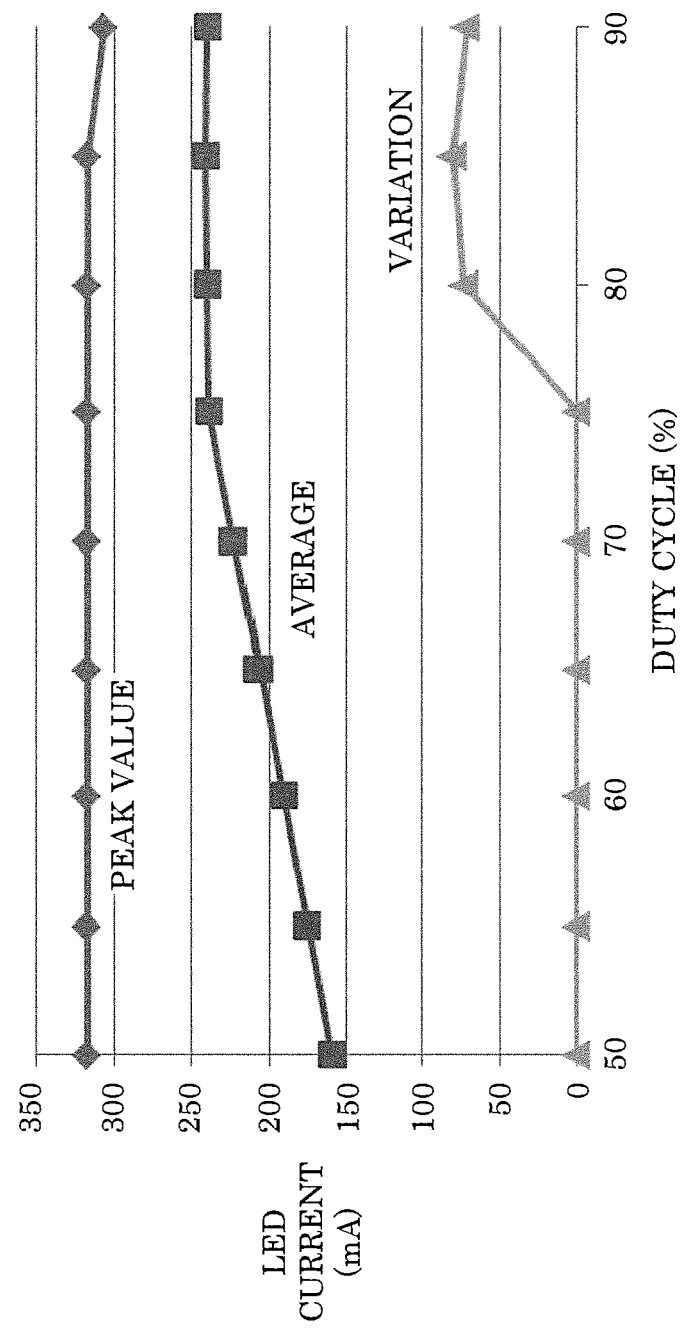
FIG. 10 is a diagram illustrating sixth simulation results for the example circuit in FIG. 2.

FIG. 10 illustrates a relation between LED current and a duty cycle of the modulating signal from the signal generator. FIG. 10 is a diagram illustrating sixth simulation results for the example circuit in FIG. 2. It can be seen that if the current set value for current limiting circuit 1 is 318 mA, when the duty cycle is higher than 75% which is considered to define the boundary, the range of variation (overshoot) is great although an average of the LED current is maintained constant, whereas when the duty cycle is lower than 75%, the range of variation (overshoot) of the LED current is eliminated, but the average is decreased.

Figure 11:
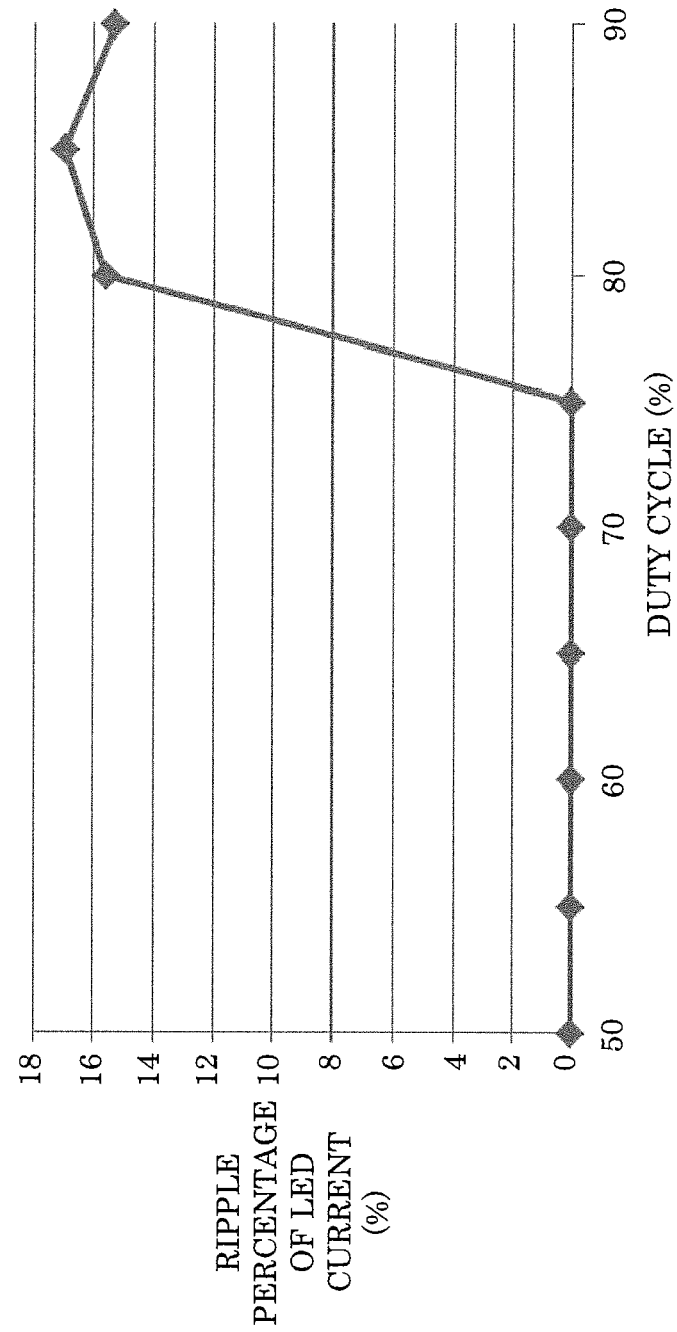
FIG. 11 is a diagram illustrating seventh simulation results for the example circuit in FIG. 2.
Figure 12:
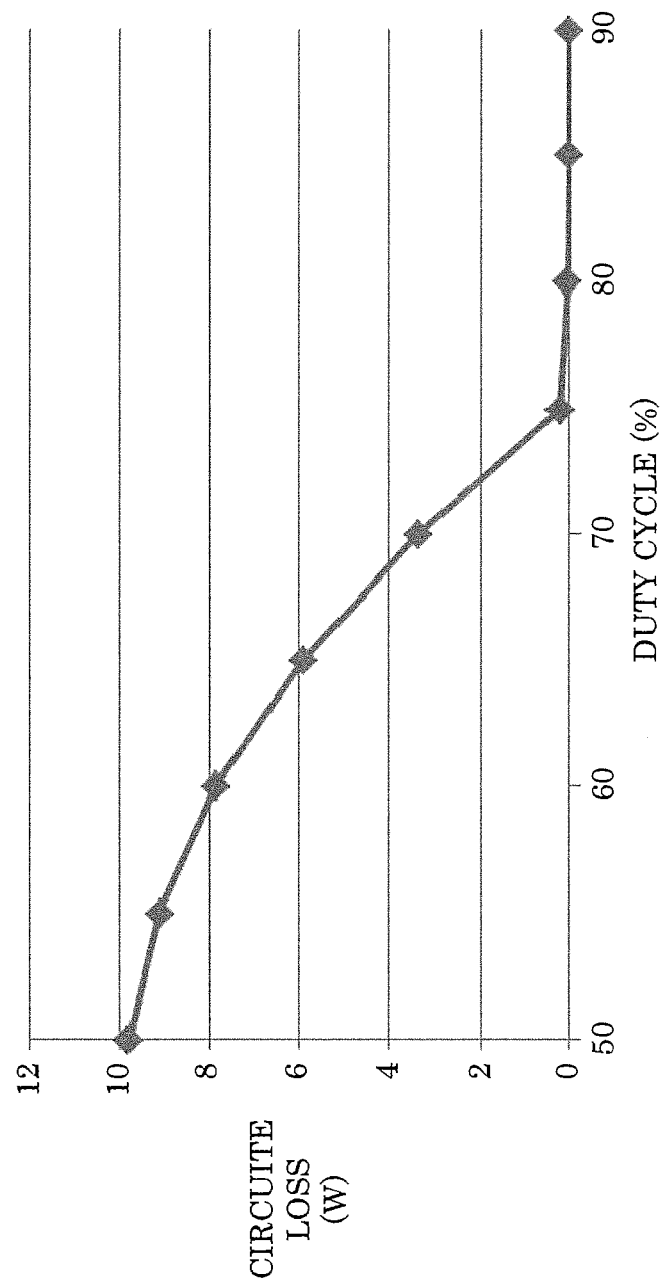
FIG. 12 is a diagram illustrating eighth simulation results for the example circuit in FIG. 2.

FIG. 11 is a diagram illustrating seventh simulation results for the example circuit in FIG. 2. FIG. 11 is a graph showing overshoot of LED current in ripple percentage. FIG. 12 is a diagram illustrating eighth simulation results for the example circuit in FIG. 2. FIG. 12 shows a relation between a duty cycle and loss caused by current limiting circuit 1. From the results, the optimal current set value for current limiting circuit 1 is assumed to be dependent on the duty cycle of a communication signal from signal generator SG.

Figure 13:
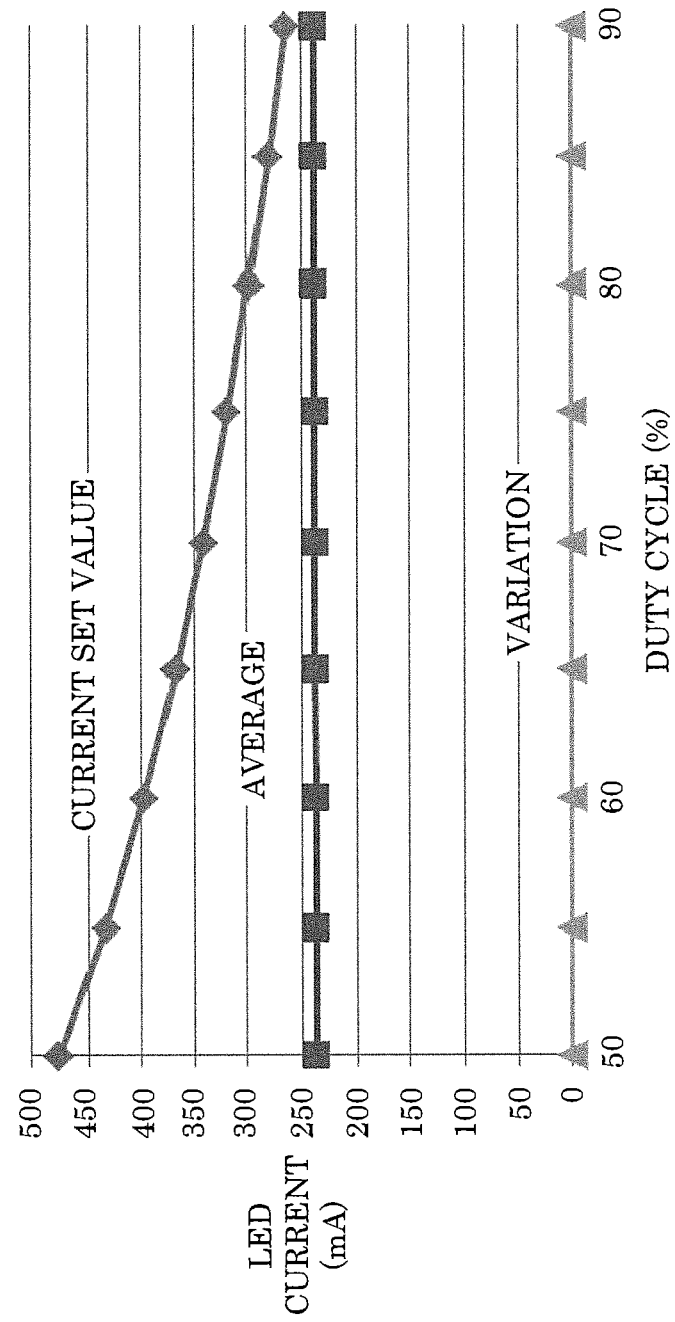
FIG. 13 is a diagram illustrating ninth simulation results for the example circuit in FIG. 2.
Figure 14:
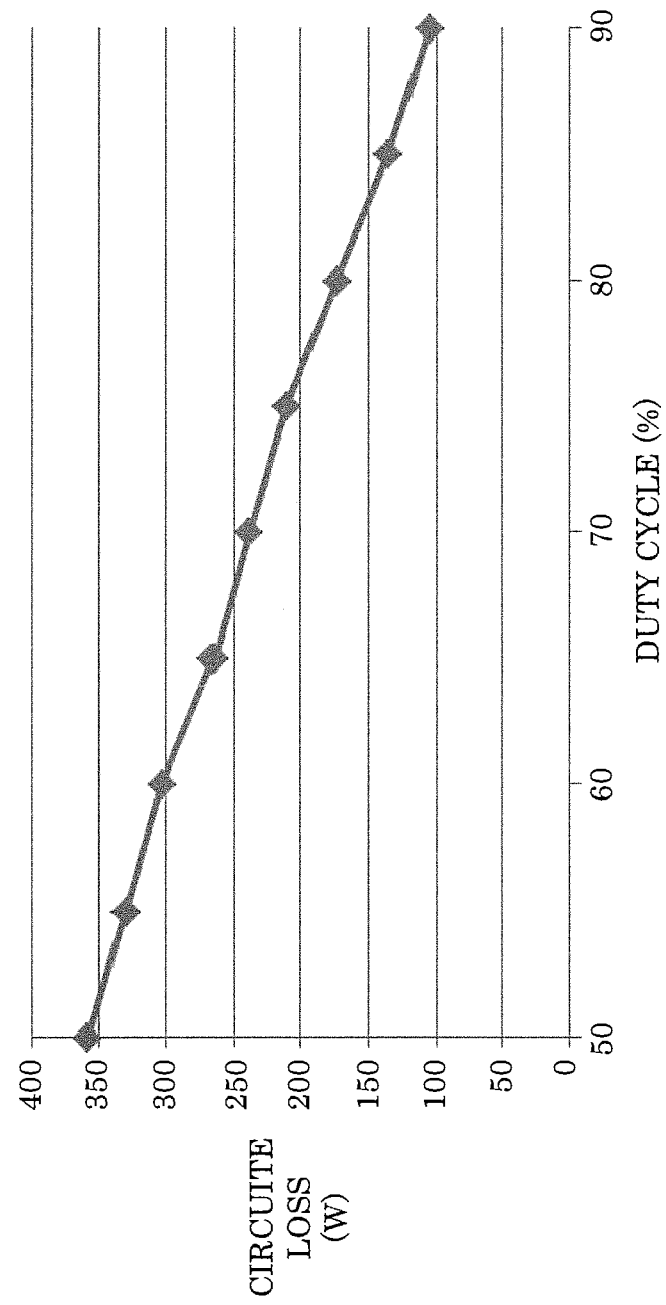
FIG. 14 is a diagram illustrating tenth simulation results for the example circuit in FIG. 2.

FIG. 13 illustrates results of obtaining an optimal current set value for current limiting circuit 1 according to a duty cycle of a modulating signal from signal generator SG. FIG. 13 is a diagram illustrating ninth simulation results for the example circuit in FIG. 2. In FIG. 13, by changing, as illustrated, the current set value according to the duty cycle indicated by the horizontal axis, a variation (overshoot) in the LED current can be reduced, and the average can be maintained at a value when the current is not interrupted. FIG. 14 illustrates loss caused by current limiting circuit 1 in such a case. FIG. 14 is a diagram illustrating tenth simulation results for the example circuit in FIG. 2. It can be seen in FIG. 14 that when the duty cycle is 50% to 90%, the circuit loss is maintained at a small value.

Figure 15:
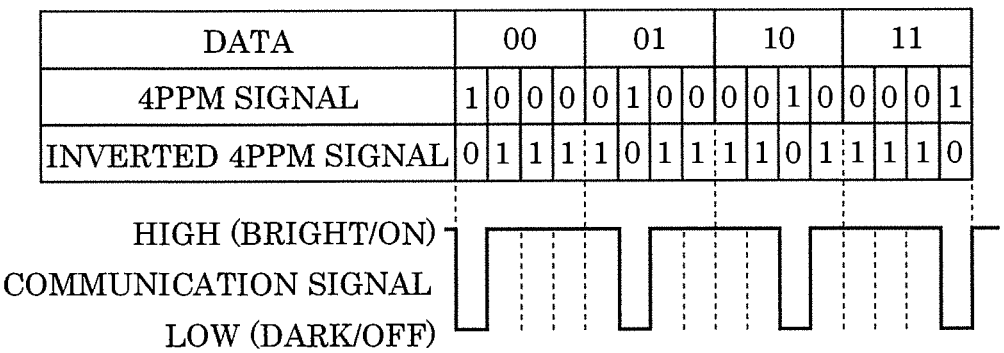
FIG. 15 is an explanatory diagram illustrating a scheme of modulating a communication signal.
Figure 16:
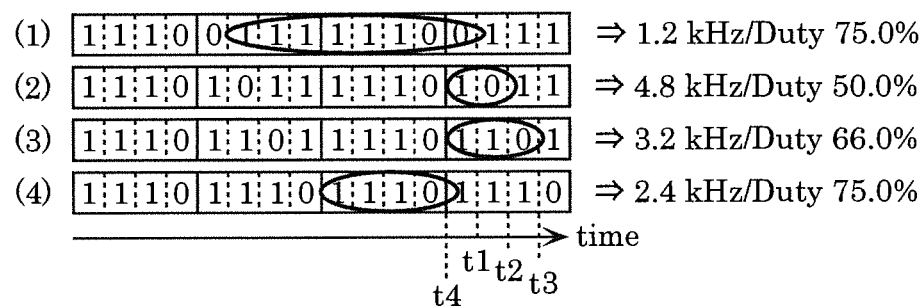
FIG. 16 is a diagram illustrating example (1) to (4) of communication signals.

FIG. 15 is an explanatory diagram illustrating a scheme of modulating a communication signal. FIG. 15 illustrates examples of modulating signals used by the illumination light communication apparatus. The scheme in FIG. 15 is in conformity with the 1-4 PPM transmission scheme specified by JEITA-CP1223. For example, a 4 PPM signal that is 2-bit data "00" is modulated to "1000" during a one-symbol period constituted by four slots. Accordingly, a pulse appears in one of the four slots. For visible light communication, an inverted 4 PPM signal is often used in order to secure a light-emission time by causing light to be emitted during three out of the four slots. A communication signal in FIG. 15 has been modulated into an inverted 4 PPM signal. In this case, a high-level communication signal brings on/off switch SW into the on state, and causes load circuit 53 which is a light source to emit light. A low-level communication signal brings on/off switch SW into the off state, and causes load circuit 53 which is a light source to stop emitting light. For example, one slot has 104.167 µsec (=1/9.6 kHz), and four slots (416 µsec) form one symbol (here, one symbol is represented by 2 bits). A 1-4 PPM signal is constituted by binary logical values 0 and 1, and has a data arrangement in which one of the four slots has a logical value 1. A communication signal generated by signal generating circuit SG is an inverted 4 PPM signal obtained by inverting the logical values. An inverted 4 PPM signal is for modulating data depending on where in the four slots a negative pulse is included. As long as four slots constituting one symbol is taken into consideration, the duty cycle is 75%. However, if the boundary between symbols is ignored, a signal arrangement has various patterns, which results in various partial duty cycles. FIG. 16 illustrates examples.

FIG. 16 is a diagram illustrating example (1) to (4) of communication signals. Within each four-symbol data in FIG. 16, a circle is given to an off period and an on period immediately before a communication signal rises from the low level to the high level. Examining the partial data enclosed by the circles, a partial duty cycle can be defined as, for example, a proportion of an on period immediately before the most recent off period with respect to a period (the most recent one cycle) which is a combination of the most recent off period and the on period. In example (1) in FIG. 16, the frequency of the most recent one cycle is 1.2 kHz, and the partial duty cycle is 75%. In example (2), the frequency is 4.8 kHz, and the partial duty cycle is 50%. In example (3), the frequency is 3.2 kHz, and the partial duty cycle is 66.7%. In example (4), the frequency is 2.4 kHz, and the partial duty cycle is 75%. Accordingly, Embodiment 1 discloses that the optimal current set value for current limiting circuit 1 is varied according to the duty cycle, but may be dynamically changed for use where the partial duty cycle changes every moment.

Furthermore, FIGS. 17 to 24 illustrate, as simulation results for the example circuit illustrated in FIG. 2, results of examination of waveforms that LED current tends to have and waveforms that voltage applied to current limiting circuit 1 tends to have in the four cases illustrated in examples (1) to (4) in FIG. 16.

Figure 17:
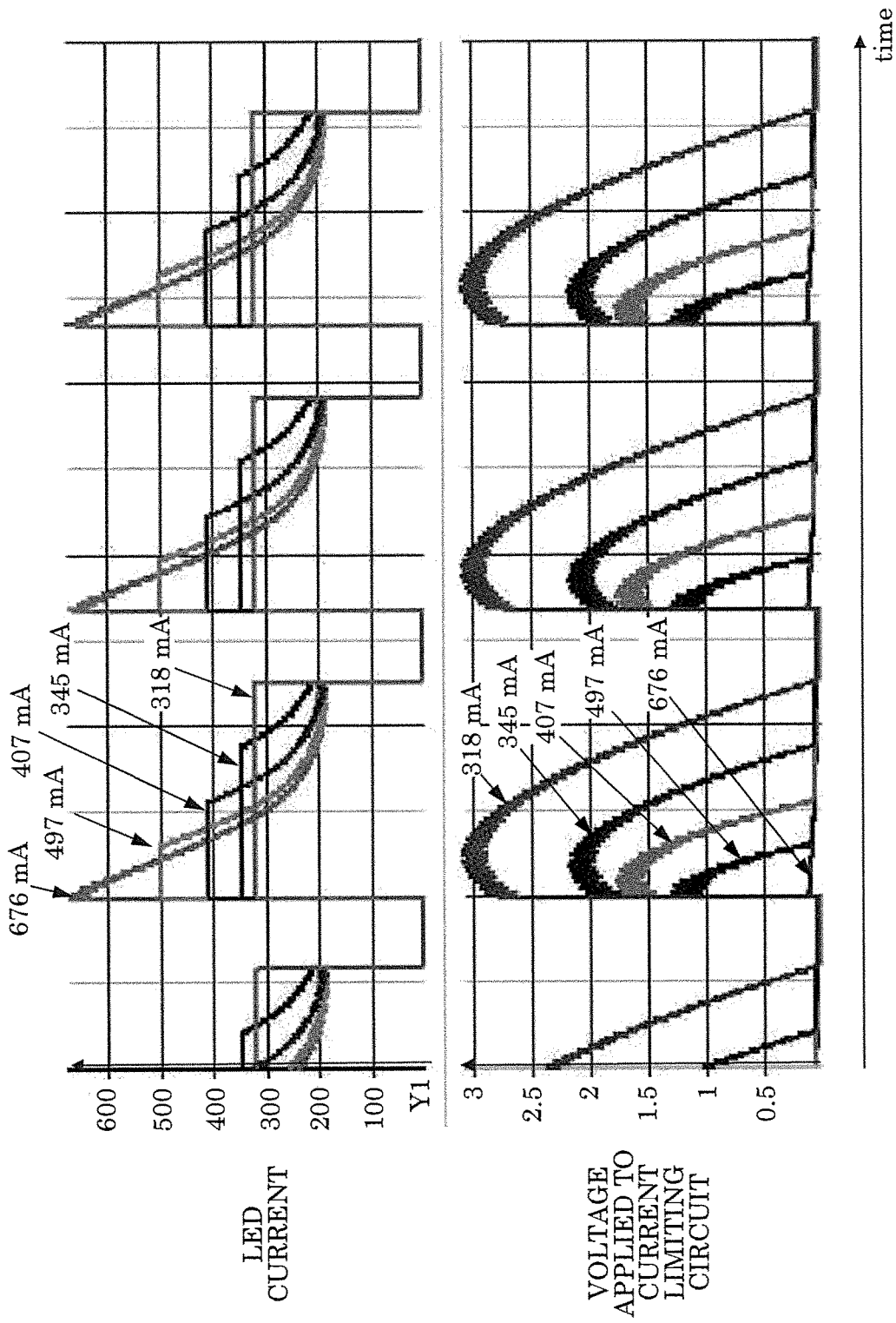
FIG. 17 is a diagram illustrating (first) simulation results in the case of example (1) in FIG. 16.
Figure 18:
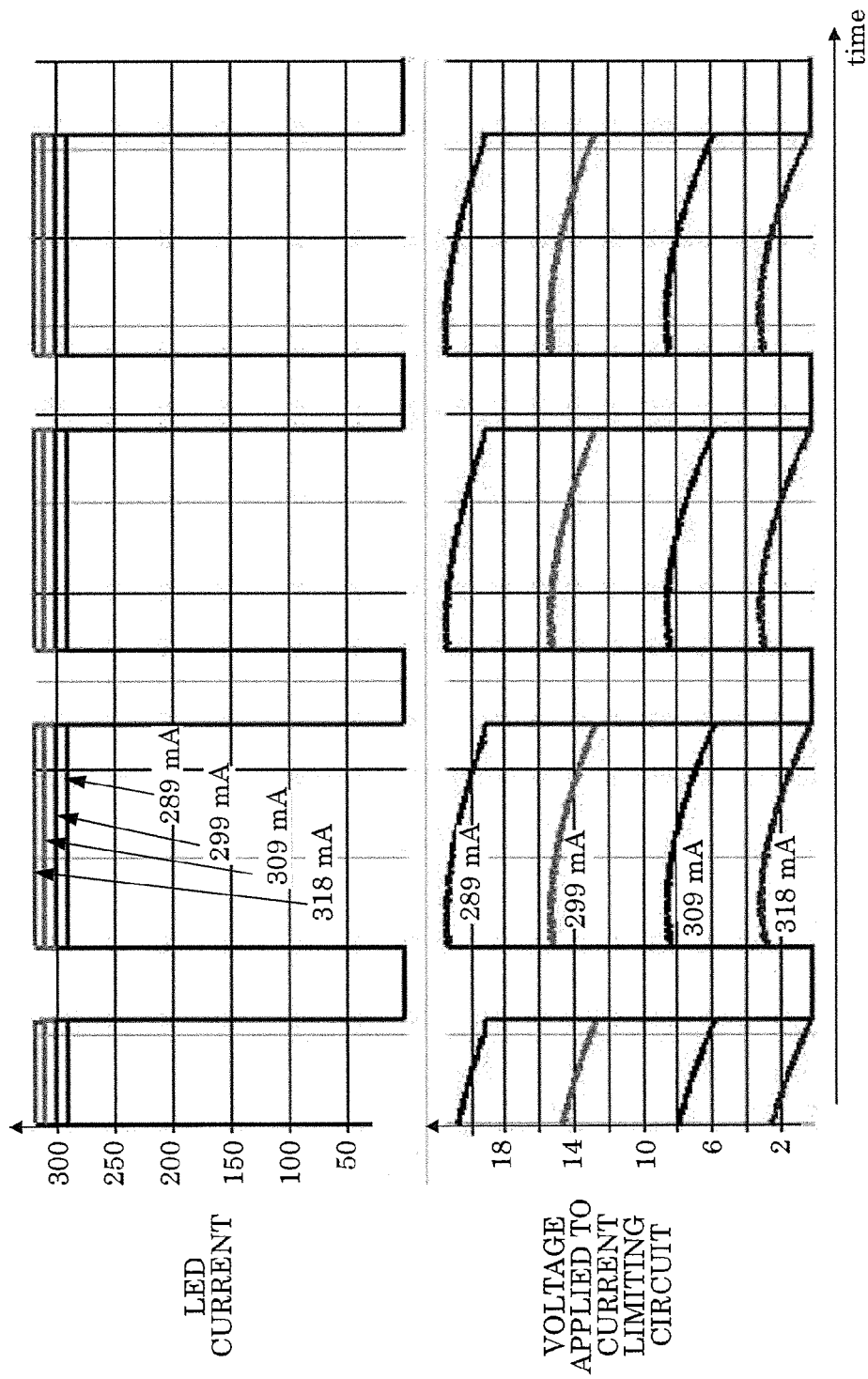
FIG. 18 is a diagram illustrating (second) simulation results in the case of example (1) in FIG. 16

FIG. 17 is a diagram illustrating (first) simulation results in the case of example (1) in FIG. 16 (1.2 kHz, 75% partial duty cycle). FIG. 18 is a diagram illustrating (second) simulation results in the case of example (1) in FIG. 16.

In FIG. 17, if the current set value for current limiting circuit 1 is 676 mA, current limiting circuit 1 has not succeeded in mitigating overshoot of the current. If the current set value is lowered to 318 mA, overshoot of the LED current disappears, and the voltage applied to current limiting circuit 1 is increased to have the peak of about 3 V.

FIG. 18 illustrates the result of further lowering the current set value from the values in FIG. 17. The LED current maintains the square wave, yet the current value falls gradually. The voltage applied to current limiting circuit 1 rapidly increases when the current set value is further lowered, and exceeds 20 V when the current set value is 289 mA.

Figure 19:
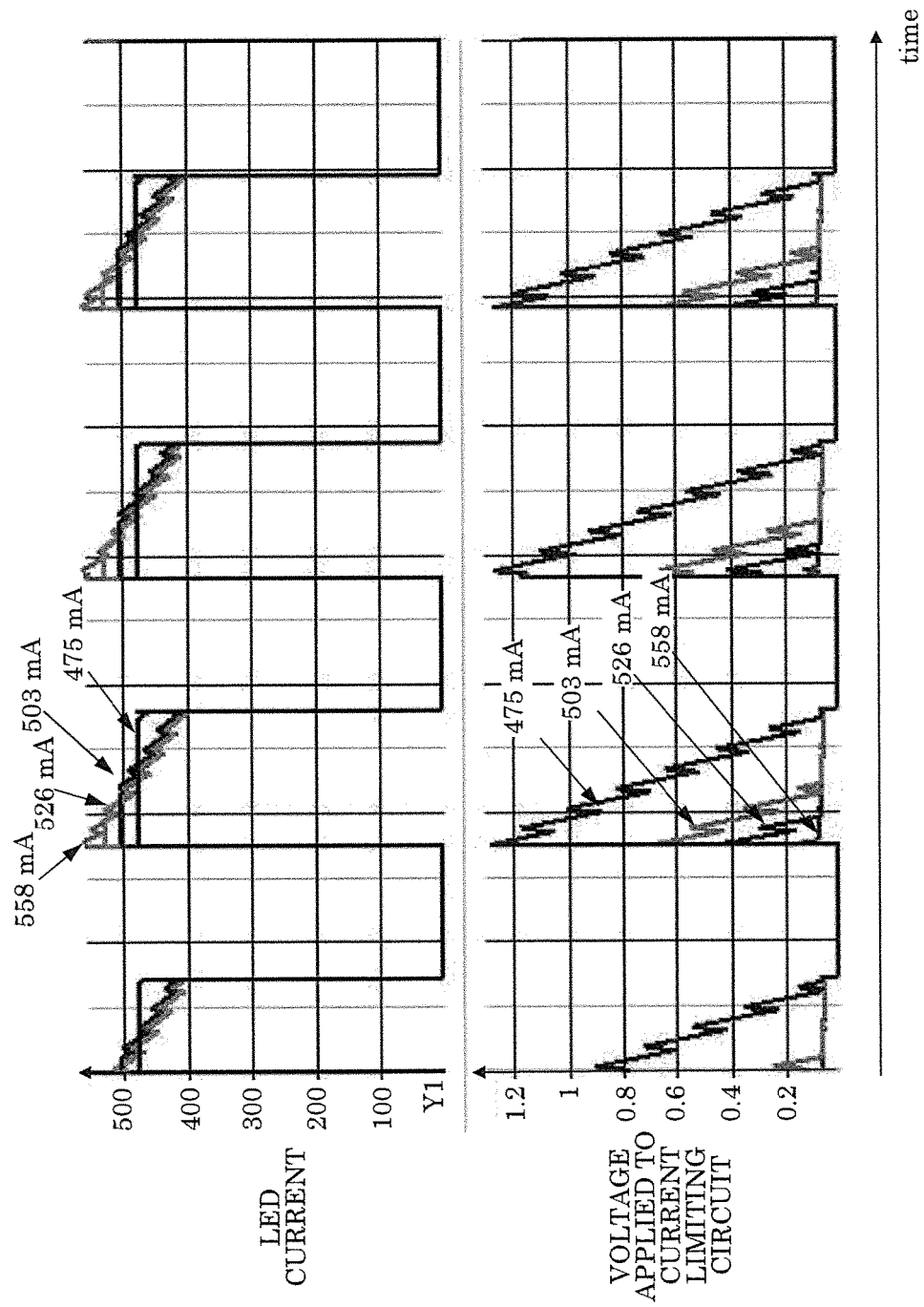
FIG. 19 is a diagram illustrating (first) simulation results in the case of example (2) in FIG. 16

FIG. 19 is a diagram illustrating (first) simulation results in the case of example (2) in FIG. 16 (4.8 kHz, 50% duty cycle). Furthermore, FIG. 20 is a diagram illustrating (second) simulation results in the case of example (2) in FIG. 16.

In FIG. 19, when the current set value for current limiting circuit 1 is 558 mA, current limiting circuit 1 has not succeeded in mitigating overshoot of the current. If the current set value is lowered to 475 mA, overshoot of the LED current disappears, and the voltage applied to current limiting circuit 1 is increased to have the peak of about 1.2 V.

Figure 20:
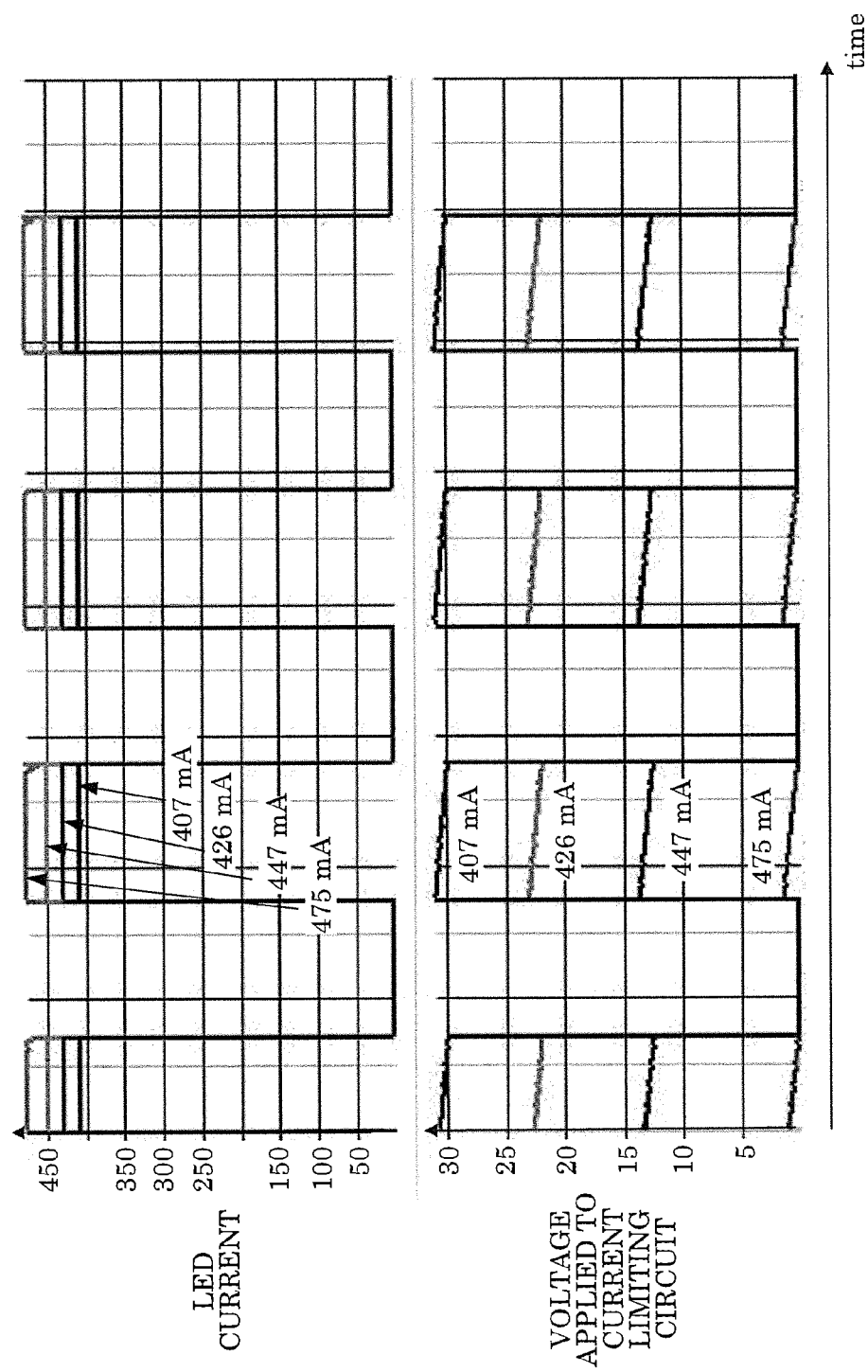
FIG. 20 is a diagram illustrating (second) simulation results in the case of example (2) in FIG. 16

FIG. 20 illustrates the results obtained when the current set value is further lowered from the values in FIG. 19. Although the LED current maintains the square wave, the current value falls gradually. The voltage applied to current limiting circuit 1 rapidly increases, and exceeds 30 V when the current set value is 407 mA.

Figure 21:
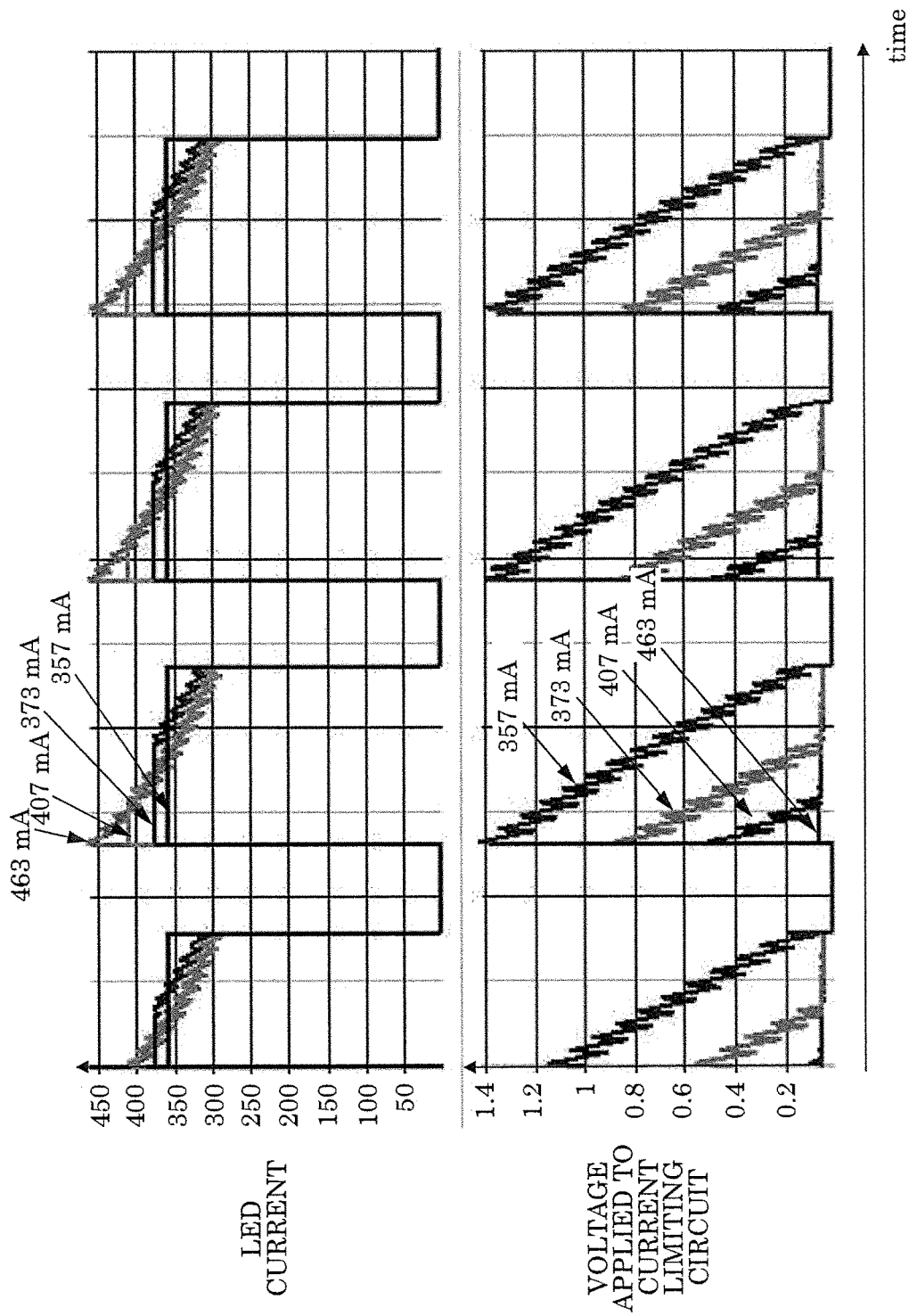
FIG. 21 is a diagram illustrating (first) simulation results in the case of example (3) in FIG. 16.
Figure 22:
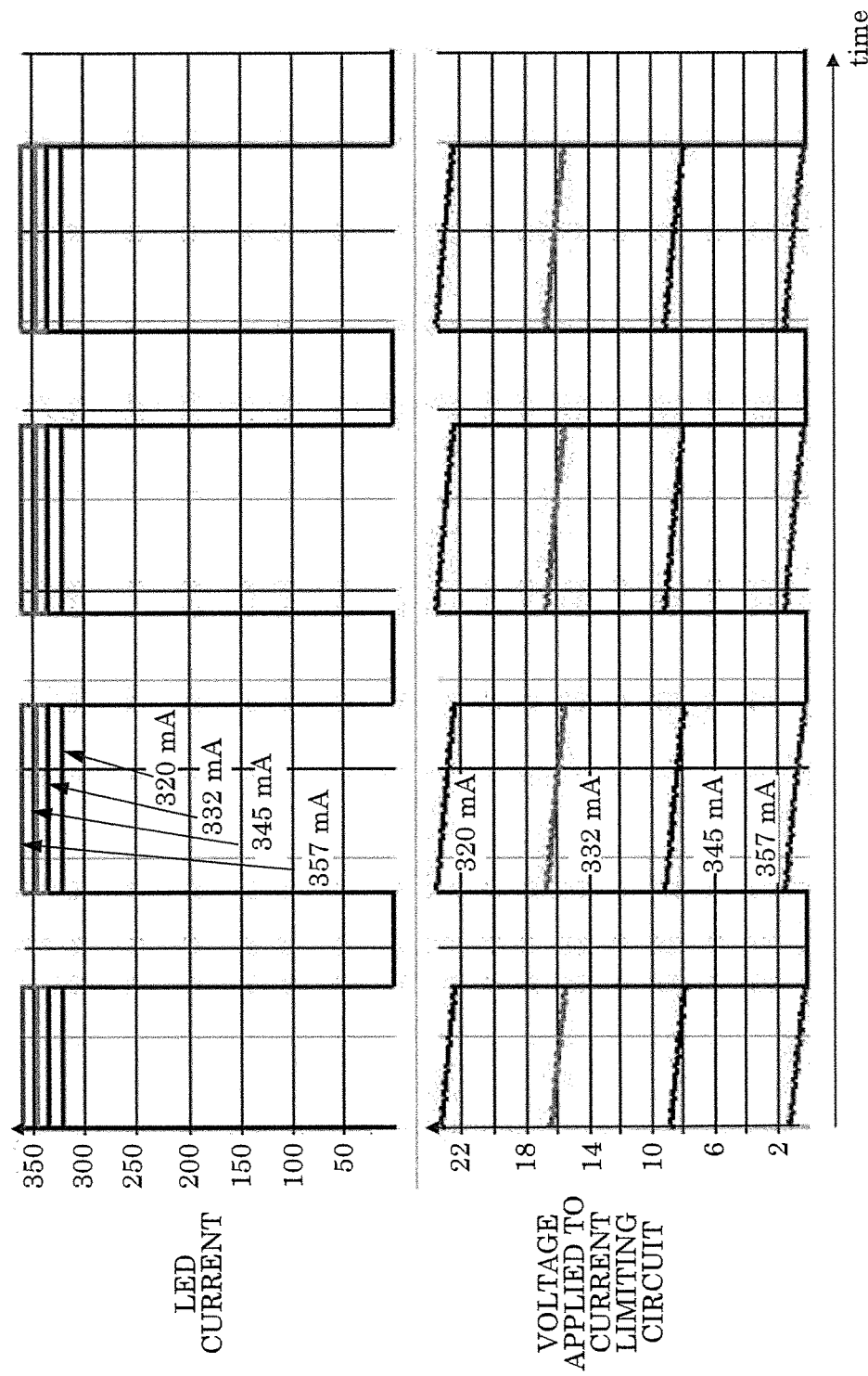
FIG. 22 is a diagram illustrating (second) simulation results in the case of example (3) in FIG. 16.

FIG. 21 is a diagram illustrating (first) simulation results in the case of example (3) in FIG. 16 (3.2 kHz, 66.7% duty cycle). FIG. 22 is a diagram illustrating (second) simulation results in the case of example (3) in FIG. 16.

In FIG. 21, when the current set value for current limiting circuit 1 is 463 mA, current limiting circuit 1 has not succeeded in mitigating overshoot of the current. If the current set value is lowered to 357 mA, the overshoot of LED current disappears, and the voltage applied to current limiting circuit 1 is increased to have the peak of about 1.4

V. FIG. 22 illustrates the results obtained by further lowering the current set value. Although the LED current maintains the square wave, the current value falls gradually. The voltage applied to current limiting circuit 1 rapidly increases, and exceeds 22 V when the current set value is 320 mA.

Figure 23:
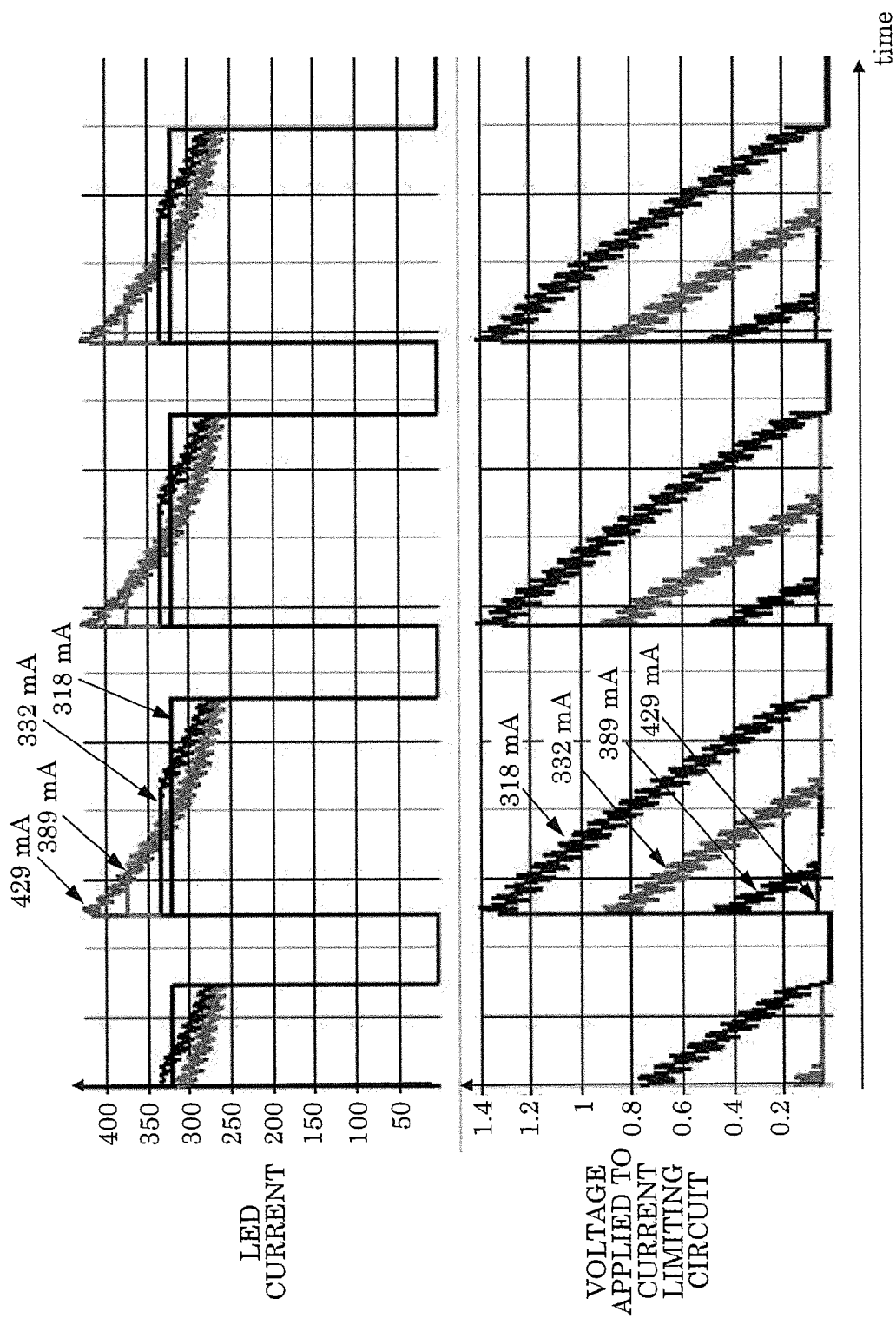
FIG. 23 is a diagram illustrating (first) simulation results in the case of example (4) in FIG. 16.
Figure 24:
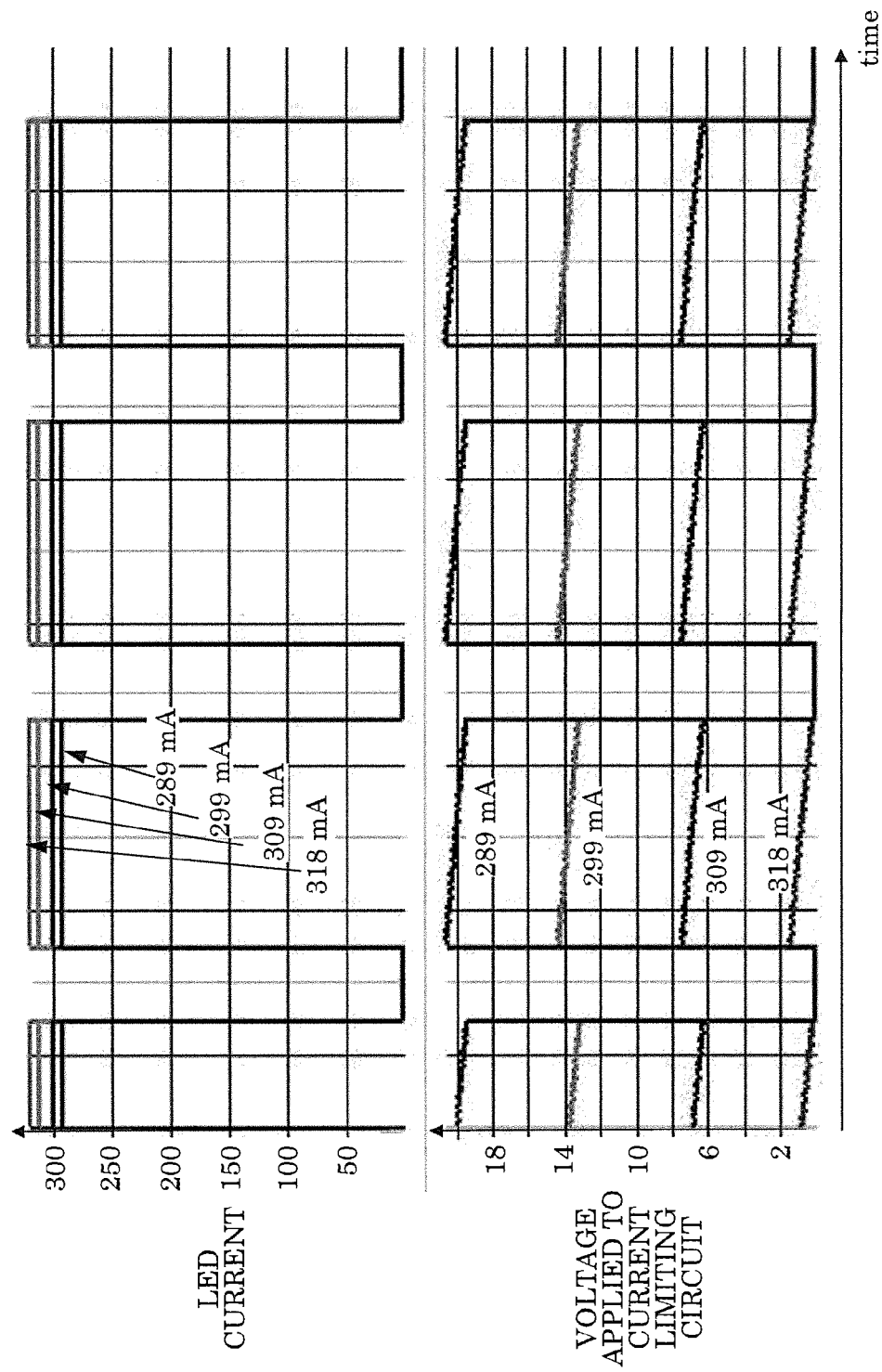
FIG. 24 is a diagram illustrating (second) simulation results in the case of example (4) in FIG. 16.
Figure 25A:
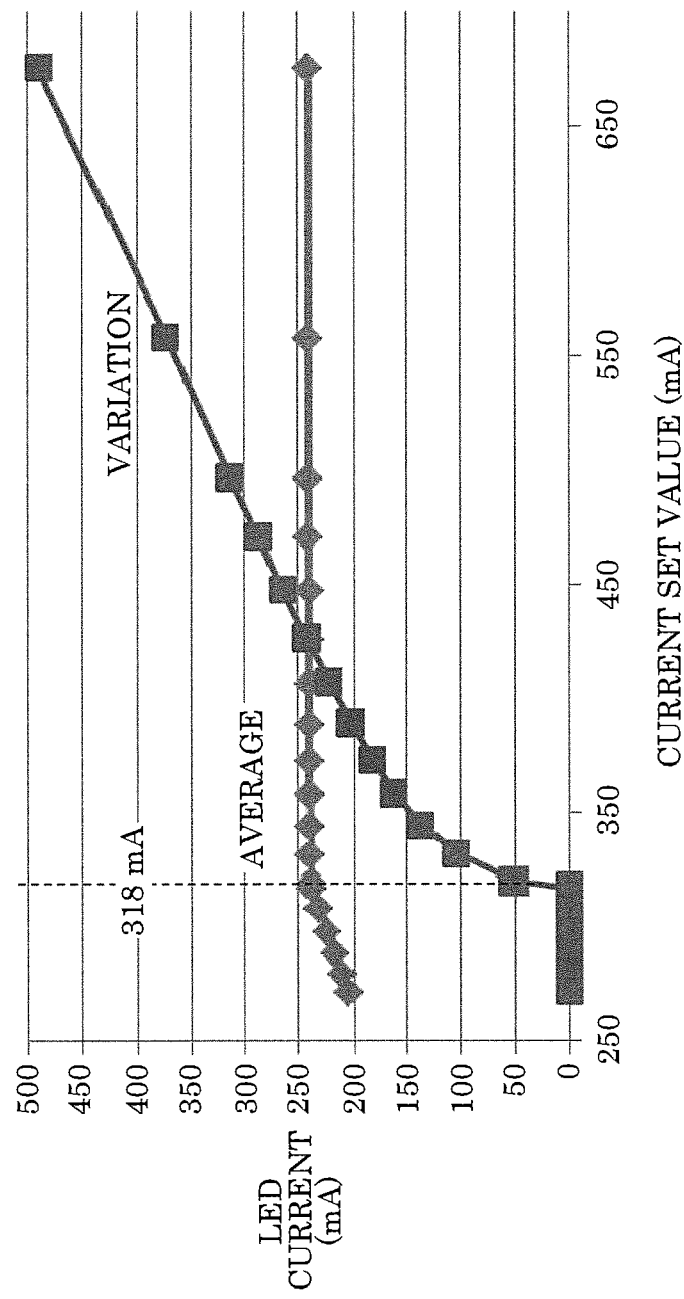
FIG. 25A is a diagram illustrating a relation between a current set value and LED current (average and variation), as simulation results in the case of example (1) in FIG. 16.
Figure 25B:
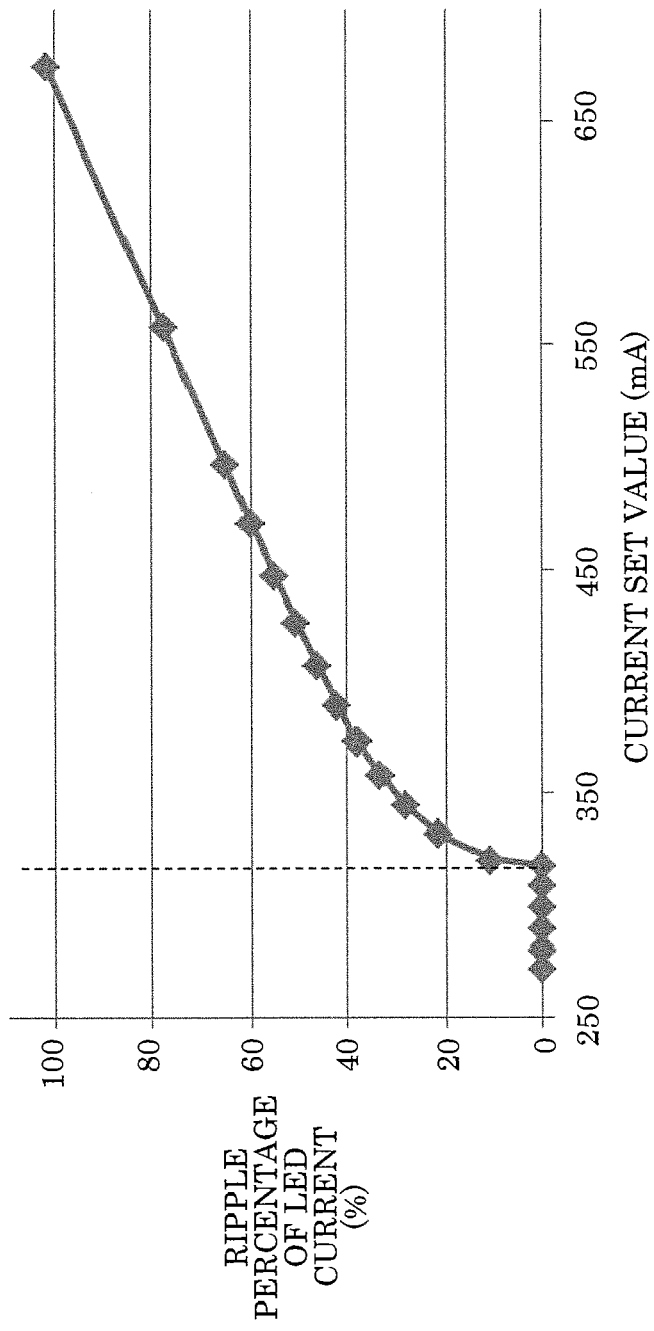
FIG. 25B is a diagram illustrating a relation between a current set value and a ripple percentage of LED current, as simulation results in the case of example (1) in FIG. 16.
Figure 25C:
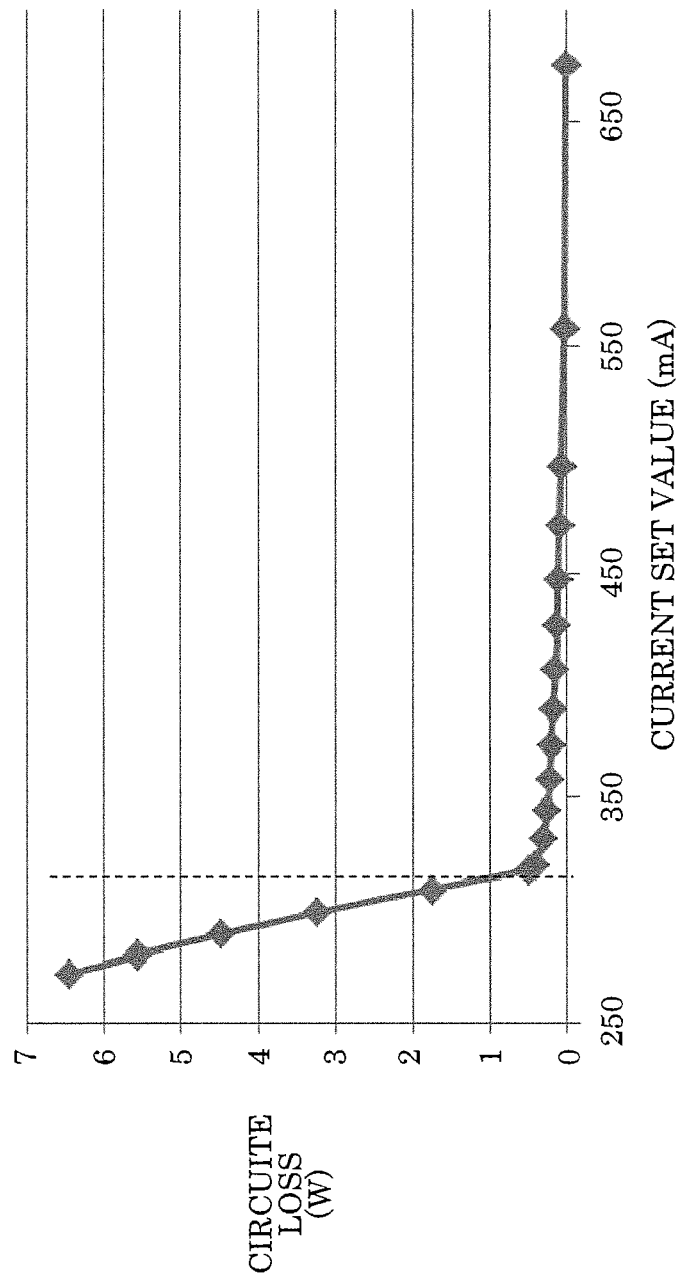
FIG. 25C is a diagram illustrating a relation between a current set value and circuit loss, as simulation results in the case of example (1) in FIG. 16.
Figure 26A:
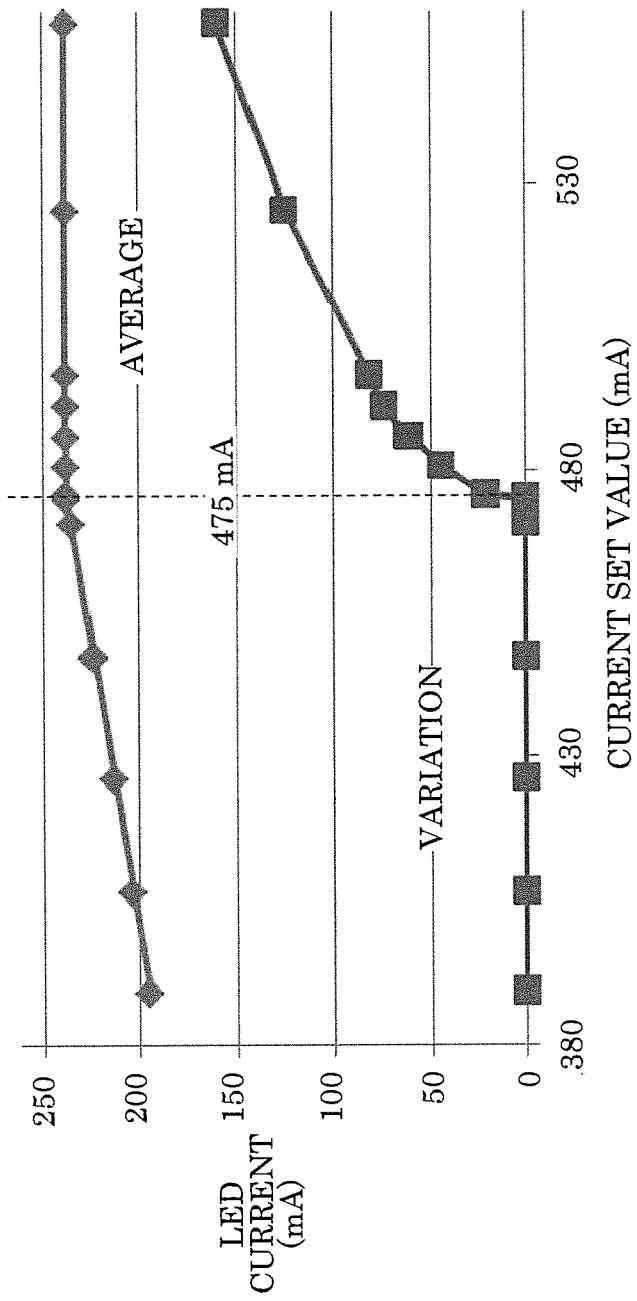
FIG. 26A is a diagram illustrating a relation between a current set value and LED current (average and variation), as simulation results in the case of example (2) in FIG. 16.
Figure 26B:
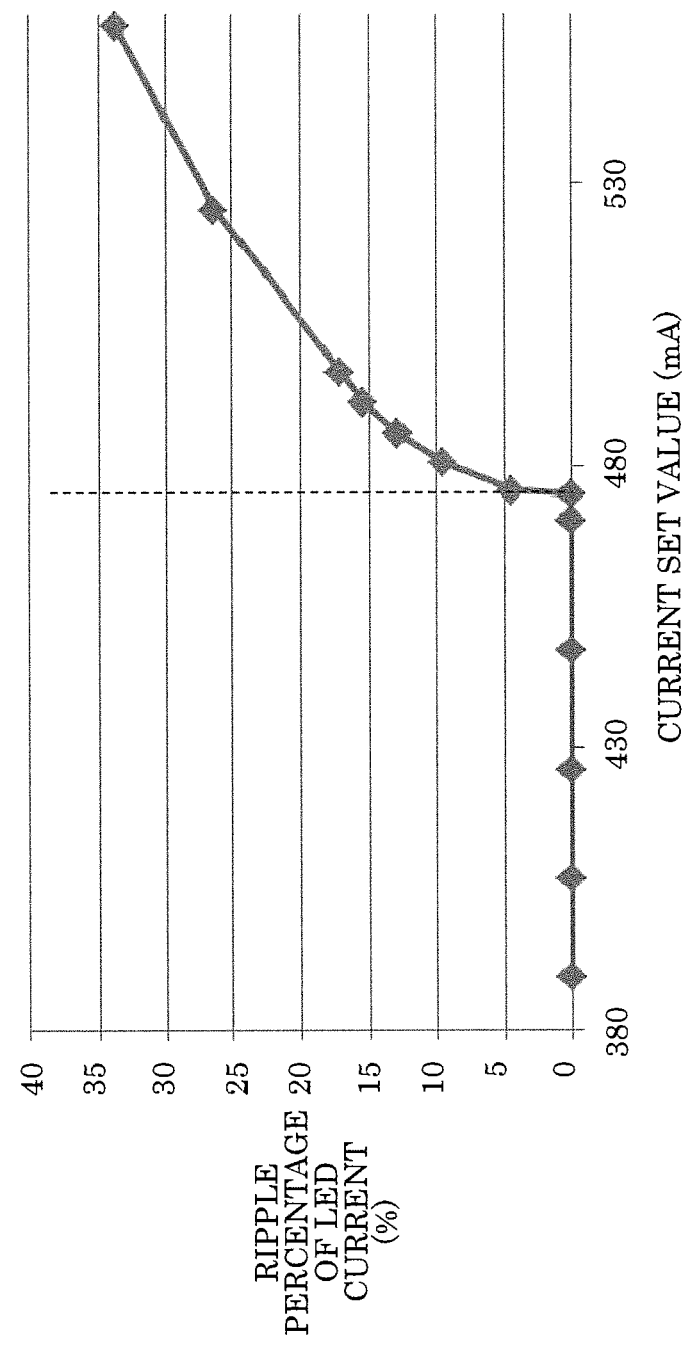
FIG. 26B is a diagram illustrating a relation between a current set value and a ripple percentage of LED current, as simulation results in the case of example (2) in FIG. 16.
Figure 26C:
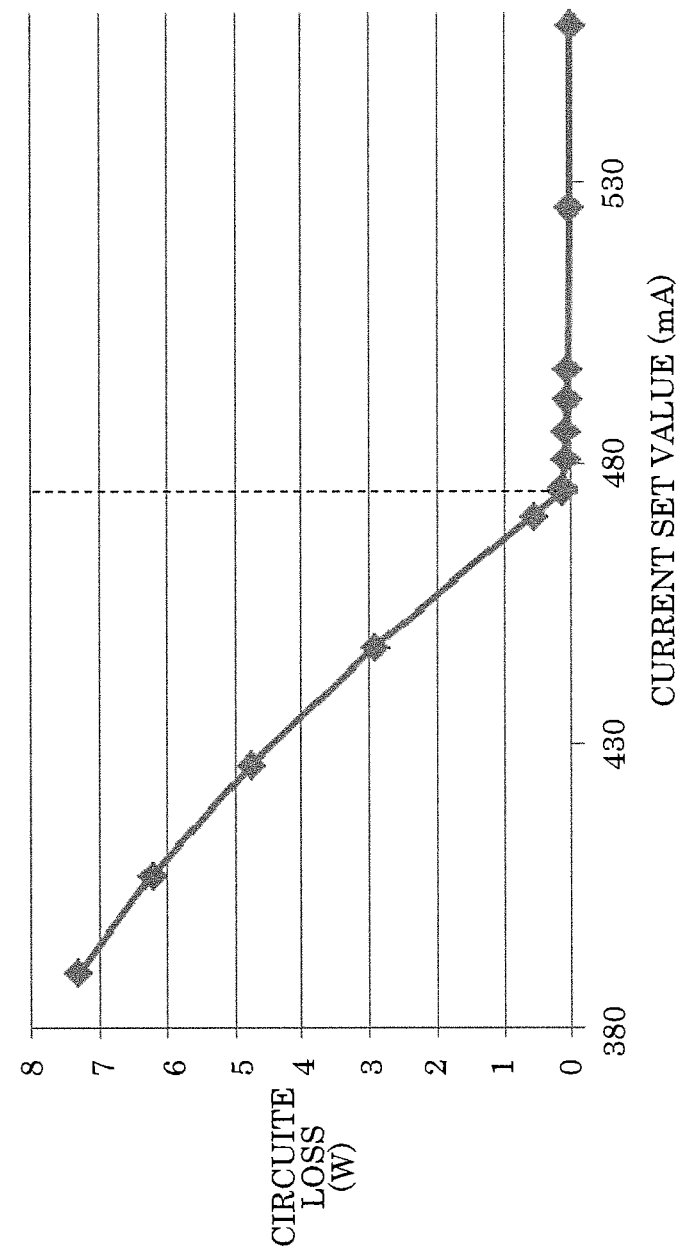
FIG. 26C is a diagram illustrating a relation between a current set value and circuit loss, as simulation results in the case of example (2) in FIG. 16.
Figure 27A:
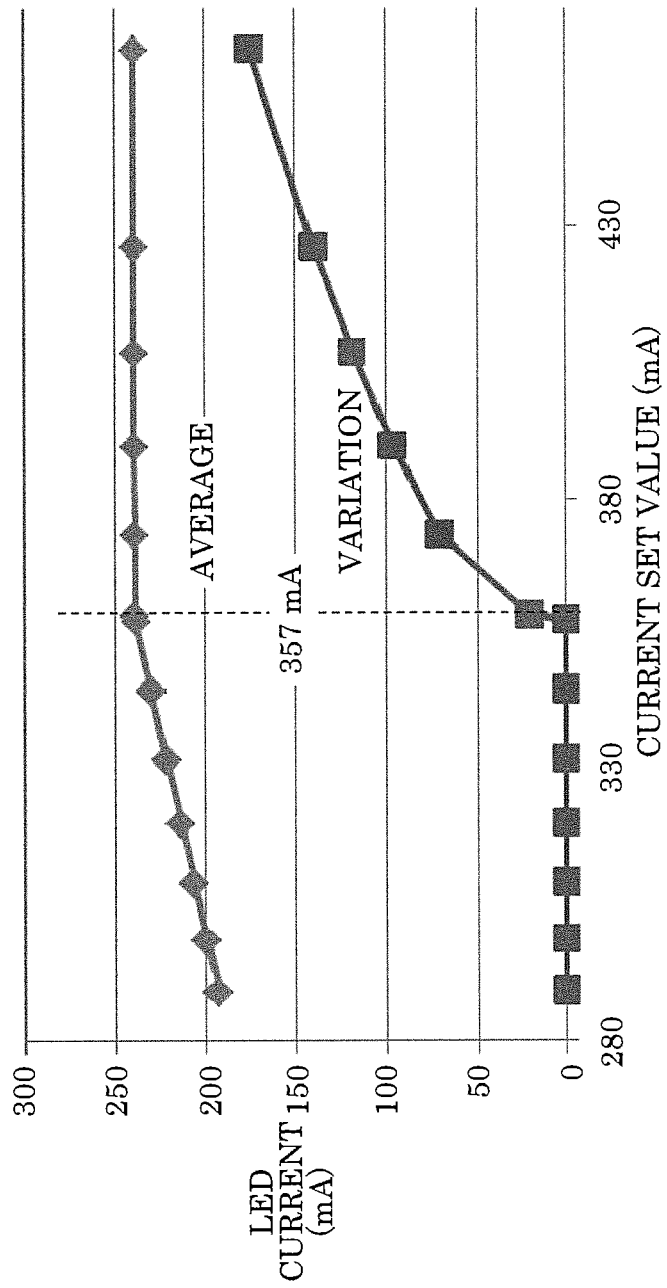
FIG. 27A is a diagram illustrating a relation between a current set value and LED current (average and variation), as simulation results in the case of example (3) in FIG. 16.
Figure 27B:
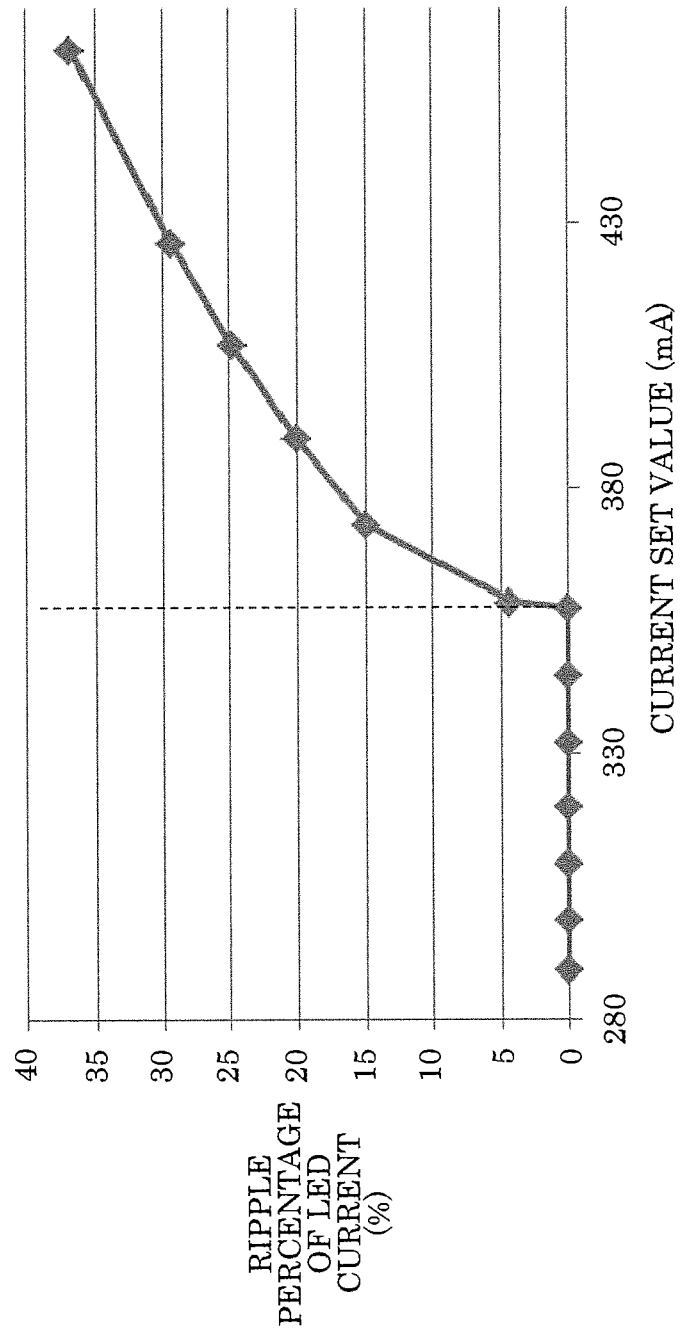
FIG. 27B is a diagram illustrating a relation between a current set value and a ripple percentage of LED current, as simulation results in the case of example (3) in FIG. 16.
Figure 28A:
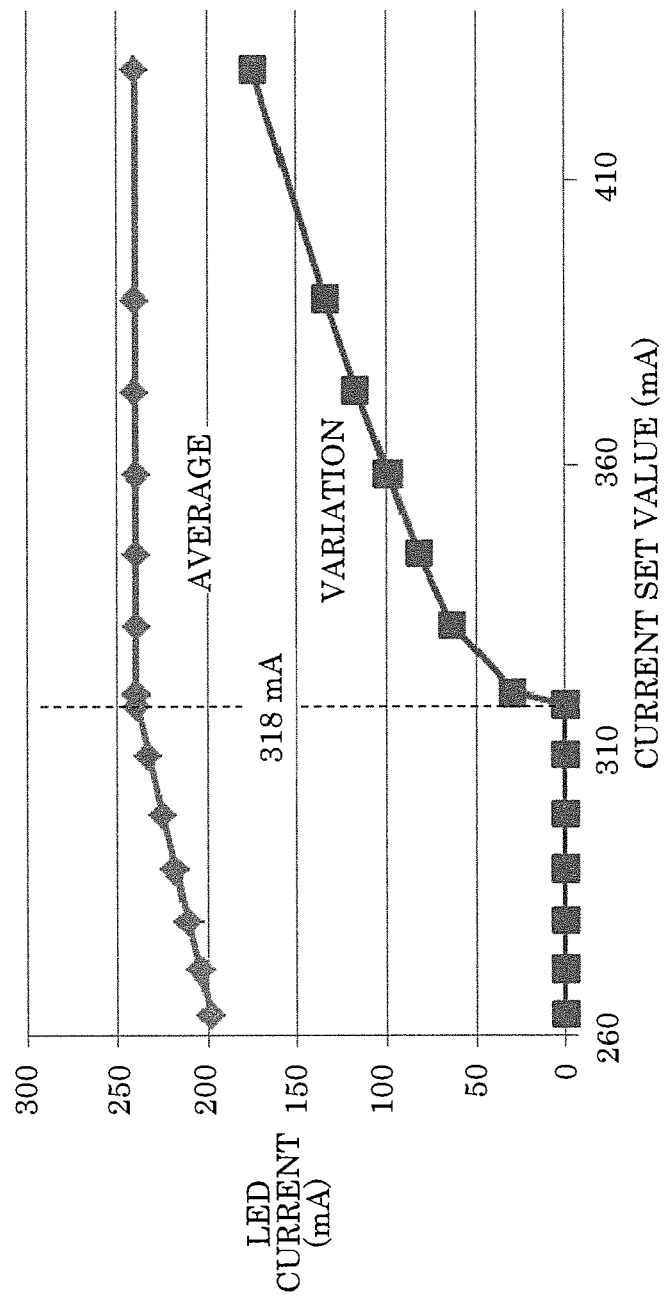
FIG. 28A is a diagram illustrating a relation between a current set value and LED current (average and variation), as simulation results in the case of example (4) in FIG. 16.
Figure 28B:
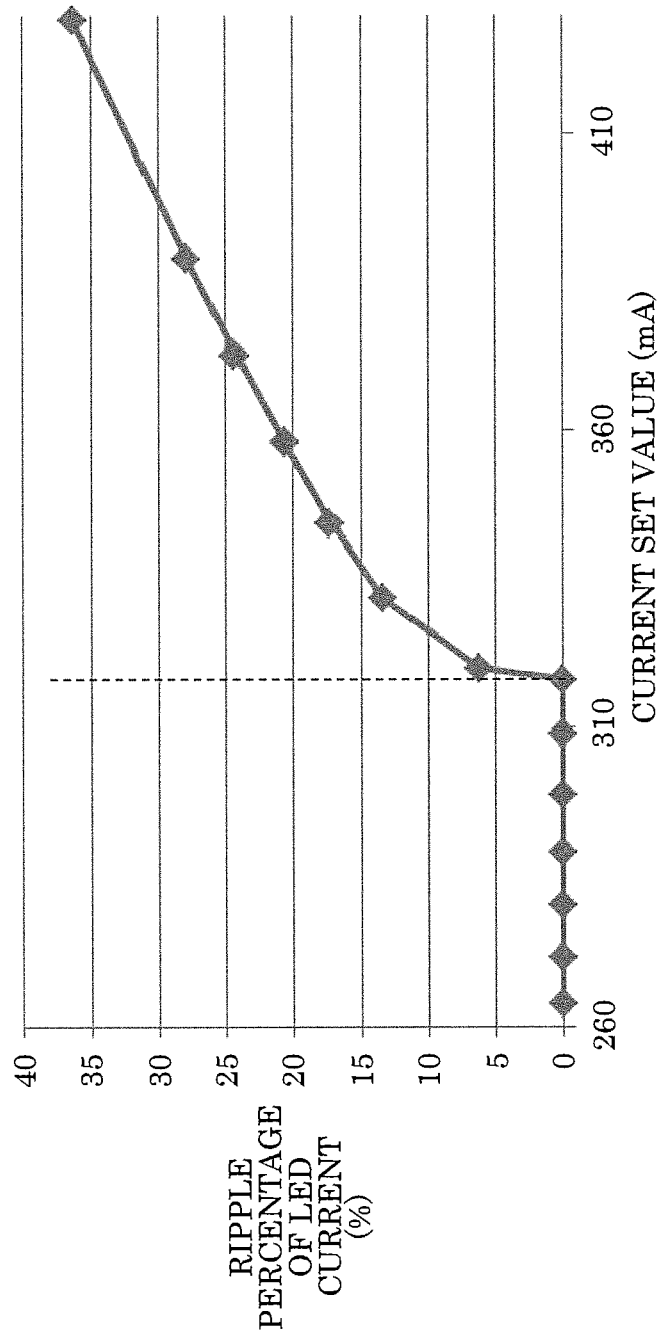
FIG. 28B is a diagram illustrating a relation between a current set value and a ripple percentage of LED current, as simulation results in the case of example (4) in FIG. 16.
Figure 28C:
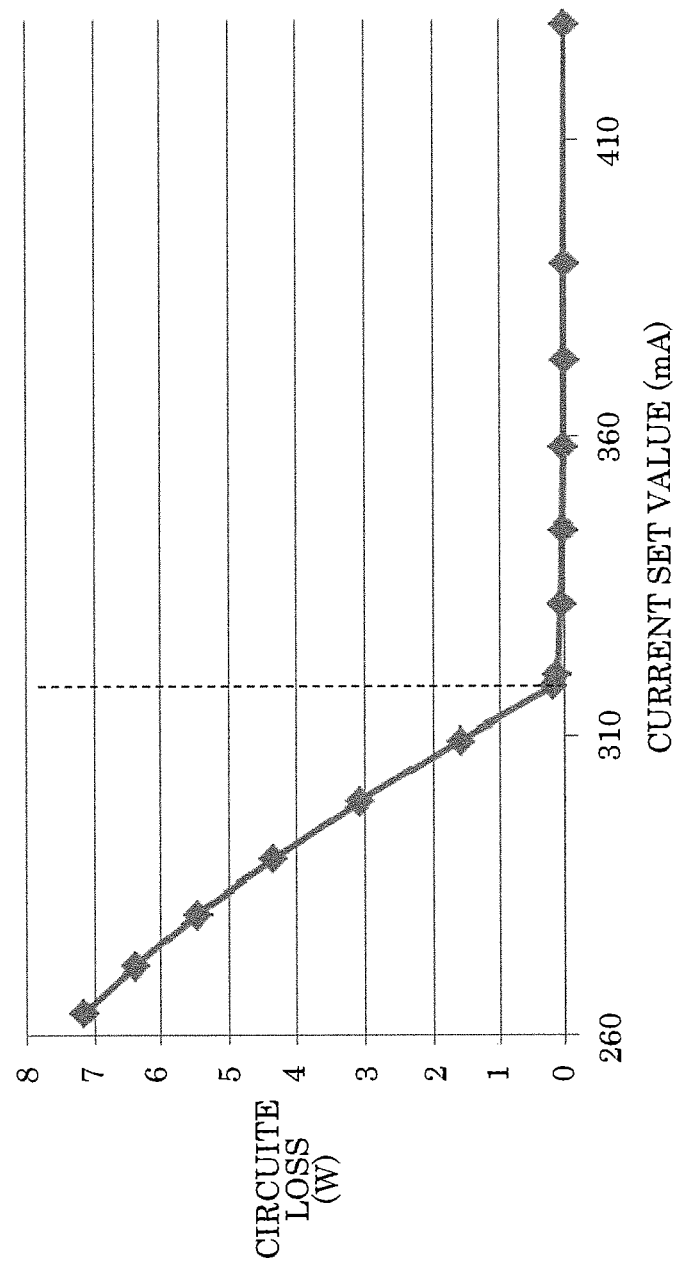
FIG. 28C is a diagram illustrating a relation between a current set value and circuit loss, as simulation results in the case of example (4) in FIG. 16.

FIG. 23 is a diagram illustrating (first) simulation results in the case of example (4) in FIG. 16 (2.4 kHz, 75% duty cycle). FIG. 24 is a diagram illustrating (second) simulation results in the case of example (4) in FIG. 16.

In FIG. 23, when the current set value for current limiting circuit 1 is 429 mA, current limiting circuit 1 has not succeeded in mitigating overshoot of the current. If the current set value is lowered to 318 mA, overshoot of the LED current disappears, and the voltage applied to current limiting circuit 1 is increased to have the peak of about 1.4 V. FIG. 24 illustrates the results obtained by further lowering the current set value. Although the LED current maintains the square wave, the current value falls gradually. The voltage applied to current limiting circuit 1 rapidly increases, and exceeds 20 V when the current set value is 289 mA.

FIGS. 25A to 25C, 26A to 26C, 27A to 27C, and 28A to 28C are graphs showing the results described with reference to FIGS. 17 to 24.

FIGS. 25A, 26A, 27A, and 28A are diagrams illustrating relations between a current set value and LED current (average and variation), as simulation results in the case of examples (1), (2), (3), and (4) in FIG. 16.

FIGS. 25B, 26B, 27B, and 28B are diagrams illustrating relations between a current set value and a ripple percentage of LED current, as simulation results in the case of examples (1), (2), (3), and (4) in FIG. 16.

FIGS. 25C, 26C, 27C, and 28C are diagrams illustrating relations between a current set value and circuit loss, as simulation results in the case of examples (1), (2), (3), and (4) in FIG. 16.

The drawings illustrate a relation among a current set value, an average, and a variation of the LED current in (A), a relation between a current set value and a ripple percentage of the LED current in (B), and a relation between a current set value and loss caused by current limiting circuit 1 in (C). These results show that the optimal current set value for current limiting circuit 1 is about 475 mA if the duty cycle is 50%, is about 357 mA if the duty cycle is 66.7%, and is about 318 mA if the duty cycle is 75%.

Figure 1B:
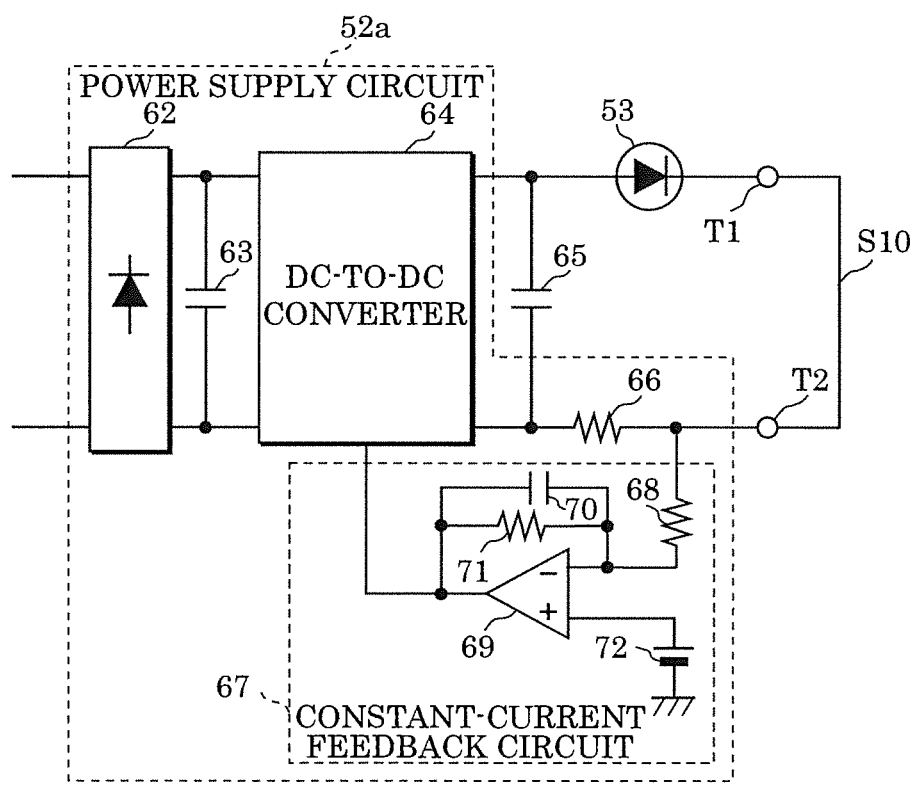
FIG. 1B is a circuit diagram illustrating a configuration of a lighting apparatus to which a communication module according to Embodiment 1 is not added.
Figures 29A, 29B:
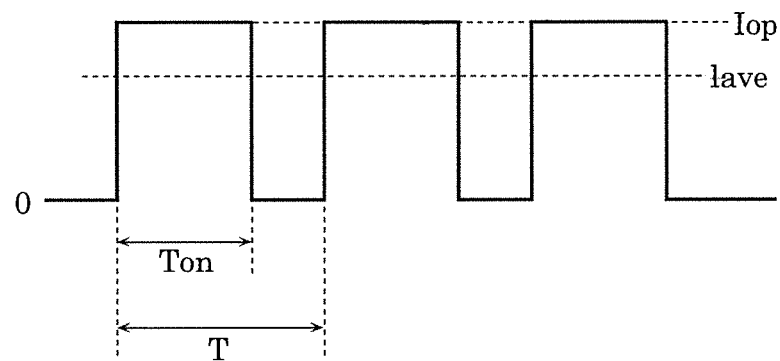
FIG. 29A is an explanatory diagram illustrating a waveform of intermittent LED current.
FIG. 29B is a diagram illustrating current set values according to duty cycles.

The following describes an optimal current set value for current limiting circuit 1 corresponding to a partial duty cycle of a communication signal from signal generator SG. Power supply circuit 52a which is assumed to be included in the illumination light communication apparatus according to the present embodiment has a constant-current feedback function as described above. A typical example can be constant-current feedback circuit 67 which includes the amplifier as illustrated in FIGS. 1A and 1B. Typically, a phase compensation circuit for securing the stability of a feedback system is further included. A compensation circuit which includes an integral element to adjust the gain and phase in a loop transfer function is used for such a phase compensation circuit, and feedback control performed using such a compensation circuit is known as PI control or PID control. In other words, such a phase compensation circuit will be a means to control the average output so that the output is constant. FIG. 29A is an explanatory diagram illustrating an ideal waveform of intermittent LED current. Viewing the interrupted wave form of the LED current illustrated in FIG. 29A, average Iave of the waveform is represented by Expression (1) below.

$$Iave = Iop \times ONd \quad (1)$$

Here, Iop denotes a peak value of the LED current. ONd denotes a duty cycle and is expressed by 100×Ton/T (%).

Average Iave above is controlled by the constant-current feedback function so as to be equal to the average current which is not interrupted, and is controlled so as to have a constant value even if the duty cycle changes. Accordingly, when the duty cycle is low, peak value Iop is increased to maintain Iave at a constant value. If peak value Iop is used as the current set value for current limiting circuit 1, a so-called optimum value which can eliminate overshoot by making the LED current waveform a square wave and can also inhibit the loss caused by current limiting circuit 1 is obtained (see Expression (2)).

$$\text{Optimal current set value} = Iave/ONd \quad (2)$$

Here, Iave denotes an average of LED current which is not interrupted.

FIG. 29B illustrates optimal current set values for partial duty cycles, which are obtained using Expression (2) under the condition that an average of LED current which is not interrupted is 240 mA. It can be seen that the optimal current set values for partial duty cycles quite match the optimal current set values for partial duty cycles discussed in the above examination.

This causes the brightness of illumination light when overshoot of the LED current is mitigated and the illumination light not modulated to appear to people substantially the same as the brightness of illumination light which is being modulated.

[1.5 Configuration Example of Communication Module 10]

The following describes the configuration of attachable communication module 10.

FIG. 1B is a circuit diagram illustrating a configuration of a lighting apparatus to which communication module 10 according to Embodiment 1 is not added. Specifically, FIG. 1B illustrates a configuration in which communication module 10 is excluded from, and short line S10 is added to the illumination light communication apparatus in FIG. 1A. The illumination light communication apparatus in FIG. 1A represents a lighting apparatus having the visible light communication function. FIG. 1B shows a lighting apparatus which does not have the visible light communication function.

Communication module 10 or short line S10 is connected to terminals T1 and T2 in FIGS. 1A and 1B. Terminals T1 and T2 may be terminal blocks or connectors, or may be cut portions of a line member corresponding to short line S10 in FIG. 1B, among lines in an existing lighting apparatus.

According to the configurations as illustrated in FIGS. 1A and 1B, a light communication function can be added by later adding a simple circuit part (that is, communication module 10) while the power supply circuit and the LED light source which are included in an existing lighting device without the light communication function are used as they are.

[1.6 Variation of Illumination Light Communication Apparatus]

The following describes a variation of the illumination light communication apparatus.

Figure 30A:
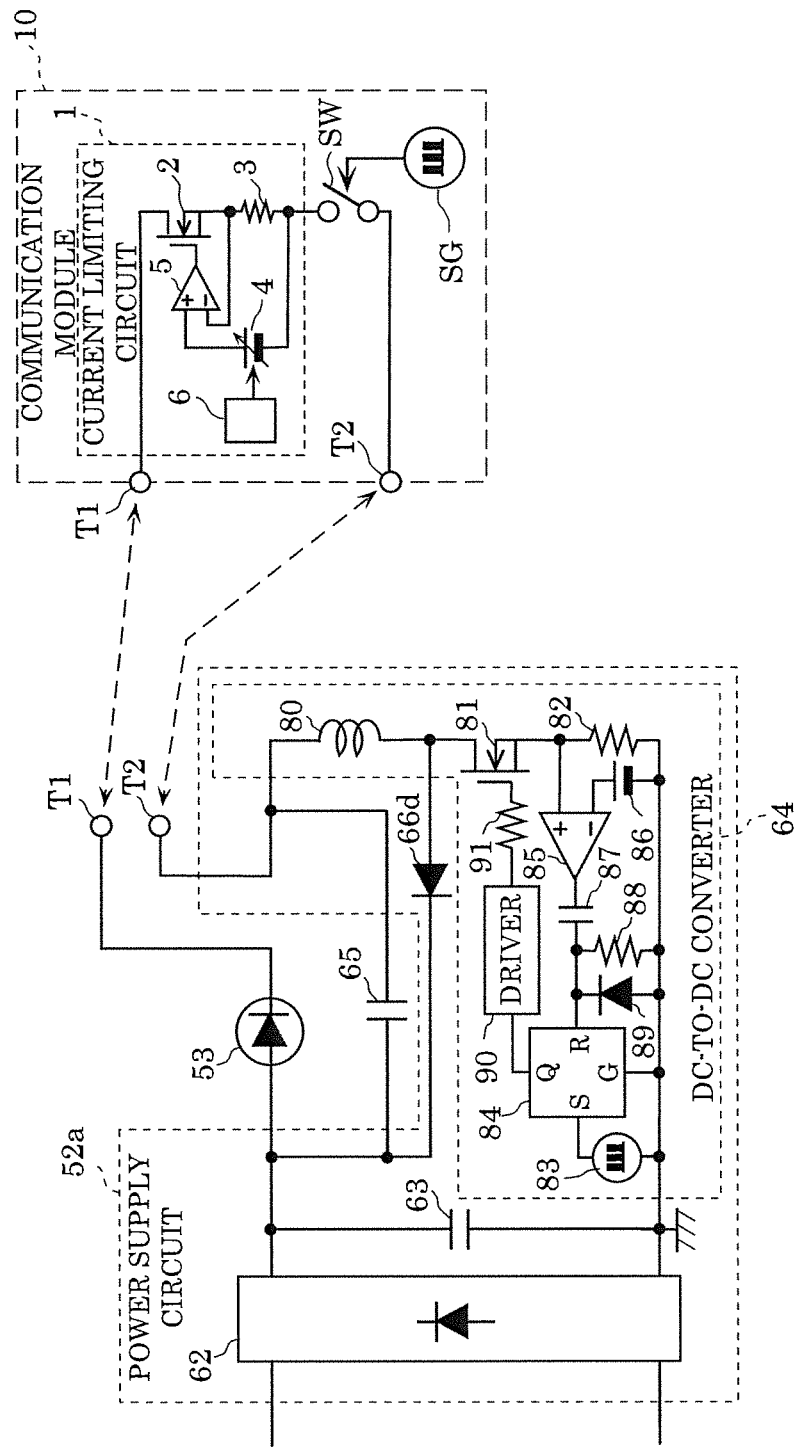
FIG. 30A is a circuit diagram illustrating a variation of the illumination light communication apparatus according to Embodiment 1.

FIG. 30A is a circuit diagram illustrating a variation of the illumination light communication apparatus according to Embodiment 1. The illumination light communication apparatus in FIG. 30A is different from the apparatus in FIG. 1A in an internal circuit configuration of power supply circuit 52a. The following gives a description focusing on differences.

In power supply circuit 52a in FIG. 1A, constant-current feedback circuit 67 performs feedback control for maintaining an average of the output current at a constant value, whereas power supply circuit 52a in FIG. 30A is configured to perform threshold control of switching current.

Power supply circuit 52a in FIG. 30A includes rectifier bridge 62, capacitor 63, and DC-to-DC converter 64. DC-to-DC converter 64 includes inductor 80, switch element 81, diode 66d, resistor 82, signal source 83, flip-flop 84, comparator 85, constant voltage source 86, capacitor 87, resistor 88, diode 89, driver 90, and gate resistor 91.

Inductor 80, switch element 81, and diode 66d are basic circuit elements which constitute DC-to-DC converter 64 as a buck converter.

Signal source 83, flip-flop 84, comparator 85, and peripheral circuits thereof control on and off of switch element 81, and control a threshold of switching current through switch element 81. Accordingly, the switching current also passes through load circuit 53 (light emitting diode), and controlling the threshold achieves a function that substitutes the constant-current feedback. Operation of such DC-to-DC converter 64 is described with reference to FIG. 30B.

Figure 30B:
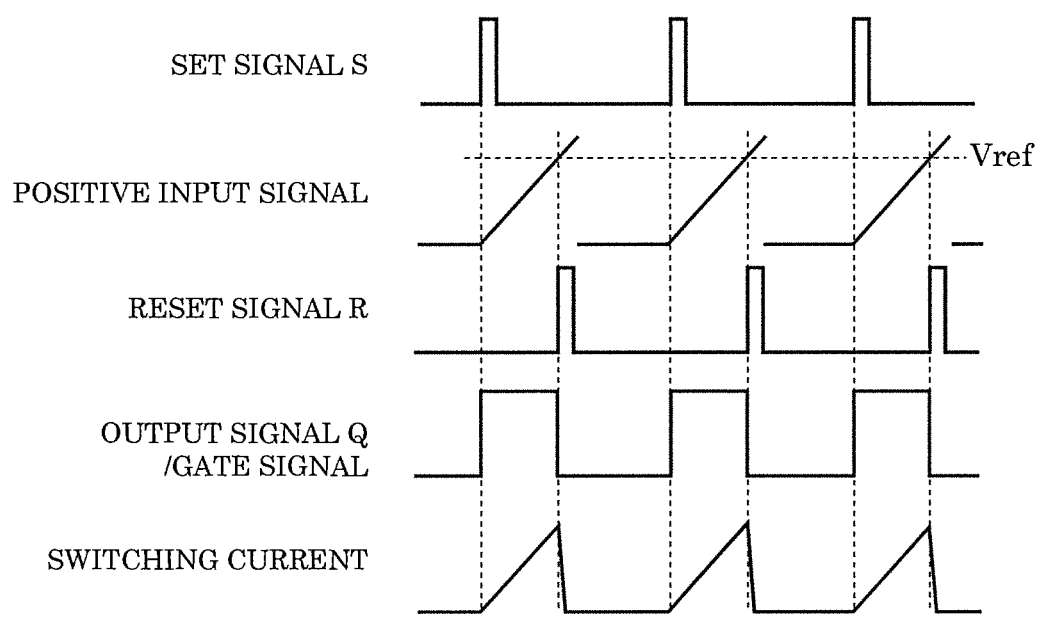
FIG. 30B is a waveform diagram illustrating threshold control of switching current by a power supply circuit in FIG. 30A.

FIG. 30B is a waveform diagram illustrating threshold control of switching current by power supply circuit 52a in FIG. 30A. Note that FIG. 30B illustrates waveforms obtained when terminals T1 and T2 are short-circuited in the apparatus in FIG. 30A or when communication module 10 is connected to terminals T1 and T2 and on/off switch SW is maintained on.

In FIG. 30B, set signal S is input from signal source 83 to set input terminal S of flip-flop 84. A positive input signal is input to the positive input terminal of comparator 85, and indicates a voltage drop across resistor 82, that is, the magnitude of current flowing through switch element 81. Reset signal R is input to the reset input terminal of flip-flop 84. Output signal Q is output from output terminal Q of flip-flop 84. Output signal Q passes through driver 90 and resistor 91, and is supplied to switch element 81 as a gate signal. Switching current flows through switch element 81, and is detected as a voltage drop across resistor 82.

A set signal is generated by signal source 83, and is periodically set high. When set signal S is set high, output signal Q of RS flip-flop 84 is set high. Output signal Q is input to the gate of switch element 81 (MOSFET) via driver circuit 90 and gate resistor 91. Switch element 81 is turned on when output signal Q is set high.

The magnitude of switching current (current flowing through switch element 81) is detected as a voltage drop across resistor 82. The switching current is input to the positive input terminal of comparator 85, and the magnitude is compared with reference voltage Vref applied to the negative input terminal of comparator 85. When the voltage drop reaches reference voltage Vref, the output from comparator 85 goes high, is converted into a pulse by a differentiation circuit constituted by capacitor 87 and resistor 88, and is input to the reset input terminal of RS flip-flop 84. At this time point, output signal Q of flip-flop 84 goes low, and switch element 81 is turned off. The detection of the magnitude of current flowing through switch element 81 as the switching current is a substitute for detecting the magnitude of current flowing through load circuit 53.

Such threshold control of switching current substitutes the constant-current feedback control as illustrated in FIG. 1A, and functions to maintain the average of output current at a constant value. Accordingly, if the apparatus in FIG. 30A does not include current limiting circuit 1, the problem of overshoot described in the summary section above also occurs, as with FIG. 1A. However, the configuration in FIG. 30A achieves a reduction in overshoot by including current limiting circuit 1 as with FIG. 1A.

Note that power supply circuit 52a may perform constant-current feedback control in FIG. 1A or threshold control of switching current in FIG. 30A. Current limiting circuit 1 has a function of reducing overshoot, and thus yields advantageous effects for a power supply circuit which may cause overshoot by bringing on/off switch SW into the on/off states.

Embodiment 2

Figure 51:
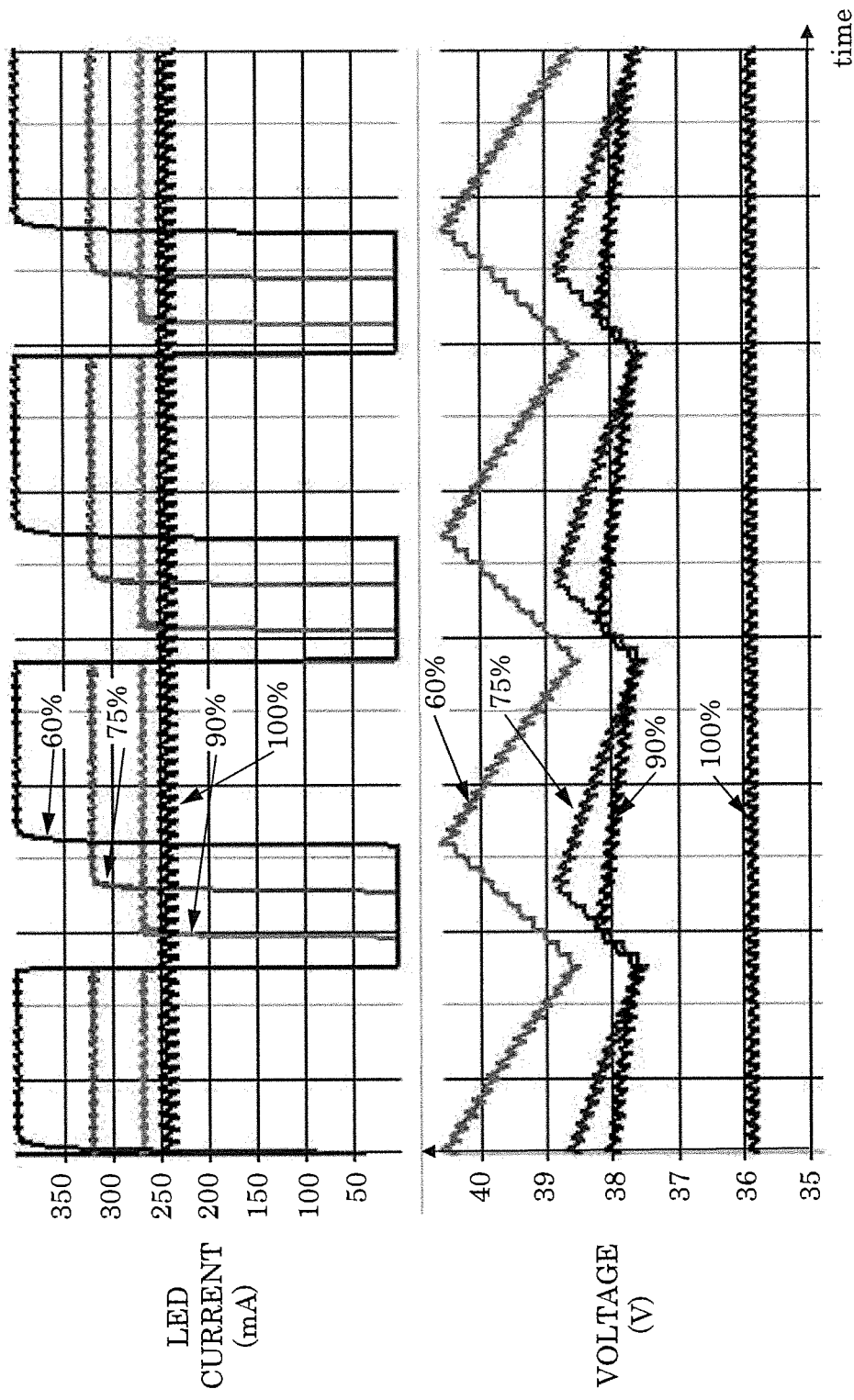
FIG. 51 is a diagram illustrating first simulation results for the example circuit in FIG. 50A.

Embodiment 2 describes a configuration of varying a reference value (also, current set value) in current limiting circuit 1, in an analog manner. In Embodiment 1, the reference value is changed according to the duty cycle, whereas in Embodiment 2, the reference value is changed according to a voltage applied to current limiting circuit 1, immediately before on/off switch SW is turned on, which is a difference from Embodiment 1. Specifically, a voltage applied to current limiting circuit 1 is used instead of the duty cycle. The greater the duty cycle is, the greater the overshoot of an LED current is. As illustrated in FIG. 51, the greater the output voltage (corresponding to the voltage applied to current limiting circuit 1) is, the greater the overshoot of the LED current is. In view of this, a voltage applied to current limiting circuit 1 is used instead of the duty cycle, according to Embodiment 2.

The illumination light communication apparatus according to Embodiment 2 has almost the same configuration as that in FIG. 1A, yet the configuration of current limiting circuit 1 is different. The following mainly describes differences.

Figure 31A:
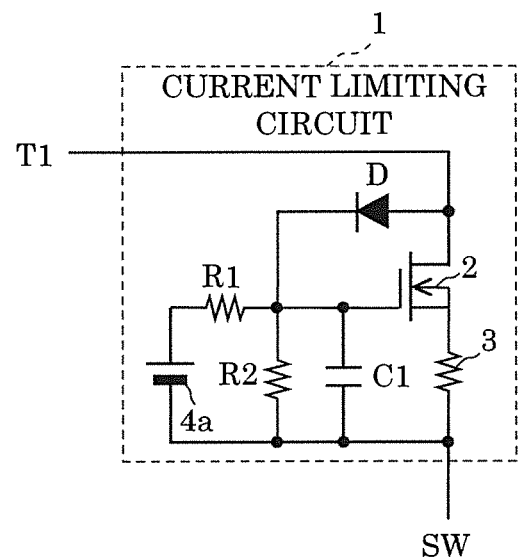
FIG. 31A is a diagram illustrating a first configuration example of a current limiting circuit according to Embodiment 2.
Figure 31B:
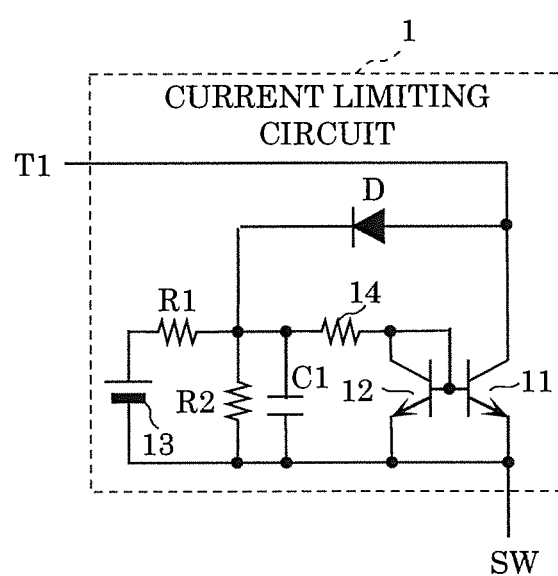
FIG. 31B is a diagram illustrating a second configuration example of the current limiting circuit according to Embodiment 2.

FIGS. 31A and 31B illustrate configuration examples of current limiting circuit 1 according to Embodiment 2.

Current limiting circuit 1 illustrated in FIG. 31A includes transistor 2 which is MOSFET 2, resistor 3 connected to the source of transistor 2, constant voltage source 4a, voltage dividing resistors R1 and R2, capacitor C1, and diode D. Current limiting circuit 1 illustrated in FIG. 31B includes bipolar transistors 11 and 12, constant voltage source 13, voltage dividing resistors R1 and R2, noise preventing capacitor C1, current limiting resistor 14, and diode D In FIG. 31A, the voltage of constant voltage source 4a is divided by resistors R1 and R2, and constant voltage source 4a is connected to, via capacitor C1, the gate terminal of transistor 2 and a point via resistor 3. Diode D is connected from the drain terminal of transistor 2 to the voltage dividing point of resistors R1 and R2. In FIG. 31B, bipolar transistors 11 and 12 form a current mirror, the voltage of constant voltage source 13 is divided by resistors R1 and R2, and the divided voltage causes reference current to flow through bipolar transistor 12 whose collector terminal and base terminal are short-circuited, via capacitor C1 and resistor 14. Diode D is connected from the collector terminal of bipolar transistor 11 to the voltage dividing point of resistors R1 and R2. According to the configuration, when an optimal current set value for current limiting circuit 1 is obtained according to the duty cycle of a modulating signal from signal generator SG, the reference source is not directly controlled, but a signal is fed back to the voltage dividing point of the reference source, using a voltage applied to current limiting circuit 1 and generated when the current set value is inappropriate.

Resistors R1 and R2 and diode D in FIGS. 31A and 31B correspond to control circuit 6 in FIG. 1A which changes the reference value.

A description of the operation as illustrated in FIG. 31A according to Embodiment 2 of the present disclosure is given using simulation results. As main setting conditions of the simulations, the capacitance value of the smoothing capacitor is set to 20 μF, the frequency of a modulating signal from the signal generating circuit is set to 2.4 kHz, the operating frequency of the DC-to-DC converter is set to 65 kHz, and the average of load current (LED current) which is not interrupted is set to 240 mA.

Figure 32A:
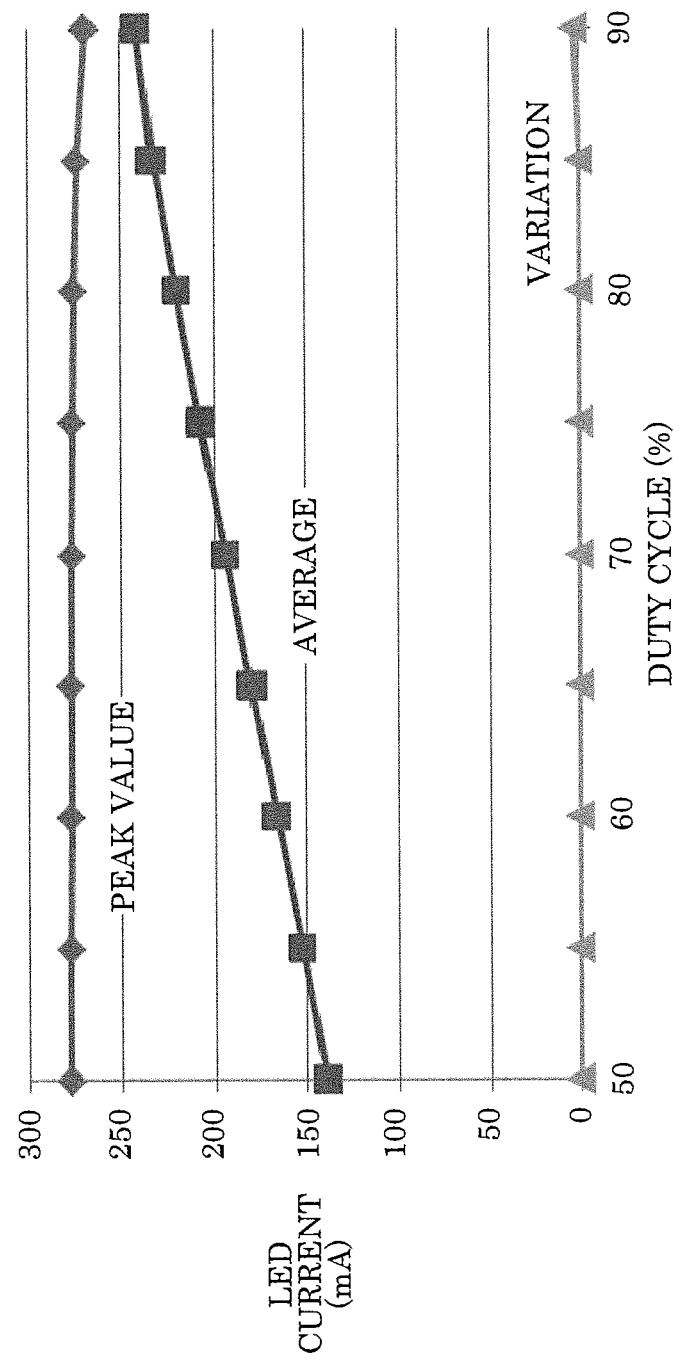
FIG. 32A is a diagram illustrating a relation between a duty cycle and LED current, as simulation results for a circuit from which a diode in FIG. 31A is excluded.
Figure 32B:
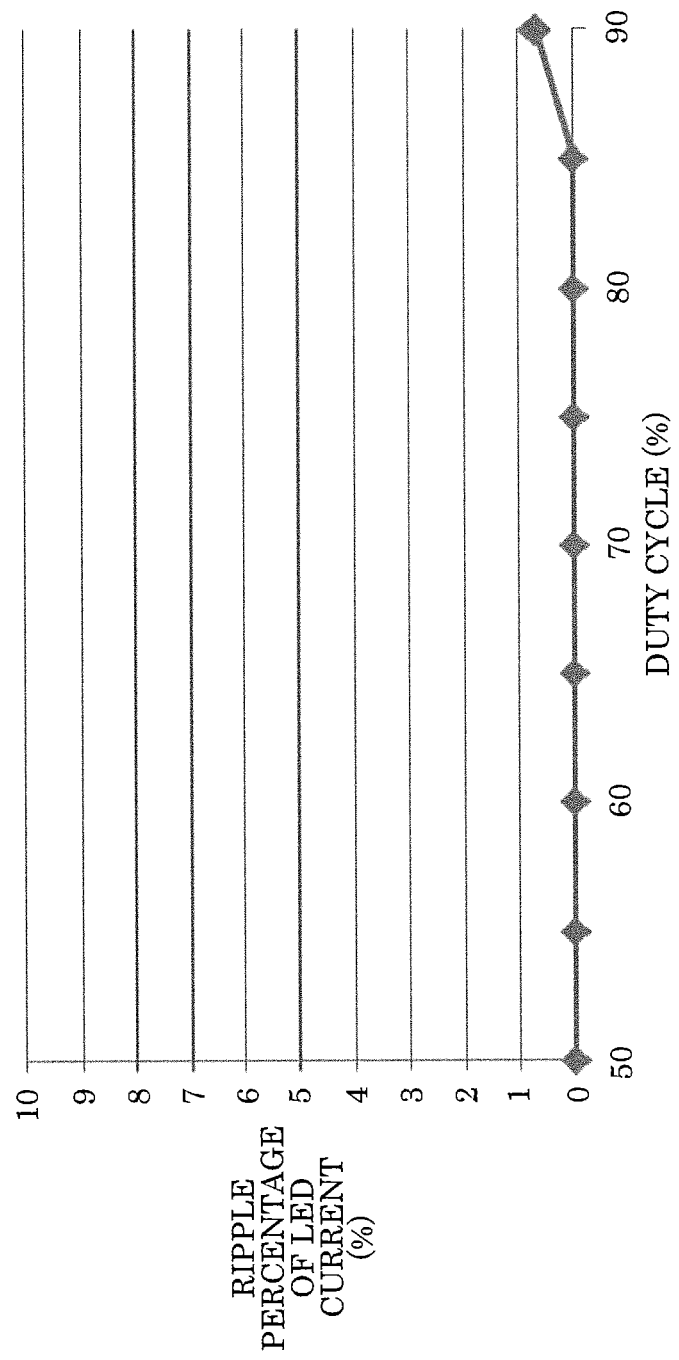
FIG. 32B is a diagram illustrating a relation between a duty cycle and a ripple percentage of LED current, as simulation results for the circuit from which the diode in FIG. 31A is excluded.
Figure 33A:
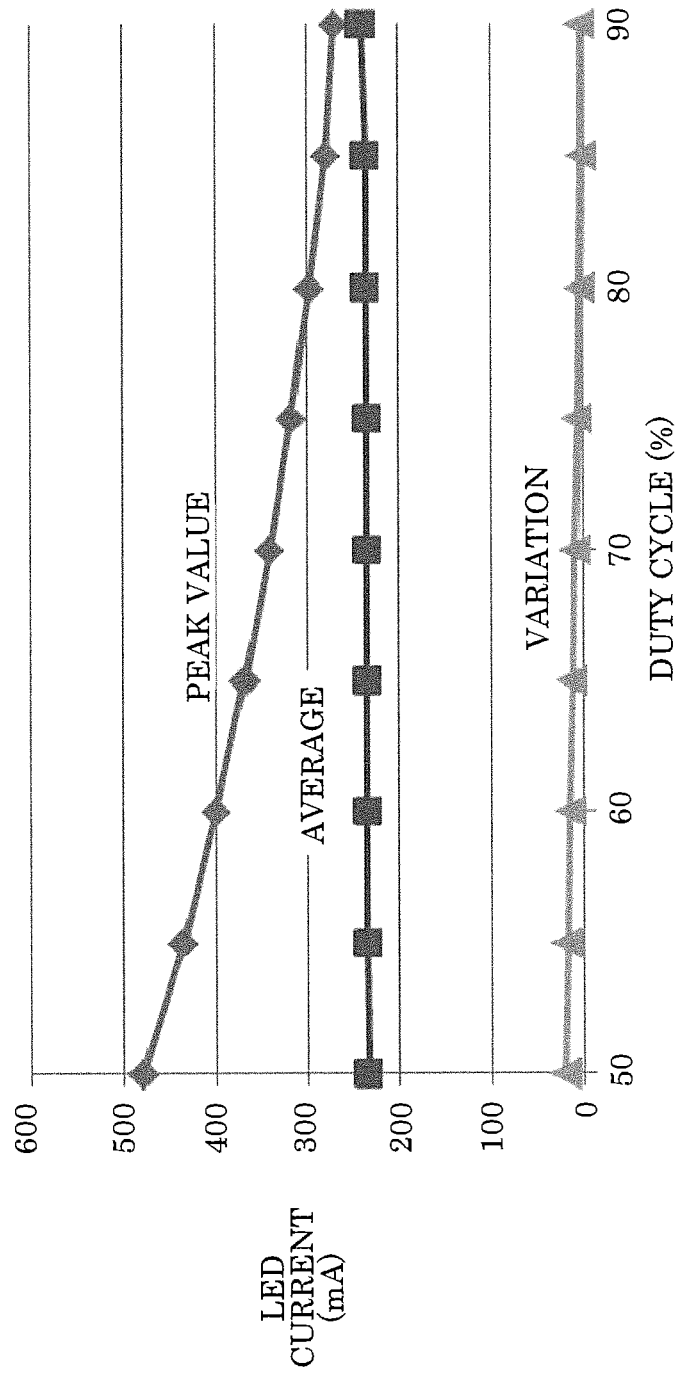
FIG. 33A is a diagram illustrating a relation between a duty cycle and LED current, as simulation results for the circuit in FIG. 31A.
Figure 33B:
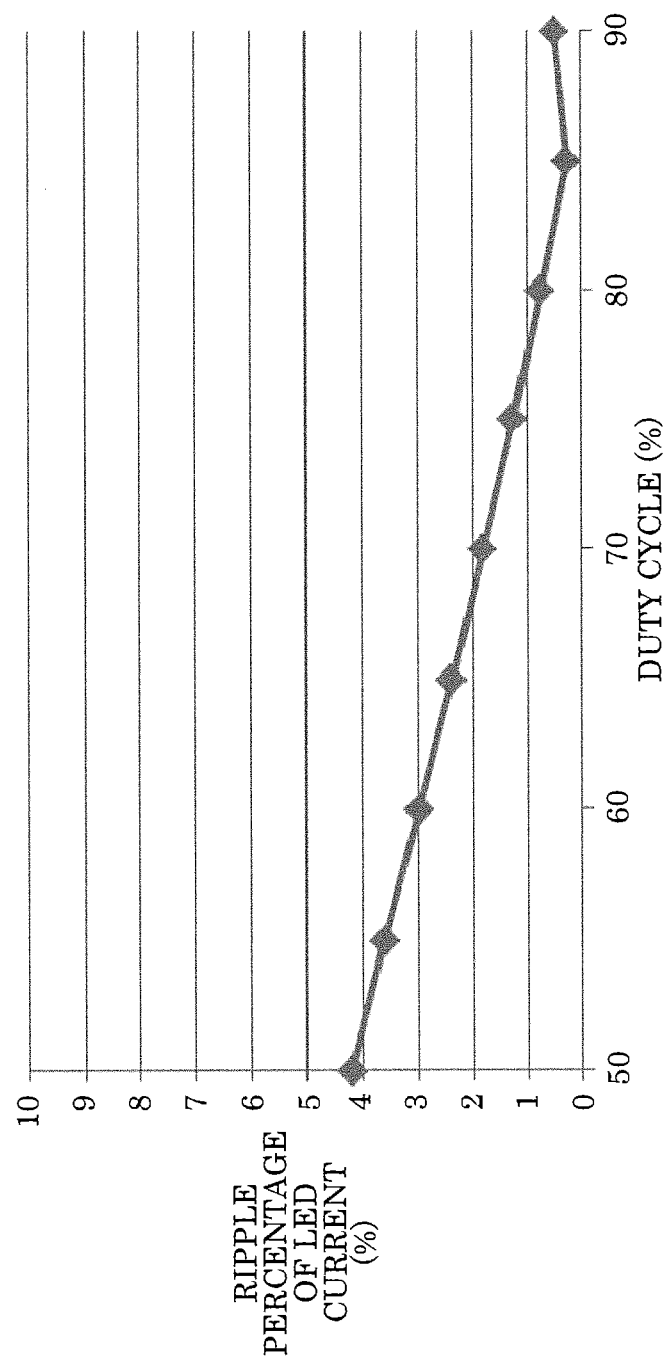
FIG. 33B is a diagram illustrating a relation between a duty cycle and a ripple percentage of LED current, as simulation results for the circuit in FIG. 31A.
Figure 34:
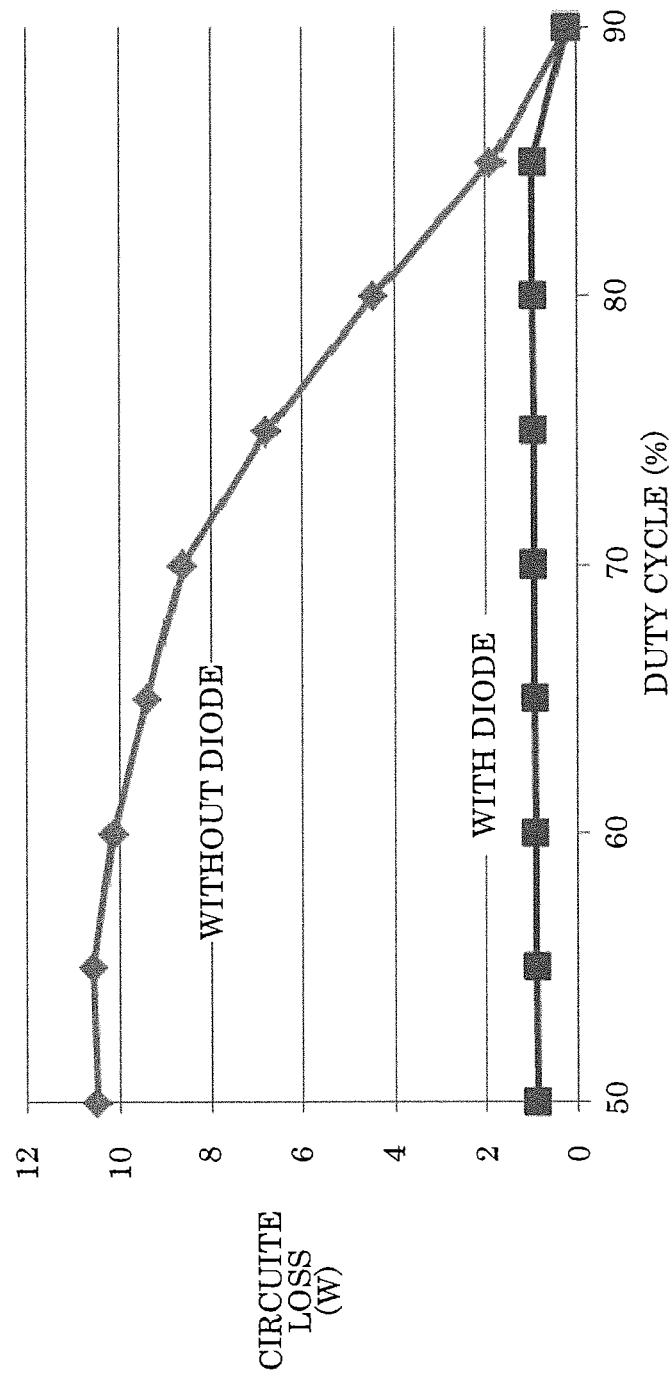
FIG. 34 is a diagram illustrating a relation between a duty cycle and circuit loss, as simulation results for the circuit in FIG. 31A.

FIGS. 32A, 32B, 33A, 33B, and 34 illustrate simulation results. FIGS. 32A and 32B firstly illustrate simulation results in the case where diode D serving as a feedback circuit is excluded, in order to examine advantageous effects of the feedback achieved by diode D illustrated in FIGS. 31A and 31B. Setting is made such that within a range where the duty cycle of a modulating signal from signal generator SG is 50% to 90%, current limiting circuit 1 functions at a duty cycle of 90% or less, and thus a variation (overshoot) of the LED current is eliminated at all the duty cycles of the modulating signal (see FIG. 32A), yet an average of the LED current is decreased as the duty cycle is lower. Furthermore, as illustrated in FIG. 34, the loss caused by current limiting circuit 1 is remarkably significant as the duty cycle is lower (see the graph without diode). FIGS. 33A and 33B illustrate results when a feedback circuit achieved by diode D is further included. When the duty cycle is 50% to 90%, a variation (overshoot) of the LED current is suppressed to a small value, and the average is maintained at a value when the current is not interrupted. Furthermore, as illustrated in and can be seen from FIG. 34 (with diode), the loss caused by current limiting circuit 1 is greatly decreased compared to the case where the feedback circuit achieved by diode D is not included.

Embodiment 3

Embodiment 3 also describes a configuration of varying a reference value (also, current set value) in current limiting circuit 1, in an analog manner, as with Embodiment 2.

The illumination light communication apparatus according to Embodiment 3 has almost the same configuration as that in FIG. 1A, yet the configuration of current limiting circuit 1 is different. The following mainly describes differences.

Figure 35A:
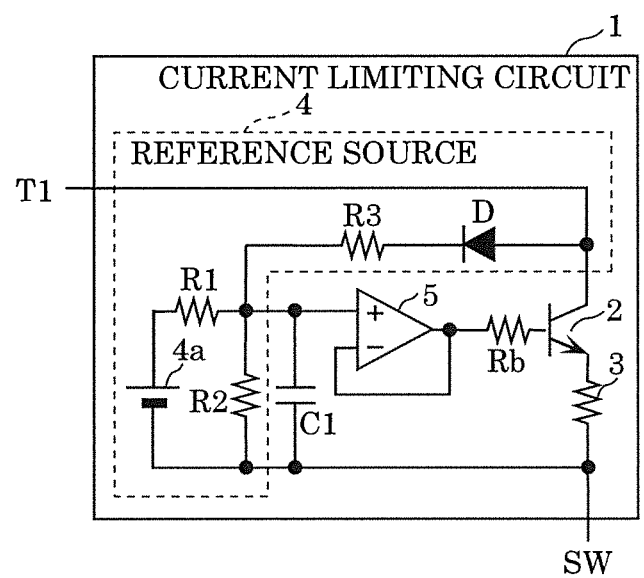
FIG. 35A is a diagram illustrating a configuration example of a current limiting circuit according to Embodiment 3.

FIG. 35A is a diagram illustrating a configuration example of current limiting circuit 1 according to Embodiment 3. Current limiting circuit 1 illustrated in FIG. 35A includes bipolar transistor 2, resistor 3 connected to the emitter, reference source 4, voltage dividing resistors R1 and R2, capacitor C1, amplifier 5 serving as a voltage follower circuit, base resistor Rb, diode D, and resistor R3.

In FIG. 35A, the voltage of constant voltage source 4a is divided by resistors R1 and R2, and constant voltage source 4a is connected to the positive input terminal of the voltage follower achieved using amplifier 5 via capacitor C1. The output terminal of amplifier 5 is connected to the negative input terminal of amplifier 5 and also to the base terminal of transistor 2 via base resistor Rb, and supplies a driver voltage to a point via the base terminal and resistor 3. Diode D is connected from the collector terminal of transistor 2 to the voltage dividing point of resistors R1 and R2. According to this configuration, when an optimal current set value for current limiting circuit 1 is obtained according to the duty cycle of a modulating signal from the signal generator, the reference source is not directly controlled, but a signal is fed back to the voltage dividing point of the reference source, using a voltage applied to current limiting circuit 1 and generated when the current set value is inappropriate. The difference between FIG. 35A and FIGS. 31A and 31B that illustrate Embodiment 2 is that the voltage follower achieved using amplifier 5 is further included.

Note that resistors R1, R2, and R3 and diode D in FIG. 35A correspond to control circuit 6 in FIG. 1A which changes the reference value.

Figure 36:
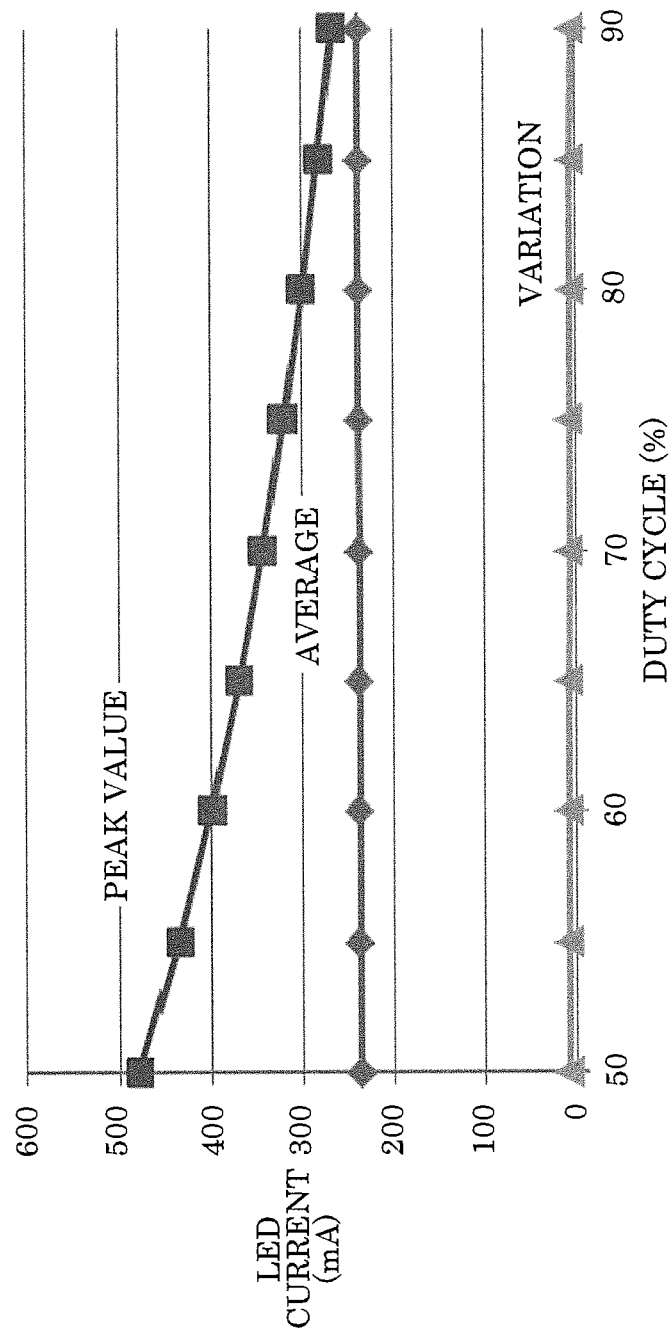
FIG. 36 is a diagram illustrating a relation between a duty cycle and LED current, as simulation results for the circuit according to Embodiment 3 in FIG. 35A.
Figure 37:
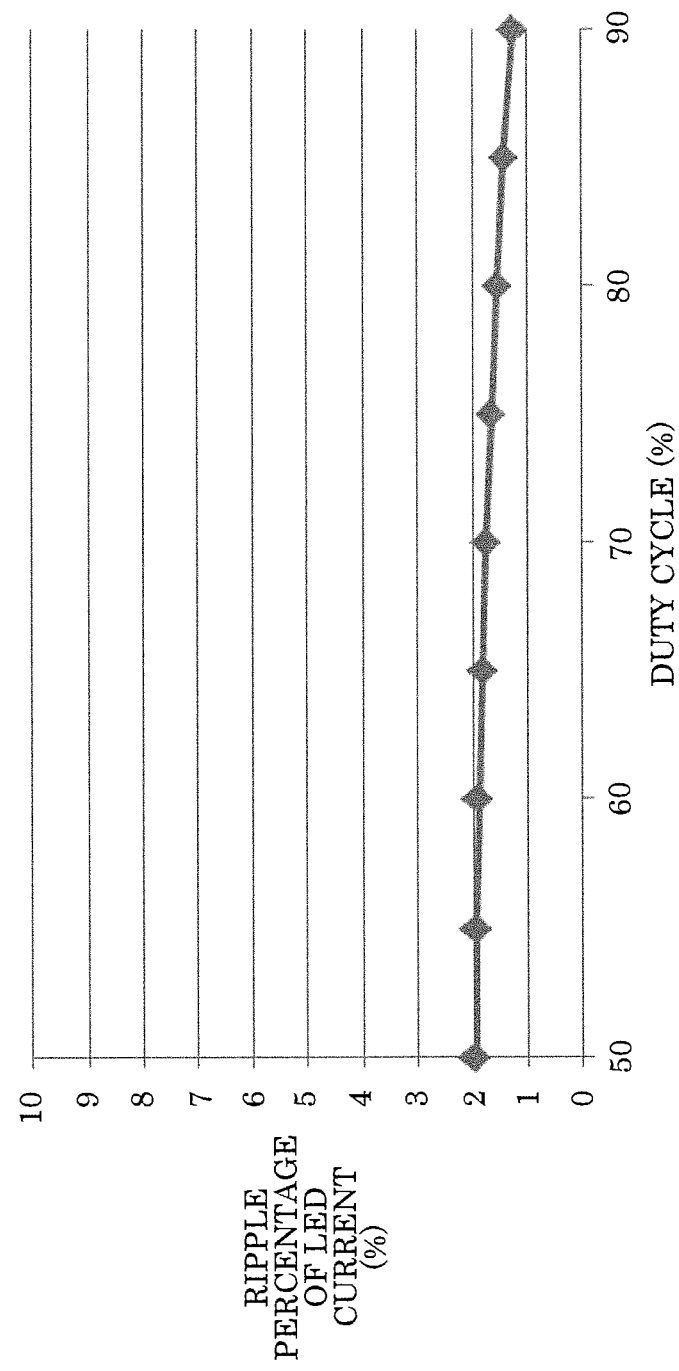
FIG. 37 is a diagram illustrating a relation between a duty cycle and a ripple percentage of LED current, as simulation results for the circuit according to Embodiment 3 in FIG. 35A.
Figure 38:
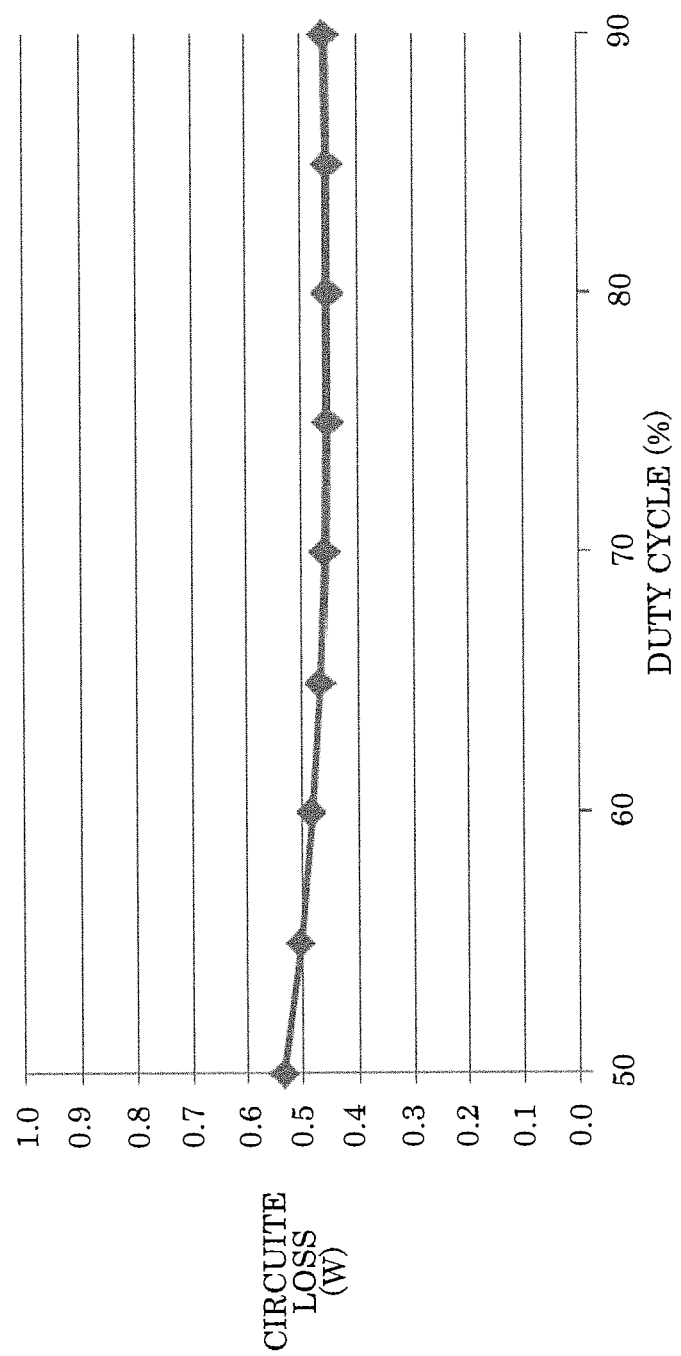
FIG. 38 is a diagram illustrating a relation between a duty cycle and circuit loss, as simulation results for the circuit according to Embodiment 3 in FIG. 35A.

FIGS. 36 to 38 are diagrams illustrating simulation results of verifying operation of current limiting circuit 1 in FIG. 35A. As the main setting conditions of the simulations, the capacitance value of smoothing capacitor 65 is set to 20 μF, the frequency of a modulating signal from signal generating circuit SG is set to 2.4 kHz, the operating frequency of the DC-to-DC converter is set to 65 kHz, and the average of load current (LED current) which is not interrupted is set to 240 mA. FIG. 36 illustrates peak value, average, and variation of LED current obtained when the duty cycle of on/off switch SW is changed in a range of 50% to 90%. A variation (overshoot) of the LED current is mostly eliminated, and the average is maintained at a value when the current is not interrupted. FIG. 37 illustrates variation (overshoot) of the LED current which is expressed in a ripple percentage, and shows that overshoot is eliminated. FIG. 38 illustrates a relation between the duty cycle and loss caused by current limiting circuit 1. The circuit loss is maintained at a low value relative to a change in duty cycle.

Embodiment 4

Embodiment 4 also describes a configuration of varying a reference value (also, current set value) in current limiting circuit 1, in an analog manner, as with Embodiment 2.

The illumination light communication apparatus according to Embodiment 4 has almost the same configuration as that in FIG. 1A, yet the configuration of current limiting circuit 1 is different. The following mainly describes differences.

Figure 35B:
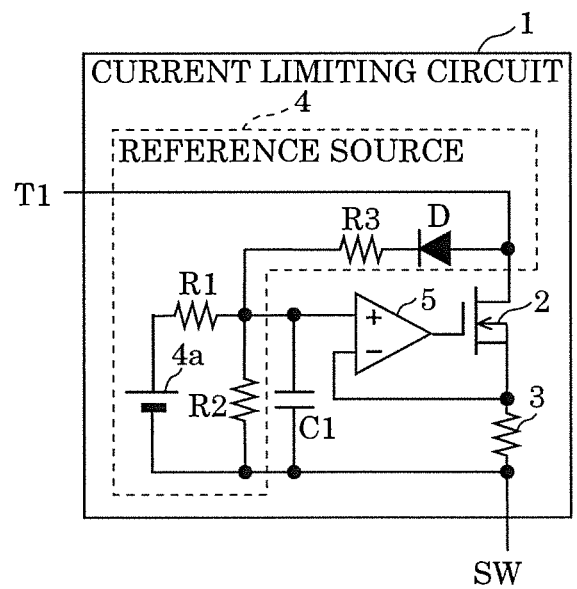
FIG. 35B is a diagram illustrating a first configuration example of the current limiting circuit according to Embodiment 4.

FIG. 35B is a diagram illustrating a first configuration example of current limiting circuit 1 according to Embodiment 4. Current limiting circuit 1 illustrated in FIG. 35B includes transistor 2 which is a MOSFET, resistor 3 connected to the source of transistor 2, constant voltage source 4a, voltage dividing resistors R1 and R2, capacitor C1, amplifier 5, diode D, and resistor R3.

In FIG. 35B, the voltage of constant voltage source 4a is divided by resistors R1 and R2, and constant voltage source 4a is connected to the positive input terminal of amplifier 5 via capacitor C1. The negative input terminal of amplifier 5 is connected to a point of connection between transistor 2 and resistor 3, the output terminal of amplifier 5 is connected to the gate terminal of transistor 2, and a driver voltage is supplied between the gate terminal and a point via resistor 3. Diode D is connected from the drain terminal of transistor 2 to the voltage dividing point of resistors R1 and R2, via adjustment resistor R3. According to the configuration, when an optimal current set value for current limiting circuit 1 is obtained according to the duty cycle of a modulating signal from signal generator SG, the reference source is not directly controlled, but a signal is fed back to the voltage dividing point of the reference voltage, using a voltage applied to current limiting circuit 1 and generated when the current set value is inappropriate. A difference from FIG. 31A in Embodiment 2 is that amplifier 5 is further included.

Figure 39:
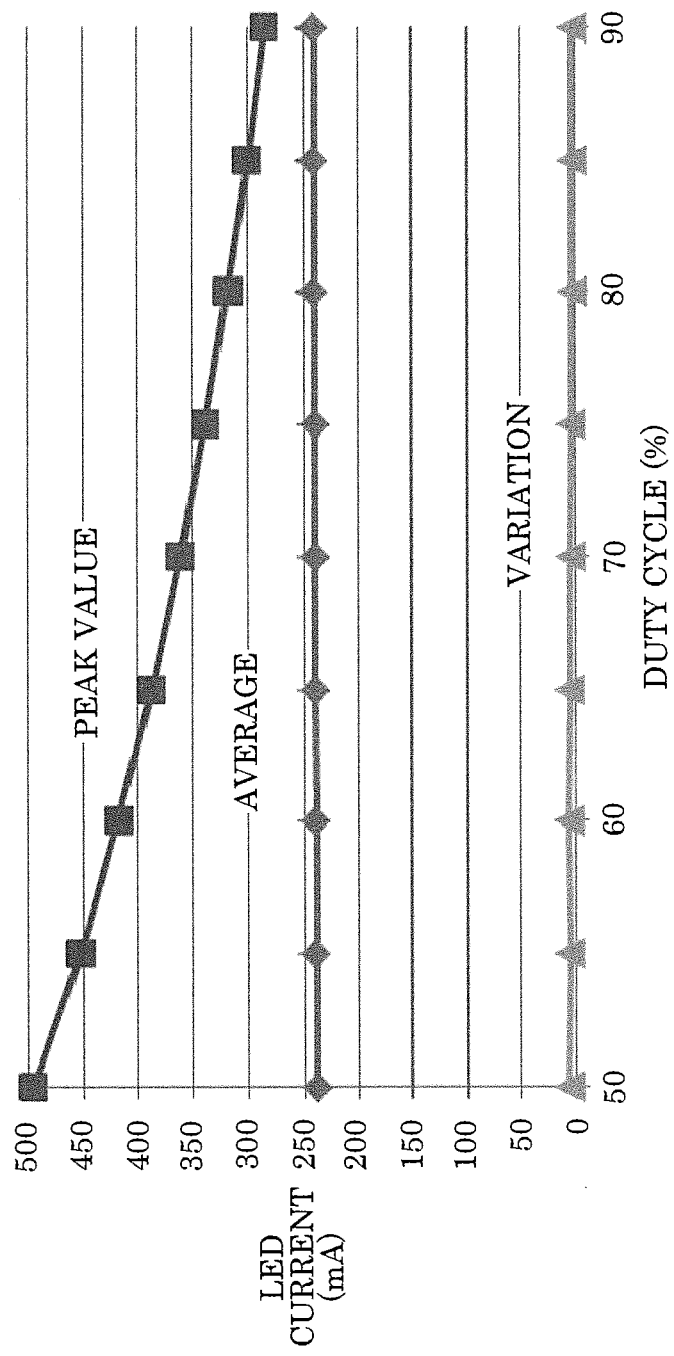
FIG. 39 is a diagram illustrating a relation between a duty cycle and LED current, as simulation results for the circuit according to Embodiment 4 in FIG. 35B.
Figure 40:
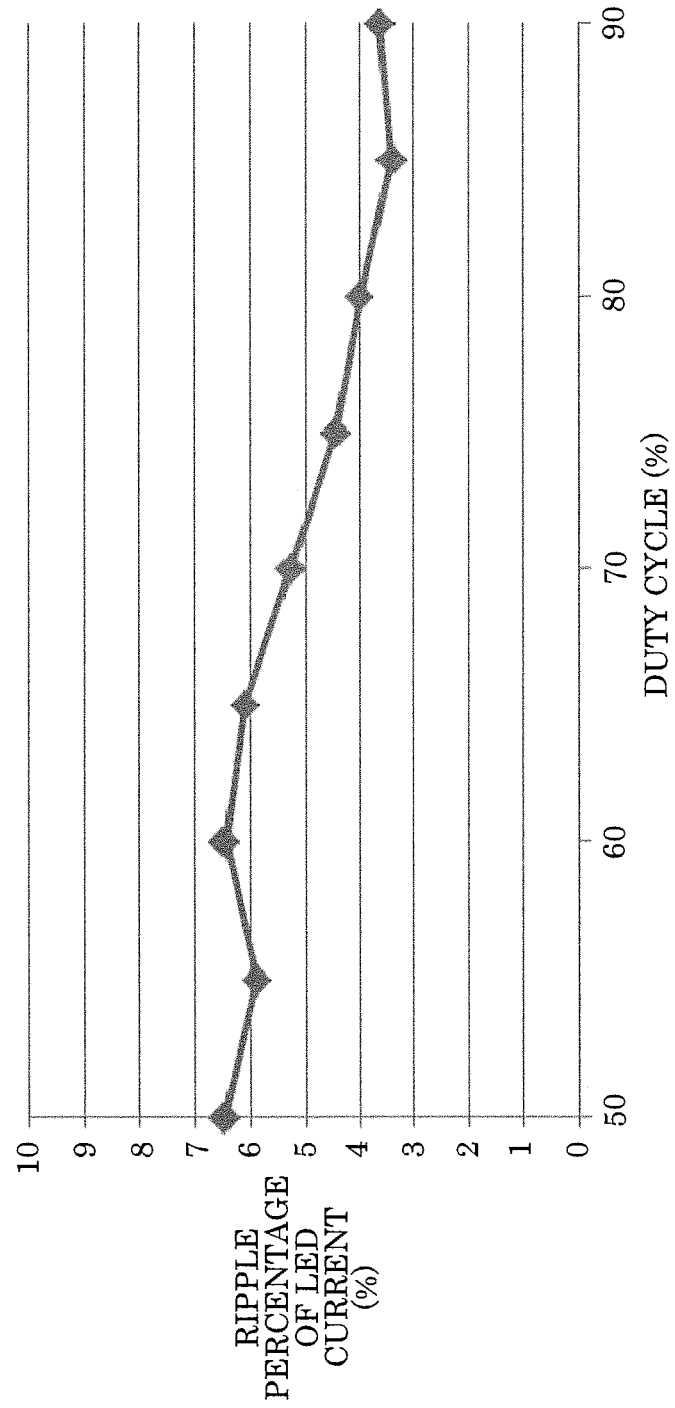
FIG. 40 is a diagram illustrating a relation between a duty cycle and a ripple percentage of LED current, as simulation results for the circuit according to Embodiment 4 in FIG. 35B.
Figure 41:
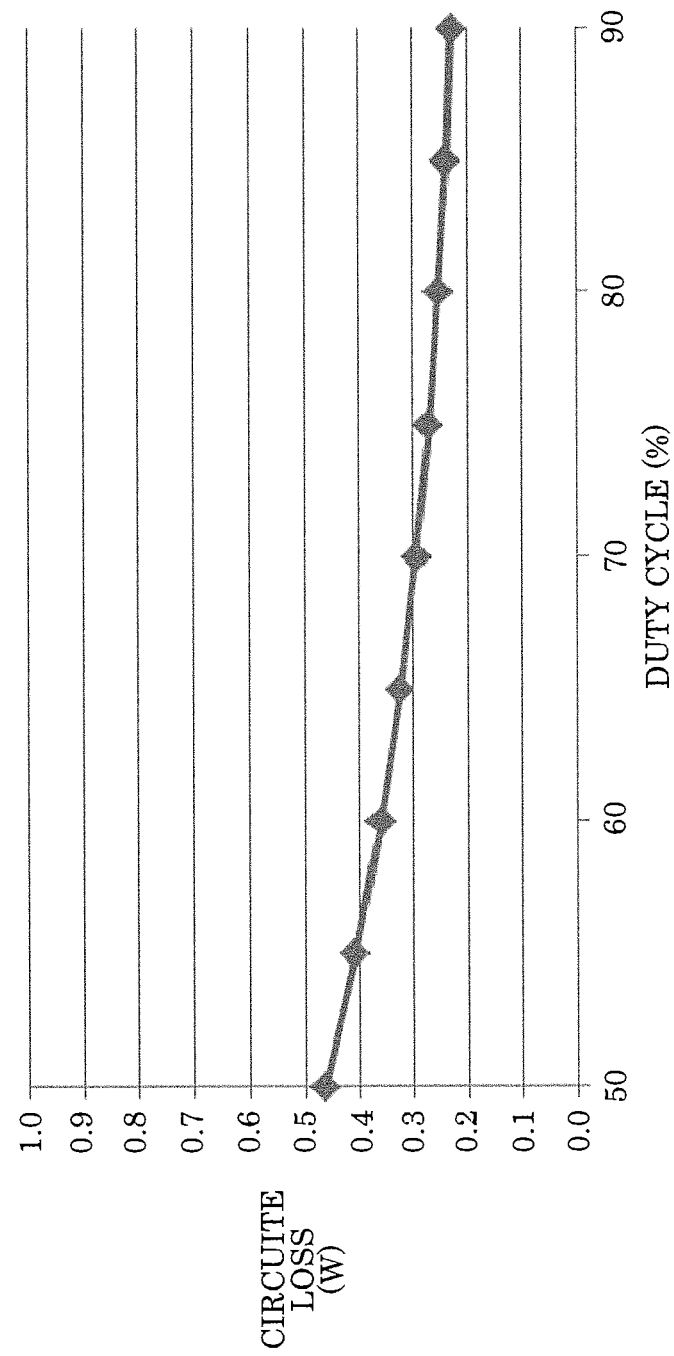
FIG. 41 is a diagram illustrating a relation between a duty cycle and circuit loss, as simulation results for the circuit according to Embodiment 4 in FIG. 35B.

FIGS. 39 to 41 are diagrams illustrating simulation results of verifying operation in FIG. 35B. As the main setting conditions of the simulations, the capacitance value of the smoothing capacitor is set to 20 μF, the frequency of a modulating signal from the signal generating circuit is set to 2.4 kHz, the operating frequency of the DC-to-DC converter is set to 65 kHz, the average of a load current (LED current) which is not interrupted is set to 240 mA. FIGS. 39 to 41 illustrate the simulation results. FIG. 39 illustrates peak value, average, and variation of LED current which are obtained when the duty cycle of on/off switch SW is changed in a range of 50% to 90%. A variation (overshoot) of the LED current is mostly eliminated, and the average is maintained at a value when the current is not interrupted. FIG. 40 illustrates a variation (overshoot) of the LED current which is expressed in a ripple percentage, and shows that overshoot is mostly eliminated. FIG. 41 illustrates a relation between a duty cycle and loss caused by current limiting circuit 1. The circuit loss is maintained at a low value relative to a change in duty cycle.

FIGS. 39 to 41 show that LED current has a slightly greater ripple, and some unstable operation is recognized, compared with the simulation results (FIGS. 36 to 38) in Embodiment 3.

Figure 35C:
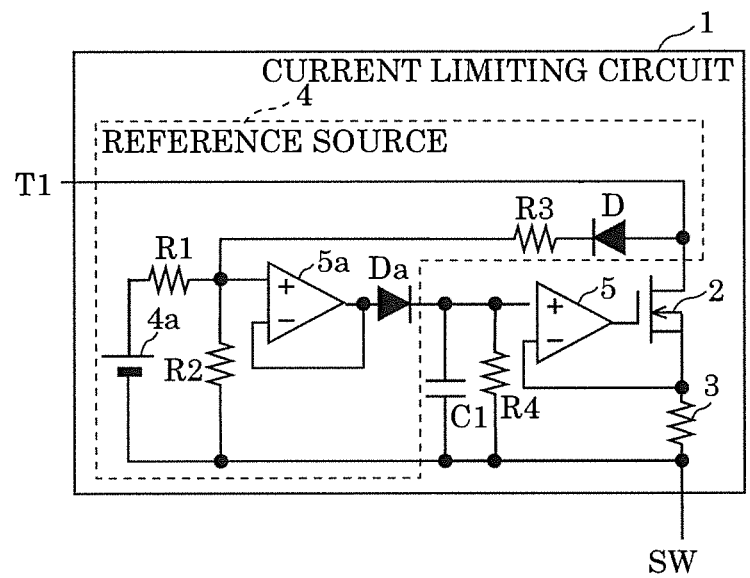
FIG. 35C is a diagram illustrating a second configuration example of the current limiting circuit according to Embodiment 4.
Figure 35D:
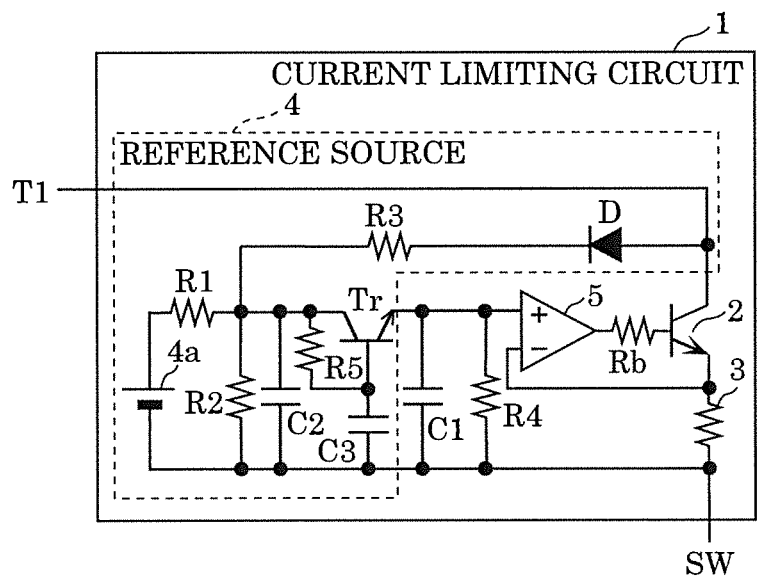
FIG. 35D is a diagram illustrating a third configuration example of the current limiting circuit according to Embodiment 4.

FIGS. 35C and 35D illustrate examples for achieving further stable operation according to Embodiments 3 and 4. FIG. 35C is a diagram illustrating a second configuration example of the current limiting circuit according to Embodiment 4. FIG. 35C illustrates current limiting circuit 1 in which amplifier 5a which achieves a voltage follower and diode Da are further included between a voltage dividing point of resistors R1 and R2 and the positive input terminal of amplifier 5, and an impedance conversion circuit is further included in a filter circuit achieved by capacitor C1 and resistor R4, in order to avoid the influence of resistors R1, R2, and R3, for instance.

FIG. 35D is a diagram illustrating a third configuration example of a current limiting circuit according to Embodiment 4. In the current limiting circuit in FIG. 35D, a ripple filter formed by transistor Tr, resistor R5, and capacitor C3 is further included between a voltage dividing point of resistors R1 and R2 and the positive input terminal of amplifier 5, so as to suppress the pulsating voltage at the positive input terminal of amplifier 5.

Embodiment 5

Embodiment 5 also describes a configuration of varying a reference value (also, current set value) in current limiting circuit 1, in an analog manner, as with Embodiment 2.

The illumination light communication apparatus according to Embodiment 5 has almost the same configuration as that in FIG. 1A, yet the configuration of current limiting circuit 1 is different. The following mainly describes differences.

Figure 35E:
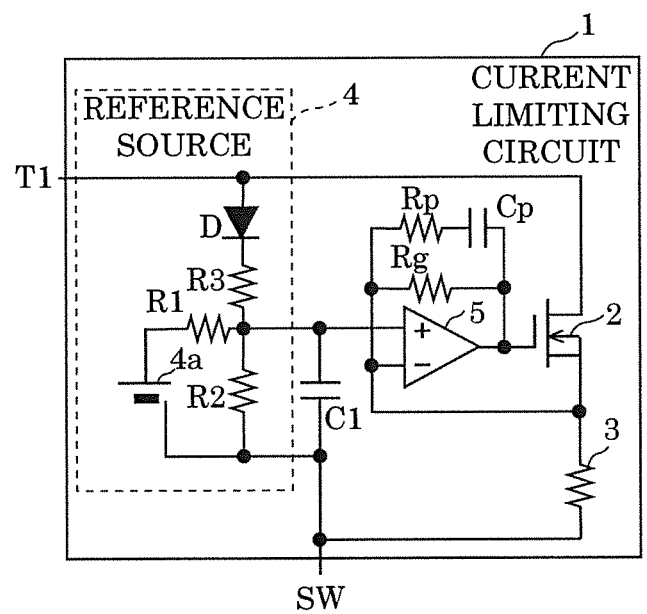
FIG. 35E is a diagram illustrating a configuration example of the current limiting circuit according to Embodiment 5.

FIG. 35E is a diagram illustrating a configuration example of the current limiting circuit according to Embodiment 5. Current limiting circuit 1 illustrated in FIG. 35E includes transistor 2 which is a MOSFET, resistor 3 connected to the source of transistor 2, reference source 4, voltage dividing resistors R1 and R2, capacitor C1, amplifier 5, resistor Rg, capacitor Cp, resistor Rp, diode D, and resistor R3, resistor Rg, capacitor Cp, and resistor Rp being provided between the output terminal and the positive input terminal of amplifier 5.

In FIG. 35E, the voltage of reference source 4 is divided by resistors R1 and R2, and reference source 4a is connected to the positive input terminal of amplifier 5 via capacitor C1. The negative input terminal of amplifier 5 is connected to a point of connection between transistor 2 and resistor 3, the output terminal of amplifier 5 is connected to the gate terminal of transistor 2, and a driver voltage is supplied between the gate terminal and a point via resistor 3. Diode D is connected from the drain terminal of the MOSFET to the voltage dividing point of resistors R1 and R2, via adjustment resistor R3. Furthermore, gain control resistor Rg is connected between the output terminal and the negative input terminal of the operational amplifier, and a phase compensation circuit constituted by capacitor Cp and resistor Rp is further included parallel to resistor Rg.

Figure 42:
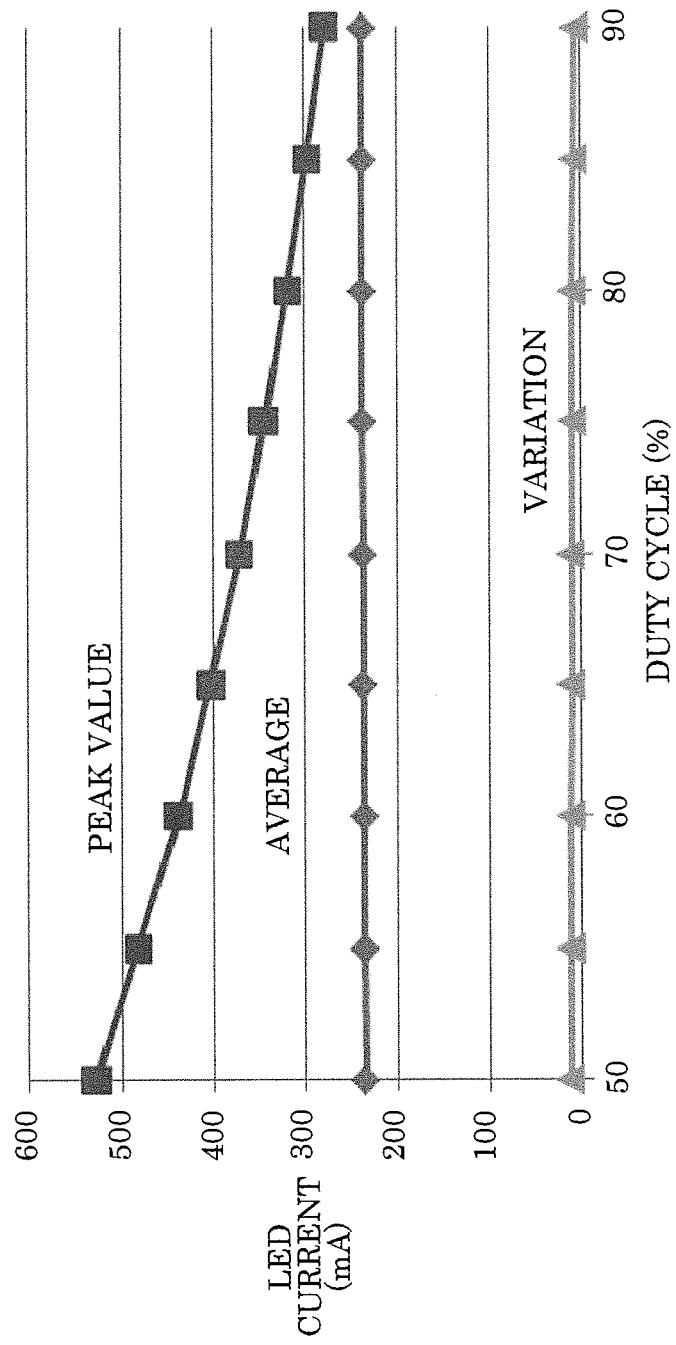
FIG. 42 is a diagram illustrating a relation between a duty cycle and LED current, as simulation results for the circuit according to Embodiment 5 in FIG. 35E.
Figure 43:
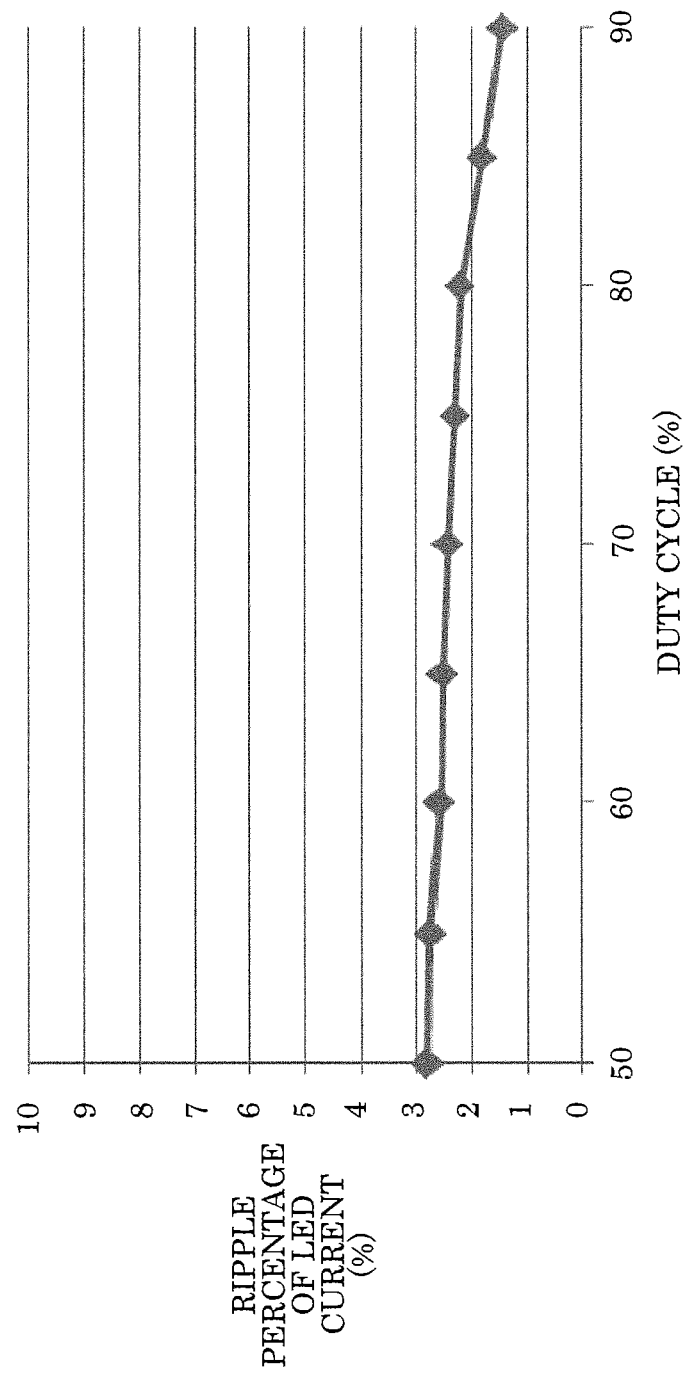
FIG. 43 is a diagram illustrating a relation between a duty cycle and a ripple percentage of LED current, as simulation results for the circuit according to Embodiment 5 in FIG. 35E.
Figure 44:
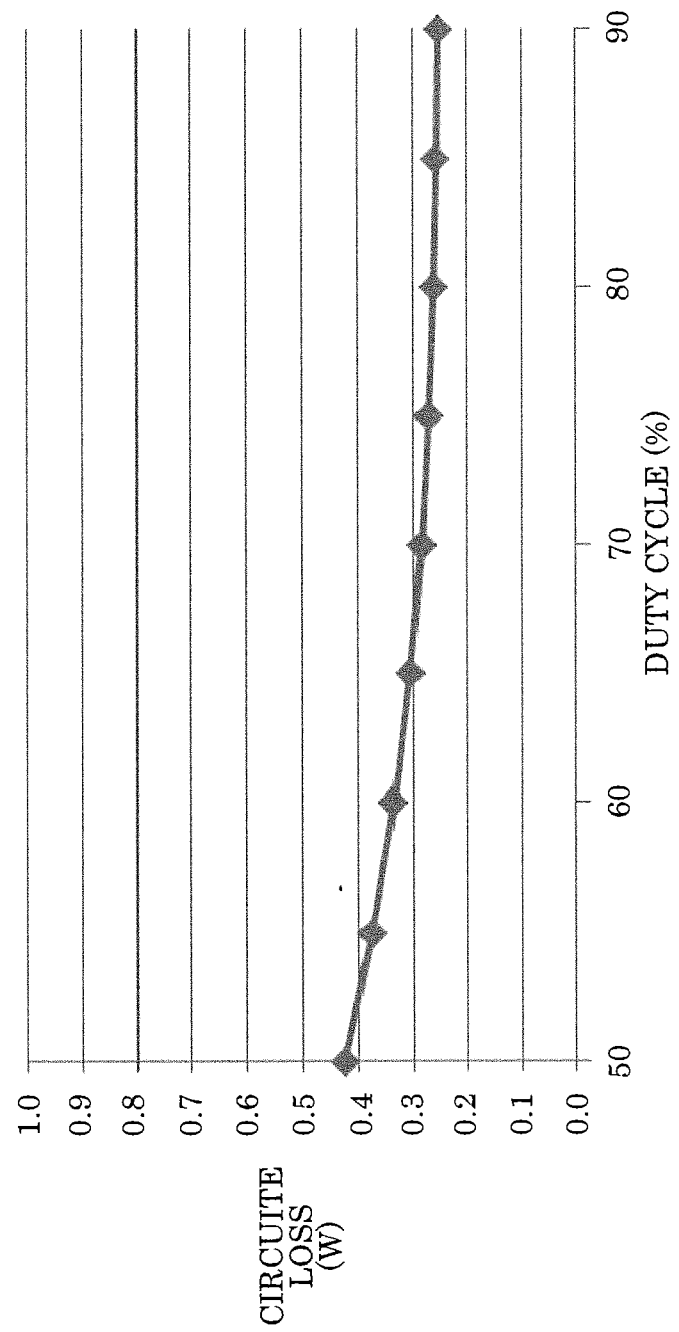
FIG. 44 is a diagram illustrating a relation between a duty cycle and circuit loss, as simulation results for the circuit according to Embodiment 5 in FIG. 35E.

FIGS. 42 to 44 are diagrams illustrating simulation results of verifying operation of current limiting circuit 1 in FIG. 35E. As the main setting conditions of the simulations, the capacitance value of the smoothing capacitor is set to 20 μF, the frequency of a modulating signal from the signal generating circuit is set to 2.4 kHz, the operating frequency of the DC-to-DC converter is set to 65 kHz, and the average of load current (LED current) which is not interrupted is set to 240 mA. FIG. 42 illustrates peak value, average, and variation of the LED current obtained when the duty cycle of on/off switch SW is changed in a range of 50% to 90%. The variation (overshoot) of the LED current is mostly eliminated, and the average is maintained at a value when the current is not interrupted. FIG. 43 illustrates a variation (overshoot) of the LED current which is expressed in ripple percentage, and shows that overshoot is mostly eliminated. FIG. 44 illustrates a relation between a duty cycle and loss caused by current limiting circuit 1. The circuit loss is maintained at a low value relative to a change in duty cycle.

As illustrated in FIGS. 42 to 44, the ripple percentage of the LED current is improved and further stable operation is achieved, compared to the simulation results (FIGS. 39 to 41) in Embodiment 4.

Embodiment 6

Current limiting circuit 1 according to Embodiments 2 to 5 has a configuration of varying a reference value (also, current set value) in an analog manner, whereas Embodiment 6 describes current limiting circuit 1 which varies the reference value (also, current set value) in such a manner that a digital circuit does.

The illumination light communication apparatus according to Embodiment 5 has substantially the same configuration as that in FIG. 1A, yet the configuration of current limiting circuit 1 is different. The following mainly describes differences.

Figure 35F:
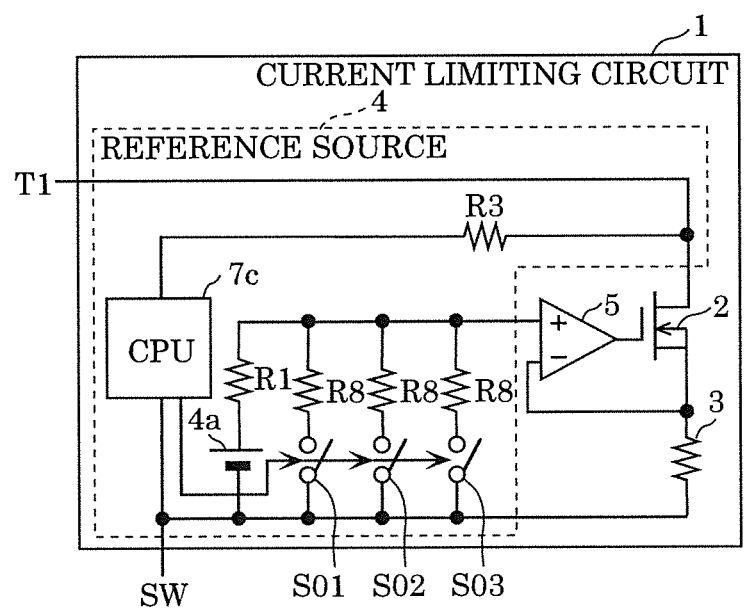
FIG. 35F is a diagram illustrating a configuration example of the current limiting circuit according to Embodiment 6.

FIG. 35F is a diagram illustrating a configuration example of the current limiting circuit according to Embodiment 6. Current limiting circuit 1 illustrated in FIG. 35F includes transistor 2 which is a MOSFET, resistor 3 connected to the source of transistor 2, reference source 4, microcomputer (specifically, CPU 7c), voltage dividing resistors R1, R6, R7, and R8, switches S01 to S03 for switching between voltage division ratios, amplifier 5, and resistor R3.

In FIG. 35F, a voltage applied to current limiting circuit 1 (transistor 2 and resistor 3) is input to a microcomputer (CPU 7c) via resistor R3. Constant voltage source 4a is connected to the positive input terminal of amplifier 5 via resistor R1, and voltage dividing resistors R6 to R8 and ratio-switching switches S01 to S03 are connected between the negative terminal of the reference source and a point of connection between constant voltage source 4a and the positive input terminal. The microcomputer calculates a value of an appropriate reference voltage according to a voltage of current limiting circuit 1 or selects a value from an association table prepared in advance, and switches between ratio-switching switches S01 to S03. It can be said that the configurations are methods achieved by digitizing portions of Embodiments 3 to 5 above.

Note that resistors R1 and R3, diode D, resistors R6 to R8, switches S01 to S03, and CPU 7c in FIG. 35F correspond to control circuit 6 which changes the reference value in FIG. 1A.

Comparative Example

The following describes a comparative example which does not include current limiting circuit 1, in order to examine advantageous effects obtained by current limiting circuit 1 in the embodiments.

Figure 45:
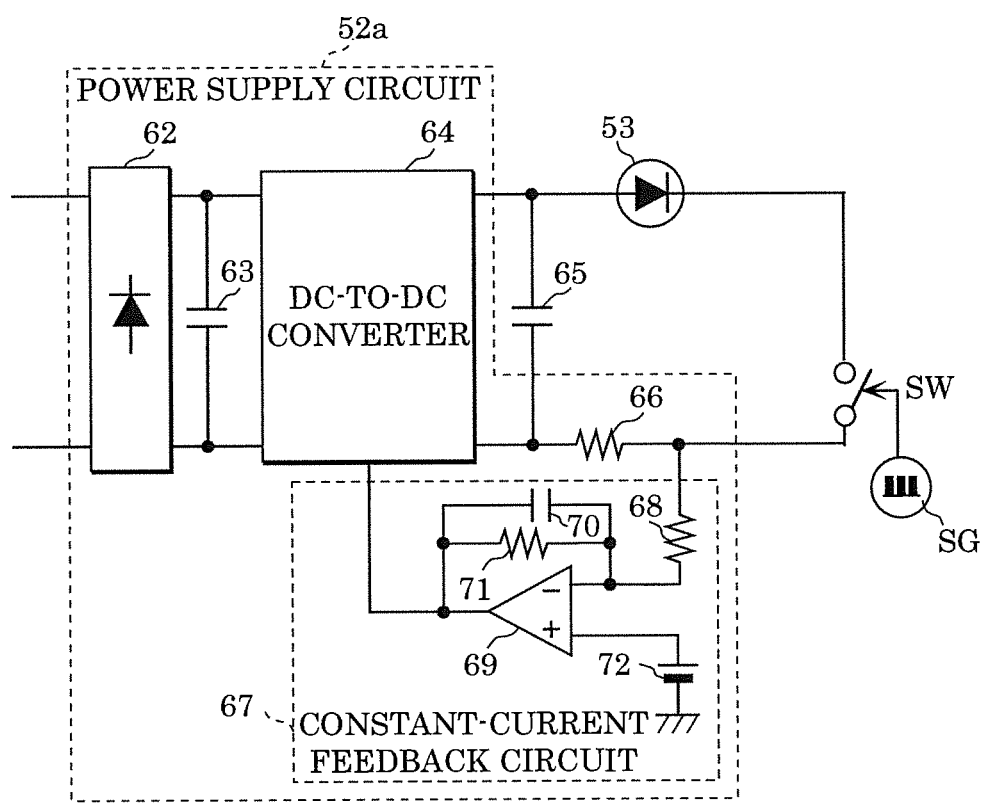
FIG. 45 is a diagram illustrating a comparative example corresponding to the configuration in FIG. 1A from which the current limiting circuit is excluded.

FIG. 45 is a diagram illustrating an illumination light communication apparatus as a comparative example which is the apparatus illustrated in FIG. 1A that does not include current limiting circuit 1. The illumination light communication apparatus illustrated in FIG. 45 is different from the apparatus illustrated in FIG. 1A in that current limiting circuit 1 is not included and load circuit 53 which is a light source and on/off switch SW are directly connected. The illumination light communication apparatus according to the comparative example does not include current limiting circuit 1, and thus does not have a function of limiting current which flows through the light source in order to prevent the current from exceeding the current set value.

The simulation results for the comparative example illustrated in FIG. 45 are described with reference to FIGS. 46 to 49B.

Figure 46:
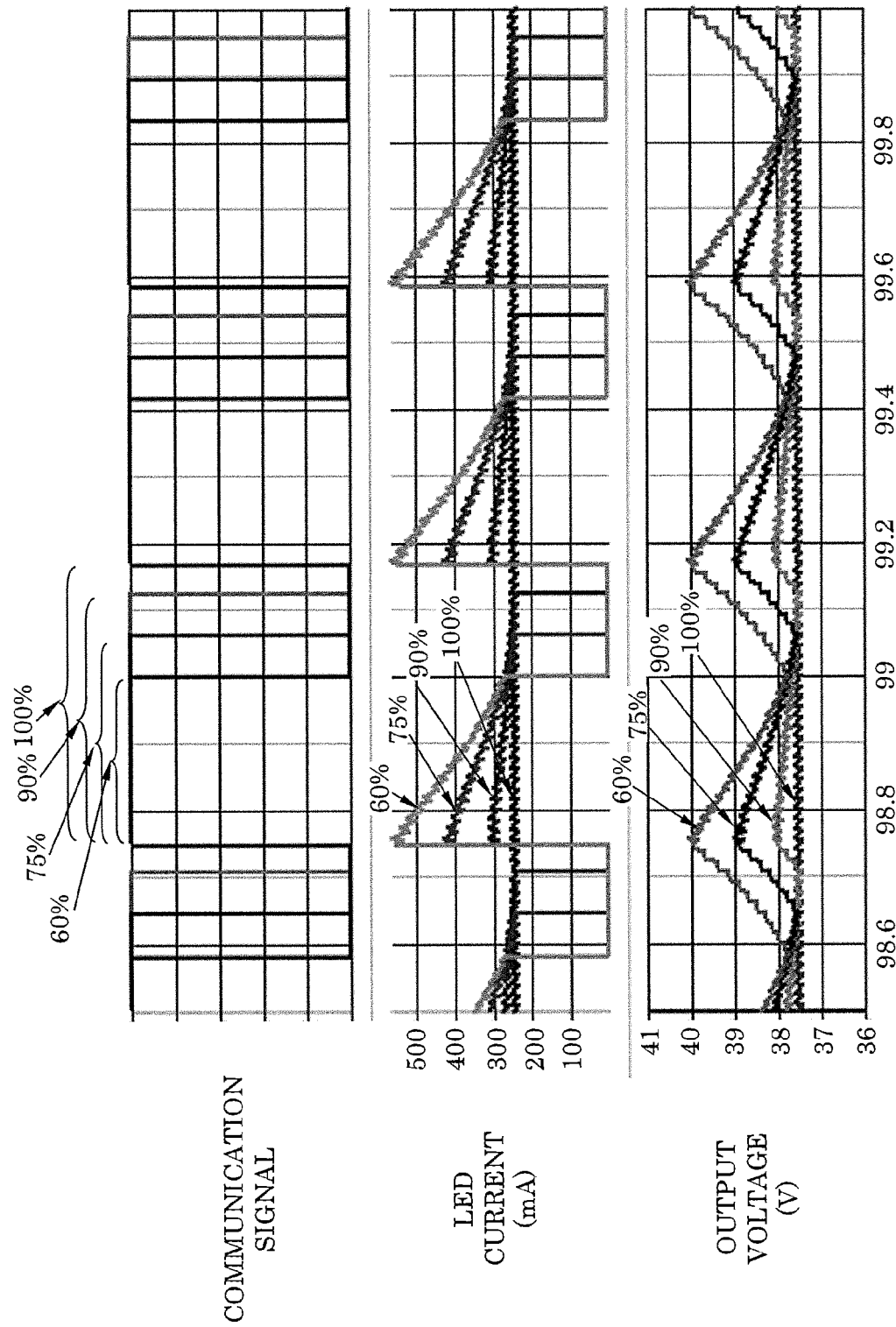
FIG. 46 is a diagram illustrating LED current and a waveform of output voltage when duty cycles are 60%, 75%, 90%, and 100%, as simulation results for a circuit for comparison in FIG. 45.

FIG. 46 is a diagram illustrating, as simulation results for the circuit for comparison in FIG. 45, LED current and waveforms of output voltage when the duty cycle is 60%, 75%, 90%, and 100%. In the simulations, the capacitance of smoothing capacitor 65 is set to 20 µF, and the frequency of a modulating signal which drives on/off switch SW is set to 2.4 kHz. As can be seen from FIG. 46, the lower the duty cycle is, the greater the overshoot of the LED current is. Also, it can be seen that the voltage waveforms vary, but not as greatly as the current does, and thus the dynamic resistance of the LED load is low.

Figure 47:
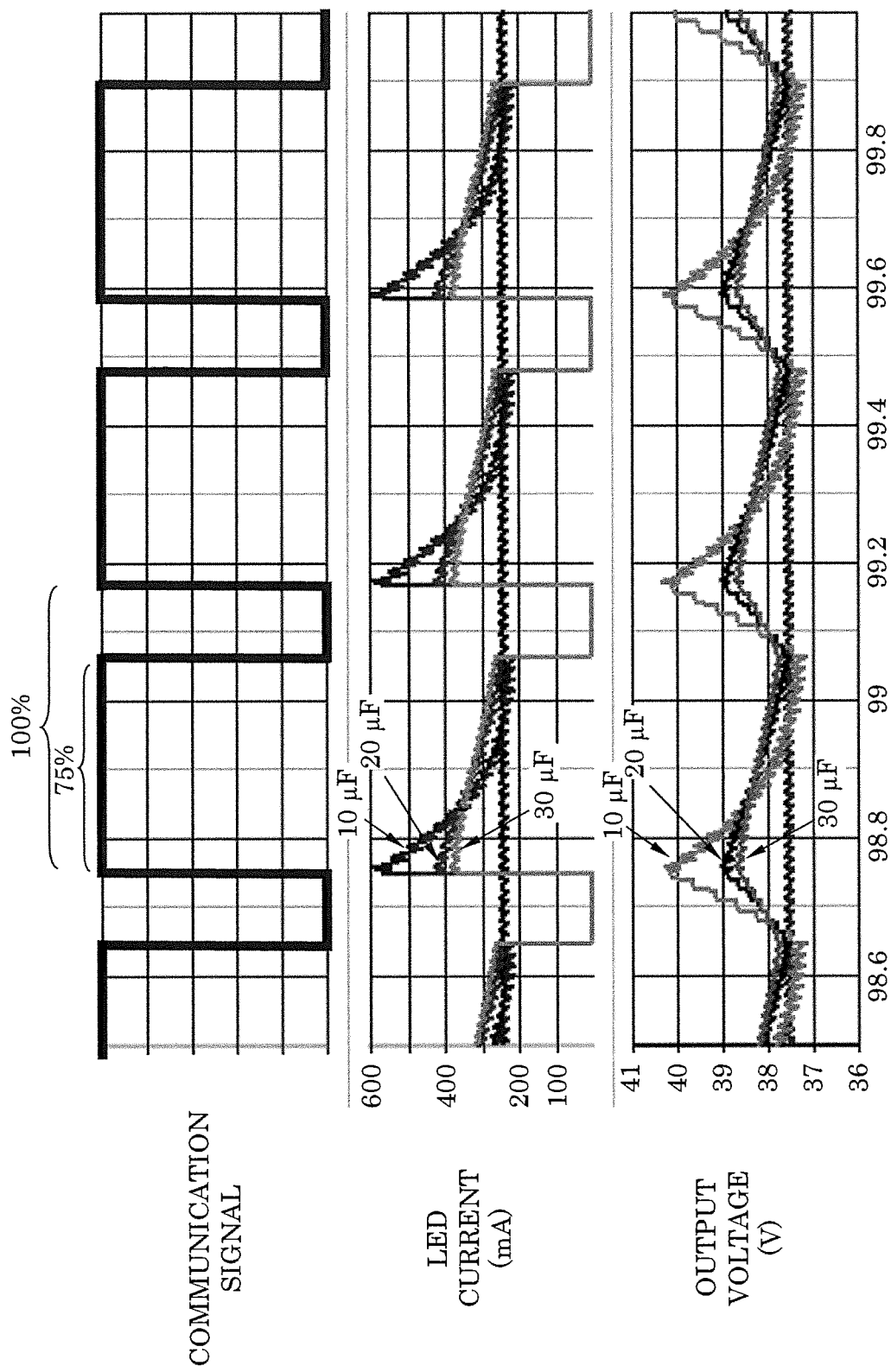
FIG. 47 is a diagram illustrating LED current and a waveform of output voltage when the smoothing capacity is 10 μF, 20 μF, and 30 μF at a 75% duty cycle, as simulation results for the circuit for comparison in FIG. 45.
Figure 48A:
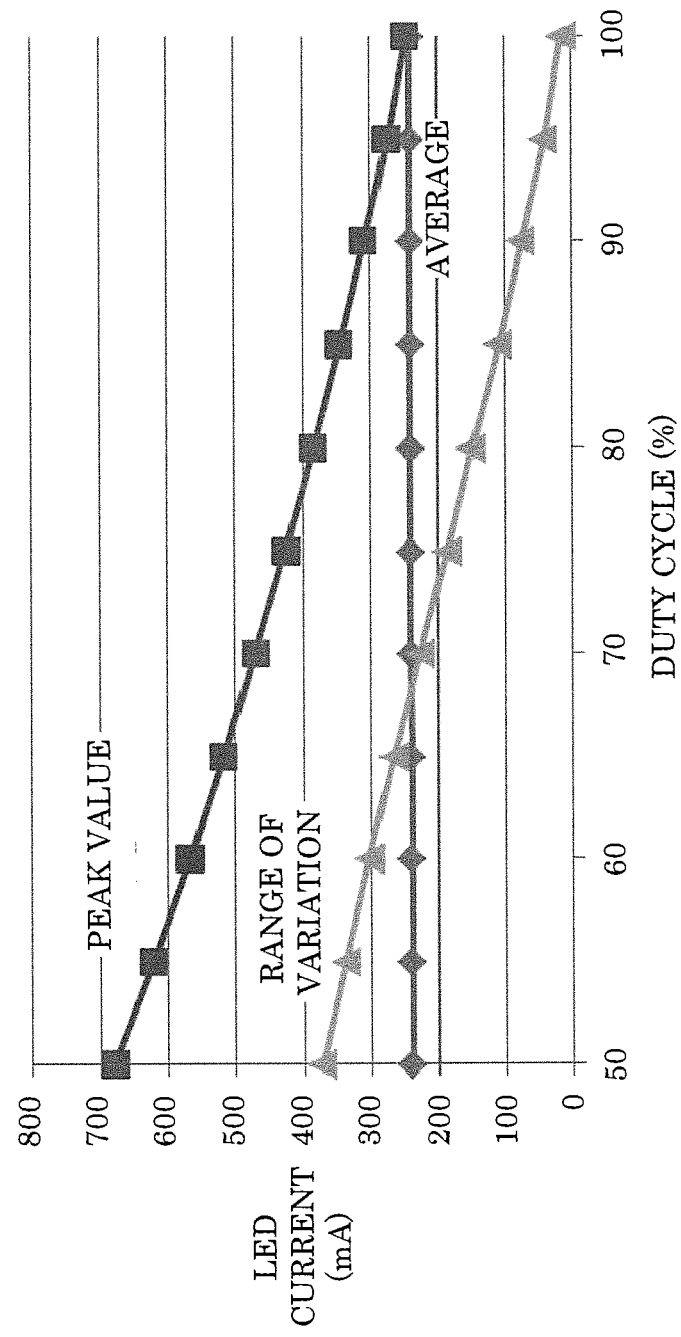
FIG. 48A is a diagram illustrating a relation between a duty cycle and LED current, as simulation results for the circuit for comparison in FIG. 45.
Figure 48B:
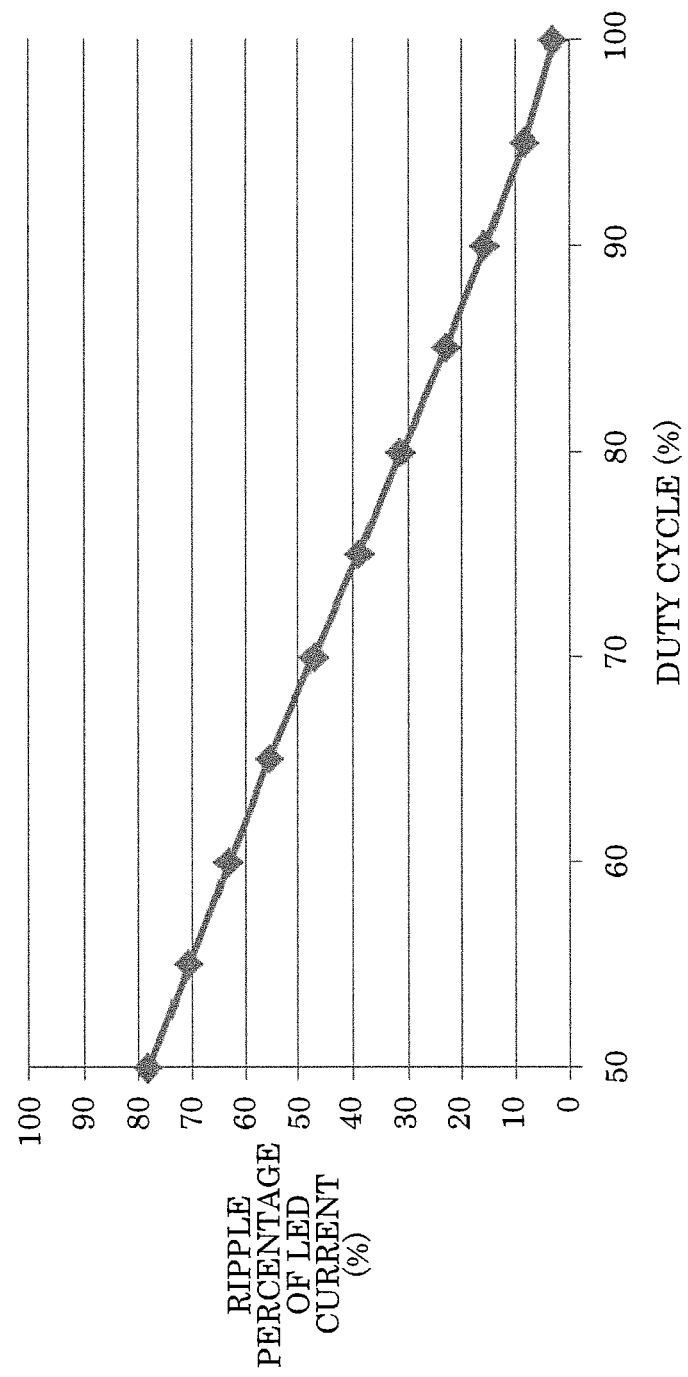
FIG. 48B is a diagram illustrating a relation between a duty cycle and a ripple percentage of LED current, as simulation results for the circuit for comparison in FIG. 45.
Figure 49A:
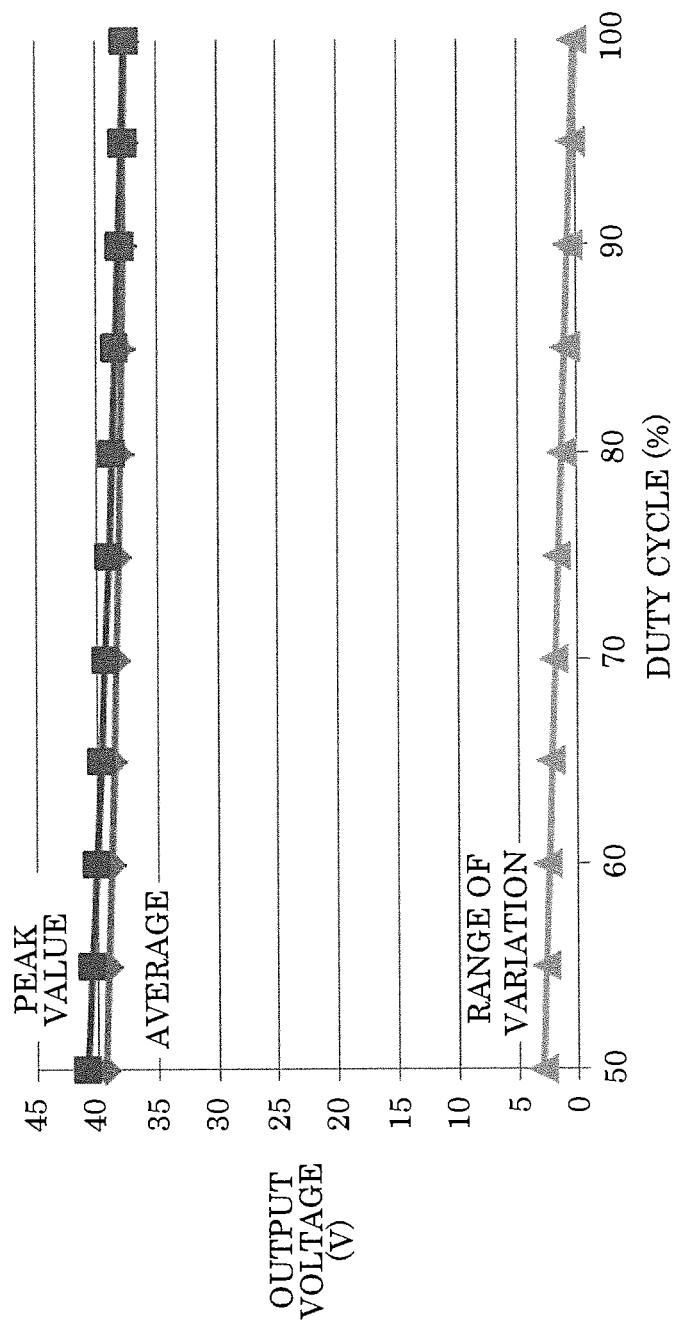
FIG. 49A is a diagram illustrating a relation between a duty cycle and output voltage, as simulation results for the circuit for comparison in FIG. 45.
Figure 49B:
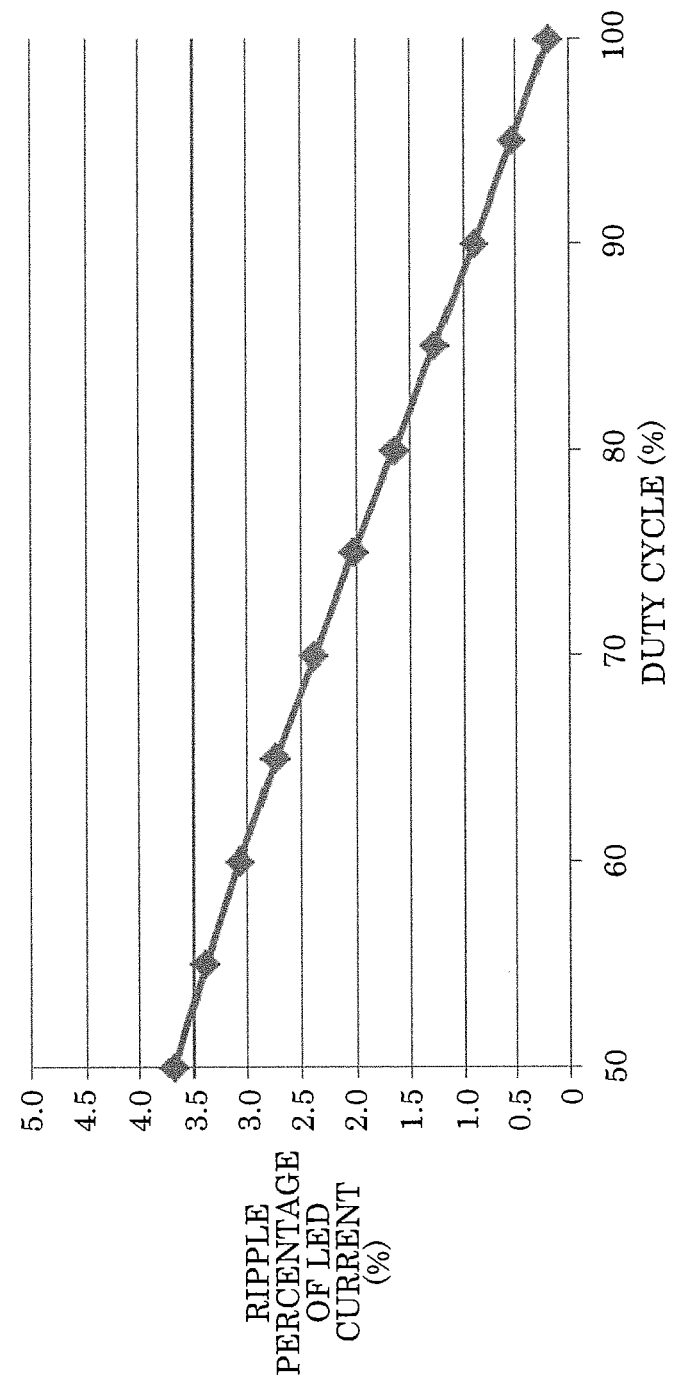
FIG. 49B is a diagram illustrating a relation between a duty cycle and a ripple percentage of output voltage, as simulation results for the circuit for comparison in FIG. 45.

FIG. 47 illustrates simulation results of the waveforms of the LED current and the waveforms of the output voltage, when the capacitance of the output smoothing capacitor is changed from 10 µF to 30 µF while the frequency of a modulating signal is set to 2.4 kHz and the duty cycle is set to 75%. It can be seen that the less the capacitance of the smoothing capacitor is, the greater the overshoot of the LED current is. FIGS. 48A, 48B, 49A, and 49B are graphs illustrating the above simulation results. The average of the LED current does not change even if the duty cycle indicated by the horizontal-axis changes, and constant-current feedback control (average control) is functioning, yet the peak value of the LED current is greater as the duty cycle is lower. The range of variation in the drawings shows the magnitude of overshoot of the LED current, and also is expressed in ripple percentage. For example, comparison of FIGS. 10 to 14 of Embodiment 1 with FIGS. 48A, 48B, 49A, and 49B of the comparative example shows that the overshoot of the LED current is significantly reduced in the embodiment.

As described above, the illumination light communication apparatus according to Embodiments 1 to 6 includes: light source 53 which emits illumination light; switch SW which is connected in series to the light source, and intermittently interrupts current which flows through the light source; signal generating circuit SG which generates a binary communication signal which controls on and off of the switch SW to modulate the illumination light; and current limiting circuit 1 which is connected in series to the light source and the switch, and limits the current which flows through the light source in order to prevent the current from exceeding a current set value which is variable.

This reduces overshoot which occurs in current flowing through the light source (that is, load circuit 53) at a moment when on/off switch SW is brought from the off state to the on state, and accordingly, error in reception by a receiving device can be reduced.

Here, current limiting circuit 1 may include: reference source 4 which outputs a reference value corresponding to the current set value, the reference value being variable; transistor 2 which is connected in series to the light source and the switch, and limits current which flows through the light source, based on the reference value; and control circuit 6 which calculates a partial duty cycle of a part of the binary communication signal, and sets the reference value to a first value when the partial duty cycle is a first proportion, and sets the reference value to a second value smaller than the first value when the partial duty cycle is a second proportion higher than the first proportion, and the current set value corresponding to the second value may be smaller than the current set value corresponding to the first value.

According to this, overshoot can be appropriately mitigated if the magnitude of overshoot depends on the partial duty cycle.

Here, control circuit 6 may change the reference value, to make the current set value inversely proportional to the partial duty cycle.

Here, control circuit 6 may change the reference value so as to satisfy the following expression.

$$I1=(Iave/ONd)\times 100$$

Here, I1 denotes the current set value, Iave denotes an average of current flowing through the light source when illumination light is not modulated by turning on/off the switch, and ONd denotes a partial duty cycle (whose unit is %) of the communication signal.

According to this, overshoot can be mitigated, and brightness of illumination light which is not modulated and brightness of illumination light which is modulated can be made to appear substantially the same to people.

Here, control circuit 6 may change the reference value so as to satisfy the following expression.

$$(Iave/ONd)\times 100 \leq I1 < Ip$$

Here, Iave denotes an average of current flowing through the light source when illumination light is not modulated by turning on/off the switch, ONd denotes a partial duty cycle of the communication signal, I1 denotes the current set value, and Ip denotes a peak value of current flowing through the light source when the current limiting circuit does not limit the current.

Here, current limiting circuit 1 may include reference source 4 which outputs a variable reference value corresponding to the current set value, and transistor 2 which is connected in series to the light source and the switch, an limits current which flows through transistor 2 and the light source, based on the reference value, reference source 4 may include constant voltage source 4a which generates constant voltage, two resistors (R1, R2) which divide the constant voltage, a diode (D) which feeds back a voltage applied to current limiting circuit 1 to a point of connection between the two resistors, and a capacitive element (C1) storing a potential at the point of connection as the reference value, and the potential at the point of connection may indicate the reference value.

This reduces overshoot which occurs in current flowing through a light source at a moment when on/off switch SW is brought from the off state to the on state, and accordingly error in reception by a receiving device can be reduced. This is because, if the power supply circuit of the illumination light communication apparatus is a current feedback circuit, the illumination light communication apparatus has features that the magnitude of overshoot depends on a partial duty cycle and the output voltage gradually increases during the off period. Due to the feedback by the diode, the reference value also increases according to the output voltage which gradually increases during the off period, and thus overshoot can be appropriately reduced.

Here, transistor 2 may be a field effect transistor. Current limiting circuit 1 may include a source resistor connected to the source of transistor 2 and connected in series to transistor 2 and switch SW, and amplifier 5 having an output terminal, a negative input terminal, and a positive input terminal. The output terminal may be connected to the gate of transistor 2, the negative input terminal may be connected to a point of connection between transistor 2 and the source resistor, and the positive input terminal may be connected to the capacitative element and a point of connection between the two resistors.

Here, transistor 2 may be a bipolar transistor, and current limiting circuit 1 may be connected to the emitter of transistor 2, and may include an emitter resister connected in series to the transistor and the switch, and amplifier 5 having an output terminal, a negative input terminal, and a positive input terminal. The output terminal may be connected to the base of the transistor, the negative input terminal may be connected to the capacitative element and a point of connection between the transistor and the emitter resistor, and the positive input terminal may be connected to a point of connection between the two resistors.

Here, current limiting circuit 1 may include a gain control circuit further included in amplifier 5, and a phase compensation circuit further included in amplifier 5.

Here, current limiting circuit 1 may further include a voltage follower circuit between the positive input terminal and the point of connection between the two resistors.

Here, control circuit 6 may include a detector which detects a voltage applied to current limiting circuit 1, and a CPU which determines the reference value according to the detected voltage.

Here, the illumination light communication apparatus may include the light source connected in series, and power supply circuit 52*a* which supplies current to the switch and current limiting circuit 1, and power supply circuit 52*a* may perform feedback control for maintaining an average of the current to be supplied at a constant value.

Here, power supply circuit 52*a* may include DC-to-DC converter 64 which includes inductor 80 and switch element 81, and detect the magnitude of current flowing through switch element 81, and control on and off of switch element 81 according to a difference between the detected value and a predetermined value.

The communication module according to Embodiments 1 to 6 is communication module 10 which is attachable to a lighting apparatus, and modulates illumination light, and includes switch SW which is to be connected in series to a light source included in the lighting apparatus, signal generating circuit SG which generates a binary communication signal which controls on and off of the switch in order to modulate the illumination light, current limiting circuit 1 which is connected in series to the light source and the switch, and limits current which flows through the light source to prevent the current from exceeding a current set value which is variable.

According to this, the communication module can be added to an existing lighting device. Specifically, while using the existing lighting device as it is, a light communication function can be added easily, and achieved at lower cost than the case where a new light communication lighting device is installed. Furthermore, overshoot which occurs in current flowing through the light source at a moment when on/off switch SW is brought from the off state to the on state, and thus error in reception by a receiving device can be reduced.

Embodiment 7

Embodiment 7 provides an illumination light communication apparatus and a communication module that achieve cost reduction and reduction in error in reception by a receiving device, even if light communication by 100% modulation is performed using a constant-current feedback power supply.

An illumination light communication apparatus according to an aspect of the present embodiment is an illumination light communication apparatus which modulates illumination light in accordance with a communication signal includes: a light source which emits the illumination light; a transistor connected in series to the light source; a signal generating circuit which generates the communication signal which is a binary signal; and a multi-operation control circuit which causes the transistor to modulate the illumination light and limit current which flows through the light source. The multi-operation control circuit is a variation of the current limiting circuit already described.

A communication module according to an aspect of the present embodiment is a communication module which is attachable to a lighting apparatus and modulates illumination light, and includes: a transistor which is to be connected in series to a light source included in the lighting apparatus; a signal generating circuit which generates a binary communication signal; and a multi-operation control circuit which causes the transistor to modulate the illumination light and limit current which flows through the light source.

The illumination light communication apparatus and the communication module according to the present embodiment yield advantageous effects of reducing error in reception by a receiving device, even if light communication by 100% modulation is performed using a constant-current feedback power supply. In addition, the above transistor serves as a switch element which performs the above modulation operation and also as a current limiting element which performs the above limiting operation, and thus contributes to inhibition of an increase in the number of circuit elements and cost reduction.

[7.1 Configuration of Illumination Light Communication Apparatus]

First, a configuration of the illumination light communication apparatus according to Embodiment 7 is described.

Figure 50A:
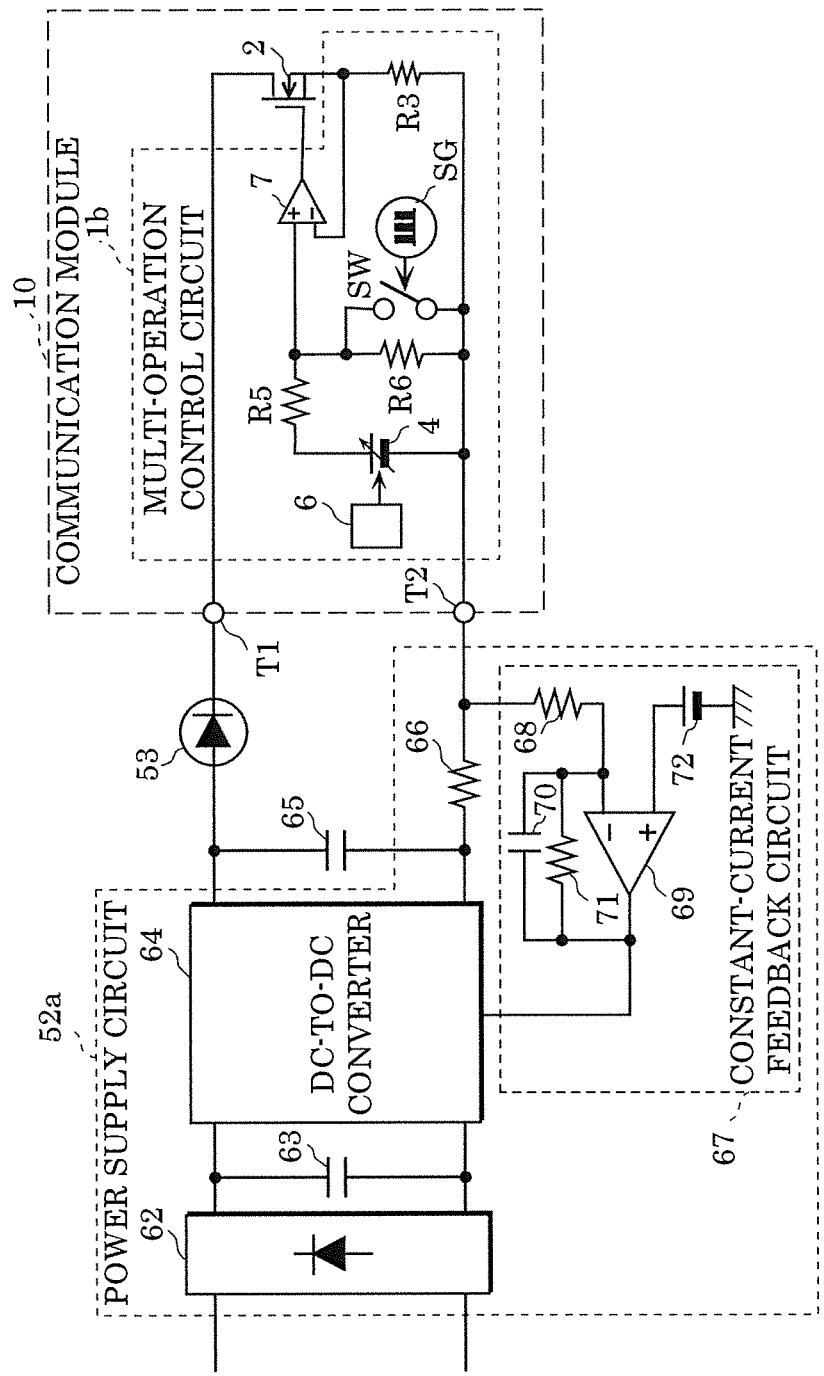
FIG. 50A is a circuit diagram illustrating a configuration example of an illumination light communication apparatus according to Embodiment 7.

FIG. 50A is a circuit diagram illustrating a configuration example of the illumination light communication apparatus according to Embodiment 7. The illumination light communication apparatus includes power supply circuit 52*a* having a function of maintaining output current at a constant value, smoothing capacitor (smoothing circuit) 65, load circuit 53, and communication module 10. Communication module 10 includes transistor 2 and multi-operation control circuit 1b.

Power supply circuit 52a includes rectifier bridge 62, capacitor 63, DC-to-DC converter 64, sense resistor 66, and constant-current feedback circuit 67. Constant-current feedback circuit 67 includes input resistor 68, amplifier 69, capacitor 70, resistor 71, and reference voltage source 72.

In power supply circuit 52a, rectifier bridge 62 full-wave rectifies commercial power (for example, 100-V AC), and after capacitor 63 smoothes the rectified power, DC-to-DC converter 64 converts the smoothed power into a desired direct voltage. Smoothing capacitor 65 is connected between the output terminals of DC-to-DC converter 64. A series circuit of load circuit 53, multi-operation control circuit 1b, and transistor 2 is connected parallel to smoothing capacitor 65.

Power supply circuit 52a has a function of directly or indirectly detecting current which flows through load circuit 53 and controlling current values to maintain the values constant. This function is achieved by sense resistor 66 for directly detecting current flowing through load circuit 53 and constant-current feedback circuit 67 in FIG. 50A. Constant-current feedback circuit 67 includes amplifier 69, reference voltage source 72 connected to the positive input terminal of amplifier 69, input resistor 68 connected to the negative input terminal of amplifier 69, gain control resistor 71 connected between the output terminal and the negative input terminal of amplifier 69, and phase compensation capacitor 70. In constant-current feedback circuit 67, amplifier 69 compares which is higher a voltage drop across sense resistor 66 or a voltage of reference voltage source 72, amplifies the difference, and feeds back the amplified difference to the controller of DC-to-DC converter 64. In other words, constant-current feedback circuit 67 performs negative feedback control on DC-to-DC converter 64 so that the voltage drop across sense resistor 66 and the reference voltage match. A gain is set according to a voltage division ratio of input resistor 68 and resistor 71 connected between the inverting input terminal and the output terminal of amplifier 69, and capacitor 70 provided parallel to resistor 71 functions as an integral element for phase compensation.

Smoothing capacitor 65 is connected between the output terminals of power supply circuit 52a, and smoothes the output from power supply circuit 52a.

Load circuit 53 includes a plurality of light emitting diodes connected in series, between the output terminals of power supply circuit 52a, and is supplied with the output from the power supply circuit. The plurality of light emitting diodes constitute a light source which emits illumination light.

Transistor 2 is, for example, a metal oxide semiconductor field effect transistor (MOSFET), and is connected in series to load circuit 53. Transistor 2 is used to modulate illumination light and limit current which flows through the light source (that is, load circuit 53). Here, the modulation operation is to modulate illumination light, and is performed by transistor 2 intermittently interrupting current supplied from power supply circuit 52a to load circuit 53. The limiting operation is to limit current which flows through the light source and transistor 2, to prevent the current from exceeding the current set value.

Multi-operation control circuit 1b causes transistor 2 to modulate illumination light and limit current flowing through the light source. Thus, multi-operation control circuit 1b includes signal generating circuit SG, switch SW, reference source 4, control circuit 6, resistor R5, resistor R6, and amplifier 7.

Signal generating circuit SG generates a binary communication signal which controls on and off of transistor 2, in order to modulate illumination light. A communication signal is indirectly input to the control terminal of transistor 2 via switch SW and amplifier 7, rather than being directly input to the gate of transistor 2, and indirectly turns on and off transistor 2. The method of modulating the communication signal may be the same as the method already described with reference to FIG. 15.

Switch SW is, for example, a switching transistor, receives input of a binary communication signal from signal generating circuit SG at the gate or base, and turns on and off in accordance with the communication signal. Switch SW and signal generating circuit SG included in multi-operation control circuit 1b function as modulation control circuits which control the modulation operation of modulating illumination light. Note that switch SW may be a switching element such as a thyristor.

Figure 50B:
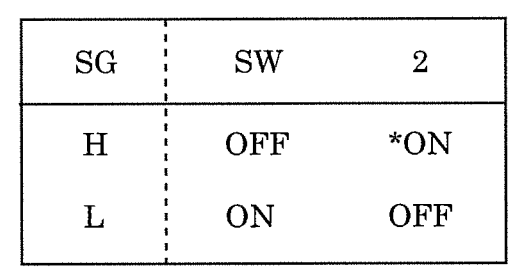

The operation of modulating illumination light is further described with reference to FIG. 50B. FIG. 50B illustrate a truth table showing a communication signal from signal generating circuit SG in FIG. 50A, and operation states of switch SW and transistor 2 in FIG. 50A. "SG" shows a logical value (high level or low level) of a communication signal, "SW" shows a state (on or off) of switch SW, and "2" shows a state (on or off) of transistor 2. Here, the communication signal is an inverted 4 PPM signal illustrated in FIG. 15.

When a communication signal is an L signal (low level signal), switch SW is on, transistor 2 is off, and current does not flow into the light source so that the light source is off.

When a communication signal is an H signal (high level signal), switch SW is off, transistor 2 is on, and current flows through the light source so that the light source emits light. In this way, illumination light is modulated by on and off of transistor 2 in accordance with a binary communication signal.

The following describes the operation of limiting current which flows through the light source. The notation "*ON" in FIG. 50B means as follows. Specifically, transistor 2 is not necessarily completely turned on, and dynamically turned on completely or incompletely, according to a difference between the positive input terminal and the negative input terminal of amplifier 7. How incompletely transistor 2 is turned on (in other words, the magnitude of the source-to-drain resistance of transistor 2) is determined according to the above difference. In this manner, current which flows through transistor 2 (in other words, current which flows through the light source) is limited to be prevented from exceeding the current set value. The current set value is determined according to a reference value input to the positive input terminal of amplifier 7.

The limiting operation is performed by a circuit part other than signal generating circuit SG and switch SW of multi-operation control circuit 1b. Stated differently, reference source 4, control circuit 6, resistor R5, resistor R6, and amplifier 7 of multi-operation control circuit 1b function as a current limiting circuit which causes transistor 2 to perform the limiting operation.

Reference source 4 outputs a reference value to the positive input terminal of amplifier 7. The reference value defines the upper limit (current set value) of current flowing through load circuit 53 which is a light source. For example, the reference value is proportional to the current set value.

Reference source 4 may output the reference value as a fixed value or may output a variable reference value according to the arrangement pattern (for example, bit pattern) of a communication signal generated by signal generating circuit SG.

Resistor R3 is a source resistor for detecting the magnitude of current flowing through load circuit 53. The source-side terminal of resistor R3 is connected to the negative input terminal of amplifier 5.

Reference source 4 is connected to the positive input terminal of amplifier 7 via voltage dividing resistors R5 and R6, and the source of transistor 2 is connected to the negative input terminal of amplifier 7. When a communication signal indicates on among on and off, amplifier 7 determines the level of a gate signal or a base signal transmitted to transistor 2, in order to prevent current flowing through the light source from exceeding the current set value. Specifically, amplifier 7 amplifies a difference between the reference value and the current value detected by resistor R3, and outputs the amplified signal to the gate of transistor 2.

Control circuit 6 performs control for changing the reference value of reference source 4, according to the arrangement pattern of a communication signal, in order to cause reference source 4 to output a variable reference value. For example, control circuit 6 calculates a partial duty cycle of a communication signal. When the calculated partial duty cycle is a first proportion, control circuit 6 sets the reference value to a first value, whereas when the partial duty cycle is a second proportion higher than the first proportion, control circuit 6 sets the reference value to the second value smaller than the first value. At this time, control circuit 6 may change the reference value so that the reference value may be inversely proportional to the partial duty cycle of a communication signal. The "partial duty cycle" is, for example, a proportion of an on period immediately before the most recent off period with respect to a combination of the most recent off period and the on period. Alternatively, the "partial duty cycle" may be substituted with a moving average of most recent n bits in the communication signal. In this manner, if the magnitude of overshoot of the current flowing through load circuit 53 depends on the partial duty cycle, the overshoot can be more appropriately mitigated.

Note that in FIG. 50A, if reference source 4 outputs a fixed reference value, multi-operation control circuit 1b may not include control circuit 6.

[7.2 Operation of Illumination Light Communication Apparatus]

Operation of the illumination light communication apparatus having the above configuration is described using simulation results.

FIGS. 51 to 54 illustrate simulation results for multi-operation control circuit 1b in FIG. 50A.

FIG. 51 illustrates first simulation results for the example circuit in FIG. 50A. FIG. 51 illustrates an LED current and an output voltage waveform when the duty cycle is 60%, 75%, 90%, and 100%. In the simulations, the capacitance of smoothing capacitor 65 is set to 20 µF, and the frequency of a modulating signal (that is, communication signal) which drives switch SW is set to 2.4 kHz. As can be seen from FIG. 51, the overshoot of the LED current is mitigated irrespective of the duty cycle. Also, it can be seen that the voltage waveform also varies, but not as greatly as the current does, which shows that the dynamic resistance of the LED load is low.

Figure 52:
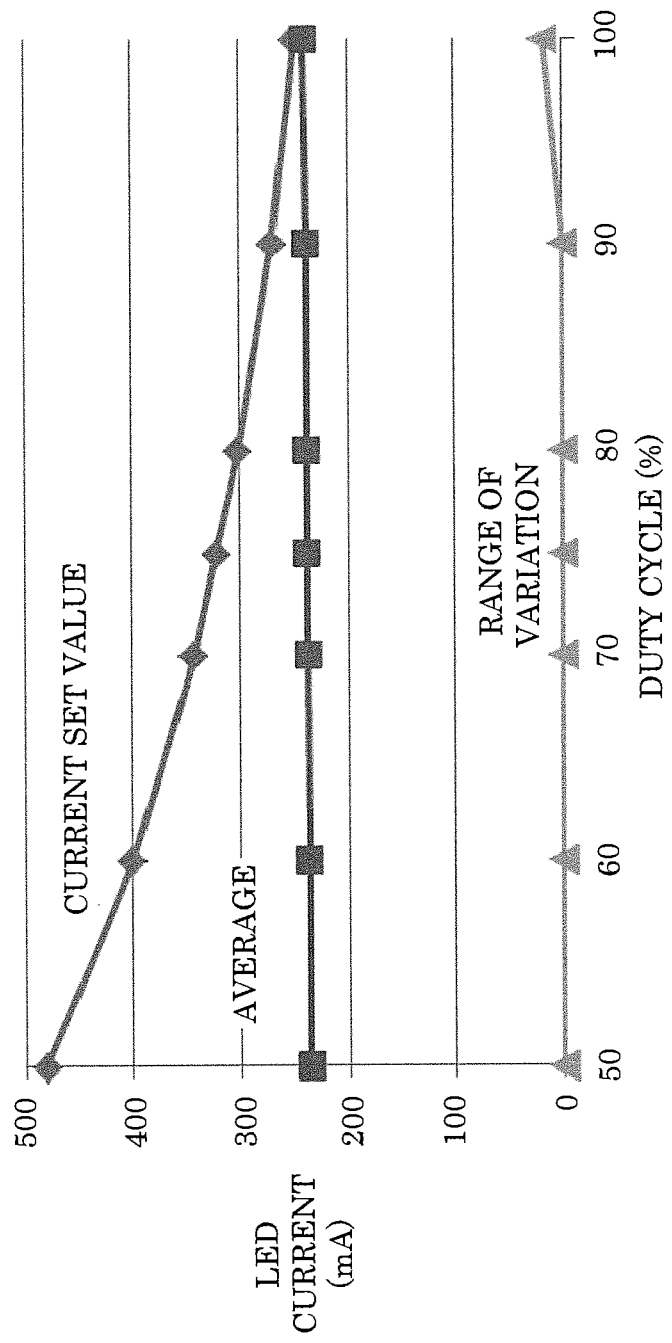
FIG. 52 is a diagram illustrating second simulation results for the example circuit in FIG. 50A.

FIG. 52 illustrates a result of calculating an optimal current set value for multi-operation control circuit 1b, according to the duty cycle of a modulating signal from signal generator SG. FIG. 52 illustrates second simulation results for the example circuit in FIG. 50A. Also in this simulation, the capacitance of smoothing capacitor 65 is set to 20 µF, and the frequency of the modulating signal which drives switch SW is set to 2.4 kHz. In FIG. 52, if the current set value is varied according to the duty cycle indicated by the horizontal axis as illustrated in the drawing, a variation of the LED current due to overshoot is suppressed, and the average can be maintained at a value when transistor 2 is not intermittently turned on and off. Note that the range of variation in FIG. 52 indicates an overshoot portion of the waveform of the modulated LED current having a rectangular wave shape. The average of the LED current is maintained almost constant, irrespective of the duty cycle, and thus the brightness of illumination light is also maintained almost constant, irrespective of the duty cycle. Furthermore, since the range of variation is small, the overshoot of the waveform of the LED current is mitigated, and the waveform appears to be substantially a square wave. Thus, error in reception by a receiving device can be prevented. Note that when the duty cycle is 100% (with no modulation), the waveform shows a slight variation, which is due to a high frequency ripple in an original waveform of current not modulated.

Figure 53:
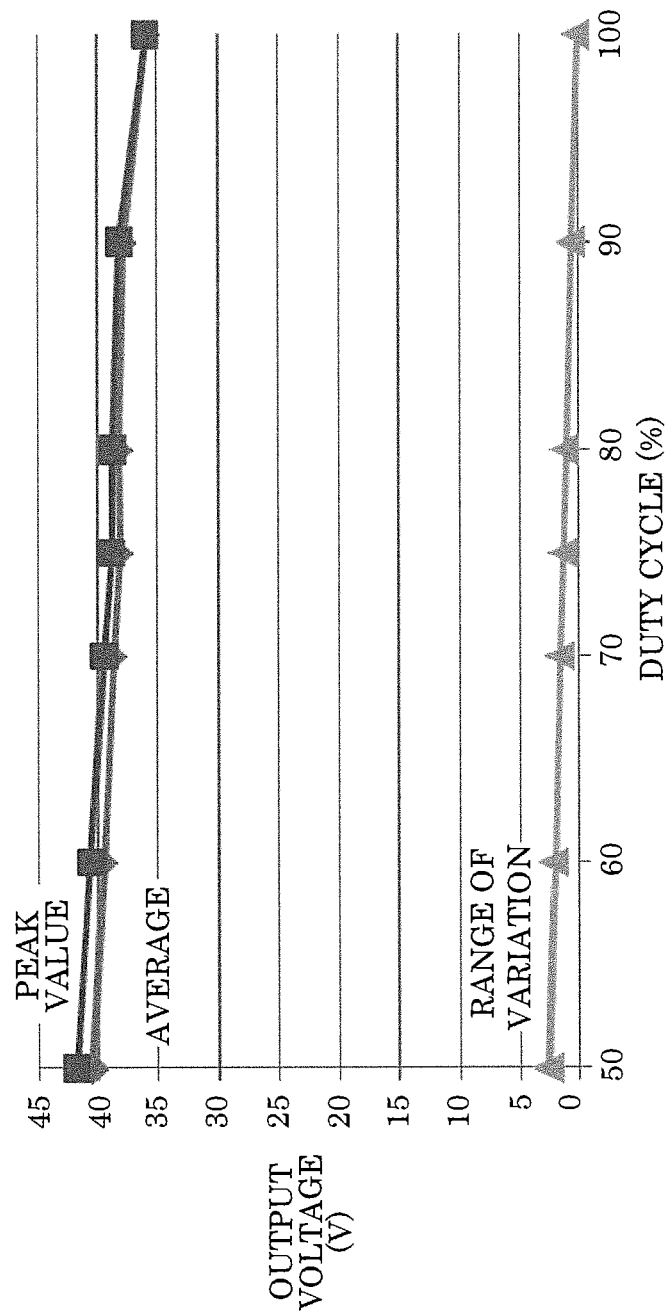
FIG. 53 is a diagram illustrating third simulation results for the example circuit in FIG. 50A.

FIG. 53 illustrates third simulation results for the example circuit in FIG. 50A. Also in the simulations, the capacitance of smoothing capacitor 65 is set to 20 µF, and the frequency of the modulating signal which drives switch SW is set to 2.4 kHz. In FIG. 53, according to the duty cycle indicated by the horizontal axis, the peak value and average of output voltage are almost the same, and the range of variation is maintained at a small value.

Figure 54:
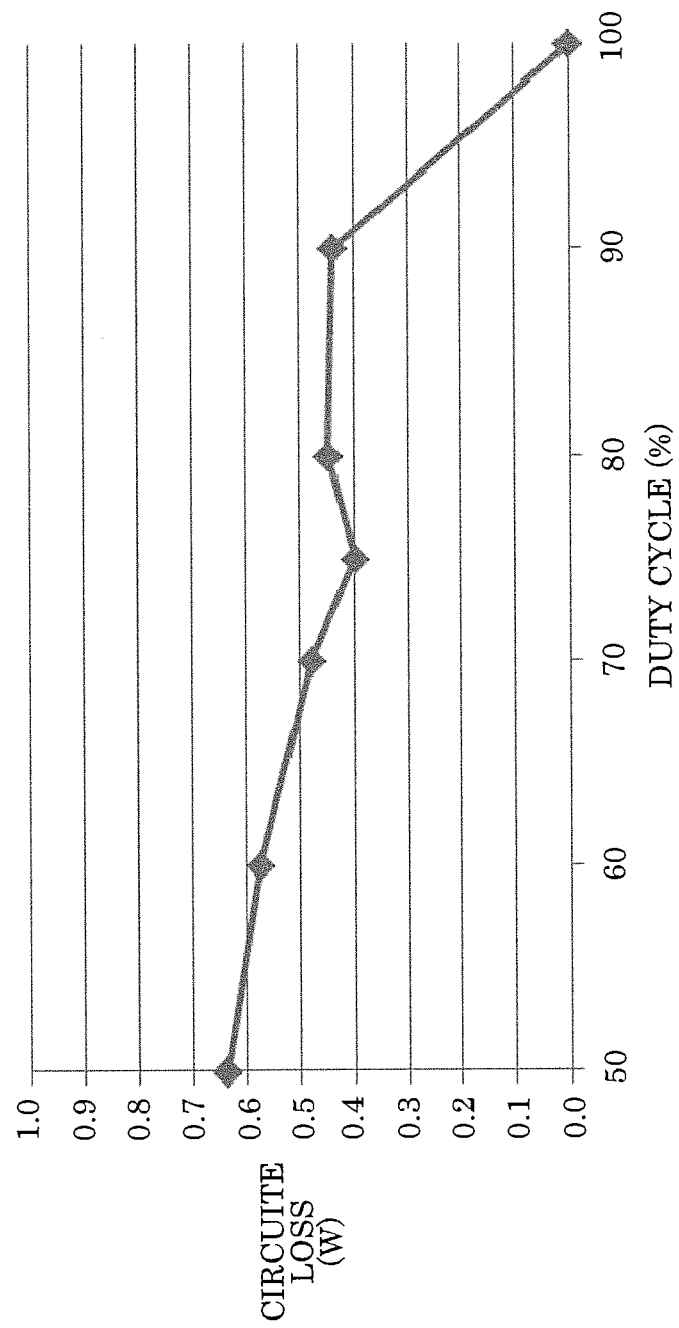
FIG. 54 is a diagram illustrating fourth simulation results for the example circuit in FIG. 50A.

Furthermore, FIG. 54 illustrates loss caused by multi-operation control circuit 1b. FIG. 54 is a diagram illustrating fourth simulation results for the example circuit in FIG. 50A. The conditions of the simulations are the same as those in FIGS. 52 and 53. The vertical axis indicates the loss caused by multi-operation control circuit 1b. As can be seen from FIG. 54, the circuit loss is maintained at a small value when the duty cycle is 50% to 90%, that is, while modulation operation is being performed.

[7.3 Configuration Example of Communication Module 10]

The following describes attachable communication module 10.

In FIG. 50A, communication module 10 is connected to a terminal of load circuit 53 and a terminal of power supply circuit 52a via terminals T1 and T2. Terminals T1 and T2 may be terminal blocks or connectors. In this manner, communication module 10 is attachable to terminals T1 and T2.

A short line can be connected to terminals T1 and T2, instead of communication module 10. An apparatus which is as illustrated in FIG. 50A, but in which a short line is connected to terminals T1 and T2 instead of communication module 10, functions as a lighting apparatus which does not have a visible light communication function.

According to the configuration as illustrated in FIG. 50A, a light communication function can be added by later adding a simple circuit part (that is, communication module 10), while the power supply circuit and the LED light source which are included in an existing lighting device without the light communication function are used as they are.

As described above, multi-operation control circuit 1b in the illumination light communication apparatus according to Embodiment 7 performs control for causing transistor 2 to modulate illumination light and limit current which flows through the light source.

This mitigates overshoot which occurs at the rise of the current waveform due to the limiting operation, and thus yields advantageous effects of reducing error in reception by a receiving device. Transistor 2 serves as a switch element which performs the above modulation operation and also as a current limiting element which performs the above limiting operation, and thus contributes to inhibition of an increase in the number of circuit elements.

Note that multi-operation control circuit 1b generates, in accordance with a communication signal, a gate signal or a base signal to be input to the gate or base of transistor 2, to cause transistor 2 to execute the modulation operation. When a communication signal indicates on among on and off, multi-operation control circuit 1b may determine the level of the gate signal or the base signal to prevent current flowing through the light source from exceeding the current set value.

Multi-operation control circuit 1b may include a current sensing circuit (that is, resistor R3) which detects the magnitude of current flowing through a light source, reference source 4 which outputs a reference value according to a current set value, amplifier 7 which has two input terminals to which the magnitude of the current and the reference value are input, amplifies a difference between the two input terminals, and outputs the amplified signal as a gate signal or a base signal, and a switching circuit (for example, switch SW) which is coupled to at least one of the two input terminals, and reduces the difference to substantially zero when the communication signal indicates off. Here, reducing the difference to substantially zero means reducing the difference to a value at which the difference brings the output from amplifier 7 to a low level. By reducing the difference to substantially zero, for example, the negative input terminal and the positive input terminal may have the same electric potential, or the negative input terminal may have a potential higher than a positive input terminal.

The switching circuit may have a switch transistor (for example, switch SW), and the switch transistor may bring the level of the input terminal corresponding to the reference value, among the two input terminals, to a substantially ground level by being in a conductive state when the communication signal indicates off. Here, a substantially ground level means to a level which reduces the difference to substantially zero, or in other words, a level which brings the output from amplifier 7 to a low level. For example, a substantially ground level may mean the ground level (that is, 0 V) or may not be the ground level, but a level that is the same as or lower than the level of the negative input terminal.

Here, a terminal of the switch transistor (for example, switch SW) may be connected to the input terminal corresponding to the reference value among the two input terminals, and the other terminal of the switch transistor may be connected to a line having a substantially ground potential (see FIG. 50A).

Figures 57A, 57B:
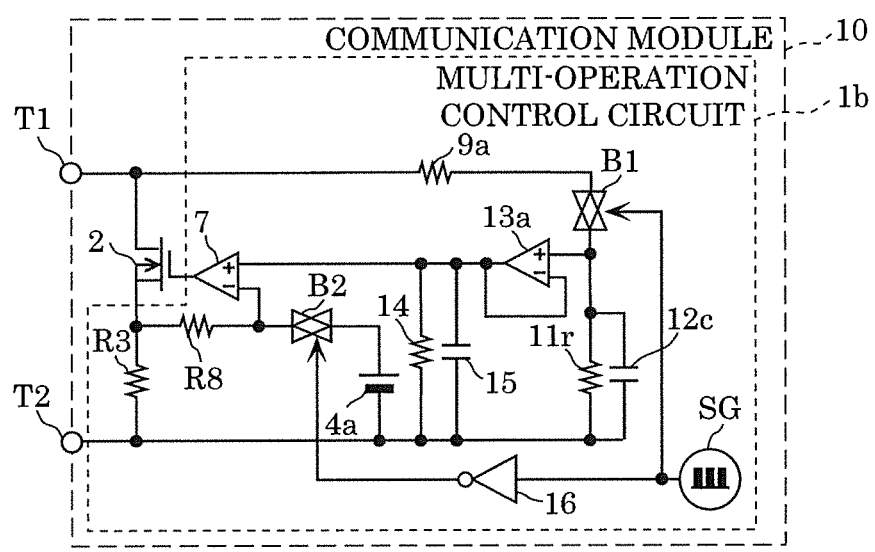
FIG. 57A is a diagram illustrating a configuration example of a communication module according to Embodiment 9.
FIG. 57B is a diagram illustrating a truth table showing a communication signal from a signal generating circuit in FIG. 57A and operating states of two valves and a transistor in FIG. 57A.
Figures 57C, 57D:
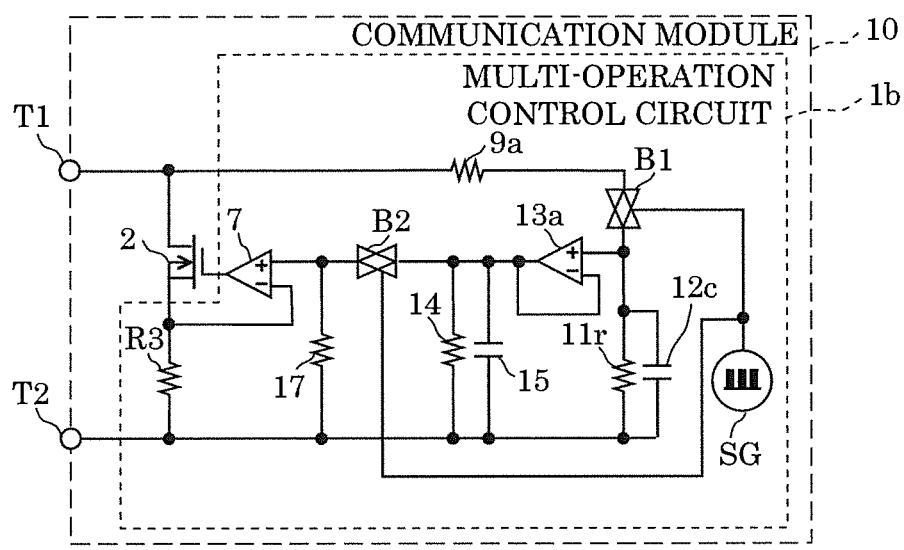
FIG. 57C is a diagram illustrating a variation of the communication module according to Embodiment 9.
FIG. 57D is a diagram illustrating a truth table showing a communication signal from a signal generating circuit in FIG. 57C, and operating states of two valves and a transistor in FIG. 57C.

Here, multi-operation control circuit 1b may further include a resistance element (for example, resistor 17) connected between the input terminal corresponding to the reference value and a line having a substantially ground potential, and a terminal of the switch transistor (for example, valve B2) may be connected to the input terminal corresponding to the reference value among the two input terminals, and the other terminal of the switch transistor may be connected to the reference source (see FIG. 57C).

Embodiment 8

Embodiment 7 has described an example of multi-operation control circuit 1b in which switch SW is connected to the positive input terminal of amplifier 7. In contrast, Embodiment 8 describes an example of multi-operation control circuit 1b in which switch SW is connected to the negative input terminal of amplifier 7.

The configuration of the illumination light communication apparatus according to Embodiment 8 is the same as that of the apparatus illustrated in FIG. 50A, except communication module 10. The following mainly describes differences.

Figure 55:
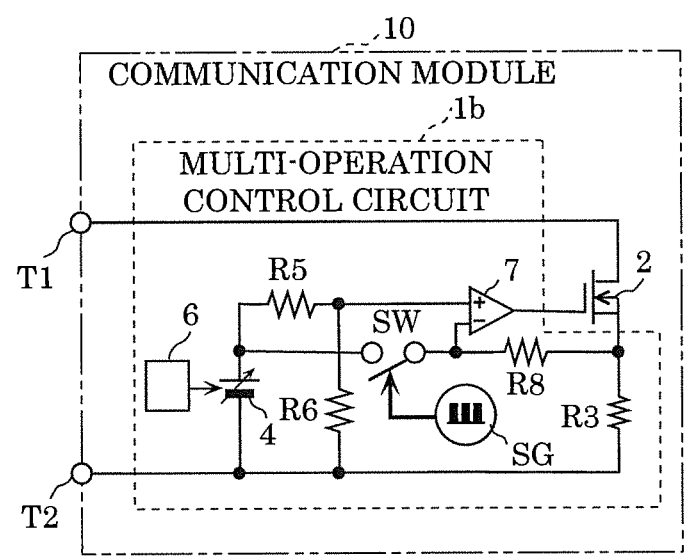
FIG. 55 is a diagram illustrating a configuration example of a communication module according to Embodiment 8.

FIG. 55 illustrates a configuration example of communication module 10 which includes multi-operation control circuit 1b in Embodiment 8. The module in FIG. 55 differs from the module in FIG. 50A mainly in that switch SW is connected to the negative input terminal and resistor R8 is further included. The following mainly describes differences.

Switch SW is connected to, among the two input terminals of amplifier 7, an input terminal (specifically, negative input terminal) corresponding to the magnitude of current detected by resistor R3, and to a line (that is, a positive-side line of reference source 4) substantially having a level of the reference value. The communication signal of signal generating circuit SG in FIG. 55 and operating states of switch SW and transistor 2 are as shown by the truth table illustrated in FIG. 50B.

Resistor R8 is for limiting, when switch SW is on, current which flows from reference source 4 to a ground line (line connected to terminal T2) via resistors R8 and R3.

Switch SW in FIG. 55 brings the level of the negative input terminal corresponding to the magnitude of the current, among the two input terminals, to a substantially reference value level by being in a conductive state when a communication signal indicates off. Here, bringing to a substantially reference value level means to bring to a level which sets the above difference to substantially zero, or in other words, a level which brings the output from amplifier 7 to the low level. For example, a substantially reference value level may be the same as the level of the reference value or a level higher than the level of the positive input terminal.

As described above, multi-operation control circuit 1b in FIG. 55 turns off transistor 2 by bringing the negative input terminal corresponding to the magnitude of current flowing through the light source to a substantially reference value level, when the communication signal indicates off. Multi-operation control circuit 1b turns on transistor 2 when the communication signal indicates on.

Accordingly, multi-operation control circuit 1b can cause transistor 2 to perform modulation operation.

A description of operation of the illumination light communication apparatus according to Embodiment 8 which has the above configuration is given using simulation results.

Figure 56:
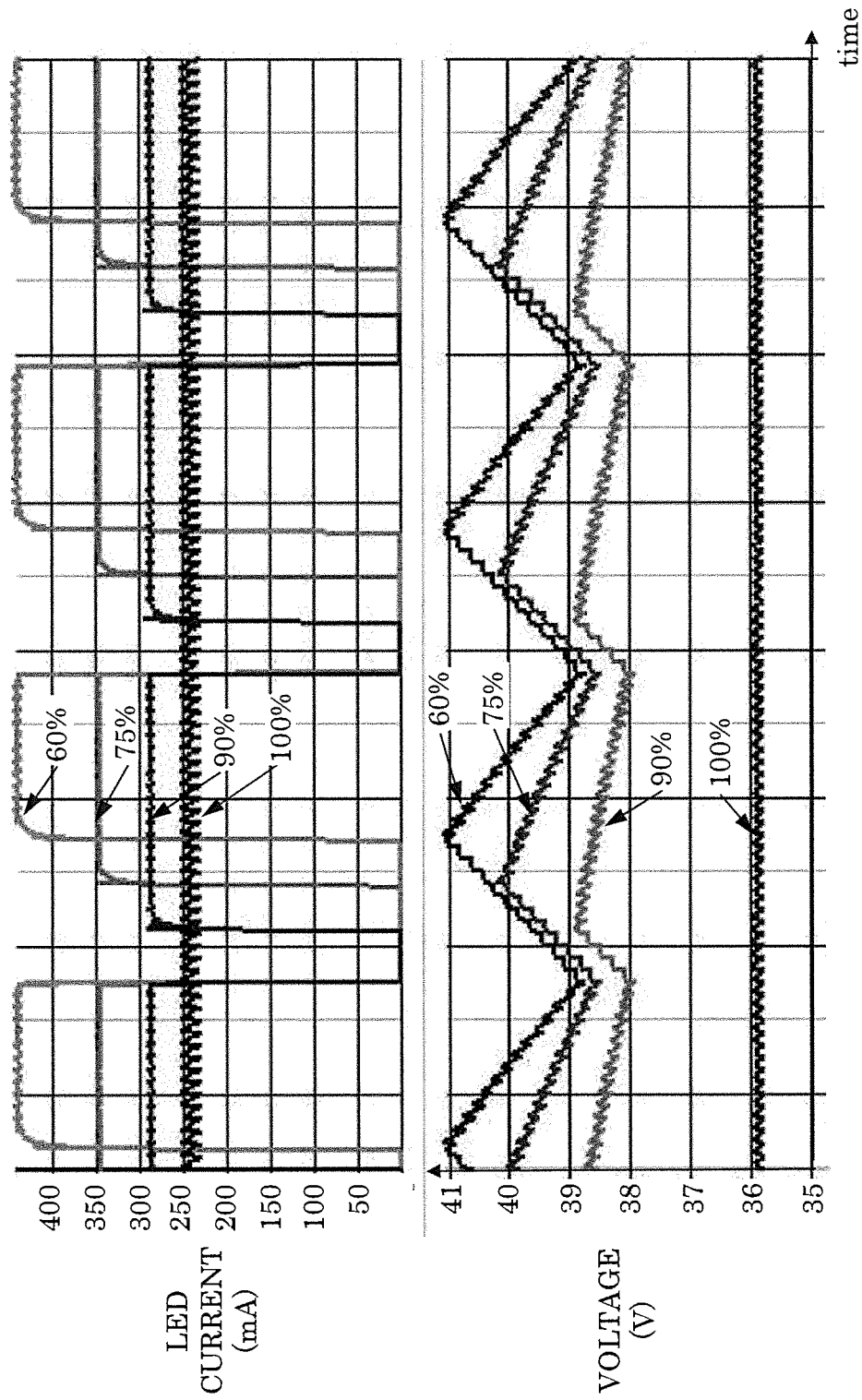
FIG. 56 is a diagram illustrating simulation results for the example circuit in FIG. 55.

FIG. 56 is a diagram illustrating first simulation results for the example circuit in FIG. 55. FIG. 56 illustrates LED current and waveforms of output voltages when the duty cycle is 60%, 75%, 90%, and 100%. In the simulations, the capacitance of smoothing capacitor 65 is set to 20 μF, and a frequency of a modulating signal (that is, communication signal) which drives switch SW is set to 2.4 kHz. FIG. 56 shows similar results to those in FIG. 51 and shows that overshoot of the LED current is mitigated, irrespective of the duty cycle. Also, it can be seen that the voltage waveform varies, but not as greatly as the current does, which shows that the dynamic resistance of the LED load is low.

As described above, multi-operation control circuit 1b in the illumination light communication apparatus according to Embodiment 8 performs control for causing transistor 2 to modulate illumination light and limit current which flows through the light source.

The switching circuit (that is, switch SW which is a switching transistor) brings the level of the input terminal corresponding to the magnitude of the current, among the two input terminals, to the substantially reference value level, by being in a conductive state when a communication signal indicates off.

According to this, multi-operation control circuit 1b turns off transistor 2, while a communication signal indicates off. Accordingly, multi-operation control circuit 1b can cause transistor 2 to perform the modulation operation.

A terminal of the switch transistor (switch SW in FIG. 55 or valve B2 in FIG. 57A) may be connected to the input terminal corresponding to the magnitude of current among the two input terminals, and the other terminal of the switch transistor may be connected to a line substantially having the level of the reference value.

Embodiment 9

Embodiment 9 describes some configuration examples of multi-operation control circuit 1b.

The configuration of the illumination light communication apparatus according to Embodiment 9 is the same as that of the apparatus in FIG. 50A, except communication module 10. The following mainly describes differences.

FIG. 57A illustrates an example of the configuration of a communication module which includes multi-operation control circuit 1b according to Embodiment 9.

Communication module 10 in FIG. 57A includes transistor 2 and multi-operation control circuit 1b. Multi-operation control circuit 1b includes signal generating circuit SG, valve B1, valve B2, resistor R3, resistor R8, amplifier 7, resistor 9a, resistor 11r, capacitor 12c, amplifier 13a, resistor 14, capacitor 15, and inverter 16.

A portion of multi-operation control circuit 1b that includes signal generating circuit SG, valve B1, valve B2, and inverter 16 functions as a modulation control circuit which causes transistor 2 to perform a modulation operation.

Signal generating circuit SG has already been described, and thus a description thereof is omitted.

Valve B1 may be a switching element such as a switching transistor or a thyristor, for example, and is open or closed, that is, in a non-conductive state or in a conductive state according to a control signal input to the control terminal. A communication signal from signal generating circuit SG is input to the control terminal of valve B1.

Valve B2 may be the same element as valve B1. A communication signal inverted by inverter 16 is input from signal generating circuit SG to the control terminal of valve B2. Valve B2 is connected to, among the two input terminals of amplifier 7, the negative input terminal corresponding to the magnitude of current flowing through the light source, and to a line substantially having the level of the reference value (that is, the positive-side line of constant voltage source 4a).

Here, the operating states of valve B1, valve B2, and transistor 2 are described with reference to FIG. 57B. FIG. 57B is a truth table showing a communication signal from signal generating circuit SG in FIG. 57A and operating states of valves B1 and B2 and transistor 2 in FIG. 57A. "SG" denotes a logical value (high level or low level) of a communication signal, "B1" denotes the state (on or off) of valve B1, "B2" denotes the state (on or off) of valve B2, and "2" denotes the state (on or off) of transistor 2. When a communication signal is an L signal (low-level signal), valve B1, valve B2, and transistor 2 are off, on, and off, respectively, and current does not flow through the light source so that the light source is off. Specifically, valve B2 brings the level of the negative input terminal corresponding to the magnitude of current among the two input terminals to a substantially reference value level, by being in a conductive state when the communication signal indicates off. Accordingly, an output signal from amplifier 7 is a low-level signal, and transistor 2 is turned off.

When a communication signal is an H signal (high-level signal), valve B1, valve B2, and transistor 2 are on, off, and, on, respectively, and current flows through the light source so that the light source is on.

In this manner, illumination light is modulated by tuning on and off transistor 2 in accordance with a binary communication signal.

A portion of multi-operation control circuit 1b except signal generating circuit SG, valve B1, valve B2, and inverter 16 functions as a current limiting circuit which causes transistor 2 to limit current which flows through the light source.

Resistor R3 is for detecting the magnitude of current flowing through transistor 2, that is, current flowing through load circuit 53 which is a light source.

Resistor R8 is for limiting current which flows from constant voltage source 4a to a ground line via resistors R8 and R3, when valve B2 is on.

Resistors 9a and 11r are circuits which function as variable reference sources. Accordingly, resistors 9a and 11r detect the magnitude of voltage applied to multi-operation control circuit 1b when valve B1 is on. Specifically, the voltage at a point of connection between valve B1 and resistor 11r indicates the magnitude of a voltage applied to multi-operation control circuit 1b, and is input to the positive input terminal of amplifier 7 as a reference value via amplifier 13a (here, amplifier 13a functions as a buffer). A voltage applied to multi-operation control circuit 1b changes as shown by, for example, the output voltage in FIG. 51 or 56, according to a duty cycle. In FIG. 57A, the voltage applied to multi-operation control circuit 1b is input to the positive input terminal of amplifier 7, as a variable reference value. The variable reference value sets the current set value indicating the upper limit of current flowing through transistor 2 to an appropriate value according to the output voltage and the duty cycle.

Constant voltage source 4a generates constant voltage greater than or equal to the reference value.

Resistor 11r and capacitor 12c function as filters, and amplifier 13a functions as an impedance matching buffer. Resistor 14 and capacitor 15 function as noise cut filters.

As described above, in multi-operation control circuit 1b in FIG. 57A, valve B2 (for example, switch transistor) turns off a transistor by bringing the negative input terminal corresponding to the magnitude of current flowing through the light source to a substantially reference value level when the communication signal indicates off (when a communication signal is an L signal). Accordingly, multi-operation control circuit 1b can cause transistor 2 to perform the modulation operation.

The following describes a variation of multi-operation control circuit 1b.

FIG. 57C is a diagram illustrating a variation of a communication module which includes multi-operation control circuit 1b according to Embodiment 9. FIG. 57D is a truth table showing a communication signal from signal generating circuit SG in FIG. 57C, and states of valves B1 and B2 and transistor 2.

Multi-operation control circuit 1b in FIG. 57C differs from the circuit in FIG. 57A in that the connecting location of valve B2 is different, resistor 17 is further included, and constant voltage source 4a, inverter 16, and resistor R8 are excluded. The following mainly describes differences.

Valve B2 is connected to the positive input terminal corresponding to the reference value among the two input terminals of amplifier 7 and to the output terminal of amplifier 13a, and brings the level of the positive input terminal corresponding to the reference value among the two input terminals to a substantially ground level via resistor 17, by being off when a communication signal indicates off (when a communication signal is an L signal). Specifically, when the communication signal indicates off (when the communication signal is an L signal), the difference between the two input terminals becomes substantially zero, and transistor 2 is turned off.

On the other hand, when the communication signal indicates on (when the communication signal is an H signal), transistor 2 is in a conductive state, and functions as a current limiting element, as with the module in FIG. 57A.

The following describes another variation of multi-operation control circuit 1b.

Figures 57E, 57F:
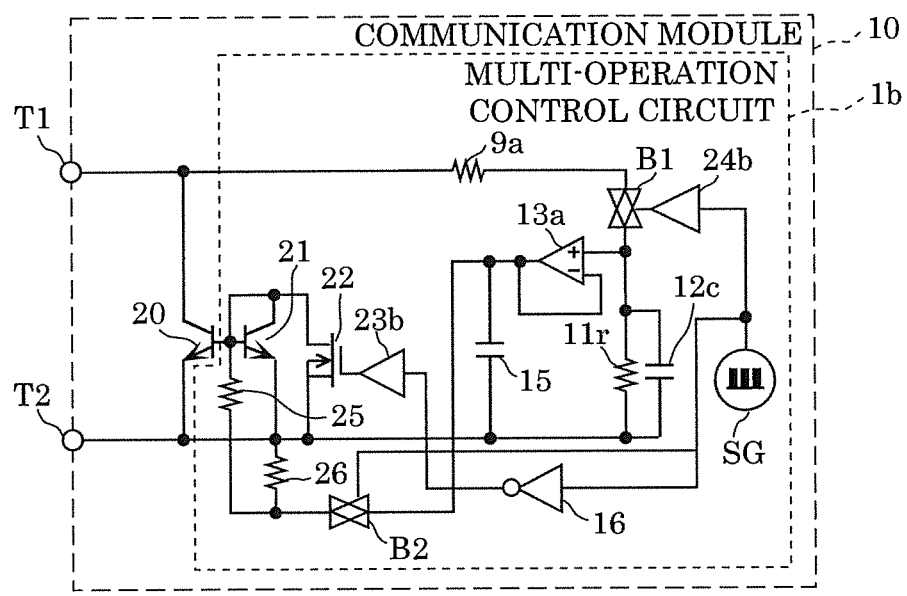
FIG. 57E is a diagram illustrating another variation of the communication module according to Embodiment 9.
FIG. 57F is a diagram illustrating a truth table showing a communication signal from a signal generating circuit in FIG. 57E, and operating states of two valves, a transistor, and a bipolar transistor in FIG. 57E.

FIG. 57E is a diagram illustrating another variation of a communication module which includes multi-operation control circuit 1b according to Embodiment 9. FIG. 57F is a truth table showing a communication signal from signal generating circuit SG in FIG. 57E and states of valves B1 and B2, transistor 22, and bipolar transistor 20 in FIG. 57E.

The module in FIG. 57E differs from the module in FIG. 57A in that bipolar transistors 20 and 21, transistor 22, buffers 23b and 24b, and resistor 26 are included instead of resistors R3 and R8, transistor 2, and amplifier 7. The following mainly describes differences.

Bipolar transistors 20 and 21 constitute a current mirror circuit, and achieve the same function as that of transistor 2 in FIGS. 57A and 57C. Specifically, when the communication signal indicates off (when the communication signal is an L signal), transistor 22 is turned off, the base signal to be applied to transistor 21 on the mirror side of the current mirror is set to substantially 0 V (or 0 A), and bipolar transistor 20 is turned off. At this time, valves B1 and B2 are open (off), and do not pass unnecessary current. When the communication signal indicates on (the communication signal is an H signal), valves B1 and B2 are closed (on), and transistor 22 is also on. At this time, the reference value from the output terminal of amplifier 13a is supplied to the base of bipolar transistor 20 as a base signal via valve B2 and resistor 25. In this manner, bipolar transistor 20 limits current which flows through bipolar transistor 20 to prevent the current from exceeding the current set value corresponding to a reference value.

Figure 58:
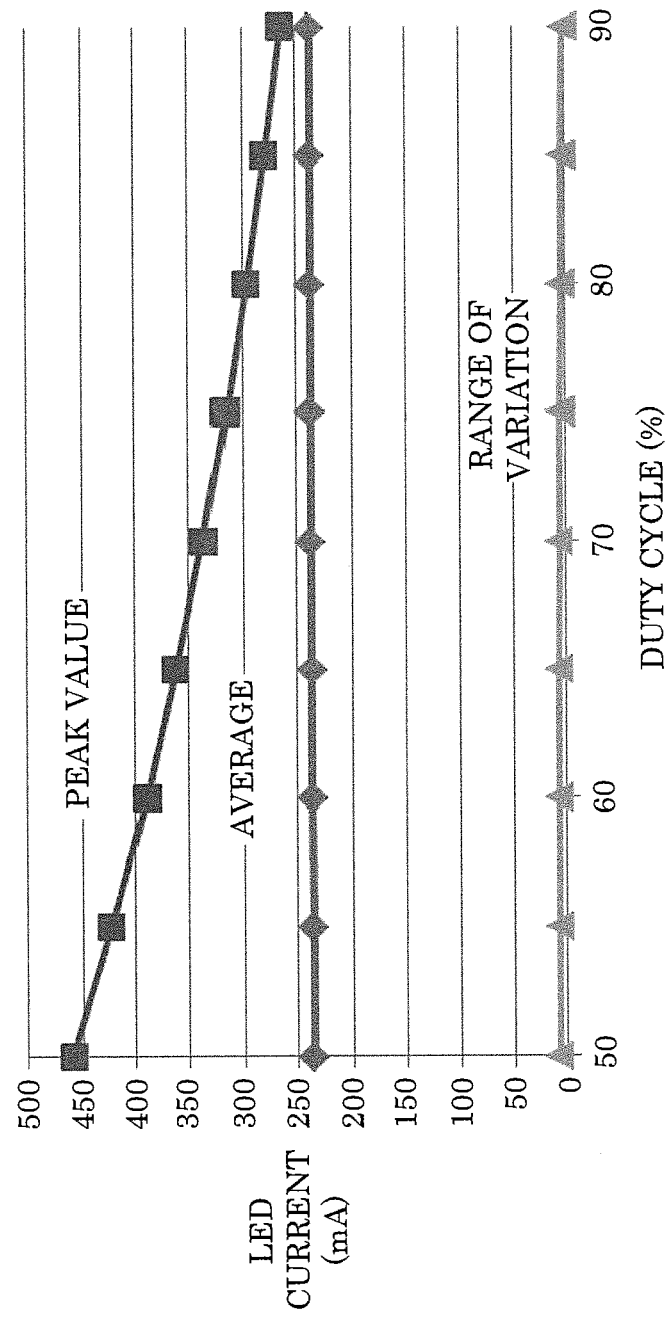
FIG. 58 is a diagram illustrating first simulation results for the example circuit in FIG. 57C.
Figure 59:
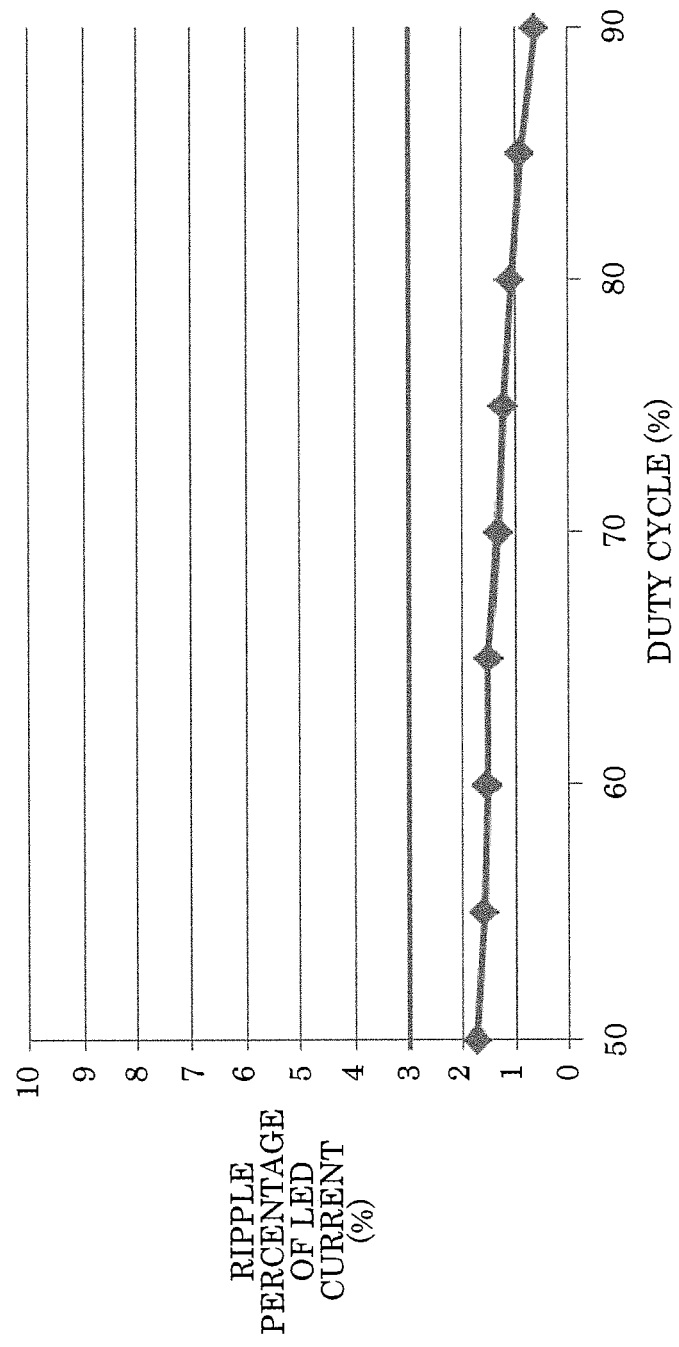
FIG. 59 is a diagram illustrating second simulation results for the example circuit in FIG. 57C.
Figure 60:
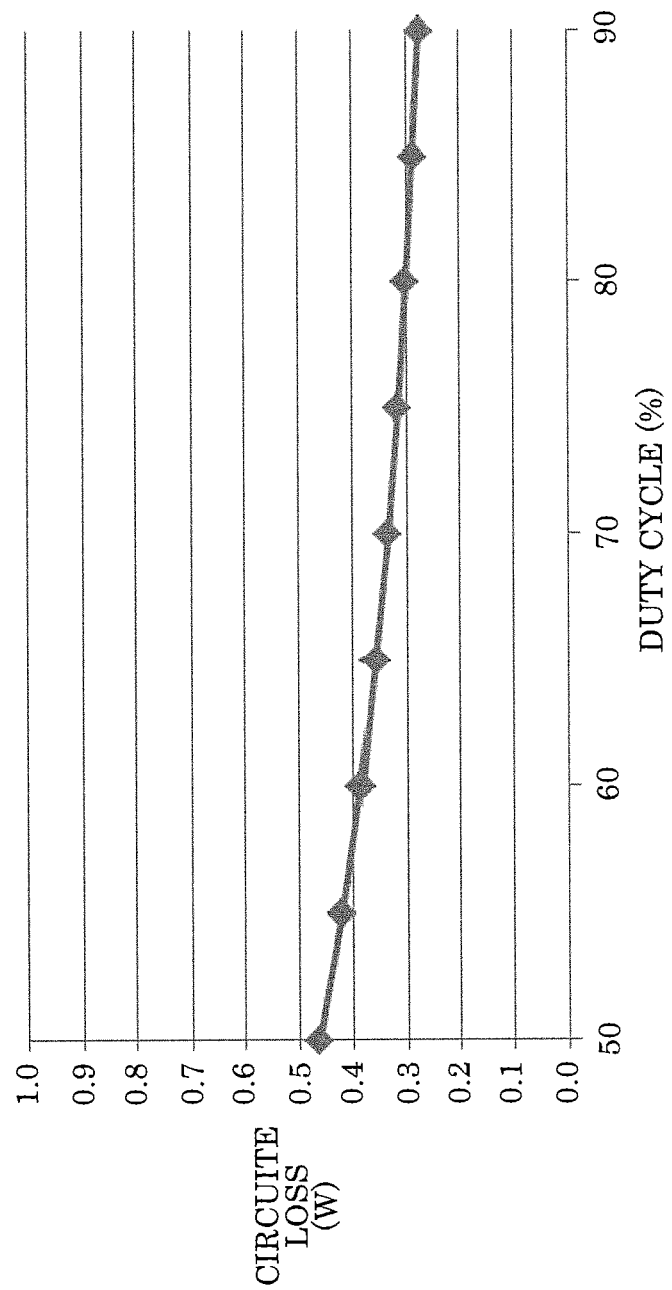
FIG. 60 is a diagram illustrating third simulation results for the example circuit in FIG. 57C.

The following describes simulation results for multi-operation control circuit 1b in FIG. 57C with reference to FIGS. 58 to 60.

FIG. 58 is a diagram illustrating first simulation results for the example circuit in FIG. 57C. FIG. 58 illustrates peak value, average, variation (that is, range of variation) of current flowing through multi-operation control circuit 1b (that is, the same as the LED current), according to the duty cycle of a modulating signal (that is, a communication signal) from signal generator SG. In this simulation, the capacitance of smoothing capacitor 65 is set to 20 μF, a frequency of a modulating signal is set to 2.4 kHz, and the duty cycle is changed from 50% to 90%. The peak value of the LED current shows substantially the same result as the current set value corresponding to the reference value illustrated in FIG. 52, and shows that overshoot is mitigated. The average of the LED current is substantially constant irrespective of the duty cycle, or in other words, the brightness appears to be constant to people. A variation of the LED current is substantially zero, and overshoot is mostly eliminated.

FIG. 59 is a diagram illustrating second simulation results for the example circuit in FIG. 57C. FIG. 59 illustrates a ripple percentage (variation percentage) of the LED current when the duty cycle is changed. The conditions of the simulations are the same as those in FIG. 58. As shown in FIG. 58, the ripple percentage is lower than 2%. Note that the ripple percentage disclosed here is obtained by dividing a square-wave shaped LED current that flows during a period when transistor 2 is on by an average current value, and is defined as follows.

Ripple percentage=(current peak value−current bottom value)/(2×average current value)

FIG. 60 illustrates third simulation results for the example circuit in FIG. 57C. FIG. 60 illustrates loss (that is, power consumption) caused by multi-operation control circuit 1b when the duty cycle is changed. The conditions of the simulations are the same as those in FIG. 58. As illustrated in FIG. 60, circuit loss is maintained lower than 0.5 W. This advantageous effect is achieved by inhibiting the occurrence of excessive power loss caused by multi-operation control circuit 1b by controlling current which flows through transistor 2 so that the current substantially has a target current set value.

Figure 61:
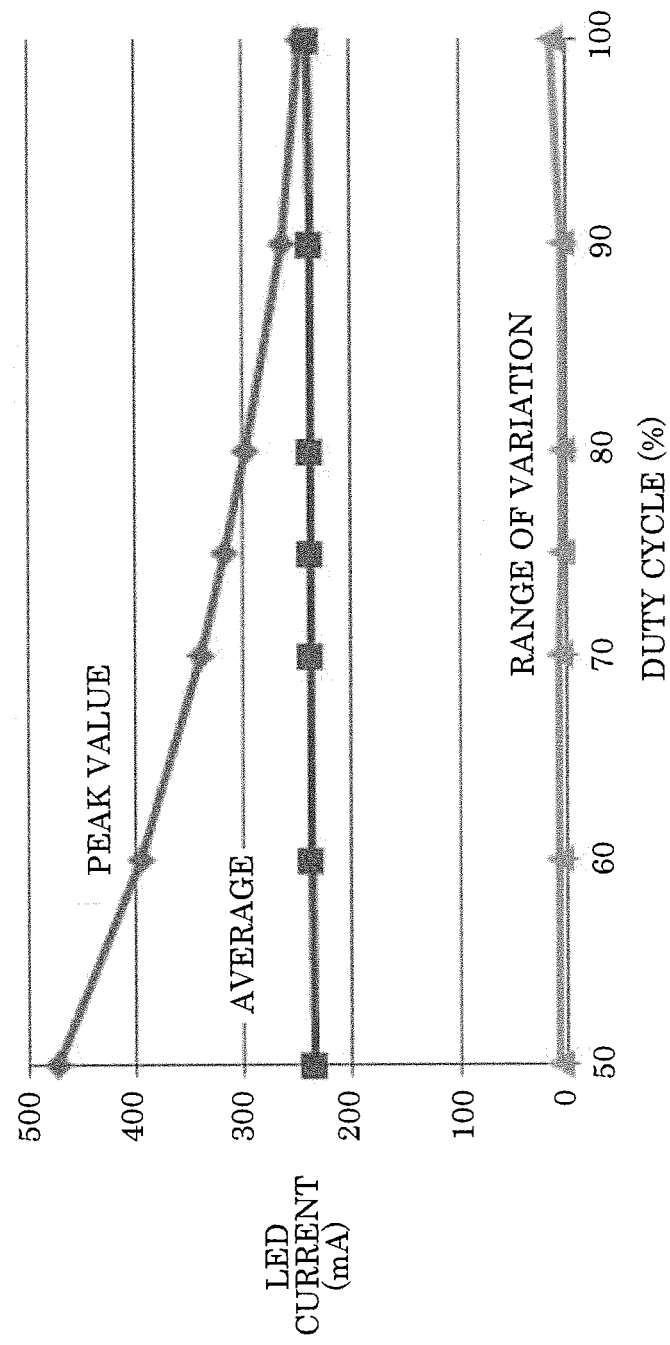
FIG. 61 is a diagram illustrating first simulation results for the example circuit in FIG. 57E.
Figure 62:
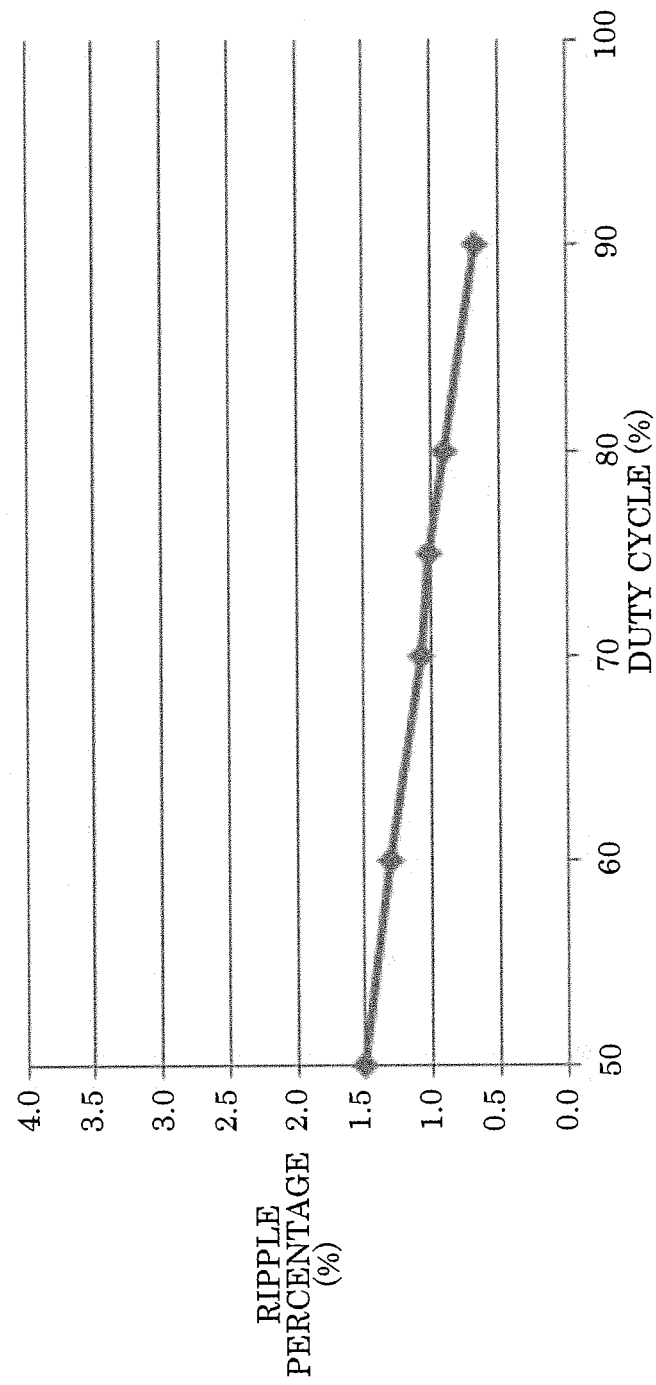
FIG. 62 is a diagram illustrating second simulation results for the example circuit in FIG. 57E.
Figure 63:
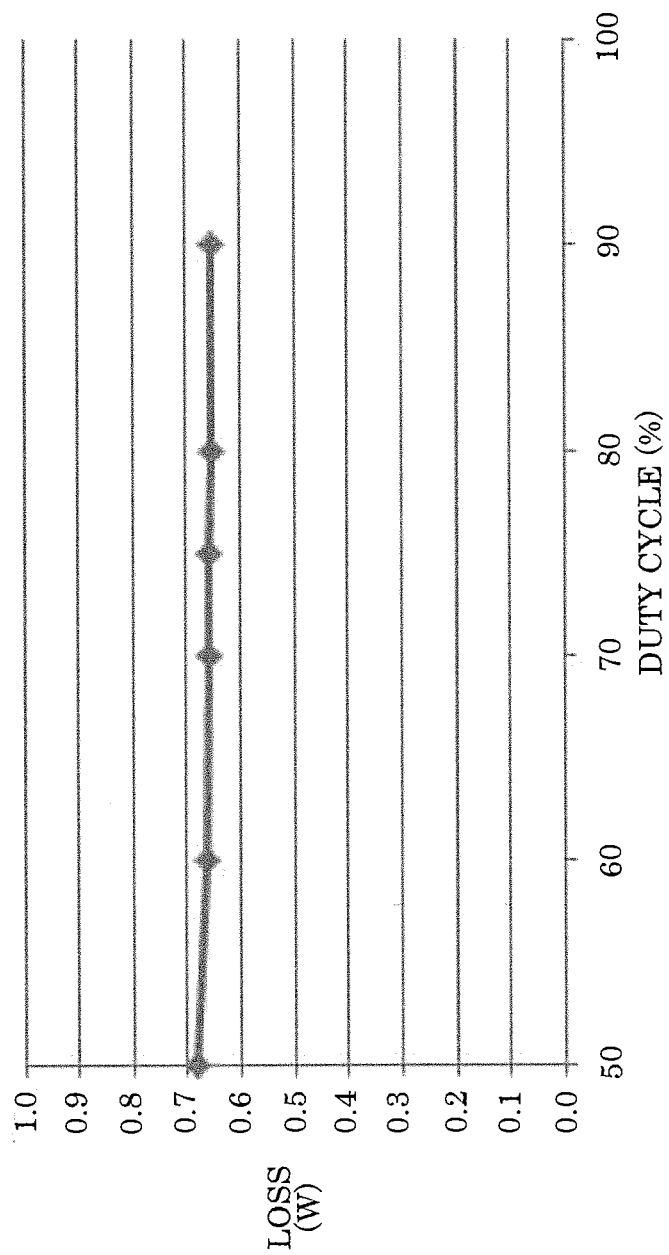
FIG. 63 is a diagram illustrating third simulation results for the example circuit in FIG. 57E.

The following describes simulation results for multi-operation control circuit 1b in FIG. 57E, with reference to FIGS. 61 to 63.

FIG. 61 illustrates first simulation results for the example circuit in FIG. 57E. FIG. 61 illustrates peak value, average, and variation (range of variation) of current flowing through multi-operation control circuit 1b (that is, the same as the LED current), according to a duty cycle of a modulating signal from signal generator SG. In the simulations, the capacitance of smoothing capacitor 65 is set to 20 μF, a frequency of a modulating signal is set to 2.4 kHz, and the duty cycle is changed from 50% to 100%. The peak value of the LED current shows substantially the same result as the current set value according to the reference value illustrated in FIG. 52, which shows that overshoot is mitigated. The average of the LED current is substantially constant irrespective of the duty cycle, or in other words, brightness appears to be constant to people. A variation of the LED current is substantially zero, and overshoot is mostly eliminated.

FIG. 62 is a diagram illustrating second simulation results for the example circuit in FIG. 57E. FIG. 62 illustrates a ripple percentage (variation percentage) of the LED current when the duty cycle is changed. The conditions of the simulations are the same as those in FIG. 61. As illustrated in FIG. 52, the ripple percentage is lower than 1.5%. Note that the ripple percentage mentioned here is the same as in the case of FIG. 59.

FIG. 63 illustrates third simulation results for the example circuit in FIG. 57E. FIG. 60 illustrates loss (that is, power consumption) caused by multi-operation control circuit 1b when the duty cycle is changed. The conditions of the simulations are the same as those in FIG. 61. As illustrated in FIG. 63, the circuit loss is maintained lower than 0.7 W. This advantageous effect is achieved by inhibiting occurrence of excessive power loss caused by multi-operation control circuit 1b, by controlling current which flows through transistor 2 so that the current substantially has a target current set value.

The following describes a variation of multi-operation control circuit 1b illustrated in FIG. 57A.

Figure 57G:
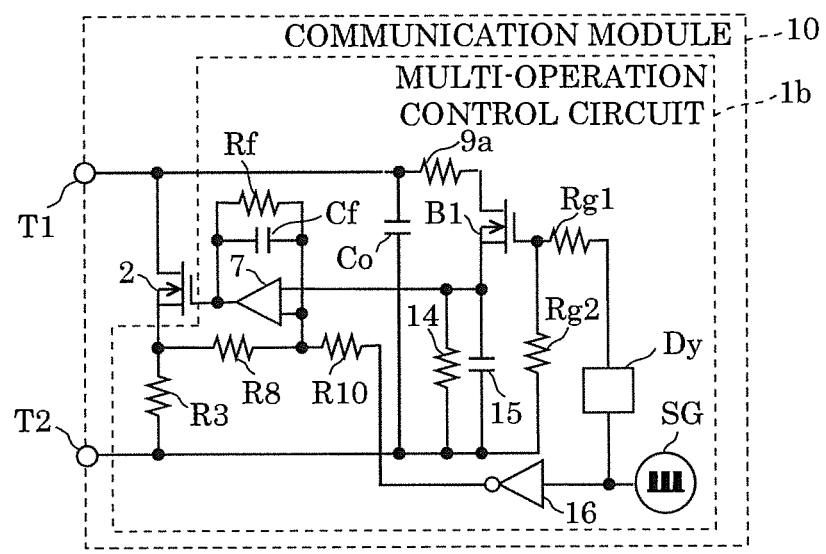
FIG. 57G is a diagram illustrating a configuration example of a communication module which includes a variation of a multi-operation control circuit in FIG. 57A.

FIG. 57G is a diagram illustrating a configuration example of communication module 10 which includes the variation of multi-operation control circuit 1b in FIG. 57A. Multi-operation control circuit 1b in FIG. 57G has a simplified configuration suitable for practical use, based on the configuration illustrated in FIG. 57A. The configuration illustrated in FIG. 57G differs from that in FIG. 57A in the following points. Specifically, an impedance matching circuit (amplifier 13a, resistor 11r, and capacitor 12c) is omitted, valve element B1 is replaced with a MOSFET, and gate resistor Rg1 and gate protective resistance Rg2 are further included.

An applied voltage during a period in which transistor 2 is off (a voltage which is applied to multi-operation control circuit 1b and gradually increases during the off period) is reliably prevented from being applied to the positive input terminal of amplifier 7, and thus delay circuit Dy which delays a rise of a signal from signal generating circuit SG is provided, and the output terminal of delay circuit Dy is connected to gate resistor Rg1 of the MOSFET (B1).

Furthermore, in FIG. 57G, valve B2 in FIG. 57A is omitted, and the output terminal of inverter 16 is connected to the negative input terminal of amplifier 7 via resistor 10, and also gain control resistor Rf and capacitor Cf serving as an integral element are connected between the output terminal and the negative input terminal of amplifier 7. Thus, transient characteristics due to on/off of transistor 2 can be adjusted. In particular, a rise time of a square-wave shaped waveform of a modulated LED current can be varied by changing the capacitance value of capacitor Cf, and thus capacitor Cf is convenient to make appropriate adjustment according to the reception sensitivity of a receiving device.

Note that capacitor Co provided between terminals T1 and T2 inhibits parasitic oscillation which may be caused due to the off operation of transistor 2, and is effective in noise reduction and prevention of malfunction.

Variation

The following describes a variation of the illumination light communication apparatus.

Figure 64:
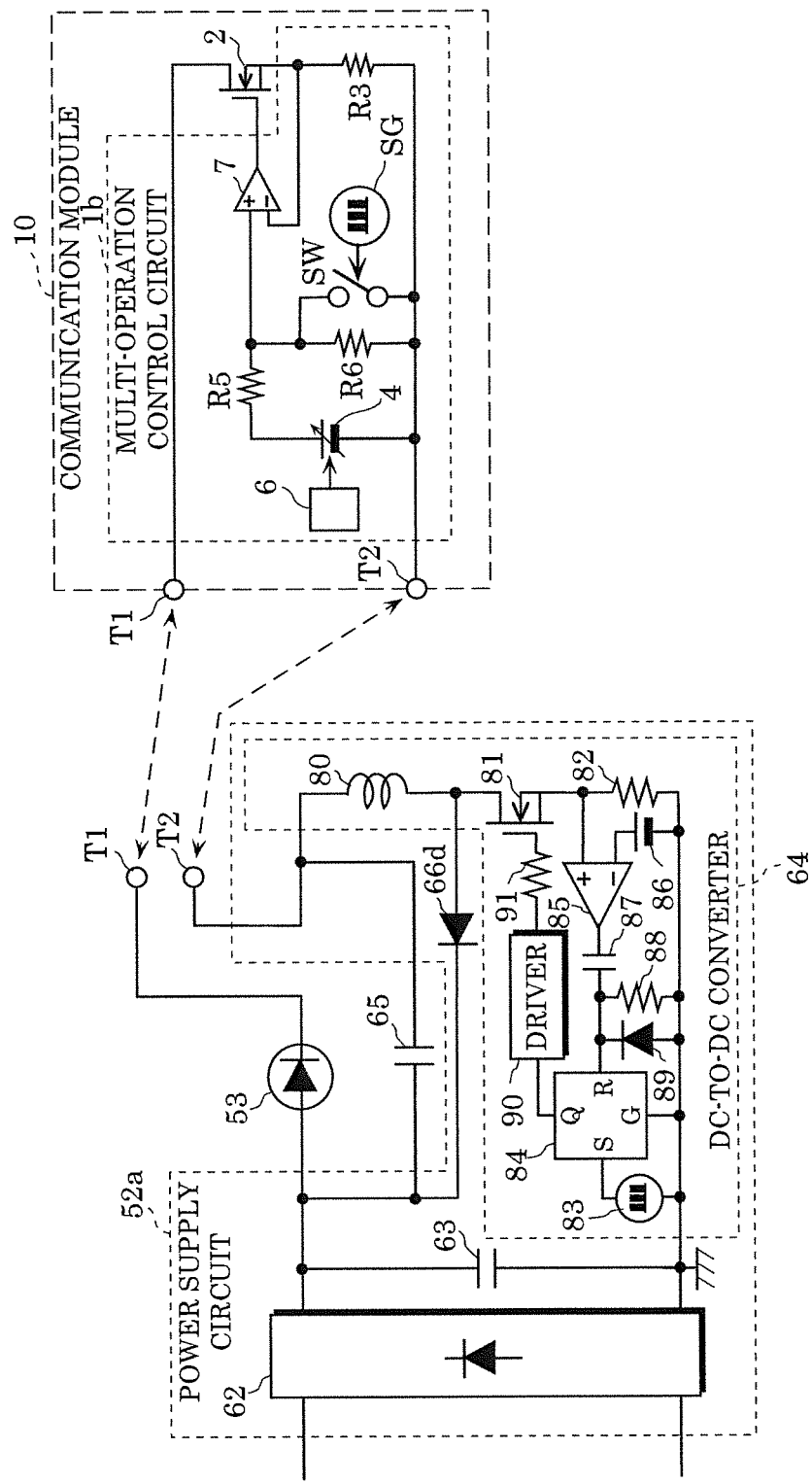
FIG. 64 is a circuit diagram illustrating a variation of the illumination light communication apparatus according to Embodiment 7.

FIG. 64 is a circuit diagram illustrating a variation of the illumination light communication apparatus according to Embodiment 7. The illumination light communication apparatus in FIG. 64 differs from the apparatus in FIG. 50A in the internal circuit configuration of power supply circuit 52a. The following mainly describes differences.

In power supply circuit 52a in FIG. 50A, constant-current feedback circuit 67 performs feedback control for maintaining an average of output current at a constant value, whereas power supply circuit 52a in FIG. 64 is configured to control a threshold of switching current.

Power supply circuit 52a in FIG. 64 includes rectifier bridge 62, capacitor 63, and DC-to-DC converter 64. DC-to-DC converter 64 includes inductor 80, switch element 81, diode 66d, resistor 82, signal source 83, flip-flop 84, comparator 85, constant voltage source 86, capacitor 87, resistor 88, diode 89, driver 90, and gate resistor 91.

Inductor 80, switch element 81, and diode 66d are basic circuit elements which constitute DC-to-DC converter 64 as a buck converter.

Control for turning on and off switch element 81 is performed by signal source 83, flip-flop 84, comparator 85, and peripheral circuits thereof, and the threshold of switching current through switch element 81 is controlled. Thus, the switching current also flows via load circuit 53 (light emitting diode), and controlling a threshold achieves an alternate function of constant-current feedback. Such operation of DC-to-DC converter 64 is as already described with reference to the waveform diagram in FIG. 30B.

Controlling a threshold of switching current in FIGS. 64 and 30B substitutes for constant-current feedback control in FIG. 50A, and maintains the average of output current at a constant value. In this manner, if multi-operation control circuit 1b is not included, the problem of overshoot occurs also in the apparatus in FIG. 64, as with the apparatus in FIG. 50A. However, the configuration in FIG. 64 includes multi-operation control circuit 1b as with the configuration in FIG. 50A, and thus overshoot can be reduced.

As described above, the illumination light communication apparatus according to Embodiments 7 to 9 is an illumination light communication apparatus which modulates illumination light in accordance with a communication signal includes: a light source which emits illumination light; transistor 2 connected in series to the light source at series; signal generating circuit SG which generates the communication signal which is a binary communication signal; and multi-operation control circuit 1b which causes transistor 2 to modulate the illumination light and limit current which flows through the light source.

According to this, transistor 2 serves as a switch element which performs the modulation operation and also as a current limiting element which performs the limiting operation, and thus contributes to the prevention of an increase in the number of circuit elements. By the limiting operation, overshoot which occurs in current flowing through the light source (that is, load circuit 53) at a moment when transistor 2 is brought from the off state to the on state is reduced, and accordingly error in reception by a receiving device can be reduced.

Here, multi-operation control circuit 1b causes transistor 2 to execute the modulation operation by generating a gate signal or a base signal that is input to the gate or base of transistor 2 in accordance with a communication signal, and may determine the level of the gate signal or the base signal to prevent current which flows through the light source from exceeding the current set value in the limiting operation, when the communication signal indicates on among on and off.

According to this configuration, the transistor can limit current which flows through the light source, according to the level of the gate signal or the base signal.

Here, multi-operation control circuit 1b may include: current sensing circuit R3 which detects the magnitude of current flowing through the light source; reference source 4 which outputs a reference value corresponding to the current set value; amplifier 7 which has two input terminals to which the magnitude of the current and the reference value are input, amplifies a difference between the two input terminals, and outputs the amplified signal as the gate signal or the base signal; and a switching circuit which is connected to at least one of the two input terminals, and reduces the difference to substantially zero when the communication signal indicates.

This configuration allows modulation operation to be performed by reducing the difference between the two input terminals to substantially zero, when the communication signal indicates off.

Here, the switching circuit may include a switch transistor, and the switch transistor may bring the level of an input terminal corresponding to the reference value among the two input terminals to a substantially ground level, by being in a conductive state when the communication signal indicated off.

According to this configuration, when the communication signal indicates off, modulation operation can be performed by bringing the input terminal corresponding to the reference value to a substantially ground level.

Here, a terminal of the switch transistor may be connected to the input terminal corresponding to the reference value among the two input terminals, and the other terminal of the switch transistor may be connected to a line substantially having a ground potential.

Here, multi-operation control circuit $1b$ may further include resistance element 17 connected between the input terminal corresponding to the reference value and a line substantially having the ground potential, and a terminal of the switch transistor may be connected to the input terminal corresponding to the reference value among the two input terminals, and the other terminal of the switch transistor may be connected to the reference source.

Here, the switching circuit may include a switch transistor, and the switch transistor may bring the level of the input terminal corresponding to the magnitude of the current among the two input terminals to a substantially reference value level, by being in a conductive state when the communication signal indicates off.

According to this configuration, modulation operation can be performed by bringing the input terminal corresponding to the magnitude of the current to a substantially reference value level, when the communication signal indicates off.

Here, a terminal of the switch transistor may be connected to the input terminal corresponding to the magnitude of the current among the two input terminals, and the other terminal of the switch transistor may be connected to a line substantially having the level of the reference value.

Here, multi-operation control circuit $1b$ may further include feedback capacitor Cf connected between the output terminal of the amplifier and the input terminal corresponding to the magnitude of the current among the two input terminals, and feedback resistor element Rf connected parallel to the feedback capacitor.

According to this configuration, gain can be controlled by feedback resistor element Rf, and capacitor Cf serving as an integral element is included, and thus transient characteristics due to on/off of transistor 2 can be adjusted. In particular, feedback capacitor Cf can determine a rise time of modulated LED current having a square-wave shaped waveform, according to the capacitance value of feedback capacitor Cf, and thus is convenient to make appropriate adjustment according to the receive sensitivity of a receiving device.

Here, multi-operation control circuit $1b$ may further include capacitor element Co connected between a ground line and a terminal on the power supply line side of the transistor.

This configuration can suppress parasitic noise which may occur due to the off operation of the transistor, and is effective in noise reduction and prevention of malfunction.

Here, the switching circuit may include: switch element B1 connected to and input terminal to which the reference value is input among the two input terminals, and turned on and off in accordance with the communication signal; resistance element R10 connected to an input terminal corresponding to the magnitude of the current among the two input terminals; and inverter 16 which outputs an inversion signal obtained by inverting the communication signal to the input terminal corresponding to the magnitude of the current via the resistance element, and multi-operation control circuit $1b$ may further include delay circuit Dy provided at a signal line which conveys the communication signal from the signal generating circuit to the switch element.

According to this configuration, the delay circuit which delays the communication signal from signal generating circuit SG or the inverted signal is provided, and the delayed communication signal is output to the control terminal of switch element B1. This reliably prevents voltage applied to multi-operation control circuit $1b$ during a period when transistor 2 is off (the voltage gradually increases in the off period) from being applied to the positive input terminal of the amplifier, and prevents a value from being the reference value.

Here, the reference source may output the variable reference value, according to the duty cycle of the communication signal or a voltage applied to multi-operation control circuit $1b$.

According to this configuration, the reference value can be optimized dynamically, and thus current limiting operation can also be optimized.

Here, the illumination light communication apparatus may include the light source connected in series, and a power supply circuit which supplies current to the transistor, and the power supply circuit may perform feedback control for maintaining an average of the current to be supplied at a constant value.

Here, the power supply circuit may include DC-DC converter 64 which is a buck converter which includes inductor 80 and switch element 81, detect the magnitude of current flowing through the switching element, and control on and off of the switching element according to a difference between the detected value and a predetermined value.

According to this configuration, even when the DC-DC converter which controls the threshold of switching current is included as a power supply circuit, overshoot can be reduced effectively.

The communication module according to the embodiments is a communication module which is attachable to a lighting apparatus and modulates illumination light, and includes: a transistor which is to be connected in series to a light source included in the lighting apparatus; a signal generating circuit which generates a binary communication signal; and current limiting circuit $1b$ which is connected in series to the light source and the switch, and limits current which causes the transistor to modulate the illumination light and limit current which flows through the light source.

According to this, the communication module can be added to an existing lighting device. Specifically, a light communication function can be added easily and achieved at a lower cost than the case where a new optical-communication lighting device is installed by utilizing the existing lighting device as it is. Furthermore, overshoot which occurs in current flowing through a light source at a moment when on/off switch SW is brought from the off state to the on state, and thus error in reception by a receiving device can be reduced. The transistor functions both as the switch element which performs the modulation operation and as the current limiting element which performs the limiting operation, and thus contributes to a reduction in the number of circuit elements.

Embodiment 10

An illumination light communication apparatus and a communication module according to Embodiment 10 reduce reception error in a visible light communication and achieve a stable circuit operation.

An illumination light communication apparatus according to Embodiment 10 includes: a light source which emits illumination light; a switch which is connected in series to the light source and intermittently interrupts current which flows through the light source; a modulating-signal generator which generates a modulating signal which controls on and off of the switch to modulate the illumination light; a current limiting circuit which is connected in series to the light source and the switch and limits current which flows through the light source so that current through the light source does not exceed a current set value; and a controller which changes the current set value, wherein the switch is connected in series between the light source and the current limiting circuit. The current limiting circuit is also connected to ground potential.

Moreover, a communication module according to Embodiment 10 is attachable to a lighting apparatus and modulates illumination light which is emitted by the lighting apparatus, the communication module including: a switch which is to be connected in series to a light source included in the lighting apparatus and intermittently interrupts current which flows through the light source; a modulating-signal generator which generates a modulating signal which controls on and off of the switch to modulate the illumination light; and a current limiting circuit which is connected in series to the light source and the switch and limits current which flows through the light source so that current through the light source does not exceed a current set value, wherein the switch is connected in series between the light source and the current limiting circuit. The current limiting circuit is also connected to ground potential.

According to the illumination light communication apparatus and the communication module of Embodiment 10, reception error in the visible light communication is reduced and stable circuit operation is achieved.

[10.1 Configuration of Illumination Light Communication Apparatus]

Figure 65:
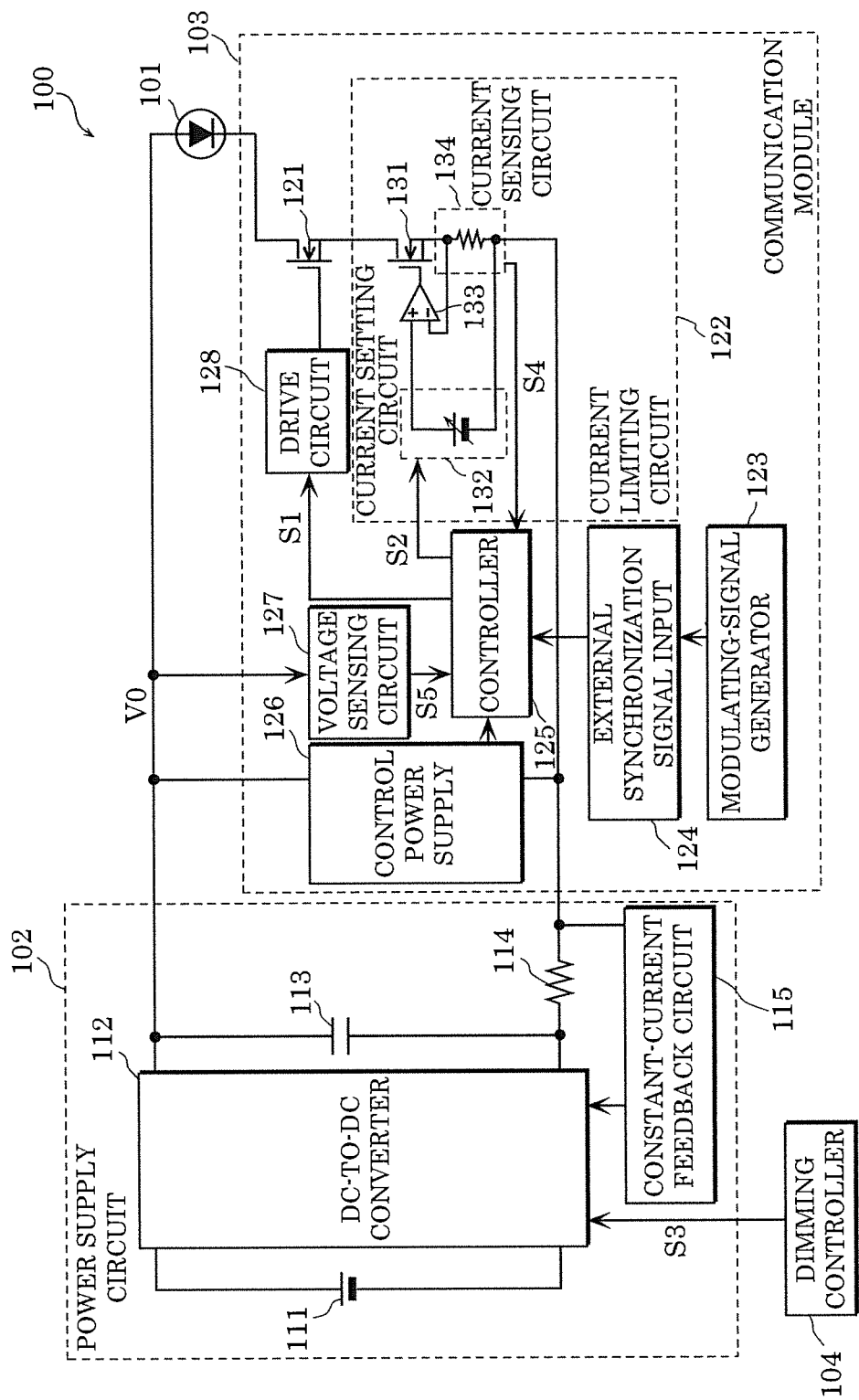
FIG. 65 is a block diagram of an illumination light communication apparatus according to Embodiment 10.

Initially, a configuration of the illumination light communication apparatus according to Embodiment 10 is described. FIG. 65 is a block diagram illustrating the configuration of illumination light communication apparatus 100 according to Embodiment 10.

Illumination light communication apparatus 100 illustrated in FIG. 65 functions as a visible light communication transmitter which transmits a signal by modulating an intensity of illumination light. Illumination light communication apparatus 100 includes light source 101, power supply circuit 102, communication module 103, and dimming controller 104.

Light source 101 includes at least one light-emitting element (e.g., LED), and emits the illumination light.

Power supply circuit 102 supplies light source 101 with power. Power supply circuit 102 includes power supply 111, DC-to-DC converter 112, capacitor 113, sense resistor 114, and constant-current feedback circuit 115.

Power supply 111 outputs a direct-current (DC) voltage to DC-to-DC converter 112. DC-to-DC converter 112 converts the DC voltage supplied from power supply 111 into desired voltage V0, and outputs voltage V0 to light source 101. Capacitor 113 is connected between output terminals of DC-to-DC converter 112.

Sense resistor 114 is used to detect current through light source 101. Constant-current feedback circuit 115 controls output voltage V0 on DC-to-DC converter 112 so that a constant current flows through sense resistor 114, that is, through light source 101.

DC-to-DC converter 112 controls output voltage V0, based on dimming signal S3 output from dimming controller 104.

Communication module 103 is detachable from a lighting apparatus which includes light source 101 and power supply circuit 102. As communication module 103 is detached from the lighting apparatus, the cathode of light source 101 and the GND terminal of power supply circuit 102 are shorted. In other words, the lighting apparatus not supporting the visible light communication can achieve a visible light communication function by having communication module 103 attached thereto.

Communication module 103 includes modulation switch 121, current limiting circuit 122, modulating-signal generator 123, external synchronization signal input 124, controller 125, control power supply 126, voltage sensing circuit 127, and drive circuit 128.

Modulating-signal generator 123 generates a modulating signal, based on a communication signal which is transmitted through the visible light communication. It should be noted that modulating-signal generator 123 may repeatedly generate a modulating signal indicative of an ID unique to illumination light communication apparatus 100, or may generate the modulating signal according to a communication signal input from an external apparatus.

External synchronization signal input 124 supplies controller 125 with the modulating signal generated by modulating-signal generator 123.

Controller 125 is configured of a microcomputer (e.g., CPU). Controller 125 generates binary modulating signal S1, based on the modulating signal supplied from external synchronization signal input 124, and supplies modulating signal S1 to a control terminal (gate terminal) of modulation switch 121 via drive circuit 128.

Control power supply 126 generates, from voltage V0 output from power supply circuit 102, power supply voltage for controller 125 and supplies the power supply voltage to controller 125. Voltage sensing circuit 127 detects output voltage V0 of power supply circuit 102.

Modulation switch 121 is connected to light source 101 in series, and intermittently interrupts the current which is supplied from power supply circuit 102 to light source 101. Modulation switch 121 is, for example, a transistor (e.g., MOSFET).

Current limiting circuit 122 is connected to light source 101 and modulation switch 121 in series and controls the current which flows through light source 101. Specifically, current limiting circuit 122 limits (clips) the current which flows through light source 101 so that current through light source 101 does not exceed current set value Is.

Current limiting circuit 122 includes transistor 131 which is a MOSFET, current setting circuit 132, amplifier 133, and current sensing circuit 134 which is a resistor connected to the source of transistor 131.

Current setting circuit 132 outputs a reference value to the positive input terminal of amplifier 133. The reference value defines an upper limit (current set value Is) of the current that can flow through light source 101. For example, the reference value is proportional to current set value Is. Current setting circuit 132 outputs the reference value that is variable and according to current command value S2 generated by controller 125. It should be noted that current setting circuit 132 may output a fixed reference value.

Transistor 131 is connected to light source 101 and modulation switch 121 in series, and limits (clips) the current which flows through light source 101, based on the reference value.

Current sensing circuit 134 is a source resistor for detecting a magnitude of the current through light source 101. Current sensing circuit 134 has a transistor 131-side terminal connected to the negative input terminal of amplifier 133.

Amplifier 133 has the positive input terminal connected to current setting circuit 132, and the negative input terminal connected to the source terminal of transistor 131. Amplifier 133 amplifies a difference between the reference value output from current setting circuit 132 and the current value detected by current sensing circuit 134, and outputs the amplified difference to the gate of transistor 131.

It should be noted that the circuit configuration illustrated in FIG. 65 is by way of example, and illumination light communication apparatus 100 need not include all the components illustrated in FIG. 65. For example, illumination light communication apparatus 100 may include at least one of dimming controller 104 and voltage sensing circuit 127.

The configuration of power supply circuit 102 is also by way of example, and power supply circuit 102 is not limited thereto. For example, power supply circuit 102 may be provided, without sense resistor 114 and constant-current feedback circuit 115. Moreover, DC-to-DC converter 112 may perform the constant-current control. For example, DC-to-DC converter 112 may control the switching current threshold. Alternatively, power supply circuit 102 may perform constant-voltage control, instead of performing the constant-current control. For example, power supply circuit 102 may include a constant-voltage feedback circuit, instead of including sense resistor 114 and constant-current feedback circuit 115, or DC-to-DC converter 112 may instead perform the constant-voltage control.

The configuration of current limiting circuit 122 is also by way of example and current limiting circuit 122 is not limited thereto insofar as current limiting circuit 122 can the limit (clip) the current which flows through light source 101. For example, current limiting circuit 122A, 122B, or 122C illustrated in FIGS. 66 to 68 may be used in place of current limiting circuit 122. It should be noted that terminal T1 and terminal T2 illustrated in FIGS. 66 to 68 are respectively connected to modulation switch 121 and the GND terminal of power supply circuit 102.

Figure 66:
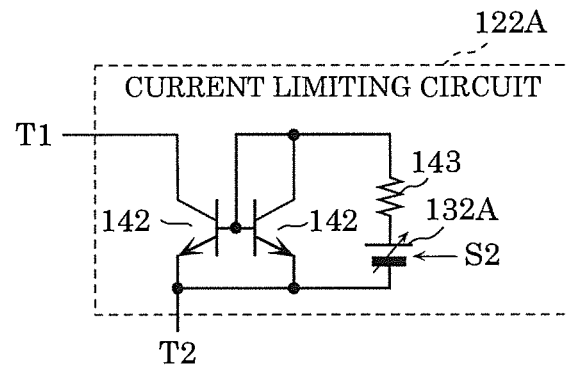
FIG. 66 is a diagram illustrating an example of a current limiting circuit according to Embodiment 10.

Current limiting circuit 122A illustrated in FIG. 66 includes bipolar transistors 141 and 142, current setting circuit 132A which is a variable voltage source, and resistor 143. Bipolar transistors 141 and 142 form a current mirror circuit. Current which flows through bipolar transistor 142 depends on a voltage output from current setting circuit 132A and a resistance of resistor 143. Bipolar transistor 141 is allowed to pass current not exceeding a current (i.e., current set value Is) equal to the current through bipolar transistor 142 times its current mirror ratio. Current setting circuit 132A changes output voltage, according to current command value S2 output from controller 125.

Figure 67:
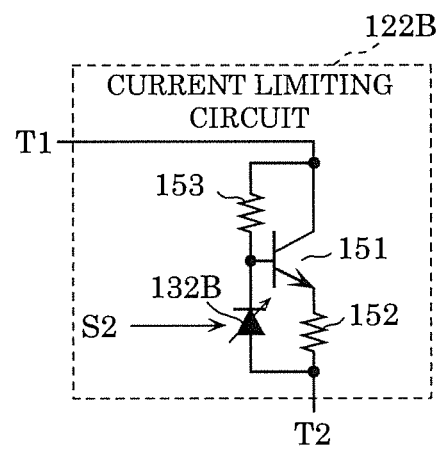
FIG. 67 is a diagram illustrating another example of the current limiting circuit according to Embodiment 10.
Figure 68:
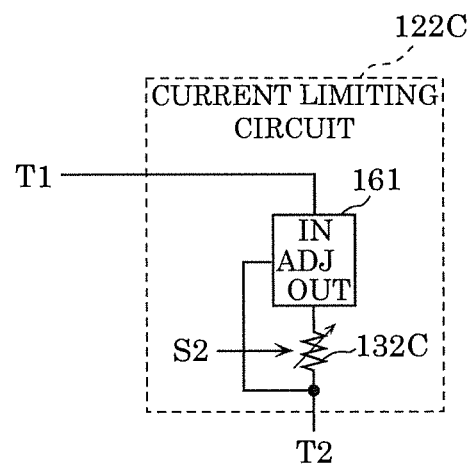
FIG. 68 is a diagram illustrating another example of the current limiting circuit according to Embodiment 10.

Current limiting circuit 122B illustrated in FIG. 67 includes bipolar transistor 151, emitter resistor 152, bias resistor 153, and current setting circuit 132B which is a Zener diode.

Bipolar transistor 151 is connected to light source 101 and modulation switch 121 in series. The current which flows through light source 101 is limited according to a base voltage (reference value) of bipolar transistor 151.

Emitter resistor 152 is for detecting the magnitude of the current through light source 101 (i.e., current through emitter resistor 152).

Bias resistor 153 is for biasing the base voltage of bipolar transistor 151.

Current setting circuit 132B outputs to the base of bipolar transistor 151 the reference value according to current command value S2 output from controller 125.

Current limiting circuit 122C illustrated in FIG. 68 includes three-terminal regulator 161 and current setting circuit 132C which is a sense resistor.

Three-terminal regulator 161 has input terminal IN and output terminal OUT which are connected to light source 101 and modulation switch 121 in series, and regulates a current flowing between input terminal IN and output terminal OUT, according to a voltage input to adjustment terminal ADJ.

Current setting circuit 132C is for detecting the magnitude of the current through light source 101 (i.e., current through current setting circuit 132C). Current setting circuit 132C is a variable resistor and its resistance is changed according to current command value S2 output from controller 125. Moreover, current setting circuit 132C is connected between output terminal OUT of three-terminal regulator 161 and terminal T2 which is connected to adjustment terminal ADJ of three-terminal regulator 161.

[10.2 Basic Operation]

Figure 69:
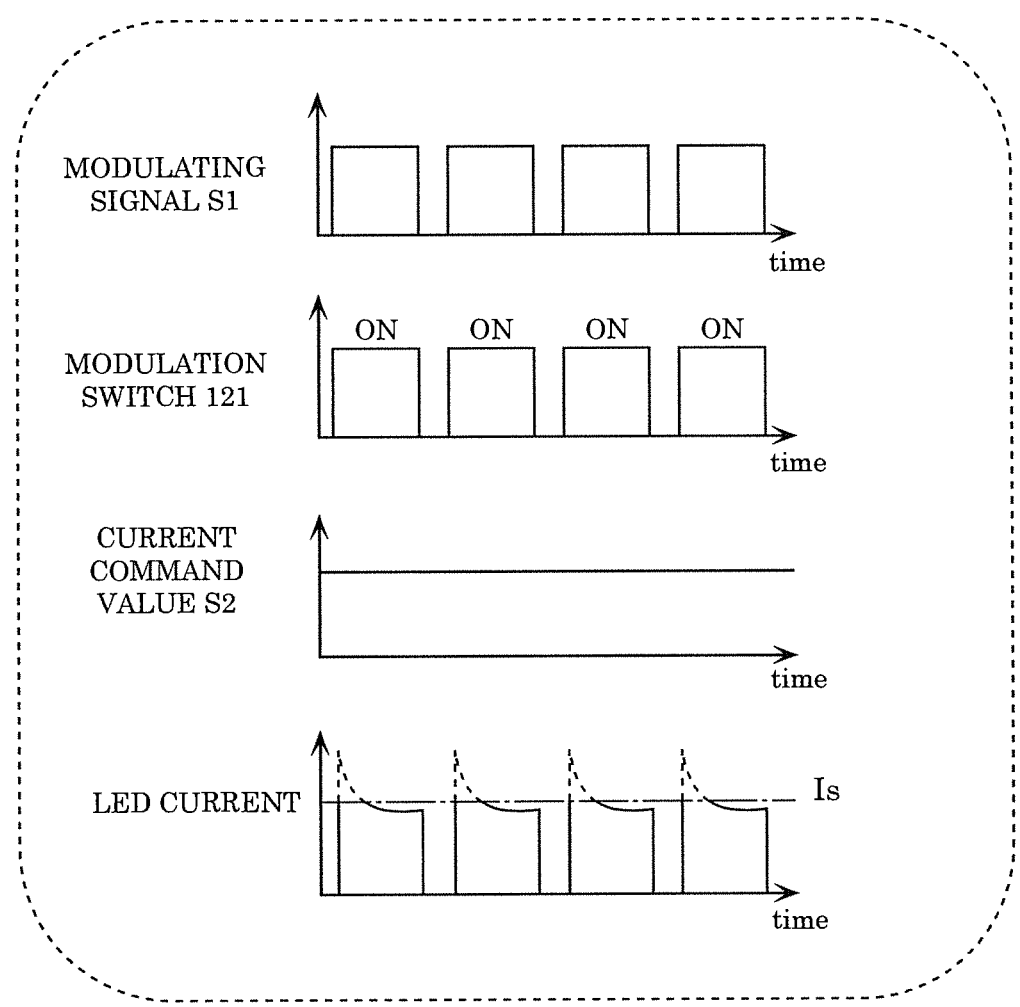
FIG. 69 is a diagram illustrating an example of operation of the illumination light communication apparatus according to Embodiment 10.

In the following, a basic operation of illumination light communication apparatus 100 is described. FIG. 69 is a diagram illustrating a basic operation of illumination light communication apparatus 100. As illustrated in FIG. 69, modulation switch 121 turns on/off according to modulating signal S1. The modulation scheme as used herein, complies with, for example, 1-4 PPM transmission scheme defined by JEITA-CP1223. Specifically, 2-bit data is converted into a 4-slot pulse. Three of the four slots are always high (on) and the remaining one slot is always low (off).

In the example illustrated in FIG. 69, current command value S2 is constant and current set value Is is constant.

Here, when the illumination light is modulated for visible light communication, overshoot is caused immediately after modulation switch 121 turns on, as illustrated in dotted lines in FIG. 69. The overshoot is an instant increase of LED current which is the current through light source 101. Due to the occurrence of overshoot, a visible light receiver may not correctly receive a signal.

On the other hand, illumination light communication apparatus 100 according to Embodiment 10 includes current limiting circuit 122, thereby limiting the maximum value of the LED current to current set value Is. This can suppress the occurrence of overshoot as illustrated in FIG. 69. This allows a reduction of reception error through the visible light communication.

While constant-current feedback circuit 115 illustrated in FIG. 65 has a function of providing a constant LED current, it should be noted that the constant-current control performed by constant-current feedback circuit 115 has a relatively great time constant. In other words, the constant-current control can provide a constant average current in a predetermined period, but cannot mitigate the overshoot that instantly occurs as illustrated in FIG. 69.

Figure 70:
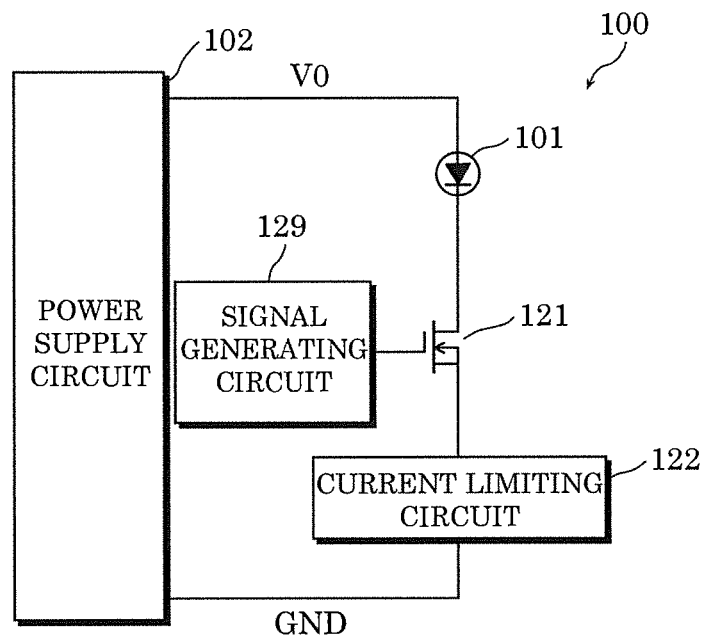
FIG. 70 is a diagram showing a schematic illustration of the illumination light communication apparatus according to Embodiment 10.

Further, in Embodiment 10, as illustrated in FIG. 70, light source 101, modulation switch 121, and current limiting circuit 122 are connected in series in listed order between the power supply terminal and GND terminal of power supply circuit 102. In the meantime, as the connection between light source 101, modulation switch 121 and current limiting circuit 122, it can also be contemplated that light source 101, current limiting circuit 122, and modulation switch 121 are connected in listed order as illumination light communication apparatus 100A illustrated in FIG. 71.

Figure 71:
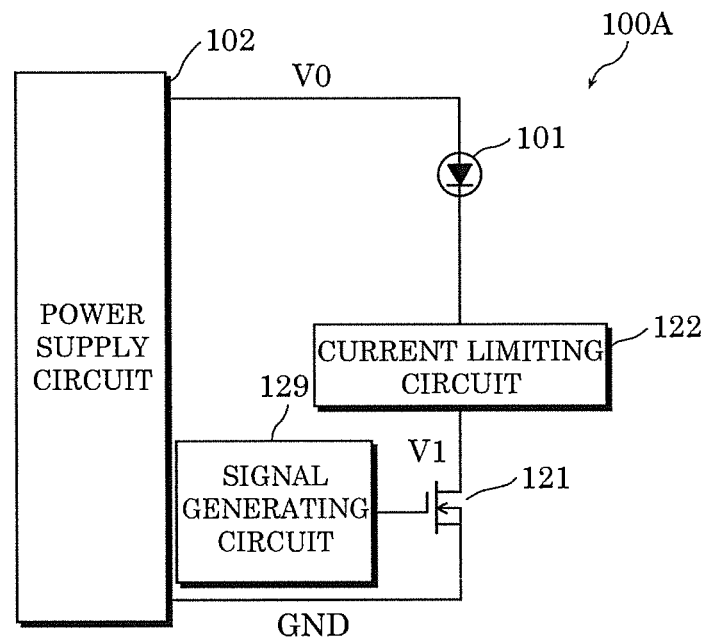
FIG. 71 is a diagram showing a schematic illustration of an illumination light communication apparatus according to Comparative Example of Embodiment 10.

However, in the connection as illustrated in FIG. 71, current limiting circuit 122 is not connected to the GND terminal of power supply circuit 102 and thus the operation of current limiting circuit 122 is unstable. Specifically, GND (V1) of current limiting circuit 122 is floating while modulation switch 121 is in the off-state. Thus, potential variation in the GND is great. On the other hand, in Embodiment 10, current limiting circuit 122 is always connected to the GND terminal by employing the connection as illustrated in FIG. 70, and thus the operation of current limiting circuit 122 is stable, irrespective of the state of modulation switch 121.

Particularly when current set value Is that is variable is used, the connection as illustrated in FIG. 71 cannot accurately control micro-current and thus has difficulty in accurately controlling current set value Is. On the other hand, the connection as illustrated in FIG. 70 allows accurate control over micro-current and thus allows accurate control over current set value Is. Further, in Embodiment 10, GND of controller 125 (GND of control power supply 126), which is the microcomputer that generates current command value S2, and GND of current limiting circuit 122 are common and thus current set value Is can more accurately be controlled.

It should be noted that signal generating circuit 129 illustrated in FIGS. 70 and 71 generates binary modulating signal S1 which controls on and off of modulation switch 121 to modulate the illumination light, and includes modulating-signal generator 123, external synchronization signal input 124, controller 125, and drive circuit 128 illustrated in FIG. 65.

While the modulation scheme in the above description is 100%-modulation scheme which completely blocks the LED current during an off-period, it should be noted that a scheme may be used in which the LED current is reduced during an off-period less than an on-period. However, the above-mentioned overshoot is particularly prominent in 100%-modulation scheme. Thus, the method according to Embodiment 10 is effective particularly when 100%-modulation scheme is used.

As described above, illumination light communication apparatus 100 according to Embodiment 10 includes: light source 101 which emits illumination light; modulation switch 121 which is connected in series to light source 101 and intermittently interrupts current which flows through light source 101; modulating-signal generator 123 which generates modulating signal S1 which controls on and off of modulation switch 121 to modulate the illumination light; current limiting circuit 122 which is connected in series to light source 101 and modulation switch 121 and limits current which flows through light source 101 so that current through the light source does not exceed current set value Is; and controller 125 which changes current set value Is, wherein modulation switch 121 is connected in series between light source 101 and current limiting circuit 122.

This can suppress the occurrence of overshoot by current limiting circuit 122, thereby reducing reception error in the visible light communication. Moreover, since light source 101, modulation switch 121 and current limiting circuit 122 are connected in series in listed order, current limiting circuit 122 is supplied with the GND potential, irrespective of the state of modulation switch 121. Thus, a stable circuit operation is achieved.

Moreover, illumination light communication apparatus 100 can set current set value Is properly for a state by changing current set value Is. Further, since current limiting circuit 122 is supplied with the GND potential, irrespective of the state of modulation switch 121, current set value Is which should be controlled accurately is controlled stably.

Moreover, communication module 103 according to Embodiment 10 is attachable to a lighting apparatus and modulates illumination light which is emitted by the lighting apparatus, communication module 103 including: modulation switch 121 which is to be connected in series to light source 101 included in the lighting apparatus and intermittently interrupts current which flows through light source 101; modulating-signal generator 123 which generates modulating signal S1 which controls on and off of modulation switch 121 to modulate the illumination light; and current limiting circuit 122 which is connected in series to light source 101 and modulation switch 121 and limits current which flows through light source 101 so that current through the light source does not exceed current set value Is, wherein modulation switch 121 is connected in series between light source 101 and current limiting circuit 122.

This allows the occurrence of overshoot to be suppressed by current limiting circuit 122, thereby reducing reception error in the visible light communication. Moreover, since light source 101, modulation switch 121, and current limiting circuit 122 are connected in series in listed order, current limiting circuit 122 is supplied with the GND potential, irrespective of the state of modulation switch 121. Thus, a stable circuit operation is achieved.

[10.3 First Example of Control Over Current Set Value]

In the following, examples of control over current set value Is are described. While methods for controlling current set value Is are described below, it should be noted that only one of the methods may be used or some of the methods may be combined for use.

Figure 72:
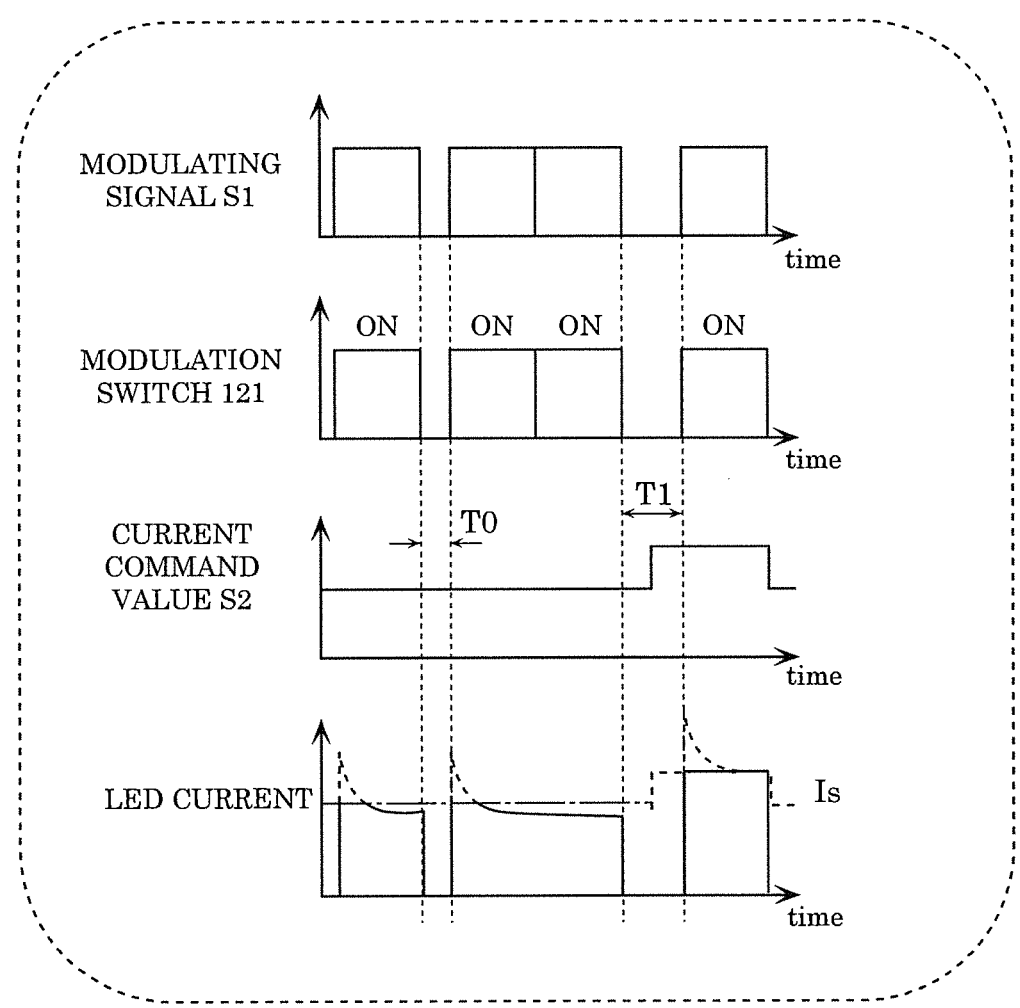
FIG. 72 is a diagram illustrating a first example of control over a current set value according to Embodiment 10.

FIG. 72 is a diagram illustrating a first example of control over current set value Is. In the first control example, controller 125 changes current command value S2 (current set value Is) according to a length of an off-period of modulation switch 121 (low period of modulating signal S1). Specifically, controller 125 sets higher current set value Is for a longer off-period. In other words, when the off-period is a first length, controller 125 sets current set value Is to a first value, and when the off-period is a second length longer than the first length, controller 125 sets current set value Is to a second value greater than the first value. For example, when a modulation according to 4 PPM is performed in which a period corresponding to the first slot is represented by T0 and a period corresponding to the second slot is represented by T1, when an off-period is shorter than a threshold that is longer than T0 and shorter than T1, controller 125 sets current set value Is to a first value, and when the off-period is longer than the threshold, controller 125 sets current set value Is to a second value greater than the first value.

Alternatively, controller 125 may calculate a partial duty cycle of modulating signal S1, and change current command value S2 (current set value Is) according to the partial duty cycle. Specifically, controller 125 sets lower current set value Is for a higher partial duty cycle. In other words, controller 125 may set current set value Is in inversely proportional to a partial duty cycle. Stated differently, when the partial duty cycle is a first proportion, controller 125 sets current set value Is to the first value, and when the partial duty cycle is a second proportion greater than the first proportion, controller 125 sets current set value Is to the second value less than the first value.

The "partial duty cycle," as used herein, refers to a proportion of an on (high)-period of modulating signal S1 in a predetermined period. For example, the "partial duty cycle" is an on-period proportion of a combination of an immediately preceding off-period and an on-period immediately preceding the off-period. Alternatively, the "partial duty cycle" may be a moving average of immediately preceding n bits in modulating signal S1.

Here, a magnitude of overshoot depends on a length of an off-period (partial duty cycle). Thus, overshoot can be mitigated more appropriately by changing current set value Is according to a length of the off-period (partial duty cycle).

If a length of off-period (partial duty cycle) is variable, the longer the off-period is, the greater the average luminance value reduces. Thus, in order to provide a constant average luminance value, the luminance value in an on-period needs to be increased for a long off-period. By controlling current set value Is in the manner as described above, current set value Is can appropriately be changed even to control the luminance value as such.

[10.4 Second Example of Control Over Current Set Value]

Figure 73:
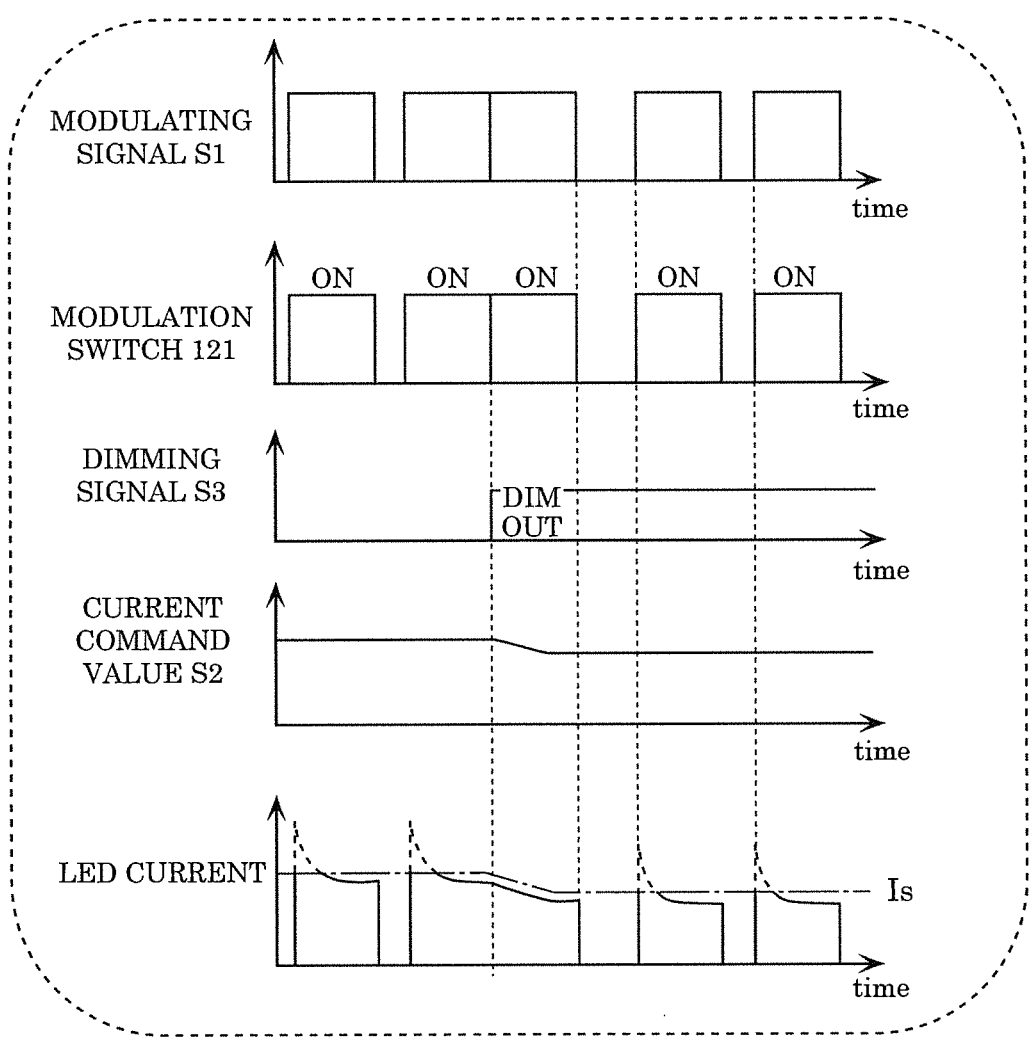
FIG. 73 is a diagram illustrating a second example of the control over the current set value according to Embodiment 10.

FIG. 73 is a diagram illustrating a second example of the control over current set value Is. In the second control example, controller 125 changes current command value S2 (current set value Is), according to dimming signal S3. For example, dimming signal S3 is generated by dimming controller 104 as a user dims (changes brightness) illumination light. Power supply circuit 102 changes output voltage V0 according to dimming signal S3, to change the current which flows through light source 101. This changes the brightness of the illumination light.

FIG. 73 illustrates an example of dimming operation. If controller 125 is instructed by dimming signal S3 to dim the illumination light, controller 125 sets current command value S2 (current set value Is) low. In other words, controller 125 sets current set value Is, according to a dimming level of light source 101. Specifically, controller 125 sets higher current set value Is for a higher (brighter) dimming level. In other words, controller 125 sets current set value Is to a first value when the dimming level is a first level, and sets current set value Is to a second value greater than the first value when the dimming level is a second level higher than the first level.

By controlling current set value Is as such, current set value Is can appropriately be changed according to a dimming level.

Also as illustrated in FIG. 73, controller 125 starts reducing current command value S2 moderately at a moment instructed by dimming signal S3 to dim the illumination light. This allows a reduction of current command value S2 following the change of the dimming level (brightness), thereby inhibiting an increase of loss due to a rapid reduction of current command value S2.

[10.5 Third Example of Control Over Current Set Value]

Figure 74:
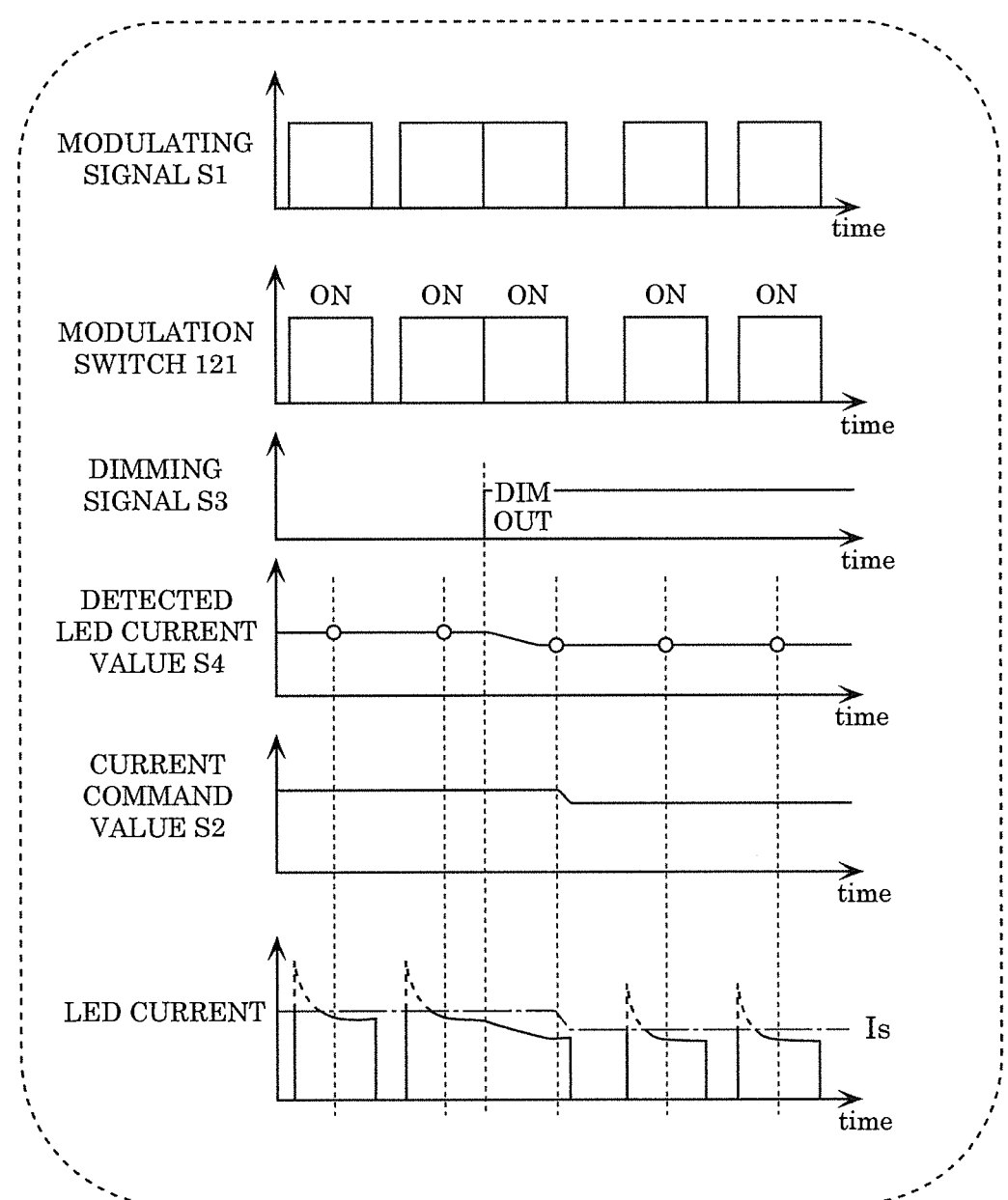
FIG. 74 is a diagram illustrating a third example of the control over the current set value according to Embodiment 10.

FIG. 74 is a diagram illustrating a third example of the control over current set value Is. In the third control example, controller 125 changes current command value S2 (current set value Is), according to detected LED current value S4 which is an LED current (current through light source 101) detected by current sensing circuit 134. Specifically, controller 125 sets lower current set value Is for a smaller LED current. In other words, when the LED current is a first current value, controller 125 sets current set value Is to a first value, and when the LED current is a second current value less than the first current value, controller 125 sets current set value Is to a second value less than the first value.

This allows, for example, when the dimming level is changed as illustrated in FIG. 74, current set value Is to be appropriately changed according to a dimming level. Moreover, as described with reference to FIG. 72, current set value Is can also be changed appropriately to change a luminance value (LED current) according to a length (partial duty cycle) of an off-period. This can inhibit an increase of loss which occurs, for example, when illumination light is dimmed.

Figure 75:
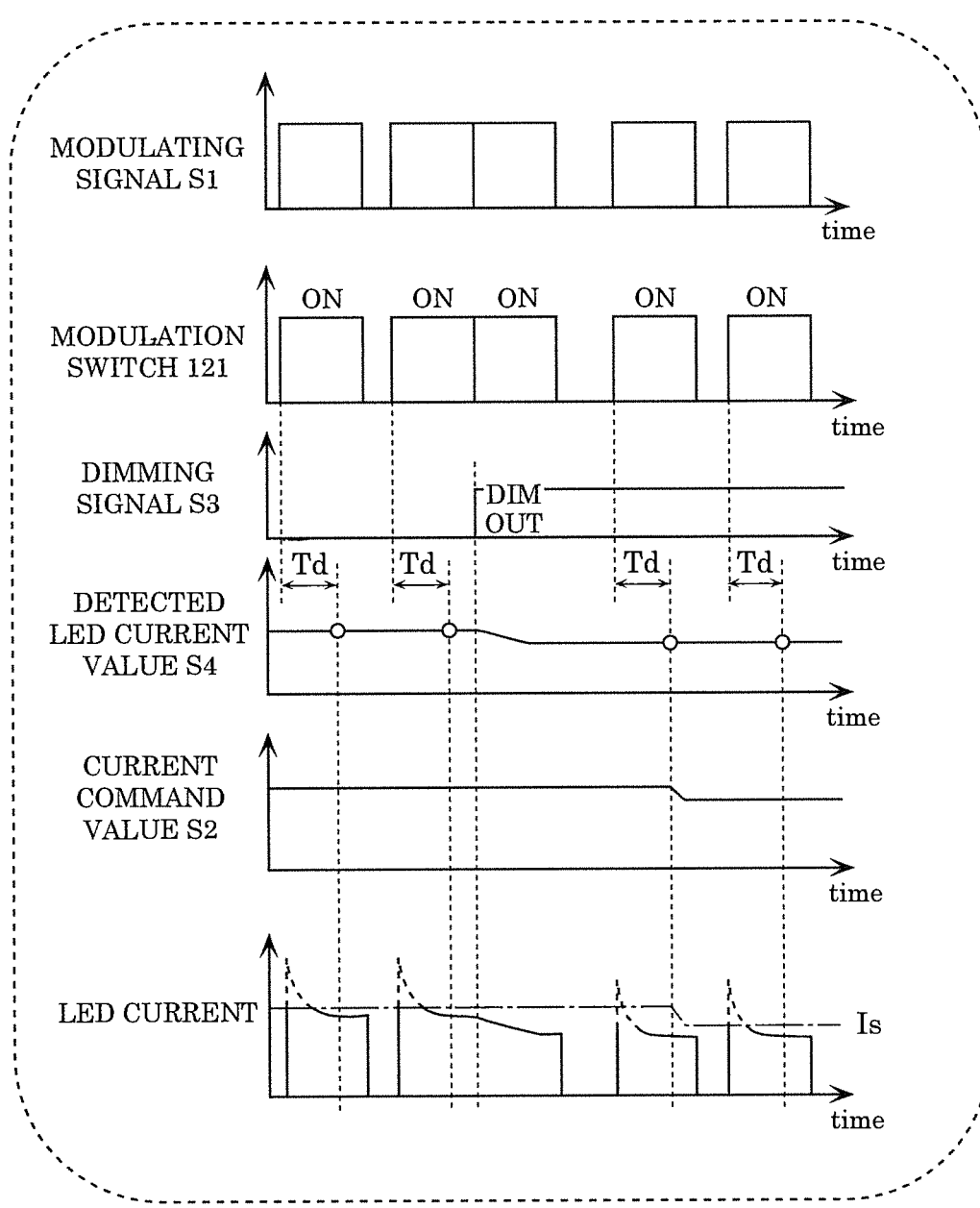
FIG. 75 is a diagram illustrating a variation of the third example of the control over the current set value according to Embodiment 10.

As illustrated in FIG. 74, preferably, the LED current is detected when no overshoot is caused and the current value is stable. For example, as illustrated in FIG. 75, current sensing circuit 134 detects the LED current after predetermined delay time Td has elapsed since a rising edge (a moment modulation switch 121 turns on) of modulating signal S1. This allows accurate detection of the LED current.

While current sensing circuit 134 included in current limiting circuit 122 in FIG. 65 is made use also for the LED current detection, it should be noted that a current sensing circuit separate from current sensing circuit 134 included in current limiting circuit 122 may be provided to detect the LED current and the result of detection may be used for the above control.

[10.6 Fourth Example of Control Over Current Set Value]

Figure 76:
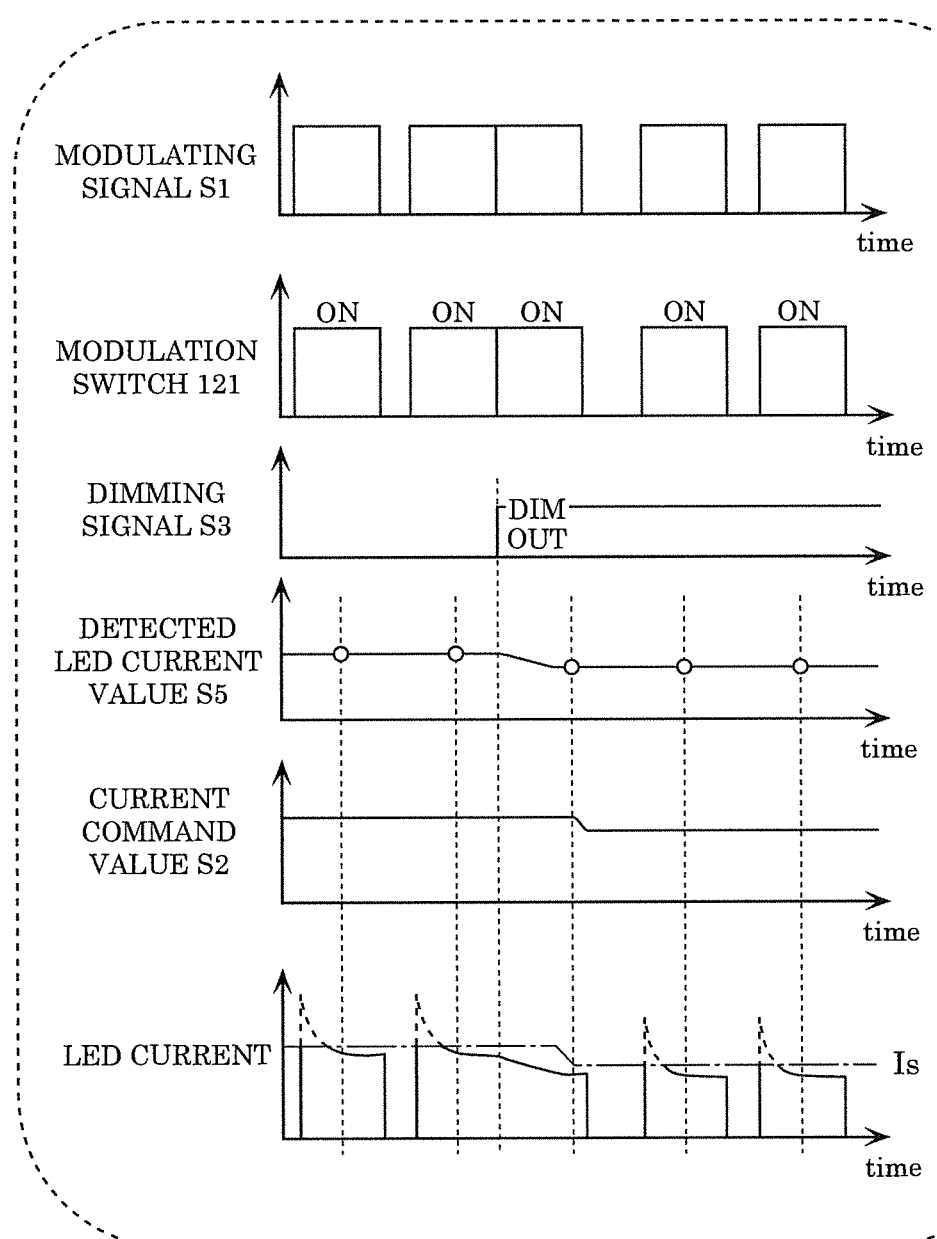
FIG. 76 is a diagram illustrating a fourth example of the control over the current set value according to Embodiment 10.

FIG. 76 is a diagram illustrating a fourth example of the control over current set value Is. In the fourth control example, controller 125 changes current command value S2 (current set value Is), according to detected LED current value S5 which is voltage V0 detected by voltage sensing circuit 127. Voltage V0, as used herein, is a voltage applied to light source 101. Specifically, controller 125 sets lower current set value Is for smaller voltage V0. In other words, controller 125 sets current set value Is to a first value when voltage V0 is a first voltage, and sets current set value Is to a second value lower than the first value when voltage V0 is a second voltage less than the first voltage.

Here, voltage V0 varies in the same manner as the LED current. Thus, the above control yields the same advantageous effects as the third control example.

It should be noted that the timing at which voltage V0 is detected may be controlled in the same manner as the LED current is detected. In other words, as with the case illustrated in FIG. 75, voltage sensing circuit 127 may detect voltage V0 after predetermined delay time Td has elapsed since a rising edge (a moment modulation switch 121 turns on) of modulating signal S1.

[10.7 Example of Use of Illumination Light Communication Apparatus]

Figure 77:
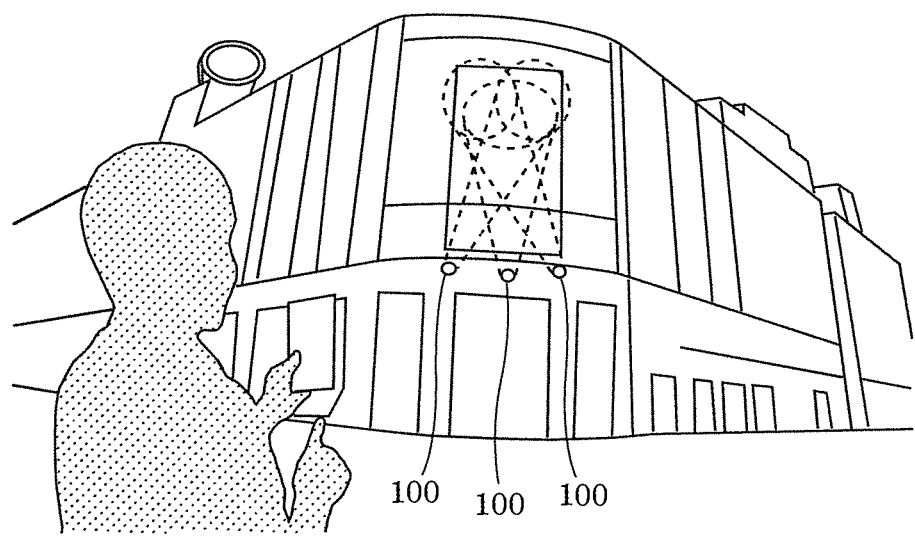
FIG. 77 is a diagram illustrating an example of use of the illumination light communication apparatus according to Embodiment 10.

In the following, an example of use of illumination light communication apparatus 100 is described. FIG. 77 is a diagram illustrating an example of use of illumination light communication apparatus 100. For example, as illustrated in FIG. 77, illumination light communication apparatus 100 is an RGB floodlight. As a user captures, by a visible light receiver such as a smart phone, a video of light emitted by illumination light communication apparatus 100, the visible light receiver receives a visible light signal.

Figure 78:
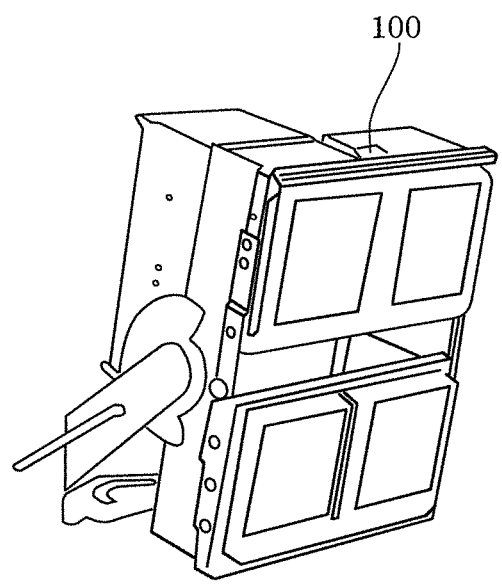
FIG. 78 is a diagram illustrating an example of the appearance of the illumination light communication apparatus according to Embodiment 10.

FIG. 78 is a diagram illustrating the appearance of illumination light communication apparatus 100 which is an RGB floodlight.

Figure 79:
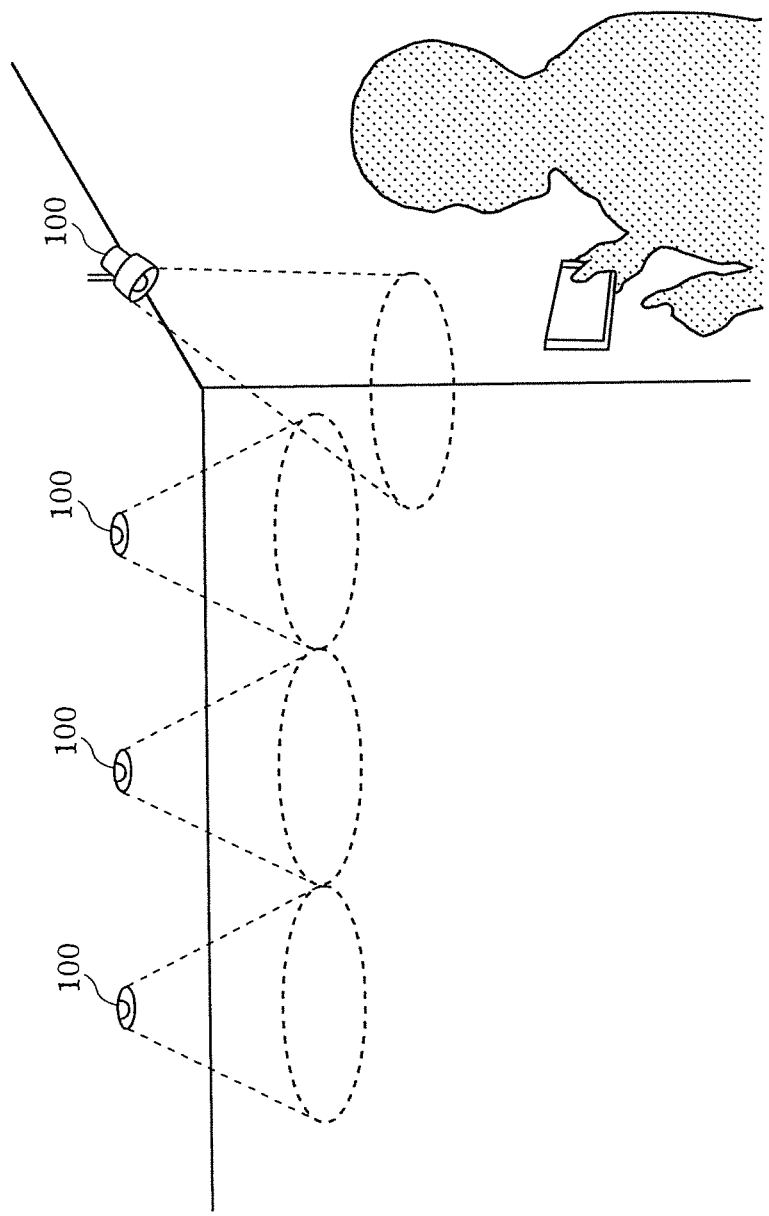
FIG. 79 is a diagram illustrating another example of use of the illumination light communication apparatus according to Embodiment 10.

FIG. 79 is a diagram illustrating another example of use of illumination light communication apparatus 100. For example, as illustrated in FIG. 79, illumination light communication apparatus 100 is an RGB spotlight. As a user captures, by a visible light receiver such as a smart phone, a video of light emitted by illumination light communication apparatus 100, the visible light receiver receives a visible light signal.

Embodiment 11

Control circuit 6 in current limiting circuit 1 as illustrated in, for instance, FIG. 1A can be configured as an analog circuit or as a digital circuit. Embodiment 11 describes an example in which control circuit 6 is configured as a digital circuit.

An illumination light communication apparatus according to an aspect of Embodiment 11 includes: a light source which emits illumination light; a switch which is connected in series to the light source, and intermittently interrupts current which flows through the light source; a signal generating circuit which generates a binary communication signal which controls on and off of the switch to modulate the illumination light; and a current limiting circuit which is connected in series to the light source and the switch, and limits the current which flows through the light source to prevent the current from exceeding a current set value corresponding to a reference value, the current limiting circuit includes: a reference source which outputs the reference value; a transistor which is connected in series to the light source and the switch, and limits the current which flows through the light source, based on the reference value; and a control circuit which includes a shift register which shifts and stores n-bit data in the binary communication signal, where n is an integer of 2 or more, and the control circuit calculates a partial duty cycle of a part of the binary communication signal based on the n-bit data, and determines the reference value according to the partial duty cycle.

[11.1 Configuration of Illumination Light Communication Apparatus]

Figure 80:
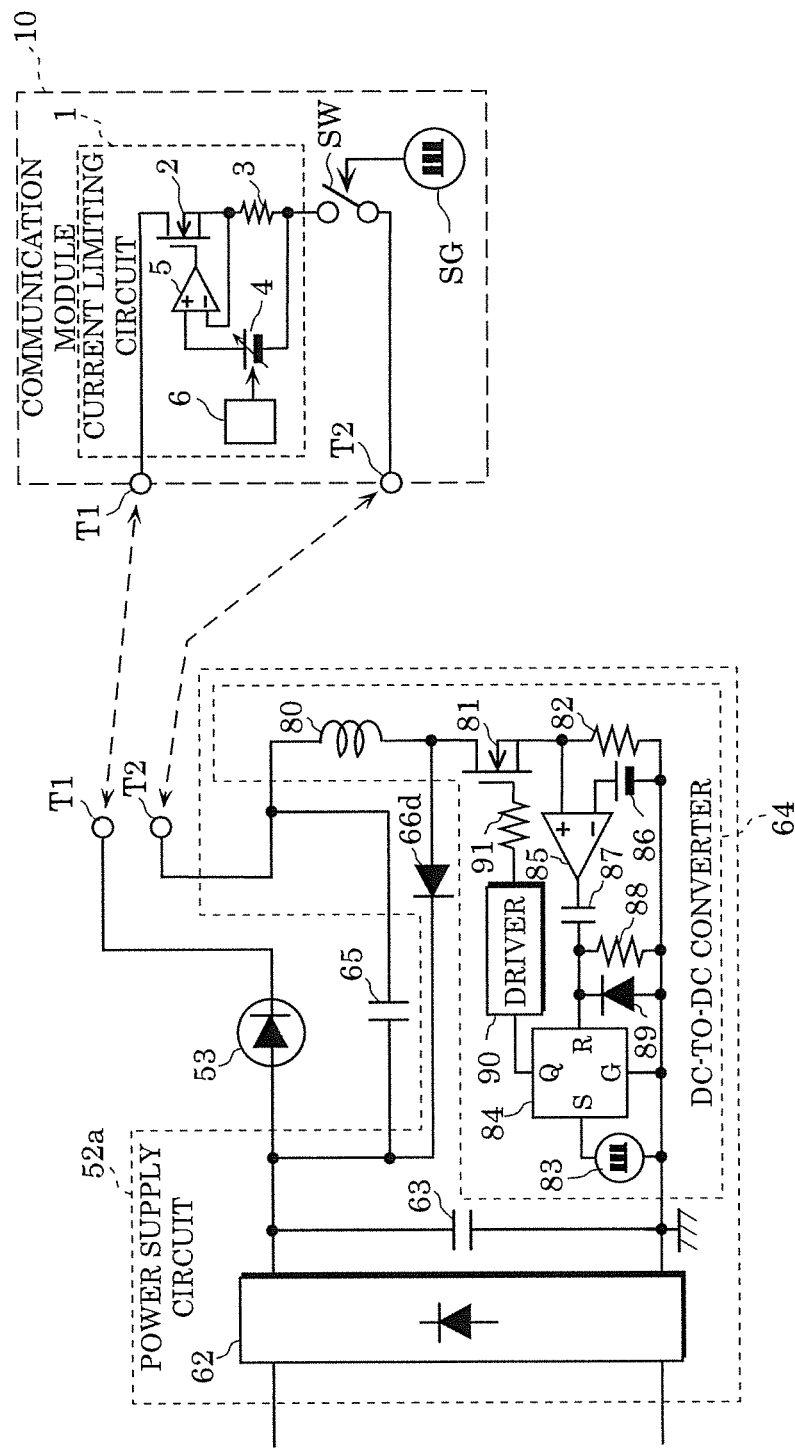
FIG. 80 is a circuit diagram illustrating a variation of the illumination light communication apparatus according to Embodiment 11.

The entire configuration of an illumination light communication apparatus according to Embodiment 11 may be the same as that of the illumination light communication apparatus illustrated in FIG. 1A or may be the same as that of the illumination light communication apparatus illustrated in FIG. 80.

FIG. 80 is a circuit diagram illustrating a variation of the illumination light communication apparatus according to Embodiment 11. In the apparatus illustrated in FIG. 80, the internal configuration of communication module 10 is different from that in FIG. 64, but power supply circuit 52a is the same as that in FIG. 64. The communication module illustrated in FIG. 80 is as already described in FIG. 1A. Power supply circuit 52a is as already described in FIG. 64.

[11.2 Variation of Current Limiting Circuit 1]

The following describes first to third variations of current limiting circuit 1.

Figure 81:
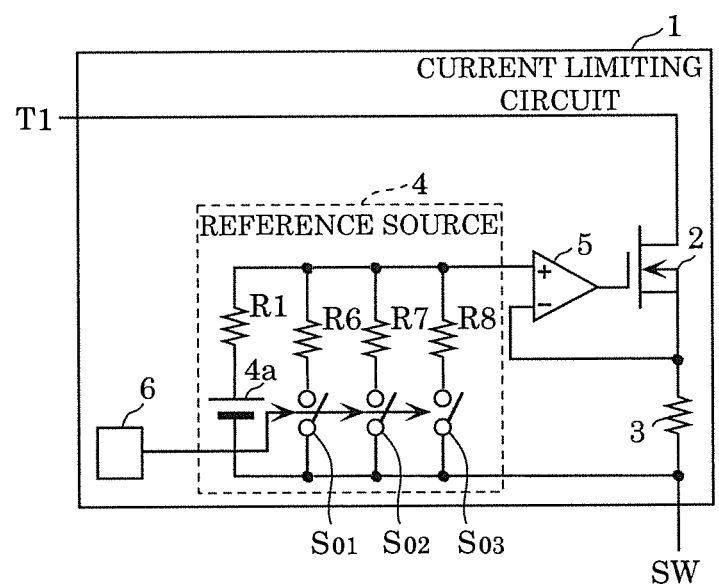
FIG. 81 is a circuit diagram illustrating a fourth variation of the current limiting circuit.
Figure 82:
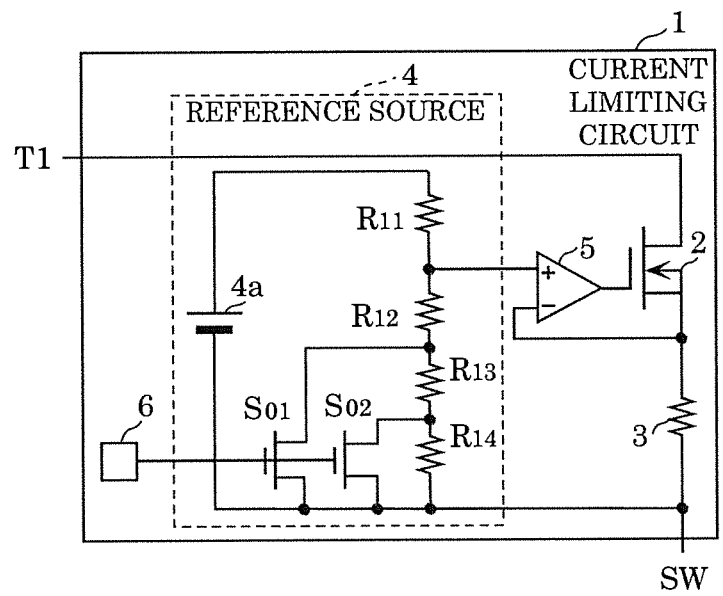
FIG. 82 is a circuit diagram illustrating a fifth variation of the current limiting circuit.

The configurations of current limiting circuit 1 are not limited to those in FIGS. 1A and 80, and may be those of first to third variations as illustrated in FIGS. 2 to 4 or those as illustrated in FIGS. 81 and 82.

FIG. 81 is a circuit diagram illustrating a fourth variation of current limiting circuit 1 in FIGS. 1A and 80. Current limiting circuit 1 illustrated in FIG. 81 includes transistor 2 which is a MOSFET, resistor 3 connected to the source of transistor 2, reference source 4, and control circuit 6. Reference source 4 includes constant voltage source 4a, voltage dividing resistors R1, R6, R7, and R8, and switch elements S01 to S03 for switching between voltage division ratios.

Control circuit 6 may switch between switch elements S01 to S03, by calculating a value of an appropriate reference voltage according to the arrangement of a communication signal or by selecting a value of an appropriate reference voltage from an association table prepared in advance. The greater the numbers of resistors and switch elements of a partial pressure circuit, the more levels the reference voltage can be switched at.

FIG. 82 is a circuit diagram illustrating a fifth variation of current limiting circuit 1 in FIGS. 1A and 80. Current limiting circuit 1 in FIG. 82 includes transistor 2 which is a MOSFET, resistor 3 connected to the source of transistor 2, reference source 4, and control circuit 6. Reference source 4 includes constant voltage source 4a, voltage dividing resistors R11, R12, R13, and R14, and switch elements S01 and S02 for switching between voltage division ratios.

Reference source 4 on the positive potential side is connected to the positive input terminal of an error amplifier via resistor R11. A series circuit of resistors R12, R13, and R14 is provided between reference source 4 on the negative potential side and a point of connection between reference source 4 and the error amplifier, and switch elements S01 and S02 which short-circuit one or two of the resistors are connected to the series circuit.

Control circuit 6 in FIG. 82 may be the same as that in FIG. 81.

[11.3 Configuration Example of Control Circuit 6]

The following describes in detail a configuration of control circuit 6 which performs control for changing a reference value of reference source 4, according to the arrangement of a communication signal, with reference to FIGS. 83 and 84A to 84C. Specifically, a configuration example is described in which control circuit 6 includes a shift register which shifts and stores n-bit data (n is an integer of 2 or more) in a communication signal, calculates a partial duty cycle of a part of the communication signal based on the n-bit data, and determines a reference value according to the calculated partial duty cycle.

Figure 83:
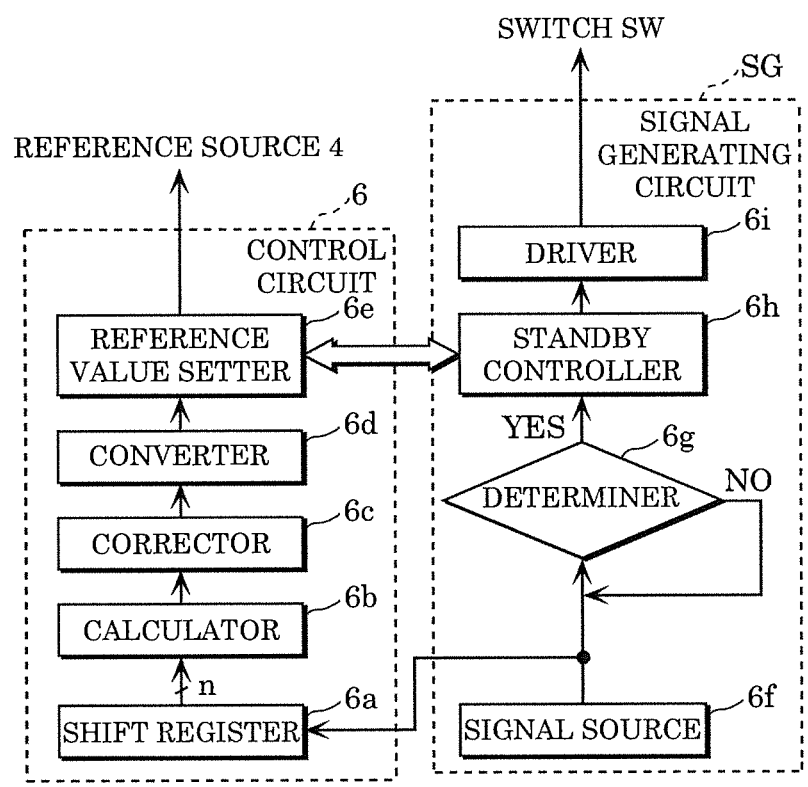
FIG. 83 is a block diagram illustrating a configuration example of a control circuit and a signal generating circuit.

FIG. 83 is a block diagram illustrating a configuration example of control circuit 6 and signal generating circuit SG in FIGS. 1A and 80. In FIG. 83, control circuit 6 includes shift register 6a, calculator 6b, corrector 6c, converter 6d, and reference value setter 6e.

Shift register 6a shifts and stores n-bit data (n is an integer of 2 or more) in a communication signal generated by signal generating circuit SG.

Calculator 6b calculates a partial duty cycle of the communication signal, based on the n-bit data stored in shift register 6a. The partial duty cycle may be, for example, (i) a proportion of an on period immediately before the most recent off period (a period which includes a succession of bit 0) with respect to a combination of the most recent off period and the on period. Alternatively, the partial duty cycle may be (ii) substituted with a moving average of the most recent n bits in the communication signal or may be a moving average of a predetermined number of bits among n bits.

Calculator 6b may simply obtain an addition average of n bits stored in shift register 6a, if a moving average is to be obtained as a partial duty cycle.

Corrector 6c corrects the partial duty cycle calculated by calculator 6b. If the calculating methods are different as indicated by (i) and (ii) above, the calculated results are also different, and thus corrector 6c corrects the results.

Converter 6d converts the corrected partial duty cycle to a corresponding appropriate reference value. Stated differently, converter 6d determines the appropriate reference value according to the corrected partial duty cycle.

Reference value setter 6e sets the determined reference value in reference source 4. Specifically, reference value setter 6e controls reference source 4 so that reference source 4 outputs the determined reference value.

The following describes a configuration example of signal generating circuit SG.

In FIG. 83, signal generating circuit SG includes signal source 6f, determiner 6g, standby controller 6h, and driver 6i.

Signal source 6f generates a communication signal. For example, signal source 6f may repeatedly generate a communication signal which includes an ID of the illumination light communication apparatus, and may generate a communication signal which includes an ID of the illumination light communication apparatus and also modulated information from the outside.

Determiner 6g determines whether the most recent bit output from signal source 6f is "1." If the bit immediately before the most recent bit is 0, the most recent bit output from signal source 6f causes a rising edge in the waveform of current flowing through load circuit 53 which is a light source. If the bit immediately before the most recent bit is 1, load circuit 53 which is a light source is continuously in the conductive state for the interval of the most recent bit output from signal source 6f.

If determiner 6g determines that the most recent bit is "1", standby controller 6h does not allow switch SW to be driven according to the most recent bit, namely to output the most recent bit to the gate of switch SW, until signal generating circuit SG receives a ready signal from control circuit 6. This standby is for completing, before a rising edge occurs in the waveform of current through load circuit 53 which is a light source, the setting of a reference value in current limiting circuit 1, according to the partial duty cycle immediately before the rising edge.

Driver 6i outputs the most recent bit "1" to the gate of switch SW at a timing when signal generating circuit SG receives a ready signal from control circuit 6.

Note that instead of distinguishing whether the most recent bit output from signal source 6f is "1", determiner 6g may determine whether the most recent 2 bits output from signal source 6f are "01." In other words, determiner 6g may determine whether the most recent bit is 1 and the bit immediately before the bit is 0. In this manner, determiner 6g determines whether a rising edge occurs in the waveform of current through load circuit 53 which is a light source, based on the most recent bit output from signal source 6f.

The following describes an example of operation by control circuit 6 in further detail.

Figure 84A:
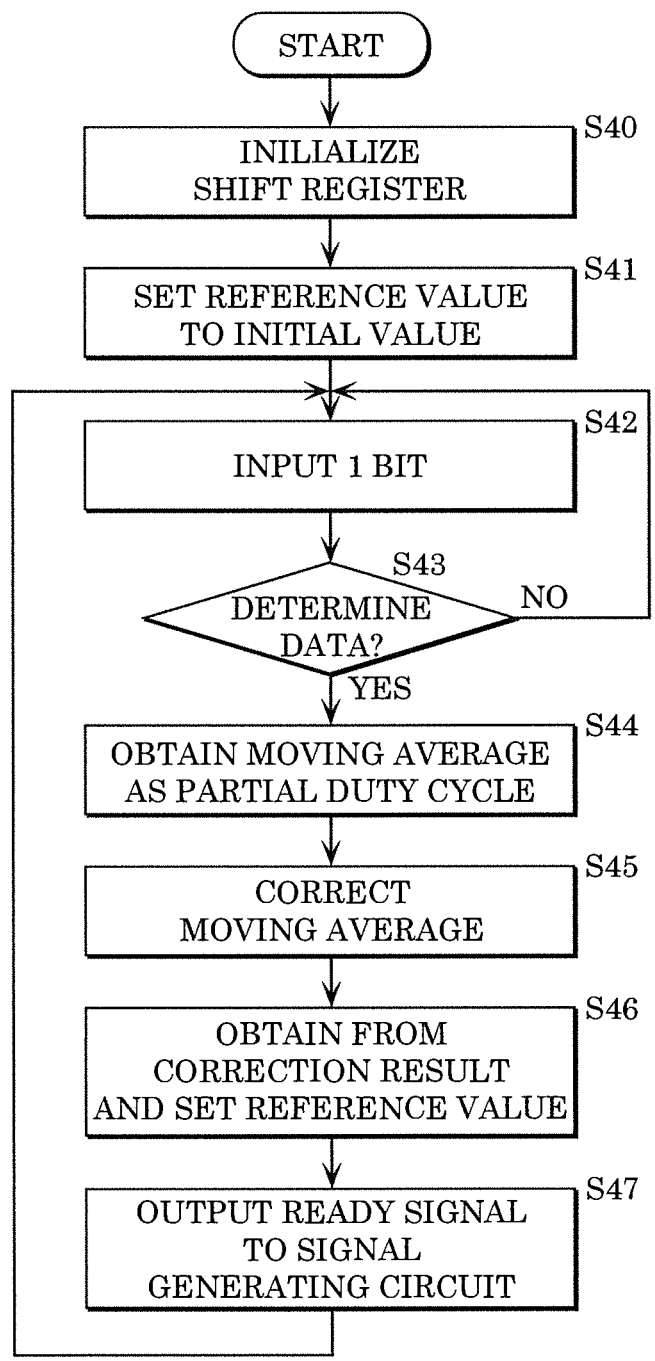
FIG. 84A is a flowchart illustrating an example of processing by the control circuit.

FIG. 84A is a flowchart illustrating an example of processing by the control circuit in FIG. 1A. In FIG. 84A, when the illumination light communication apparatus starts visible light communication (for example, when the illumination light communication apparatus is powered on), control circuit 6 first initializes (for example, resets) shift register 6a (S40), and sets an initial value of a reference value in reference source 4 (S41). This initial value may be, for example, a reference value corresponding to the average duty cycle of a communication signal, that is, 75%.

When signal source 6f of signal generating circuit SG inputs, to shift register 6a, one bit in a communication signal among bits generated serially (S42), control circuit 6 determines whether the input bit is 1 (S43).

If control circuit 6 determines that the input bit is 1, control circuit 6 obtains an average of n-bit data stored in shift register 6a, as a partial duty cycle (S44). This average is a moving average obtained by shifting n-bit data in a communication signal which is serial data, each time loop processing in FIG. 84A is performed (S42 to S47). Furthermore, control circuit 6 corrects the moving average (S45), obtains a reference value from correction results and sets the reference value in reference source 4 (S46), and outputs a ready signal to signal generating circuit SG (S47). By outputting this ready signal, the one bit input in step S42 is output to the gate of switch SW. In step S46, relational expression (2) described below may be used for calculation or a number table may be prepared in advance, in order to obtain the current set value and the reference value of current limiting circuit 1 from the corrected moving average. This number table may indicate associations between the corrected moving average and a reference value, for example.

Figure 84B:
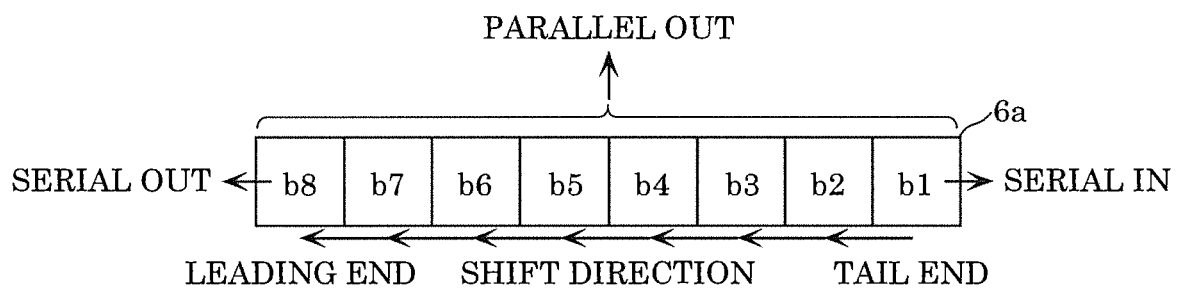
FIG. 84B is an explanatory diagram of a shift register in the control circuit.

The following describes a configuration example of shift register 6a. FIG. 84B is an explanatory diagram illustrating a configuration example of shift register 6a in control circuit 6. FIG. 84B exemplifies 8-bit shift register 6a. Shift register 6a includes a serial-in terminal for inputting 1-bit data, a parallel-out terminal for outputting 8-bit data, and a serial-out terminal for outputting 1-bit data. Bits of stored 8-bit data are called bits $b1, b2, \ldots$, and $b8$ in the order from the serial-in terminal side. Bit $b1$ is the most recent bit output from signal source 6f. At a timing at which the most recent bit is input to bit $b1$ through the serial-in terminal, bit $b2$ is input to the gate of switch SW. Bit $b1$ is output to the gate of switch SW at a timing when the ready signal in step S47 in FIG. 84A is output.

The following describes a specific example of correction in step S45 in FIG. 84A.

Figure 84C:
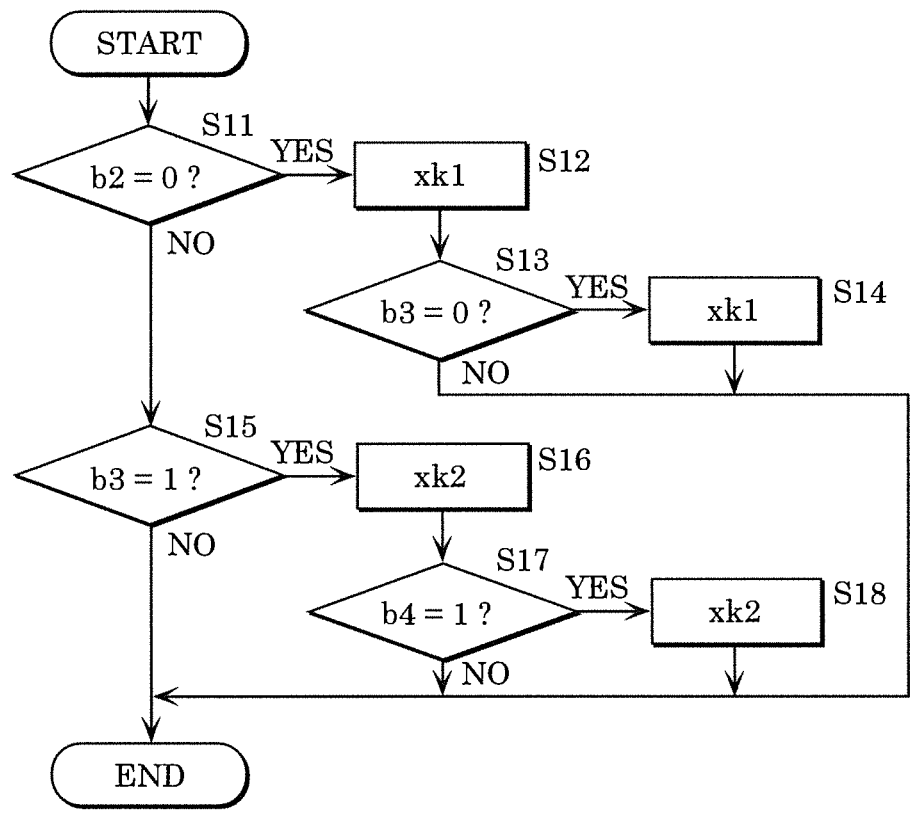
FIG. 84C is a flowchart illustrating an example of correction in step S45 in FIG. 84A.

FIG. 84C is a flowchart illustrating an example of correction in step S45 in FIG. 84A. When a moving average is obtained in step S44, most recent bit $b1$ of shift register 6a is 1 as determined in step S43. In FIG. 84C, if bit $b2$ immediately before most recent bit $b1$ is 0 (S11: YES), control circuit 6 first multiplies the moving average by coefficient k1 (S12), and furthermore if bit $b3$ immediately before bit $b2$ is 0 (S13: YES), multiplies the resultant moving average by coefficient k1 again (S14). Stated differently, if bit $b1$ which is the first bit from the tail end of shift register 6a is 1, and bit $b2$ which is the second bit and bits following bit $b2$ are one or more successive bits 0, control circuit 6 raises the moving average to the power of coefficient k1 smaller than 1, the power being the same number as the number of successive bits 0. Here, coefficient k1 may be 0.9, for example.

Next, when NO in step S11, if bit $b3$ is 1 (S15: YES), control circuit 6 multiplies the moving average by coefficient k2 (S16), and furthermore if bit $b4$ is 1 (S17: YES), control circuit 6 multiplies the resultant moving average by coefficient k2 again (S18). Stated differently, if bit $b1$ which is the first bit from the tail end of shift register 6a is 1 and bit $b2$ which is the second bit or bit $b3$ which is the third bit and bits following bit $b2$ or $b3$ are one or more successive bits 1, control circuit 6 raises the moving average to the power of coefficient k2 larger than 1, the power being the same number as the number of successive bits 1. Here, coefficient k2 may be 1.03, for example.

Such correction causes the moving average in all the assumed data arrangements to fall within a range of about 0.5 to 0.9. The above correction method is a mere example, and a correction method may be selected according to necessary dynamic property. In particular, the coefficient multiplied varies according to a data transmission format used and power supply circuit conditions, and thus the appropriateness under the actual conditions needs to be examined.

Such a configuration more appropriately mitigates overshoot which occurs in the current flowing through load circuit 53.

[11.4 Operation of Illumination Light Communication Apparatus]

For example, the simulation results illustrated in FIGS. 5 to 14 apply to the operation of the illumination light communication apparatus having the above configuration. The illumination light communication apparatus performs the same operation as those described in Embodiment 1.

As described above, the illumination light communication apparatus according to Embodiment 11 includes: light source 53 which emits illumination light; switch SW which is connected in series to the light source, and intermittently interrupts current which flows through the light source; signal generating circuit SG which generates a binary communication signal which controls on and off of the switch to modulate the illumination light; and current limiting circuit 1 which is connected in series to the light source and the switch, and limits the current which flows through the light source to prevent the current from exceeding a current set value corresponding to a reference value, current limiting circuit 1 includes: reference source 4 which outputs the reference value; transistor 2 which is connected in series to the light source and the switch, and limits the current which flows through the light source, based on the reference value; and control circuit 6 which includes shift register 6a which shifts and stores n-bit data in the binary communication signal, where n is an integer of 2 or more, and control circuit 6 calculates a partial duty cycle of a part of the binary communication signal based on the n-bit data, and determines the reference value according to the partial duty cycle.

According to this, overshoot which occurs in current flowing through a light source (that is, load circuit 53) at a moment when switch SW is brought from the off state to the on state, and thus error in reception by a receiving device can be reduced. Moreover, a partial duty cycle is calculated using a shift register, and the reference value is determined according to the calculated partial duty cycle. Thus, the reference value can be more dynamically set to an appropriate value.

Here, control circuit 6 may set the reference value to a first value when the partial duty cycle is a first proportion, and set the reference value to a second value smaller than the first value when the partial duty cycle is a second proportion higher than the first proportion, and the current set value corresponding to the second value may be smaller than the current set value corresponding to the first value.

According to this, if the magnitude of overshoot depends on the partial duty cycle, overshoot can be appropriately mitigated.

Here, control circuit 6 may change the reference value so that the current set value is inversely proportional to the partial duty cycle.

Here, the control circuit may change the reference value so as to satisfy the following expression.

$$I1 = (Iave/ONd) \times 100$$

Here, I1 denotes the current set value, Iave denotes an average current flowing through the light source when illumination light is not modulated by turning on/off the switch, and ONd denotes a partial duty cycle (whose unit is %) of the communication signal.

According to this, overshoot can be mitigated, and brightness of illumination light not modulated and brightness of illumination light being modulated can be caused to appear substantially the same to people.

Here, the control circuit may change the reference value so as to satisfy the following expression.

$$(Iave/ONd) \times 100 \leq I1 < Ip$$

Here, Iave denotes an average current flowing through the light source when illumination light is not modulated by turning on and off the switch, ONd denotes a partial duty cycle of the communication signal, I1 denotes the current set value, and Ip denotes a peak value of current flowing through the light source when the current limiting circuit does not limit the current.

Here, control circuit 6 may calculate a moving average of data of a predetermined number of bits from the tail end of shift register 6a, as a partial duty cycle, correct the moving average, based on a bit pattern of n-bit data stored in the shift register, and determine a reference value corresponding to the corrected moving average.

According to this, overshoot which occurs in current flowing through a light source (that is, load circuit 53) at a moment when switch SW is brought from the off state to the on state, and thus error in reception by a receiving device can be reduced. Because, if the power supply circuit of the illumination light communication apparatus is a current feedback circuit, the illumination light communication apparatus has features that the magnitude of overshoot depends on a partial duty cycle, and the output voltage gradually increases during the off period. Due to the feedback by the diode, the reference value also increases according to the output voltage which gradually increases during the off period, and thus overshoot can be reduced appropriately.

Here, when correcting the moving average, if the first bit from the tail end of the shift register is 1, and the second bit and bits following the second bit are one or more successive bits 0, control circuit 6 may raise the moving average to the power of a coefficient smaller than 1, the power being the same number as the number of successive bits 0.

Here, when correcting the moving average, if the first bit from the tail end of shift register 6a is 1 and the second bit or the third bit and bits following the second or third bit are one or more successive bits 1, control circuit 6 may raise the moving average to the power of a coefficient larger than 1, the power being the same number as the number of successive bits 1.

Here, control circuit 6 may use $(1-(1/N)) \times 100(\%)$ which is an average duty cycle of the communication signal on which N-value pulse position modulation (N is an integer of 2 or more) is performed, instead of calculating the moving average as a partial duty cycle.

Here, the communication signal may have been subjected to N-value pulse position modulation (N is an integer of 4 or more), and the number of bits of shift register 6a and the number of bits of which a moving average is to be calculated may be greater than or equal to N.

Here, reference source 4 may include constant voltage source 4a which generates a fixed voltage, a plurality of resistance elements (for example, some of R1, R6, R7, and R11 to R14) which divide a voltage of the constant voltage source, and one or more switch elements connected in series or parallel to the resistance elements (for example, some of S01 to S03), and control circuit 6 may control on and off of the one or more switch elements according to the corrected value.

Here, the illumination light communication apparatus may include power supply circuit 52*a* which supplies current to the light source, the switch, and the current limiting circuit which are connected in series, and power supply circuit 52*a* may perform feedback control for maintaining an average of current to be supplied at a constant value.

Here, power supply circuit 52*a* may include DC-to-DC converter 64 which includes inductor 80 and switch element 81, detect the magnitude of current flowing through switch element 81, and control on and off of switch element 81 according to a difference between the detected value and a predetermined value.

The communication module according to Embodiment 11 is communication module 10 which is attachable to a lighting apparatus and modulates illumination light, and includes: switch SW which is to be connected in series to a light source included in the lighting apparatus; signal generating circuit SG which generates a binary communication signal which controls on and off of the switch to modulate the illumination light; and current limiting circuit 1 which is connected in series to the light source and switch SW, and limits current which flows through the light source, current limiting circuit 1 includes: reference source 4 which outputs the reference value; transistor 2 which is connected in series to the light source and the switch, and limits current which flows through the light source, based on the reference value; and control circuit 6 which includes shift register 6*a* which shifts and stores leading n-bit data in the binary communication signal, where n is an integer of 2 or more, and control circuit 6 calculates a partial duty cycle of the binary communication signal based on the n-bit data, and determines the reference value according to the partial duty cycle.

According to this, the communication module can be added to an existing lighting device. Specifically, while the existing lighting device is used as it is, a light communication function can be added easily, and achieved at lower cost than the case where a new light communication lighting device is installed. Further, overshoot which occurs in current flowing through the light source at a moment when the switch is brought from the off state to the on state, and thus error in reception by a receiving device can be reduced.

Embodiment 12

Embodiment 12 describes an illumination light communication apparatus and a communication module which prevent malfunction of an overvoltage protection circuit when power is on, even if light communication by 100% modulation is performed.

Generally, the output voltage from a power supply circuit is high in the unloaded state. The power supply circuit often includes an overvoltage protection circuit which stops operation if the output voltage exceeds an overvoltage protection level. If 100% modulation is performed in visible light communication, during a rise time until the output voltage or output current from the power supply circuit rises at power on, the switch element may be turned off (that is, in the unloaded state) until modulation operation starts, the output voltage may increase and exceed the overvoltage protection level, and the power supply circuit may stop. Specifically, due to the unloaded state, the overvoltage protection circuit may malfunction and the power supply may stop.

For example, if a communication module which performs visible light communication is later added to the existing lighting device, the overvoltage protection circuit in the power supply circuit may operate. Furthermore, the margin design of the overvoltage protection circuit may be difficult when designing a power supply circuit. These are problems.

In view of this, the illumination light communication apparatus according to an aspect of Embodiment 12 is an illumination light communication apparatus which modulates illumination light by causing an on state and an off state of the illumination light in accordance with a binary communication signal, and includes: a power supply circuit which includes an overvoltage protection circuit; a light source which is connected to the power supply circuit and emits the illumination light; a first switch element connected in series to the light source; a signal generating circuit which generates the binary communication signal; a bias circuit which supplies a bias voltage which turns on the first switch element to a control terminal of the first switch element in a period after power on and until the signal generating circuit starts generating the binary communication signal; and a second switch element which is connected to the control terminal of the first switch element, and turns on and off in accordance with the binary communication signal. The bias circuit is a variation of the current limiting circuit already described.

The communication module according to an aspect of Embodiment 12 is a communication module which modulates illumination light by causing an on state and an off state of the illumination light in accordance with a binary communication signal, and is attachable to a lighting apparatus, and includes: a light source which is to be connected in series to a light source included in the lighting apparatus; a first switch element connected in series to the light source; a signal generating circuit which generates the binary communication signal; a bias circuit which supplies a bias voltage which turns on the first switch element to a control terminal of the first switch element after power on and until the signal generating circuit starts generating the binary communication signal; and a second switch element which is connected to the control terminal of the first switch element, and turns on and off in accordance with the binary communication signal after the signal generating circuit starts operation.

The illumination light communication apparatus and the communication module according to the present embodiment can prevent malfunction of the overvoltage protection circuit at power on.

[12.1 Configuration Example of Illumination Light Communication Apparatus]

First, an example of a circuit configuration of the illumination light communication apparatus according to Embodiment 12 is described.

Figure 85:
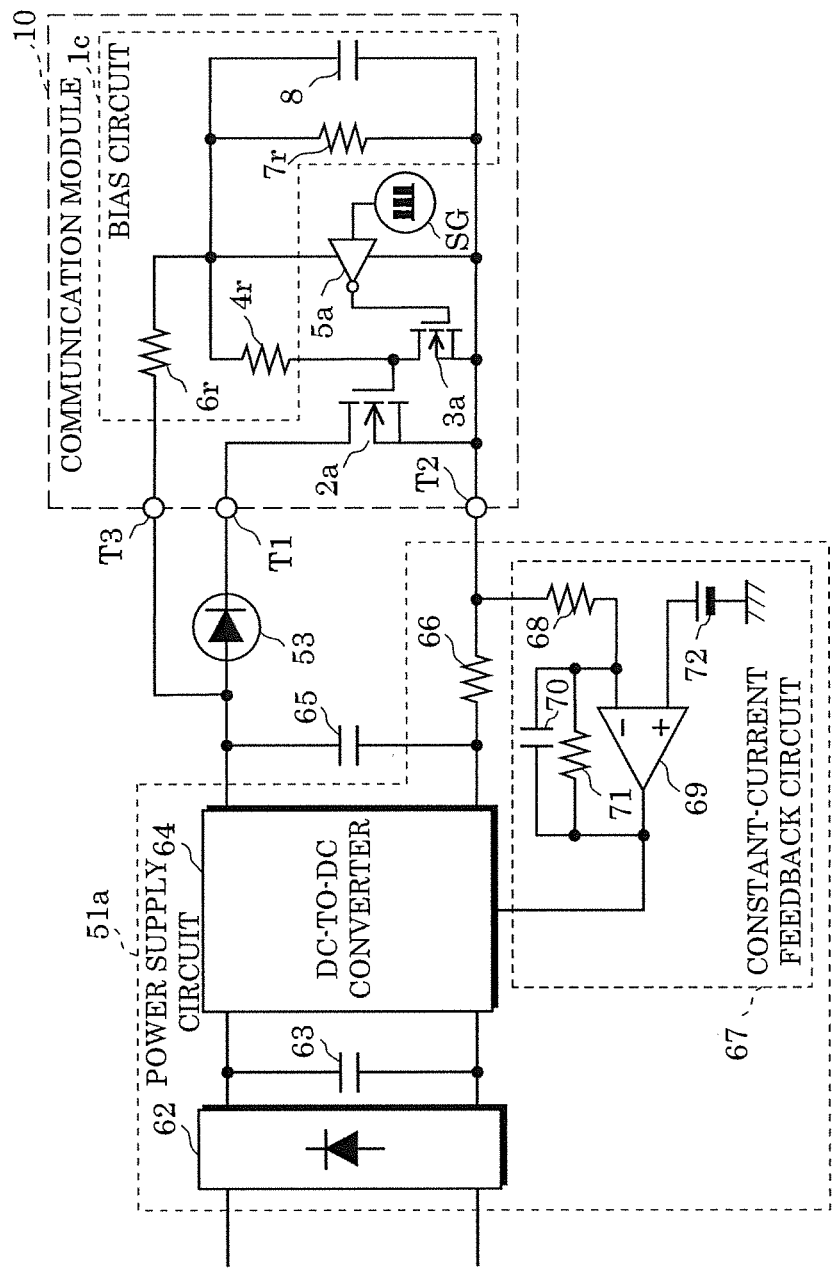
FIG. 85 is a circuit diagram illustrating a configuration example of an illumination light communication apparatus according to Embodiment 12.

FIG. 85 is a circuit diagram illustrating a configuration example of the illumination light communication apparatus according to Embodiment 12. The illumination light communication apparatus includes power supply circuit 51*a* having a function of maintaining output current at a constant value, smoothing capacitor (smoothing circuit) 65, load circuit 53, and communication module 10.

Power supply circuit 51*a* includes rectifier bridge 62, capacitor 63, DC-to-DC converter 64, sense resistor 66, and constant-current feedback circuit 67. Constant-current feedback circuit 67 includes input resistor 68, amplifier 69, capacitor 70, resistor 71, and reference voltage source 72.

In power supply circuit 51*a*, rectifier bridge 62 full-wave rectifies commercial power (for example, 100-V AC), capacitor 63 smoothes the resultant power, and thereafter DC-to-DC converter 64 converts the smoothed power into a desired direct voltage. Smoothing capacitor 65 is connected between the output terminals of DC-to-DC converter 64.

Specifically, smoothing capacitor 65 is connected between the power supply line of power supply circuit 51a and the ground line. Load circuit 53 and first switch element 2a are connected in series between the power supply line of power supply circuit 51a and the ground line.

Power supply circuit 51a has a function of directly or indirectly detecting current flowing through load circuit 53 and controlling the current values to maintain the values constant. This function is achieved by sense resistor 66 for directly detecting current flowing through load circuit 53 and constant-current feedback circuit 67 in FIG. 85. Constant-current feedback circuit 67 includes amplifier 69, reference voltage source 72 connected to the positive input terminal of amplifier 69, input resistor 68 connected to the negative input terminal of amplifier 69, gain control resistor 71 connected between the output terminal and the negative input terminal of amplifier 69, and phase compensation capacitor 70. In constant-current feedback circuit 67, amplifier 69 compares which is higher a voltage drop across sense resistor 66 or a voltage of reference voltage source 72, amplifies the difference, and feeds back the amplified difference to a controller of DC-to-DC converter 64. In other words, constant-current feedback circuit 67 performs negative feedback control on DC-to-DC converter 64 so that the voltage drop across sense resistor 66 and the reference voltage match. A gain is set according to a voltage division ratio of input resistor 68 and resistor 71 connected between the negative input terminal and the output terminal of amplifier 69, and capacitor 70 provided parallel to resistor 71 functions as an integral element for phase compensation.

Smoothing capacitor 65 is connected between the power supply line of power supply circuit 51a and the ground line, and smoothes the output of power supply circuit 51a.

Load circuit 53 includes a plurality of light emitting diodes connected in series. The light emitting diodes are light sources which emit illumination light. The illumination light is modulated by a binary communication signal.

Communication module 10 includes bias circuit 1c, first switch element 2a, second switch element 3a, inverter 5a, and signal generating circuit SG.

First switch element 2a is connected in series to load circuit 53 which is a light source, and modulates the illumination light emitted by the light source at 100% by turning on and off. Here, 100% modulation means to modulate illumination light in two states, namely, the on state and the off state. First switch element 2a in FIG. 85 is a normally off switch transistor. Thus, when a voltage greater than or equal to a threshold is not applied between the source and the gate of first switch element 2a, first switch element 2a is off. A terminal of first switch element 2a is connected to load circuit 53. The other terminal of first switch element 2a is connected to the ground line. The control terminal of first switch element 2a is connected to second switch element 3a, and receives input of a bias voltage from bias circuit 1c.

Bias circuit 1c supplies the bias voltage which turns on first switch element 2a to the control terminal of first switch element 2a, during a period after the illumination light communication apparatus is powered on and before signal generating circuit SG starts operation of generating a communication signal. The bias voltage prevents power supply circuit 51a from being placed in the unloaded state in the period, and avoids an increase in the output voltage of power supply circuit 51a so as not to allow the output voltage to exceed the overvoltage protection level.

Second switch element 3a turns on and off in accordance with a communication signal. Specifically, second switch element 3a is a normally off transistor. A terminal of second switch element 3a is connected to the control terminal of first switch element 2a. The other terminal of second switch element 3a is connected to the ground line. The control terminal of second switch element 3a is connected to signal generating circuit SG via inverter 5a, and an inverted communication signal is input to the control terminal.

In this manner, when a communication signal is a low-level signal, second switch element 3a is on, and the control terminal of first switch element 2a is a low-level terminal. As a result, first switch element 2a is off.

When a communication signal is a high-level signal, second switch element 3a is off, and, the level of the control terminal of first switch element 2a maintains the bias voltage level. As a result, first switch element 2a is on.

In the above period after power on, since the output level of inverter 5a is low, second switch element 3a is off, and the level of the control terminal of first switch element 2a is brought to the bias voltage level. The bias voltage increases as the output voltage rises after power on, and thus first switch element 2a is turned on before signal generating circuit SG starts operation. As a result, first switch element 2a is on during the above period after power on.

In this way, although first switch element 2a is a normally-off switch, due to the bias voltage, first switch element 2a appears to operate as a normally-on switch during the above period, and thus the unloaded state at power on is resolved. As a result, malfunction of the overvoltage protection circuit can be prevented at power on. The margin of the overvoltage protection level and flexibility of margin design can be increased.

Signal generating circuit SG generates a binary communication signal. This communication signal may be an inverted 4 PPM signal specified by JEITA-CP1223, for example.

[12.2 Configuration Example of Bias Circuit 1c]

As illustrated in FIG. 85, bias circuit 1c includes first resistance element 6r, second resistance element 7r, capacitor 8, and resistor 4r.

First resistance element 6r and second resistance element 7r are connected in series between the power supply line of power supply circuit 51a and the ground line. The point of connection between first resistance element 6r and second resistance element 7r is electrically connected to the control terminal of first switch element 2a, or in other words, is connected to the control terminal via input resistor 4r. Bias voltage can be readily generated as a voltage dividing value of a voltage divider circuit constituted by first resistance element 6r and second resistance element 7r.

Power is supplied through the power supply line of power supply circuit 51a to signal generating circuit SG and inverter 5a, via the point of connection between first resistance element 6r and second resistance element 7r. Specifically, the point of connection between first resistance element 6r and second resistance element 7r is connected to signal generating circuit SG and inverter 5a. Capacitor 8 which supplies a power supply voltage to signal generating circuit SG and inverter 5a is connected parallel to second resistance element 7r, and the voltage at the above point of connection (the power supply voltage to be supplied to signal generating circuit SG and inverter 5a) is to be stabilized. In this manner, a voltage-dividing value of the voltage divider circuit which includes first resistance element 6r and second resistance element 7r can be used as a power supply voltage for signal generating circuit SG and inverter 5a.

[12.3 Configuration Example of DC-to-DC Converter]

The following describes a configuration example of power supply circuit 51a which includes an overvoltage protection circuit.

Figure 86:
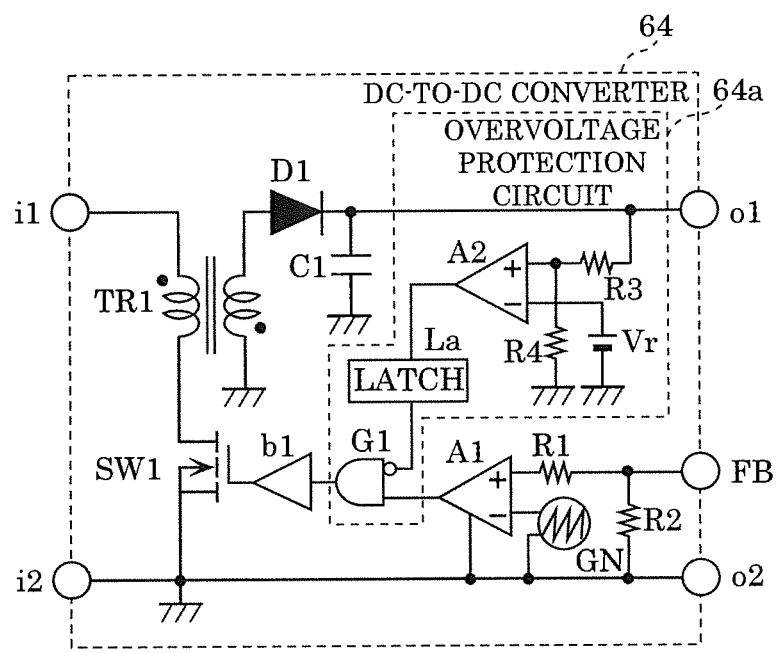
FIG. 86 is a diagram illustrating an example circuit of a DC-to-DC converter according to Embodiment 12.

FIG. 86 is a diagram illustrating an example circuit of DC-to-DC converter 64 which includes overvoltage protection circuit 64a according to Embodiment 12. DC-to-DC converter 64 in FIG. 86 includes input terminals i1 and i2, output terminals of and o2, feedback input terminal FB, transformer TR1, switch SW1, diode D1, capacitor C1, buffer b1, error amplifier A1, resistors Rd and R2, triangular wave generating circuit GN, and overvoltage protection circuit 64a.

Input terminals i1 and i2 are connected to two output terminals of rectifier bridge 62 and the two terminals of capacitor 63 in FIG. 85, and a direct voltage rectified and smoothed is applied.

Output terminals o1 and o2 are connected to the two terminals of smoothing capacitor 65 in FIG. 85. Output terminal o1 is connected to the power supply line, and output terminal o2 is connected to the ground line.

Feedback input terminal FB is connected to constant-current feedback circuit 67 in FIG. 85, and receives input of a feedback signal from amplifier 69. The feedback signal indicates the magnitude of the output current of power supply circuit 51a.

DC-to-DC converter 64 is a so-called flyback converter, conveys electrical energy to the secondary winding, by a switching operation of switch SW1 connected in series to the primary winding of transformer TR1, and outputs a direct voltage between output terminals of and o2 by diode D1 and capacitor C1.

Switch SW1 performs switching operation according to a triangular wave signal generated by triangular wave generating circuit GN and a feedback signal. Specifically, when the level of the triangular wave signal generated by triangular wave generating circuit GN has not reached the level of the feedback signal, switch SW1 is in the off state, and when the level of the triangular wave signal is above the level of the feedback signal, switch SW1 is in the on state. For example, if the triangular wave signal repeats the same triangular wave with constant frequency, the output signal of error amplifier A1 (comparator) is a pulse width modulated pulse signal having a width determined according to the level of a feedback signal from the positive input terminal of error amplifier A1.

In overvoltage protection circuit 64a, error amplifier A2 (comparator) compares the output voltage from output terminal of with the overvoltage protection level defined by constant voltage source Vr. The output signal from error amplifier A2 is inverted from the low level to the high level when the output voltage from output terminal of exceeds the overvoltage protection level. Latch circuit La latches and outputs the high level signal when the output signal of error amplifier A2 is inverted. AND circuit G1 compulsorily brings the input signal of buffer b1 to the low level, by eliminating a pulse signal of error amplifier A1, while latch circuit La is outputting a high-level signal. If the input signal of buffer b1 is compulsorily brought to the low level, the output signal of buffer b1 is also compulsorily brought to the low level, and as a result, the switching operation of switch SW1 stops while switch SW1 is off.

In this manner, overvoltage protection circuit 64a stops the power supply operation of power supply circuit 51a, if the output voltage of power supply circuit 51a is an excess voltage, or in other words, if the output voltage exceeds the overvoltage protection level.

[12.4 Operation]

The operation of the illumination light communication apparatus having the above configuration according to Embodiment 12 is described.

Figure 87:
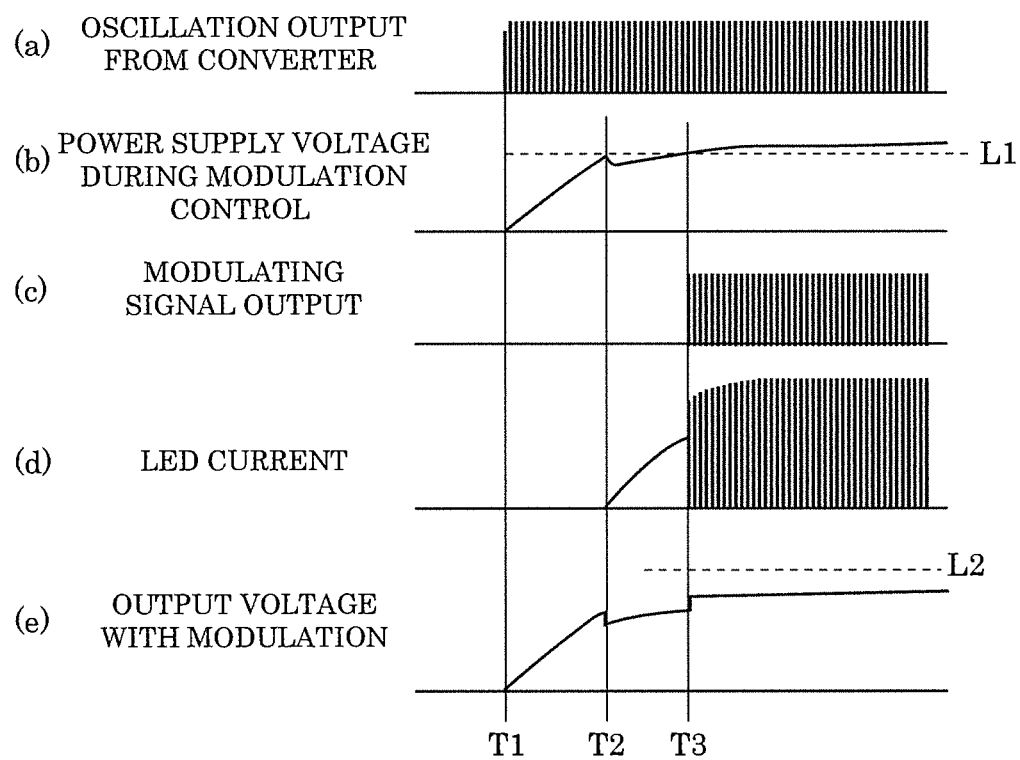
FIG. 87 is a time chart showing potentials at portions of the illumination light communication apparatus according to Embodiment 12.

FIG. 87 is a time chart showing potentials at portions of the illumination light communication apparatus according to Embodiment 12. In FIG. 87, (a) oscillation output from converter indicates a temporal change in a potential at the output terminal of error amplifier A1 or the control terminal of switch SW1 in FIG. 86. (b) Power supply voltage during modulation control indicates a temporal change in power supply voltage supplied to signal generating circuit SG through the point of connection between first resistance element 6r and second resistance element 7r in FIG. 85 and a temporal change in bias voltage input to the control terminal of first switch element 2a. (c) Modulating signal output indicates a temporal change in output signal, that is, a communication signal from signal generating circuit SG. (d) LED current indicates a temporal change in current flowing through a light source, that is, load circuit 53. (e) Output voltage with modulation indicates a temporal change in output voltage from power supply circuit 51a. L1 in FIG. 87 indicates a modulation control operation level, that is, the level of power supply voltage at which signal generating circuit SG starts operation. L2 indicates the overvoltage protection level of overvoltage protection circuit 64a, and is corresponding to the reference level of constant voltage source Vr in FIG. 86.

Time T1 in FIG. 87 indicates a timing at which power supply circuit 51a is powered on. At time T1, (a) oscillation output from converter starts being output actively, and accordingly (e) output voltage with modulation starts increasing.

At time T2, (d) LED current starts flowing. In other words, a period between time T2 and time T3 is a period in which first switch element 2a is on due to the bias voltage, and is a period after power on and until signal generating circuit SG starts generating a communication signal. At T2, (e) output voltage with modulation slightly falls since the LED current starts flowing. (b) Modulation control voltage also slightly falls as (e) output voltage with modulation falls.

During a period between time T2 and time T3, first switch element 2a is on due to the bias voltage, and thus the unloaded state is resolved and the LED current flows. Thus, (e) output voltage with modulation is prevented from exceeding overvoltage protection level L2, or in other words, malfunction of overvoltage protection circuit 64a is prevented.

At time T3, (b) modulation control voltage exceeds the modulation control operation level, and thus (c) modulating signal output becomes active, and (d) LED current is switched on and off.

The illumination light communication apparatus will be in a steady operating state after time T3.

As described above, the illumination light communication apparatus according to Embodiment 12 is an illumination light communication apparatus which modulates illumination light by causing an on state and an off state of the illumination light in accordance with a binary communication signal, and includes: power supply circuit 51a which includes an overvoltage protection circuit; load circuit 53 which is connected to power supply circuit 51a and emits the illumination light; first switch element 2a connected in series to the light source; signal generating circuit SG which generates the binary communication signal; bias circuit 1c which supplies a bias voltage which turns on first switch element 2a to a control terminal of first switch element 2a in a period after power on and until the signal generating circuit starts generating the binary communication signal; and second switch element 3a which is connected to the control terminal of first switch element 2a, and turns on and off in accordance with the binary communication signal.

According to this configuration, even if first switch element 2a is a normally-off switch, first switch element 2a appears to operate as a normally-on switch due to the bias voltage, and thus the unloaded state when power on is resolved. As a result, malfunction of the overvoltage protection circuit can be prevented at power on. The margin of the overvoltage protection level and flexibility of margin design can be increased.

Here, overvoltage protection circuit 64a may stop power supply operation if the output voltage becomes an overvoltage.

According to this configuration, the power supply circuit can be prevented from stopping due to malfunction of the overvoltage protection circuit at power on.

Here, first switch element 2a may be a normally-off switch transistor, bias circuit 1c may include first resistance element 6r, a terminal of first resistance element 6r may be connected to the power supply line of power supply circuit 51a, the other terminal of first resistance element 6r may be directly or indirectly connected to the control terminal of first switch element 2a, a terminal of second switch element may be connected to the control terminal of first switch element 2a, and the other terminal of the second switch element may be connected to the ground line.

According to this configuration, the bias voltage is supplied from the other terminal of the resistance element to the control terminal of first switch element 2a. Bias circuit 1c which supplies the bias voltage can be constituted by a simple resistance element. With the bias voltage, first switch element 2a appears to operate as a normally-on switch.

Here, first switch element 2a may be a normally-off switch transistor, bias circuit 1c may include, between the power supply line of the power supply circuit and the ground line, first resistance element 6r and second resistance element 7r which are connected in series, a point of connection between first resistance element 6r and second resistance element 7r may be electrically connected to the control terminal of first switch element 2a, and power may be supplied to the signal generating circuit through the power supply line of the power supply circuit via the point of connection between first resistance element 6r and second resistance element 7r.

According to this configuration, first switch element 2a appears to operate as a normally-on switch, due to the bias voltage. Further, bias circuit 1c can be constituted by a simple voltage divider circuit which includes the first resistance element and the second resistance element. The bias voltage can be readily generated as a voltage-dividing value of the voltage divider circuit.

Here, bias circuit 1c may include capacitative element 8 connected parallel to the second resistance element, and may supply power to the signal generating circuit through the power supply line of the power supply circuit via the point of connection between first resistance element 6r and second resistance element 7r.

According to this configuration, the voltage-dividing value of the voltage divider circuit which includes the first resistance element and the second resistance element can be used as a power supply voltage of the signal generating circuit.

The communication module according to Embodiment 12 is a communication module which modulates illumination light by causing an on state and an off state of the illumination light in accordance with a binary communication signal and is attachable to a lighting apparatus, and includes load circuit 53 which is a light source that is to be connected in series to a light source included in the lighting apparatus and emits the illumination light; first switch element 2a connected in series to the light source; signal generating circuit SG which generates the binary communication signal; bias circuit 1c which supplies a bias voltage which turns on the first switch element to a control terminal of first switch element 2a in a period after power on and until the signal generating circuit starts generating the binary communication signal; and second switch element 3a which is connected to the control terminal of first switch element 2a, and turns on and off in accordance with the binary communication signal, after signal generating circuit SG starts operation.

According to this configuration, the communication module can be added to the existing lighting device. Specifically, while the existing lighting device is used as it is, a light communication function can be added easily, and achieved at a lower cost than the case where a new light communication lighting device is installed. Malfunction of the overvoltage protection circuit can be prevented when the existing lighting device which includes a communication module is powered on.

Embodiment 13

The following describes an illumination light communication apparatus according to Embodiment 13. Embodiment 12 has described an example in which first switch element 2a is a normally-off switch transistor. In contrast, Embodiment 13 describes an example in which first switch element is a normally-on switch transistor.

Figure 88:
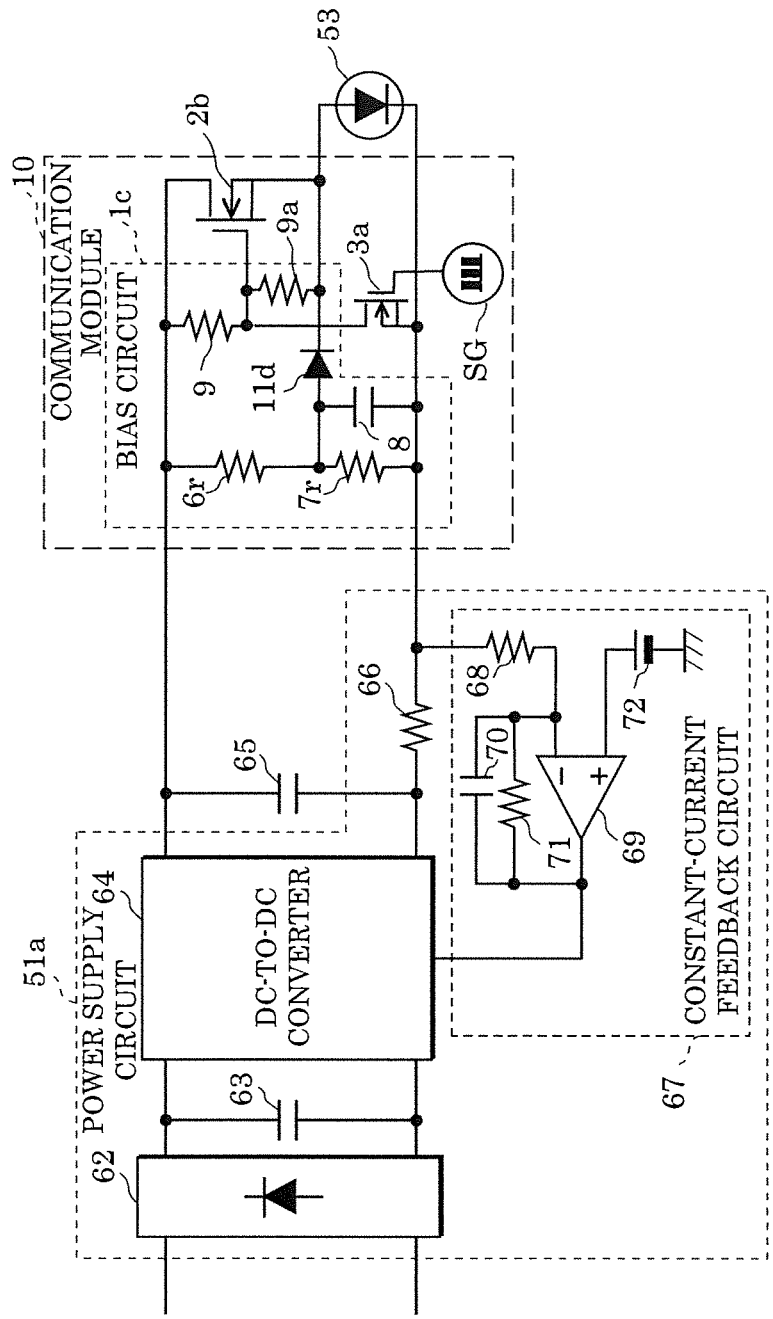
FIG. 88 is a circuit diagram illustrating a configuration example of an illumination light communication apparatus according to Embodiment 13.

FIG. 88 is a circuit diagram illustrating a configuration example of the illumination light communication apparatus according to Embodiment 13. The apparatus in FIG. 88 is different from the apparatus in FIG. 85 in the circuit configuration of communication module 10. The following mainly describes differences.

Communication module 10 in FIG. 88 is different from FIG. 85 in that first switch element 2b is included instead of first switch element 2a, and also in the circuit configuration of bias circuit 1c.

First switch element 2b is not a normally-off, but normally-on switch transistor.

Bias circuit 1c is configured to supply a bias voltage which applies a forward bias to a control terminal of first switch element 2b when second switch element 3a is off after power on, and supply a bias voltage which applies a reverse bias to the control terminal of first switch element 2b when second switch element 3a is on after power on. Specifically, bias circuit 1c includes first resistance element 6r, second resistance element 7r, capacitor 8, third resistance element 9, fourth resistance element 9a, and diode 11d.

First resistance element 6r and second resistance element 7r are connected in series between the power supply line of power supply circuit 51a and the ground line.

Third resistance element 9 and fourth resistance element 9a are connected in series. Third resistance element 9 and fourth resistance element 9a which are connected in series are electrically connected between the power supply line of the power supply circuit and the point of connection between first resistance element 6r and second resistance element 7r. Here, electrical connection includes direct connection and indirect connection. For example, a terminal of fourth resistance element 9a in FIG. 88 is indirectly connected to the point of connection between first resistance element 6r and second resistance element 7r, via diode 11d.

A terminal of first switch element 2b is connected to the power supply line, and another terminal of first switch element 2b is electrically connected to the point of connection between first resistance element 6r and second resistance element 7r. The control terminal of first switch element 2b is connected to the point of connection between third resistance element 9 and fourth resistance element 9a.

A terminal of second switch element 3a is connected to the control terminal of first switch element 2b, and the other terminal of second switch element 3a is connected to the ground line.

As described above, bias circuit 1c includes two stages of voltage divider circuits, namely, a voltage divider circuit which includes first resistance element 6r and second resistance element 7r, and a voltage divider circuit which includes third resistance element 9 and fourth resistance element 9a. A bias voltage applies a reverse bias when second switch element 3a is on, and thus first switch element 2b is turned off. During a period after power on and until signal generating circuit SG starts generating a communication signal, first switch element 2b is on since second switch element 3a is off, and the unloaded state is resolved.

A power supply voltage of signal generating circuit SG is supplied through the power supply line of power supply circuit 51a via a point of connection between first resistance element 6r and second resistance element 7r. Accordingly, bias circuit 1c includes capacitor 8 connected parallel to second resistance element 7r, in order to stabilize the power supply voltage supplied to signal generating circuit SG.

As described above, the illumination light communication apparatus according to Embodiment 13 is an illumination light communication apparatus which modulates illumination light by causing an on state and an off state of the illumination light in accordance with a binary communication signal, and includes: power supply circuit 51a which includes an overvoltage protection circuit; load circuit 53 which is connected to power supply circuit 51a and emits the illumination light; first switch element 2b which is connected in series to the light source; signal generating circuit SG which generates the binary communication signal; bias circuit 1c which supplies a bias voltage which turns on first switch element 2b to a control terminal of first switch element 2b in a period after power on and until the signal generating circuit starts generating the binary communication signal; and second switch element 3a which is connected to the control terminal of first switch element 2b, and turns on and off in accordance with the binary communication signal.

Here, first switch element 2b may be a normally-on switch transistor, the second switch element may be connected between the control terminal of first switch element 2b and a ground line, and bias circuit 1c may supply a bias voltage which applies a forward bias to the control terminal of first switch element 2b when the second switch element is off after power on, and supply a bias voltage which applies a reverse bias to the control terminal of first switch element 2b when the second switch element is on after power on.

According to this configuration, a normally-on switch transistor is used, and thus the unloaded state at power on is resolved and malfunction of the overvoltage protection circuit can be prevented.

Here, bias circuit 1c may include first resistance element 6r and second resistance element 7r which are connected in series between the power supply line of the power supply circuit and the ground line, and third resistance element 9 and fourth resistance element 9a which are connected in series, third resistance element 9 and fourth resistance element 9a may be electrically connected between the power supply line of the power supply circuit and a point of connection between first resistance element 6r and second resistance element 7r, a terminal of first switch element 2b may be connected to the power supply line, the other terminal of first switch element 2b may be electrically connected to the point of connection between first resistance element 6r and second resistance element 7r, the control terminal of first switch element 2b may be connected to a point of connection between third resistance element 9 and fourth resistance element 9a, a terminal of second switch element 3a may be connected to the control terminal of first switch element 2b, and the other terminal of second switch element 3a may be connected to the ground line.

According to this configuration, bias circuit 1c includes two stages of voltage divider circuits, namely a voltage divider circuit which includes the first and second resistance elements, and a voltage divider circuit which includes the third and fourth resistance elements. A bias voltage applies a reverse bias when the second switch element is on, and thus first switch element 2b is turned off.

Here, bias circuit 1c may include capacitative element 8 connected parallel to the second resistance element, may supply power to the signal generating circuit through the power supply line of the power supply circuit, via the point of connection between first resistance element 6r and second resistance element 7r.

According to this configuration a voltage-dividing value of the voltage divider circuit which includes the first resistance element and the second resistance element can be used as a power supply voltage of the signal generating circuit.

Comparative Example

The following describes a comparative example assumed to be an illumination light communication apparatus which does not include bias circuit 1c, in comparison with Embodiment 12.

Figure 89:
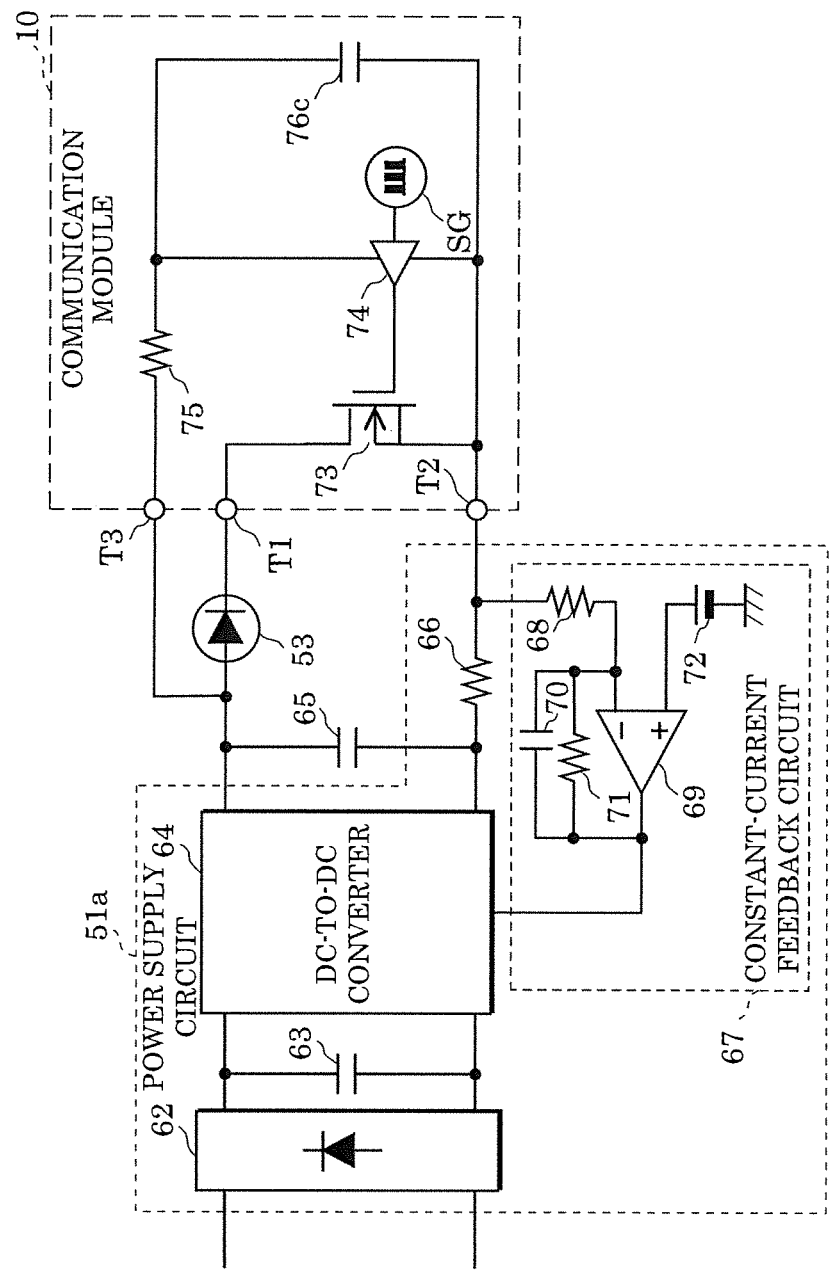

FIG. 89 is a circuit diagram illustrating a configuration example of the illumination light communication apparatus according to the comparative example. The apparatus in FIG. 89 is different from the apparatuses in FIG. 85 and FIG. 88 in that communication module 10 does not include bias circuit 1c. Specifically, communication module 10 includes first switch element 73, buffer 74, signal generating circuit SG, and capacitor 76c. Communication module 10 has a function of modulating illumination light 100% in accordance with a communication signal, but does not have the function of bias circuit 1c, and thus in a rise period at power on, the unloaded state may occur in power supply circuit 51a and malfunction of the overvoltage protection circuit may occur.

Figure 90:
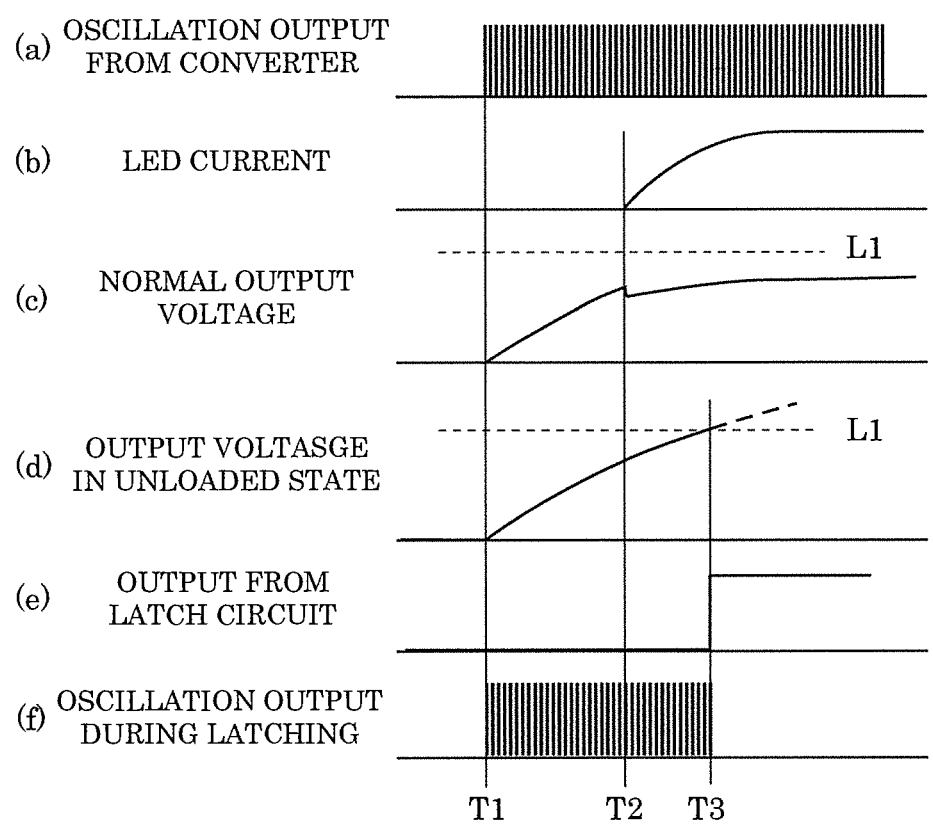

FIG. 90 is a time chart of potentials at portions of the illumination light communication apparatus according to the comparative example in FIG. 89. Here, DC-to-DC converter 64 in FIG. 89 is as illustrated in FIG. 86.

In FIG. 90, (a), (b), and (c) illustrate temporal changes in voltage and current of the portions when overvoltage protection circuit 64a does not malfunction. (a) Oscillation output from converter indicates a temporal change in voltage at an output terminal of error amplifier A1 or the control terminal of switch SW1 in FIG. 86. (b) LED current indicates a temporal change in current through the light source, that is, load circuit 53. (c) Normal output voltage indicates a temporal change in output voltage from power supply circuit 51*a* when overvoltage protection circuit 64*a* does not malfunction.

Power is on at time T1, (a) oscillation output from converter starts being output actively, and (b) LED current starts flowing at time T2. At time T2, (c) normal output voltage has not reached the overvoltage protection level, and (b) LED current starts flowing and thus the unloaded state is resolved. Stated differently, although the unloaded state lasts during a period from time T1 to time T2, but the unloaded state is resolved during a period from time T2 to time T3. The unloaded state is resolved in a state where (c) normal output voltage has not reached the overvoltage protection level, and thus malfunction of overvoltage protection circuit 64*a* does not occur.

In contrast, (d), (e), and (f) in FIG. 90 illustrate temporal changes in potentials at the portions when overvoltage protection circuit 64*a* malfunctions. (d) Output voltage in unloaded state indicates a temporal change in output voltage from power supply circuit 51*a* when the overvoltage protection circuit malfunctions. (e) Output from latch circuit La indicates a temporal change in output voltage from latch circuit La in FIG. 86 when the overvoltage protection circuit malfunctions. (f) Oscillation output during latching indicates a temporal change in voltage at the output terminal of error amplifier A1 or the control terminal of switch SW1 when the overvoltage protection circuit malfunctions. As shown by (d), (e), and (f) in FIG. 90, the rise of signal generating circuit SG is slow, and at time T3, signal generating circuit SG has not started operation, or in other words, is in the unloaded state in which the LED current is not flowing. Accordingly, (d) output voltage in unloaded state exceeds overvoltage protection level L1 at time T3, (e) output from latch circuit La is high, and (f) oscillation output during latching stops. Stated differently, at time T3, overvoltage protection circuit 64*a* malfunctions and stops supplying power.

Accordingly, if signal generating circuit SG is in the unloaded state during a period after power on and until signal generating circuit SG starts generating a communication signal, overvoltage protection circuit 64*a* may malfunction.

Variation

The following describes a variation of the illumination light communication apparatus.

Figure 91:
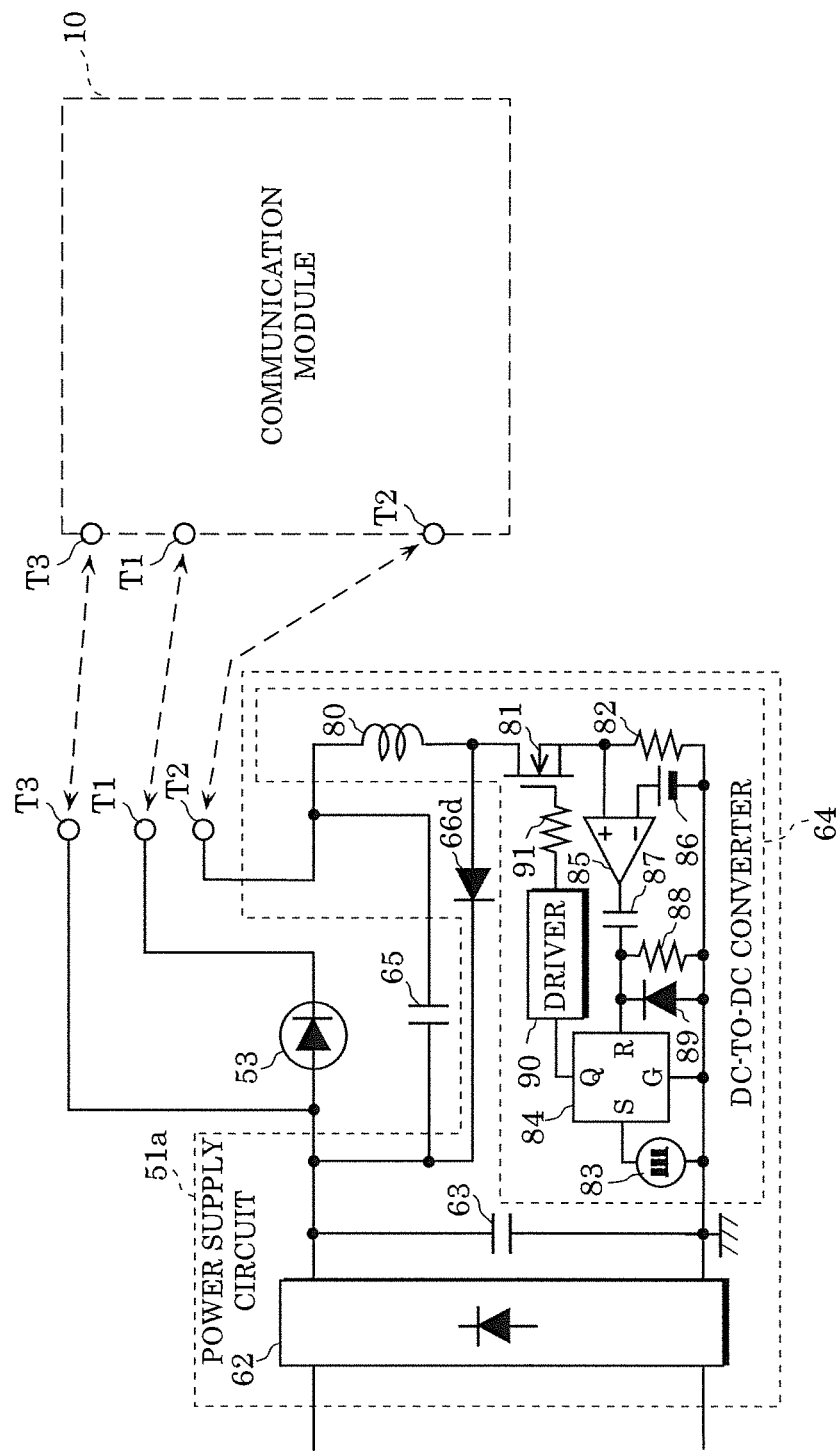

FIG. 91 is a circuit diagram illustrating a variation of the illumination light communication apparatus according to Embodiments 12 and 13. The illumination light communication apparatus in FIG. 91 differs from the apparatuses in FIGS. 85 and 88 in the circuit configuration inside power supply circuit 51*a*. The following mainly describes differences.

In power supply circuit 51*a* in FIGS. 85 and 88, constant-current feedback circuit 67 performs feedback control for maintaining an average of output current at a constant value, whereas power supply circuit 51*a* in FIG. 91 is configured to perform threshold control of switching current.

Power supply circuit 51*a* in FIG. 91 includes rectifier bridge 62, capacitor 63, and DC-to-DC converter 64. DC-to-DC converter 64 includes inductor 80, switch element 81, diode 66*d*, resistor 82, signal source 83, flip-flop 84, comparator 85, constant voltage source 86, capacitor 87, resistor 88, diode 89, driver 90, and gate resistor 91.

Inductor 80, switch element 81, and diode 66*d* are basic circuit elements which constitute DC-to-DC converter 64 as a buck converter.

Control for turning on and off switch element 81 is performed by signal source 83, flip-flop 84, comparator 85, and peripheral circuits thereof, and threshold control of switching current of switch element 81 is performed. Specifically, switching current also flows through load circuit 53 (light emitting diode), and the threshold control achieves an alternate function of the constant-current feedback. Such operation of DC-to-DC converter 64 is described with reference to FIG. 92.

Figure 92:
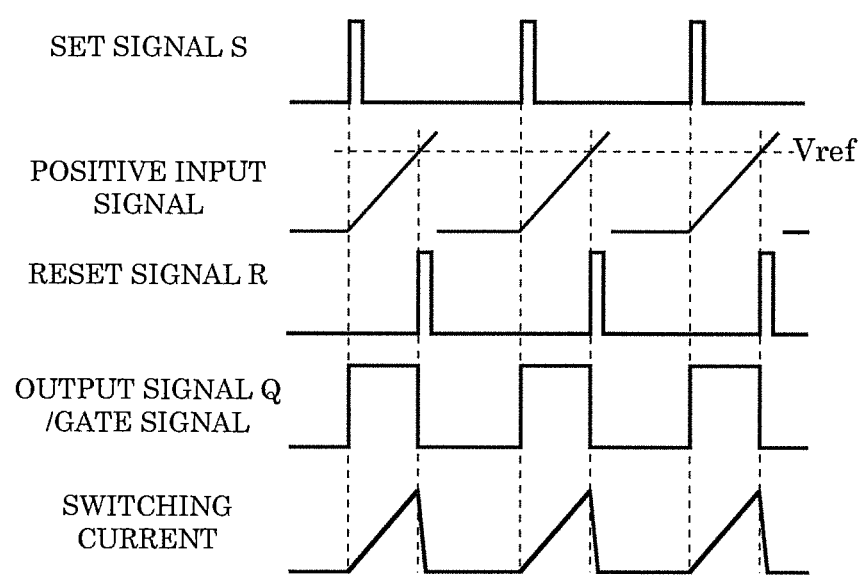

FIG. 92 is a waveform diagram illustrating threshold control of switching current by power supply circuit 51*a* in FIG. 91. Note that FIG. 92 is a diagram illustrating waveforms when terminals T1 and T2 are short-circuited in FIG. 91, or when communication module 10 is connected to terminals T1 and T2 and transistor 2 maintains the on state.

In FIG. 92, set signal S is a signal input from signal source 83 to set input terminal S of flip-flop 84. A positive input signal is input to the positive input terminal of comparator 85, and indicates a voltage drop across resistor 82, that is, the magnitude of current flowing through switch element 81. Reset signal R is input to the reset input terminal of flip-flop 84. Output signal Q is output from output terminal Q of flip-flop 84. Output signal Q passes through driver 90 and resistor 91, and is supplied to switch element 81 as a gate signal. Switching current flows through switch element 81, and is detected as a voltage drop across resistor 82.

A set signal is generated by signal source 83 and is periodically high. When set signal S is high, output signal Q from RS flip-flop 84 is high. Output signal Q is input to the gate of switch element 81 (MOSFET) via driver circuit 90 and gate resistor 91. Switch element 81 is turned on when output signal Q is high.

The magnitude of switching current (current flowing through switch element 81) is detected as a voltage drop across resistor 82, and the voltage drop is input to the positive input terminal of comparator 85 and is compared with reference voltage Vref applied to the negative input terminal of comparator 85. When the voltage drop reaches reference voltage Vref, the output from comparator 85 goes high and is converted into a pulse by a differentiation circuit which includes capacitor 87 and resistor 88, and the pulse is input to the reset input terminal of RS flip-flop 84. At this time point, output signal Q from flip-flop 84 goes low, and switch element 81 is turned off. Detecting the magnitude of current flowing through switch element 81 as the above switching current is a substitute for detecting the magnitude of current flowing through load circuit 53.

Such threshold control of the switching current is a substitute for constant-current feedback control in FIGS. 85 and 88, and maintains the average of output current at a constant value.

Note that power supply circuit 51*a* may perform constant-current feedback control in FIGS. 85 and 88 or switching current threshold control in FIG. 91.

Note that power supply circuit 51*a* in FIG. 91 may include overvoltage protection circuit 64*a*. In that case, power supply circuit 51*a* in FIG. 91 includes overvoltage protection circuit 64*a* illustrated in FIG. 86, and the non-inverting input terminal of AND circuit G1 is connected to output terminal Q of flip-flop 84.

Power supply circuit 51*a* may perform feedback control for maintaining an average of the current to be supplied at a constant value, as illustrated in FIGS. 85 and 88.

As illustrated in FIG. 91, power supply circuit 51*a* may include a buck converter which includes inductor 80 and switch element 81 (that is, DC-to-DC converter 64), detect the magnitude of current flowing through switch element 81, and control on and off of switch element 81, according to a difference between the detected value and a predetermined value.

Note that the above bias voltage may be a bias voltage having a biased voltage value if first switch element 2a or 2b is driven by voltage, and may be a bias current having a biased current value if first switch element 2a or 2b is driven by current.

Embodiment 14

Embodiments 14 to 18 describe a configuration in which the power supply circuit of the illumination light communication apparatus includes a constant-voltage feedback circuit, instead of the constant-voltage feedback circuit.

If a constant-voltage feedback power supply is included (for example, as illustrated in FIG. 1 of Japanese Unexamined Patent Application Publication No. 2010-283616), instead of the constant-current feedback power supply, great overshoot is less likely to occur in the LED current, and it is considered to achieve a reduction in the overshoot problem. However, when the constant-voltage feedback power supply is included, if visible light communication using 100% modulation is performed, a problem that the brightness of illumination light falls due to a decrease in average current by on and off of a switch arises.

The present embodiment describes an illumination light communication apparatus and a communication module which suppress fall of the brightness due to on/off of a switch and reduce error in reception by a receiving device even if the light communication using 100% modulation is performed using a constant-voltage feedback power supply.

An illumination light communication apparatus according to an aspect of the present embodiment includes: a light source which emits illumination light; a switch which is connected in series to the light source, and intermittently interrupts current which flows through the light source; a signal generating circuit which generates a binary communication signal which controls on and off of the switch to modulate the illumination light; a current limiting circuit which is connected in series to the light source and the switch, and limits the current which flows through the light source to prevent the current from exceeding a current set value corresponding to a reference value; a DC power supply circuit which applies a direct voltage to the light source, the switch, and the current limiting circuit which are connected in series; and a constant-voltage feedback circuit which controls the DC power supply circuit to maintain an average of voltage applied to the current limiting circuit at a constant value.

A communication module according to an aspect of the present embodiment is a communication module which is attachable to a lighting apparatus and modulates illumination light, and includes: a switch which is to be connected in series to a light source included in the lighting apparatus; a signal generating circuit which generates a binary communication signal which controls on and off of the switch to modulate the illumination light; a current limiting circuit which is connected in series to the light source and the switch, and limits current which flows through the light source; and first, second, and third terminals for attaching to the lighting apparatus, wherein the first terminal is connected to a switch-side terminal of a series circuit of the switch and the current limiting circuit, the second terminal is connected to a point of connection between the switch and the current limiting circuit in the series circuit, and the third terminal is connected to the other terminal of the series circuit on the current limiting circuit side.

The illumination light communication apparatus and the communication module according to the present embodiment yield advantageous effects of suppressing fall of the brightness due to on/off of a switch and reducing error in reception by a receiving device, even if light communication using 100% modulation is performed using a constant-voltage feedback power supply.

[14.1 Configuration of Illumination Light Communication Apparatus]

First, a configuration of the illumination light communication apparatus according to Embodiment 14 is described.

FIG. 93A is a circuit diagram illustrating a configuration of the illumination light communication apparatus according to Embodiment 14. The illumination light communication apparatus includes power supply circuit 52b having a function of maintaining output voltage at a constant value, smoothing capacitor (smoothing circuit) 65, load circuit 53, switch SW, signal generating circuit SG, and current limiting circuit 73.

Power supply circuit 52b includes rectifier bridge 62, capacitor 63, DC-to-DC converter 64 that is a DC power supply circuit, and constant-voltage feedback circuit 67a. Constant-voltage feedback circuit 67a includes input resistor 68, amplifier 69, capacitor 70, resistor 71, and reference voltage source 72.

In power supply circuit 52b, rectifier bridge 62 full-wave rectifies commercial power (for example, 100-V AC), capacitor 63 smoothes the resultant power, and thereafter DC-to-DC converter 64 converts the smoothed power into a desired direct voltage. Smoothing capacitor 65 is connected between the output terminals of DC-to-DC converter 64. In addition, a series circuit of load circuit 53, current limiting circuit 73, and switch SW is connected parallel to smoothing capacitor 65.

Power supply circuit 52b forms a kind of a constant-voltage power supply which feeds back a voltage applied to the two terminals of current limiting circuit 73 to DC-to-DC converter 64 of power supply circuit 52b via constant-voltage feedback circuit 67a, and controls a voltage applied to current limiting circuit 73 so that the voltage is constant.

Smoothing capacitor 65 is connected between the output terminals of power supply circuit 52b, and smoothes the output of power supply circuit 52b.

Load circuit 53 includes a plurality of light emitting diodes connected in series, between the output terminals of power supply circuit 52b, and the output from the power supply circuit is supplied to load circuit 53. The plurality of light emitting diodes constitute a light source which emits illumination light.

Switch SW is added in series with load circuit 53, and intermittently interrupts the current supplied from power supply circuit 52b to load circuit 53.

Signal generating circuit SG generates a binary communication signal which controls on and off of switch SW, in order to modulate illumination light. The communication signal is input to the control terminal of switch SW, and turns on and off switch SW. Note that signal generating circuit SG may repeatedly generate a communication signal which indicates an ID unique to the illumination light communication apparatus, and may generate a communication signal according to a transmission signal input from an external apparatus.

[14.2 Configuration of Current Limiting Circuit 73]

The following describes a configuration example of current limiting circuit 73.

Current limiting circuit 73 is further connected in series to load circuit 53 and switch SW, and suppresses the magnitude of current which flows through load circuit 53. For example, current limiting circuit 73 may be connected in series to switch SW and load circuit 53 which is a light source, and may limit current which flows through load circuit 53 according to a reference value to prevent the current from exceeding the current set value corresponding to the reference value. In this manner, even if light communication using 100% modulation is performed by using a constant-voltage feedback power supply, fall of the brightness due to on/off of a switch can be suppressed. Furthermore, at a moment when switch SW is brought from the off state to the on state, overshoot which occurs in the current flowing through load circuit 53 which is a light source can be reduced. Thus, error in reception by a receiving device can be reduced.

Current limiting circuit 73 includes transistor 74 which is a MOSFET, resistor 75 connected to the source of transistor 74, error amplifier 77, reference source 76, and control circuit 6.

Reference source 76 outputs a reference value to the positive input terminal of error amplifier 77. The reference value defines the upper limit (current set value) of current flowing through load circuit 53 which is a light source. For example, the reference value is proportional to the current set value. Reference source 76 may output the reference value as a fixed value, or may output a variable reference value according to the arrangement pattern (for example, bit pattern) of a communication signal generated by signal generating circuit SG.

Transistor 74 is connected in series to load circuit 53 which is a light source and switch SW, and limits current which flows through load circuit 53, based on the reference value.

Resistor 75 is a source resistor for detecting the magnitude of current flowing through load circuit 53. The source side terminal of resistor 75 is connected to the negative input terminal of error amplifier 77.

Reference source 76 is connected to the positive input terminal of error amplifier 77, and the source of transistor 74 is connected to the negative input terminal of error amplifier 77. Error amplifier 77 amplifies a difference between the reference value and the current value detected by resistor 75, and outputs the amplified signal to the gate of transistor 74.

Control circuit 6 performs control for changing the reference value from reference source 76 according to the arrangement pattern of a communication signal in order to cause reference source 76 to output a variable reference value. For example, control circuit 6 calculates a partial duty cycle of a communication signal, when the calculated partial duty cycle is a first proportion, sets the reference value to a first value, and sets the reference value to a second value smaller than the first value when the partial duty cycle is a second proportion higher than the first proportion. At this time, control circuit 6 may change the reference value so that the reference value is inversely proportional to the partial duty cycle of the communication signal. The "partial duty cycle" is, for example, a proportion of an on period immediately before the most recent off period with respect to a combination of the most recent off period and the on period. Alternatively, the "partial duty cycle" may be substituted with a moving average of most recent n-bit data in a communication signal. In this manner, if the magnitude of overshoot of current which flows through load circuit 53 depends on the partial duty cycle, overshoot can be mitigated more appropriately.

[14.3 Variation of Current Limiting Circuit 73]

The following describes first to third variations of current limiting circuit 73.

The configuration of current limiting circuit 73 in FIG. 93A is not limited to this configuration. For example, the internal configuration of current limiting circuit 73 may be the same as the first to third variations of current limiting circuit 1 illustrated in FIGS. 2 to 4.

Figure 93B:
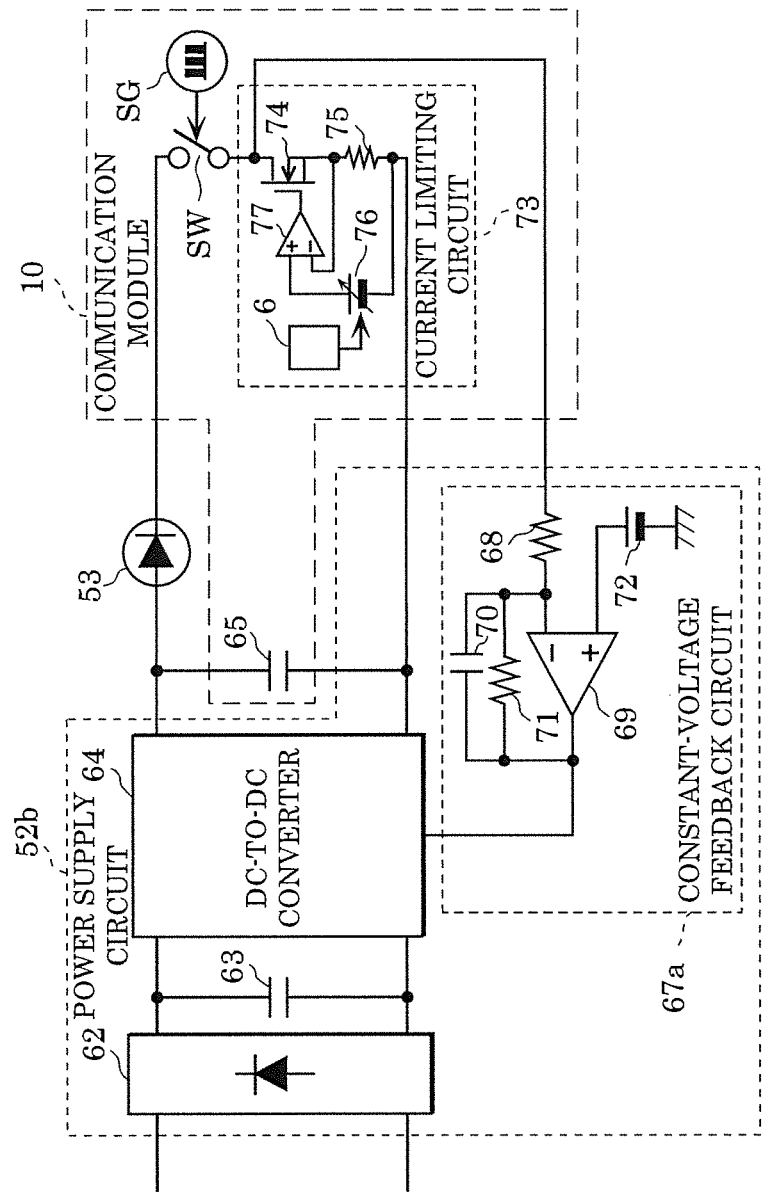

In the illumination light communication apparatus in FIG. 93A, a portion which includes current limiting circuit 73 may be achieved as attachable communication module 10, as illustrated in FIG. 93B.

Communication module 10 includes current limiting circuit 73, switch SW, and capacitor 65. Communication module 10 illustrated in FIG. 1A does not include capacitor 65, whereas communication module 10 illustrated in FIG. 93B includes capacitor 65. Capacitor 65 has a comparatively large capacitance and smoothes the output voltage from DC-to-DC converter 64. Communication module 10 may include an internal power supply circuit which generates a power supply voltage of communication module 10 from the voltage across the two terminals of capacitor 65. The internal power supply circuit may be the same as control source 126 illustrated in FIG. 65, and may be a three-terminal regulator, for example. In this manner, even if switch SW is off, the power supply voltage in communication module 10 can be continuously, stably supplied, and necessary power can be readily secured.

Note that communication module 10 illustrated in other drawings such as FIGS. 1A and 30A may have a configuration in which capacitor 65 and an internal power supply circuit are included as illustrated in FIG. 93B.

[14.4 Operation of Illumination Light Communication Apparatus]

Operation of the illumination light communication apparatus having the above configuration is described with reference to simulation results.

Figure 94B:
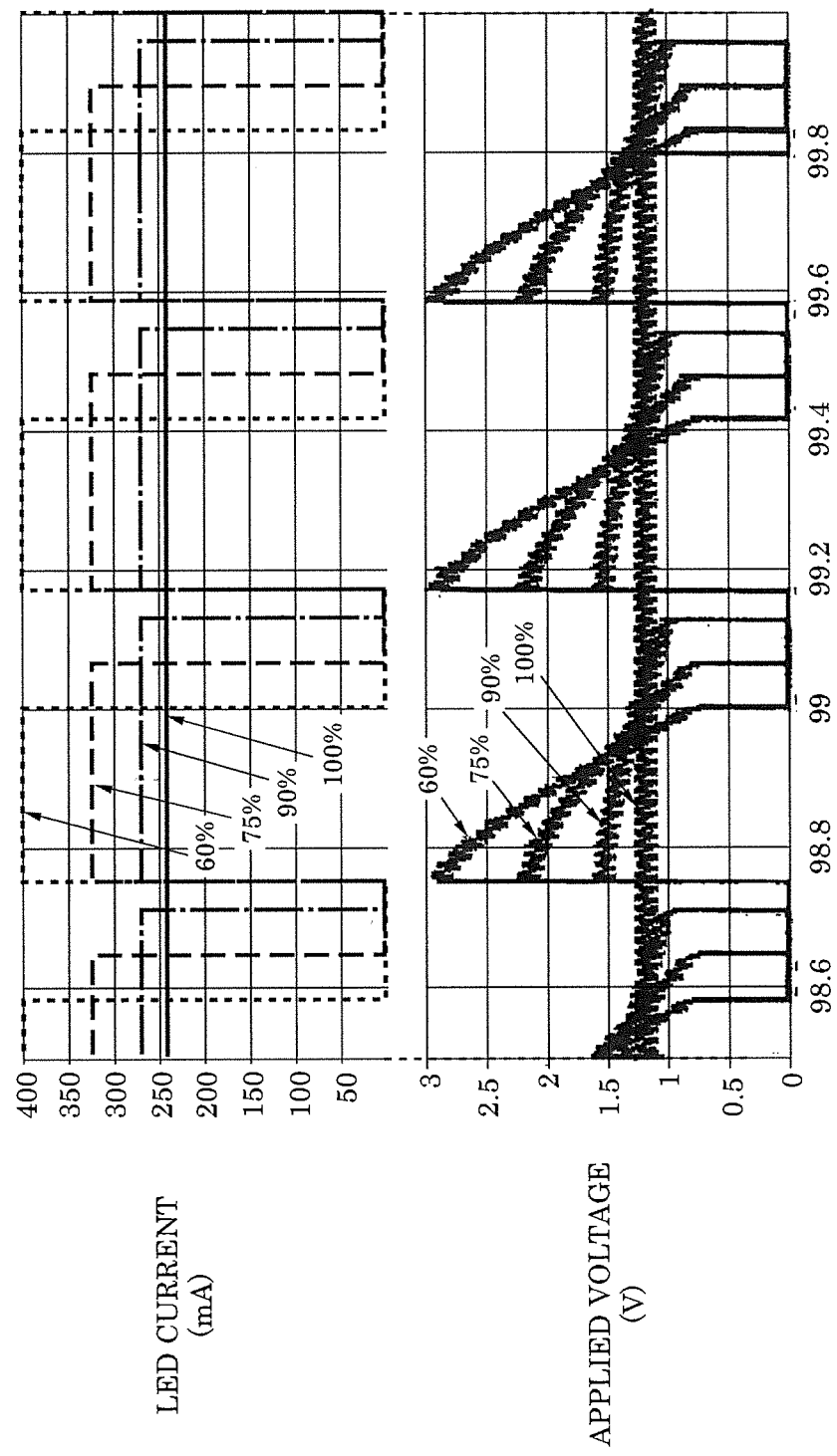

FIGS. 94A, 94B, 97A, and 97B illustrate simulation results for the apparatus as illustrated in FIG. 93A in which current limiting circuit 1 in FIG. 2 is used instead of current limiting circuit 73. FIG. 94A is a diagram illustrating a first simulation result for the apparatus as illustrated in FIG. 93A in which current limiting circuit 1 in FIG. 2 is used instead of current limiting circuit 73. FIG. 94A is a diagram illustrating an LED current and an output voltage waveform when the capacitance value of smoothing capacitor 65 is set to 20 uF, the frequency of a communication signal (modulating signal) from signal generating circuit SG is set to 2.4 kHz, and the duty cycle of switch SW is changed to four percentages, namely 60%, 75%, 90%, and 100%. The operating frequency of DC-to-DC converter 64 is set to 65 kHz, and an average of load current (LED current) which is not interrupted is set to 240 mA. At the duty cycles, a clamp current value (peak value) changes while the LED current waveform maintains a square wave, yet a voltage source of current limiting circuit 73 is varied so that an average of the LED current is maintained constant (240 mA), independently of the value of the duty cycle. In addition, the lower the duty cycle is, the greater pulsation component is included in the output voltage.

FIG. 94B is a diagram illustrating a second simulation result for the apparatus as illustrated in FIG. 93A in which current limiting circuit 1 in FIG. 2 is used instead of current limiting circuit 73. As illustrated in FIG. 94B, the peak value of the voltage applied to current limiting circuit 73 tends to be higher as the duty cycle is lower. Both when the duty cycle is high and low, this tendency allows the brightness of LEDs included in load circuit 53 to be maintained substantially constant.

Figure 95:
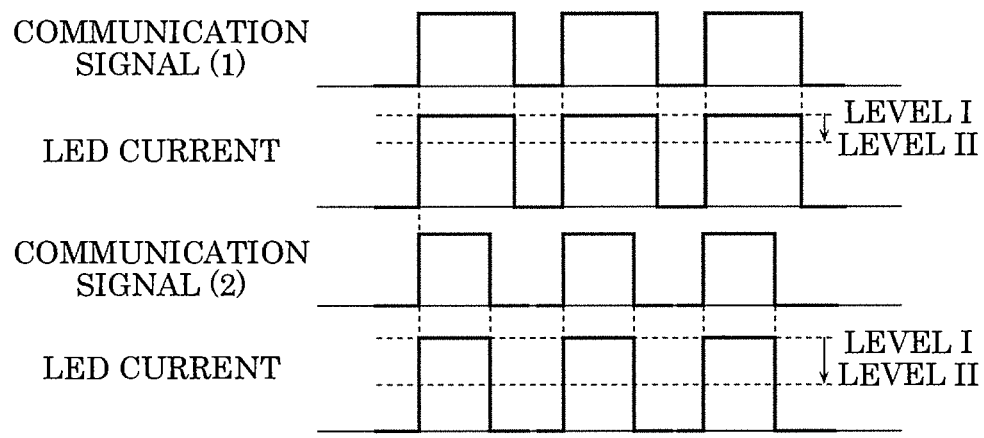
Figure 96:
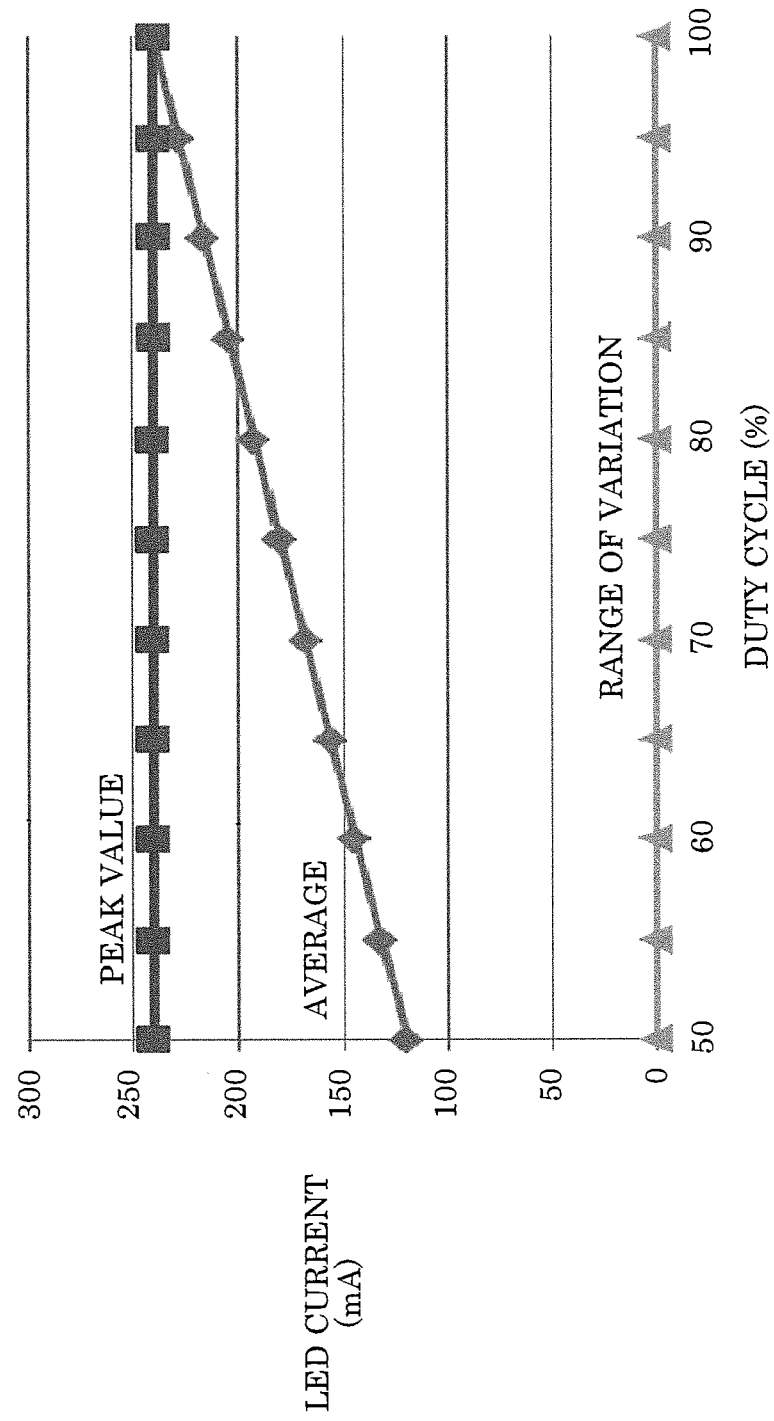

A relation between a duty cycle and brightness of LEDs is described with reference to FIGS. 95 and 96 illustrating comparative examples. FIG. 95 is a schematic diagram illustrating relations between LED current and two communication signals having different duty cycles. Note that FIG. 95 is a diagram illustrating the case where current limiting circuit 73 is not present, or the case where the current set value for current limiting circuit 73 is fixed.

Communication signal (1) indicates the case where the duty cycle is comparatively high. Communication signal (2) indicates the case where the duty cycle is comparatively low. In both the cases of communication signals (1) and (2), an average (level II) of the LED current when switch SW is turned on and off is smaller than the average (level I) when switch SW is not turned on/off. Level II of communication signal (2) having a lower duty cycle is lower than level II of communication signal (1). Thus, the value of average current when the switch is turned on and off is further decreased in proportion to the off duty ratio, when compared to a current value when the switch is not turned on and off. This indicates that inconvenience may be caused if the current set value is not controlled by current limiting circuit 73, the brightness changes once the LED load is turned on and off in order to perform light communication.

FIG. 96 is a diagram illustrating a relation between a duty cycle and LED current in the case where the current set value is fixed or in the case where current limiting circuit 73 is not present. From FIG. 96, even if the duty cycle represented by the horizontal axis changes, the peak value (level I in FIG. 95) of the LED current does not change, and the average (level II in FIG. 95) falls as the duty cycle is lower. Stated differently, the lower the duty cycle is, the darker illumination light is. Thus, the brightness falls due to visible light communication.

In contrast to FIGS. 95 and 96, according to the illumination light communication apparatus according to Embodiment 14 as illustrated in FIG. 94A, the lower the duty cycle is, the greater the peak value (that is, current set value) of the LED current is. In this manner, both when the duty cycle is low and high, the average of the LED current can be maintained constant, independently of whether switch SW is turned on and off or is not turned on and off, and also independently of the duty cycle, the brightness of illumination light can be maintained constant.

Figure 97A:
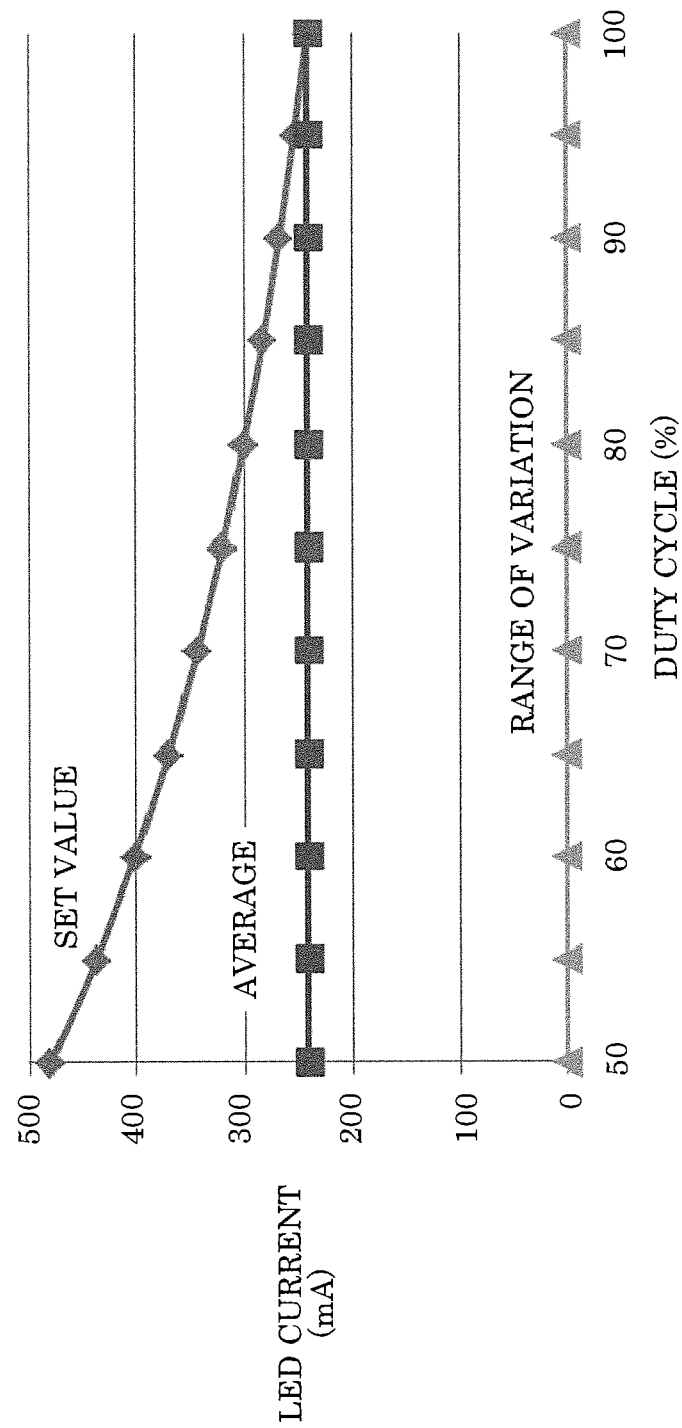
Figure 97B:
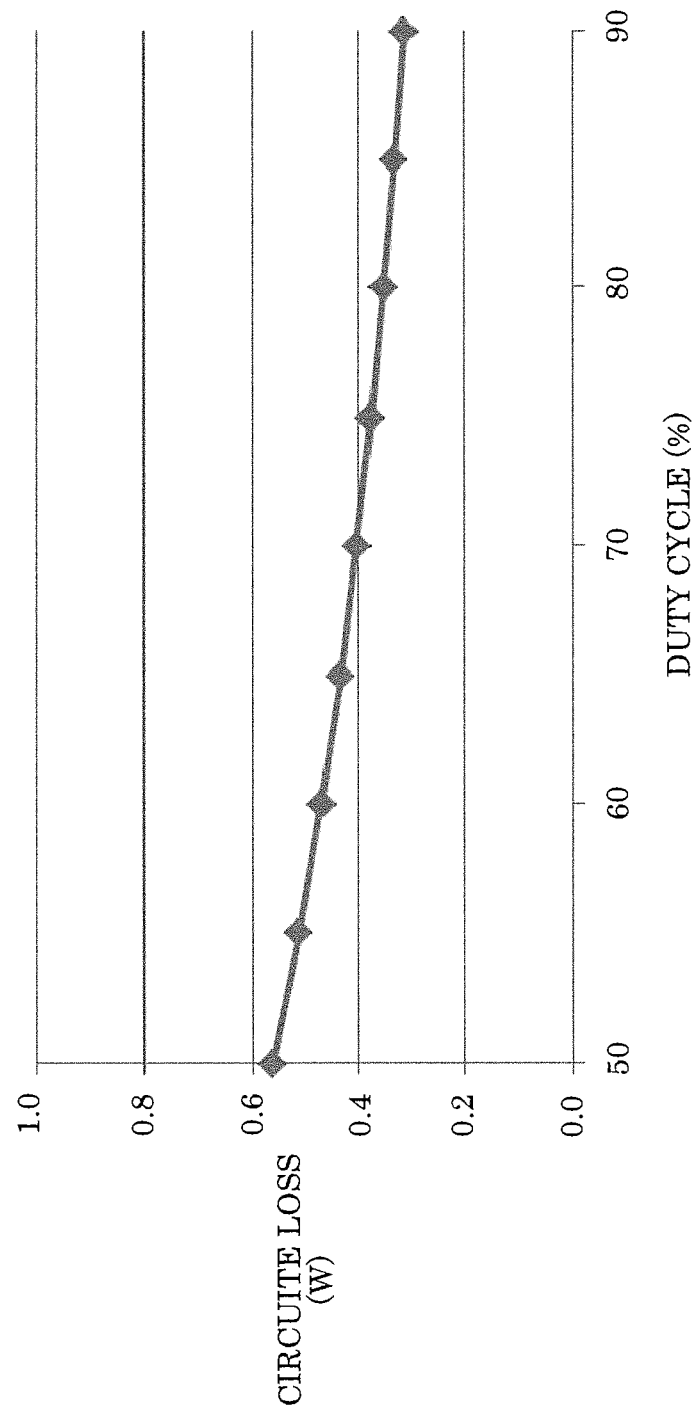

FIG. 97A is a diagram illustrating a third simulation result for the apparatus as illustrated in FIG. 93A in which current limiting circuit 1 in FIG. 2 is used instead of current limiting circuit 73. FIG. 97A is a diagram illustrating an optimal current set value for current limiting circuit 73 for each duty cycle. As illustrated in FIG. 97A, the current set value is variable for each duty cycle, and thus an average of the LED current can be made constant at a value when current is not interrupted. Thus, the fall of the brightness due to switch SW is suppressed. As illustrated in FIG. 97B, loss by current limiting circuit 73 (that is, power consumption of current limiting circuit 73) can be maintained at a low value.

FIG. 98 is a diagram illustrating LED current, output voltage, SW voltage, and voltage of the current limiting circuit in FIG. 93A. FIG. 98 is an explanatory diagram for calculating an optimal current set value for current limiting circuit 73, according to the duty cycle of a modulating signal from signal generating circuit SG. Power supply circuit 52b assumed to be included in the illumination light communication apparatus according to Embodiment 14 is a constant-voltage power supply, and has a constant-voltage feedback function as already described. As a typical example, power supply circuit 52b includes constant-voltage feedback circuit 67a in which an error amplifier as illustrated in FIG. 93A is used. Normally, a phase compensation circuit for securing the stability of a feedback system is further included. In such a phase compensation circuit, a compensation circuit which includes an integral element is used in order to adjust the gain and the phase in a loop transfer function, and feedback control performed using such a compensation circuit is known as PI control or PID control. In other words, such a phase compensation circuit is a means for controlling the average of a voltage applied to current limiting circuit 73 so that the average is constant.

Looking at the various waveforms illustrated in FIG. 98 in view of this point, first the LED current which flows when switch SW is on is maintained in a square-wave shape by current limiting circuit 73. During a period when switch SW is off, load current is interrupted, and thus the output voltage increases and is applied to switch SW. Next, during a period when switch SW is on, the output voltage decreases since the LED current flows, and also this voltage is applied to load circuit 53 which is a light source and current limiting circuit 73. The current through load circuit 53 has a square wave, and thus variation ΔVo of the output voltage is applied to current limiting circuit 73, and average Vave of the voltage waveform is controlled by constant-voltage feedback circuit 67a to be constant (about 1 V in the example illustrated in FIG. 98). Specifically, if settings of reference voltage source 72 of constant-voltage feedback circuit 67a are appropriately made, taking into consideration, for instance, the current value of the current through load circuit 53, the capacitance value of smoothing capacitor 65, and the variable range of the duty cycle, loss caused by current limiting circuit 73 can be suppressed almost within a desired range while maintaining the waveform of the LED current a square wave. Irrespective of the value of the duty cycle, the average of the LED current can be maintained at a constant value, by varying peak cut value Iop of the LED current to the value indicated by Expression (1) according to the duty cycle.

$$\text{Optimal current set value} = Iop = 100 \times Iave/ONd(\%) \quad (1)$$

Here, Iop is a peak cut value of the LED current, that is, the optimal current set value for current limiting circuit 73. Iave is an average of LED current which is not interrupted. ONd indicates the duty cycle (%) of switch SW.

A relation between the partial duty cycle of the communication signal and the optimal current set value is as illustrated in FIG. 29B. FIG. 29B illustrates the results of obtaining optimal current set values for duty cycles using Expression (1). In FIG. 29B, duty cycle ONd and the current set value have an inversely proportional relation.

As described above, the illumination light communication apparatus according to Embodiment 14 can mitigate overshoot of the LED current, reduce malfunction of a receiving device, and cause brightness of illumination light which is not modulated and brightness of illumination light which is modulated to appear substantially the same to people.

Embodiment 15

A description of an illumination light communication apparatus according to Embodiment 15 is given with reference to FIGS. 99A to 99C.

FIG. 99A is a circuit diagram illustrating a configuration of the illumination light communication apparatus according to Embodiment 15. The apparatus in FIG. 99A differs from the apparatus in FIG. 93A in that first current limiting circuit 73a and second current limiting circuit 73b are included instead of current limiting circuit 73. Also, another difference is that switch SW, signal generating circuit SG, and second current limiting circuit 73b are attachable, as communication module 10, at the portions of first to third terminals T1 to T3. The following mainly describes differences.

First current limiting circuit 73a is connected in series to load circuit 53 which is a light source and switch SW, and limits current which flows through first current limiting circuit 73a so as to prevent the current from exceeding the first current set value corresponding to the first reference value. Specifically, first current limiting circuit 73a includes transistor 74 which is a MOSFET, resistor 75 connected to the source of transistor 74, error amplifier 77, and reference source 76. Reference source 76 outputs the first reference value to the positive input terminal of error amplifier 77. The first reference value defines the first current set value for current flowing through load circuit 53 which is a light source. For example, the first reference value is proportional to the first current set value. Reference source 76 outputs the first reference value as a fixed value.

Second current limiting circuit 73b is connected parallel to first current limiting circuit 73a, and limits current which flows through second current limiting circuit 73b so as to prevent the current from exceeding second current set value corresponding to the second reference value.

FIG. 99C is a circuit diagram illustrating a specific configuration example of communication module 10 and second current limiting circuit 73b according to Embodiment 15. The configuration of second current limiting circuit 73b in FIG. 99C is similar to the configuration of current limiting circuit 73 illustrated in FIG. 93A, and current limiting circuit 73b operates similarly to current limiting circuit 73. The output from reference source 76 in FIG. 99C is called a second reference value. The upper limit of current flowing through second current limiting circuit 73b according to the second reference value is called a second current set value. It can be said that communication module 10 attachable at the portions of the first to third terminals has a configuration suitable for adding an illumination-light communication function by later being added to an existing LED lighting device. FIG. 99B is a circuit diagram illustrating a configuration of an illumination light communication apparatus according to Embodiment 15 to which communication module 10 is not added. If the illumination light communication apparatus (a normal lighting apparatus) does not include communication module 10 as illustrated in FIG. 99B, short line S10 which connects first terminal T1 and second terminal T2 may be included.

Operation of the apparatuses in FIGS. 99A and 99C is described using simulation results. FIG. 100 is a diagram illustrating simulation results obtained by using the example circuit in FIGS. 99A and 99C. As the main setting conditions of the simulations, a capacitance value of smoothing capacitor 65 is set to 20 μF, the frequency of a modulating signal from signal generating circuit SG is set to 2.4 kHz, the operating frequency of DC-to-DC converter 64 is set to 65 kHz, and an average of load current (LED current) flowing when switch SW is not turned on and off is set to 240 mA.

As illustrated in FIG. 100, a first current set value corresponding to the first reference value of reference source 76a for first current limiting circuit 73a is set to the current value (240 mA) of current flowing when switch element SW is not turned on and off (base current value in FIG. 100). The second current set value corresponding to the second reference value for second current limiting circuit 73b is increased as indicated by the "additional current value" in FIG. 100, with a decrease in the duty cycle of switch SW. The ideal set value in FIG. 100 is a sum of the first current set value and the second current set value. Accordingly, the average of current flowing through the LED load can be maintained constant irrespective of the duty cycle.

Next, FIG. 101 is an explanatory diagram for calculating an optimal second current set value for added second current limiting circuit 73b, according to the duty cycle of a modulating signal from signal generating circuit SG, in Embodiment 15. Also see the explanatory diagram illustrating the waveform of intermittent LED current illustrated in FIG. 29A. As already described with reference to FIG. 98, the first current set value for first current limiting circuit 73a and the second current set value for second current limiting circuit 73b are each for setting the peak cut value (Iop) of the LED current. In Embodiment 15, the first current set value is already set to a fixed value of 240 mA of LED current which is not interrupted in first current limiting circuit 73a, and thus it is optimal to set the second current set value (additional current set value) of added second current limiting circuit 73b to the value expressed by Expression (2) below.

$$Iop2 = Iave \times [100/ONd(\%) - 1] \quad (2)$$

Here, Iop2 denotes a current peak cut value of second current limiting circuit 73b, that is, the optimal additional current set value. Iave denotes an average of LED current not interrupted. ONd denotes a duty cycle (%) of switch SW.

FIG. 101 is a diagram illustrating current set values according to duty cycles. FIG. 101 illustrates results of obtaining optimal current set values for duty cycles using Expression (2). A total current set value in FIG. 101 indicates the sum of the first current set value and the second current set value. The additional current set value indicates the second current set value. In this example, the first current set value is a fixed value of 240 mA, and the second current set value is a variable value of 0 to 240 mA.

As described above, first current limiting circuit 73a and current limiting circuit 73b limit current which flows through switch SW so as to prevent the current from exceeding the sum of the first current set value and the second current set value. By setting the first current set value to a fixed value and varying the second current set value, the accuracy of circuit operation can be further improved and suppression of a fall of brightness of illumination light by turning on and off switch SW can be improved more appropriately. Furthermore, overshoot which occurs in LED current can be reduced, and malfunction of a receiving device can be reduced. Since second current limiting circuit 73b is configured to be attachable as a part of communication module 10, second current limiting circuit 73b can be readily added to an existing lighting apparatus.

Note that communication module 10 as illustrated in FIGS. 99A and 99C may not include switch SW and signal generating circuit SG, and may include only a circuit portion constituted by current limiting circuit 73b, second terminal T2, and third terminal T3. In this case, in FIG. 99B, switch SW and signal generating circuit SG are included instead of short line S10, and switch SW is connected between the first terminal and the second terminal.

Embodiment 16

A description is given of an illumination light communication apparatus according to Embodiment 16 with reference to FIG. 102. Here, the same symbols are assigned to circuit parts common to those in FIG. 93A, and a description is given focusing on circuit portions added and changed.

Embodiment 16 describes a specific configuration of varying the value of the reference source according to the duty cycle described in Embodiment 14, which is achieved by including constant-current feedback circuit 167 instead of control circuit 6 in FIG. 93A.

FIG. 102 is a circuit diagram illustrating a configuration of the illumination light communication apparatus according to Embodiment 16. Compared to Embodiment 14 (FIG. 93A), the apparatus in FIG. 102 constitutes a feedback system by further newly including resistor 66 for detecting LED current, constant-current feedback circuit 167, and level shifter 78, instead of control circuit 6 which varies reference source 76 of current limiting circuit 73. Regarding constant-current feedback circuit 167, resistor 66 is connected to the negative input terminal of error amplifier 169 via input resistor 168, and constant voltage source 72*c* is connected to the positive input terminal of error amplifier 169. Gain control resistor 71*r* and phase compensation capacitor 170 are connected between the output terminal of error amplifier 169 and the negative input terminal of error amplifier 169.

Constant-current feedback circuit 167 controls the voltage at the positive input terminal of error amplifier 77 of current limiting circuit 73, so that a voltage drop across resistor 66 for detecting LED current matches the value of constant voltage source 72*c*. Note that level shifter 78 is needed when the operation reference point of current limiting circuit 73 and the operation reference point of constant-current feedback circuit 167 are different.

FIGS. 104 to 106 illustrate simulation results for verifying operation in Embodiment 16 (FIG. 102). As the main setting conditions of the simulations, the capacitance value of smoothing capacitor 65 is set to 20 μF, the operating frequency of DC-to-DC converter 64 is set to 65 kHz, an average of the load current (LED current) when switch SW is not turned on and off is set to 240 mA.

FIG. 104 is a diagram illustrating third simulation results for the example circuit in FIG. 102. FIG. 104 illustrates average, peak value (peak cut value), and variation (changed portion of the peak value) of LED current, with the horizontal axis indicating the duty cycle, and the average of the LED current is maintained constant, irrespective of the duty cycle. Furthermore, it can be seen that the range of variation is also small and the LED current keeps having a square wave.

FIG. 105 is a diagram illustrating second simulation results using the example circuit in FIG. 102. FIG. 105 illustrates a range of variation of the results in ripple percentage, and slight variations which are recognizable include a high frequency ripple.

FIG. 106 is a diagram illustrating third simulation results for the example circuit in FIG. 102. FIG. 106 illustrates loss caused by current limiting circuit 73 with the horizontal axis indicating a duty cycle. It can be seen that the loss is maintained low, irrespective of the duty cycle.

According to the illumination light communication apparatus according to Embodiment 16 illustrated in FIG. 102, if light communication is performed by tuning on and off switch SW, the average of LED current can be maintained constant, irrespective of the duty cycle of switch SW, and thus a change in brightness and flicker as a light can be prevented during communication. Current limiting circuit 73 is connected, and thus the waveform of the LED current maintains a square wave, and overshoot which may trigger malfunction of a receiving device is mitigated. Furthermore, the voltage applied to current limiting circuit 73 is controlled by constant-voltage feedback circuit 67*a* to have a desired average, and thus loss caused by current limiting circuit 73 can also be reduced.

Embodiment 17

The illumination light communication apparatus according to Embodiment 17 is described with reference to FIG. 103. Here, the same symbols are assigned to the circuit parts common to those in FIG. 99, and a description is given focusing on circuit portions added and changed. Embodiment 17 describes a specific configuration of varying, according to a duty cycle, the second reference value, which is described in Embodiment 15.

In the apparatus in FIG. 103, a feedback system is constituted by newly adding resistor 66 for detecting LED current, constant-current feedback circuit 167, and level shifter 78, as a method of varying the value of reference source 76 of second current limiting circuit 73*b* in Embodiment 15 (FIGS. 99A and 99C). Regarding constant-current feedback circuit 167, resistor 66 is connected to the negative input terminal of error amplifier 169 via input resistor 168, and also constant voltage source 72*c* is connected to the positive terminal of error amplifier 169. Gain control resistor 71*r* and phase compensation capacitor 170 are connected between the output terminal and the negative input terminal of error amplifier 169.

Constant-current feedback circuit 167 controls the voltage at the positive input terminal of error amplifier 77 of second current limiting circuit 73*b* so that a voltage drop across sense resistor 66 for detecting LED current and the value of constant voltage source 72*c* match. Note that level shifter 78 is needed when the operation reference point of second current limiting circuit 73*b*, and the operation reference point of constant-current feedback circuit 167 are different.

FIGS. 107 to 109 illustrate simulation results for verifying operation in Embodiment 17 (FIG. 103). As the main setting conditions of the simulations, the capacitance value of smoothing capacitor 65 is set to 20 μF, the frequency of a modulating signal from signal generating circuit SG is set to 2.4 kHz, the operating frequency of DC-to-DC converter 64 is set to 65 kHz, and an average of load current (LED current) obtained when switch SW is not turned on and off is set to 240 mA.

FIG. 107 is a diagram illustrating first simulation results for the example circuit in FIG. 103. FIG. 107 illustrates average, peak value (peak cut value), and a variation (change in a peak value) of LED current, with the horizontal axis indicating the duty cycle, and the average of the LED current is maintained constant, irrespective of the duty cycle. The range of variation is small, and it can be seen that the LED current keeps having the square wave.

FIG. 108 is a diagram illustrating second simulation results using the example circuit in FIG. 103. FIG. 108 illustrates a range of variation of the results in ripple percentage, and slight variations which are recognizable include a high frequency ripple.

FIG. 109 is a diagram illustrating third simulation results for the example circuit in FIG. 103. FIG. 109 illustrates loss caused by first current limiting circuit 73*a* and second current limiting circuit 73*b*, with the horizontal axis indicating the duty cycle. It can be seen that the loss is suppressed low, irrespective of the duty cycle.

According to Embodiment 17 illustrated in FIG. 103, when light communication is performed by turning on and off switch SW, the average of LED current can be maintained constant, irrespective of the duty cycle of switch SW, and thus change in brightness and flicker as a light can be prevented during communication. First current limiting circuit 73a and second current limiting circuit 73b are connected, and thus the waveform of the LED current maintains a square wave, and overshoot which may trigger malfunction of a receiving device is mitigated. Furthermore, a voltage applied to first current limiting circuit 73a and second current limiting circuit 73b is controlled by constant-voltage feedback circuit 67a to have a desired average, and thus loss caused by first current limiting circuit 73a and second current limiting circuit 73b can be reduced.

In addition, if a circuit part constituted by second current limiting circuit 73b, constant-current feedback circuit 167, level shifter 78, and switch SW in FIG. 103 is achieved as a communication module which is later attached to an existing LED lighting device, a feature of readily adding an illumination-light communication function is achieved. Note that the communication module may be achieved as a circuit part constituted by second current limiting circuit 73b, constant-current feedback circuit 167, and level shifter 78 in FIG. 103, without switch SW.

Embodiment 18

FIGS. 110 and 111 illustrate an illumination light communication apparatus according to Embodiment 18. The basic main circuit configurations illustrated in the drawings are the same as those in FIGS. 93A and 99A, and the same symbols are assigned. The apparatuses in FIGS. 110 and 111 differ from the apparatuses in FIGS. 93A and 99A in that a specific configuration example of control circuit 6 and a specific configuration example of signal generating circuit SG are shown as block diagrams. The following mainly describes differences.

Control circuit 6 and signal generating circuit SG in FIGS. 110 and 111 are the same as control circuit 6 and signal generating circuit SG in FIG. 83, and are as already described.

Here, FIGS. 112A and 112B illustrate example circuits of reference source 76 which switches the reference value or the second reference value.

FIG. 112A is a circuit diagram illustrating a current limiting circuit which includes a first variation of reference source 76 in Embodiment 18. Current limiting circuit 73 illustrated in FIG. 112A includes transistor 2 which is a MOSFET, resistor 3 connected to the source of transistor 2, reference source 76, and control circuit 6. Reference source 76 includes constant voltage source 4a, voltage dividing resistors R1, R6, R7, and R8, and switch elements S01 to S03 for switching between voltage division ratios.

Control circuit 6 may switch between switch elements S01 to S03 by calculating an appropriate value of a reference voltage according to the signal arrangement of a communication signal, or by selecting an appropriate value of a reference voltage from an association table prepared in advance. The greater the numbers of resistors and switch elements of a partial pressure circuit, the more levels the reference voltage can be switched at.

FIG. 112B is a circuit diagram illustrating a current limiting circuit which includes a second variation of reference source 76 according to Embodiment 18. Current limiting circuit 73 in FIG. 112B includes transistor 2 which is a MOSFET, resistor 3 connected to the source of transistor 2, reference source 76, and control circuit 6. Reference source 76 includes constant voltage source 4a, voltage dividing resistors R11, R12, R13, and R14, and switch elements S01 and S02 for switching between voltage division ratios.

The positive potential side of constant voltage source 4a is connected to the positive input terminal of error amplifier 5 via resistor R11. A series circuit of resistors R12, R13, and R14 is included between the negative potential side of constant voltage source 4a and a point of connection between the positive potential side and the positive input terminal, and switch elements S01 and S02 which short-circuit one or two of the resistors are connected.

Note that in FIGS. 112A and 112B, the greater the numbers of resistors and selector switches of a voltage divider circuit, the more levels the reference voltage can be switched at.

An example operation of control circuit 6 illustrated in FIGS. 110 and 111 is as already described with reference to the flowchart illustrated in FIG. 84A, the explanatory diagram of shift register 6a illustrated in FIG. 84B, and the flowchart showing an example of correction illustrated in FIG. 84C.

According to Embodiment 18 as described above, overshoot which occurs in current flowing through a light source (that is, load circuit 53) at a moment when switch SW is brought from the off state to the on state can be reduced, and thus error in reception by a receiving device can be reduced. In addition, the partial duty cycle is calculated using a shift register, and the reference value is determined according to the calculated partial duty cycle, and thus the reference value can be more dynamically set to an appropriate value.

The illumination light communication apparatus according to Embodiments 14 to 18 as described above includes: a light source which emits illumination light; switch SW which is connected in series to the light source, and intermittently interrupts current which flows through the light source; signal generating circuit SG which generates a binary communication signal which controls on and off of switch SW to modulate the illumination light; current limiting circuit 73 which is connected in series to the light source and switch SW, and limits the current which flows through the light source to prevent the current from exceeding a current set value corresponding to a reference value; DC-to-DC converter which applies a direct voltage to the light source, the switch, and the current limiting circuit which are connected in series; and constant-voltage feedback circuit 67 which controls the DC power supply circuit to maintain an average of voltage applied to the current limiting circuit at a constant value.

According to this, even if light communication using 100% modulation is performed by using a constant-voltage feedback power supply, fall of brightness due to turning on and off the switch can be suppressed. In addition, overshoot which occurs in current flowing through a light source (that is, load circuit 53) at a moment when switch SW is brought from the off state to the on state, and thus error in reception by a receiving device can be reduced.

Here, current limiting circuit 73 may include: reference source 76 which outputs the reference value; transistor 74 which is connected in series to the light source and switch SW, and limits current which flows through the light source based on the reference value; and control circuit 6 which measures a partial duty cycle of the communication signal, sets the reference value to a first value when the partial duty cycle is a first proportion, and sets the reference value to a second value smaller than the first value when the partial duty cycle is a second proportion higher than the first proportion. A current set value corresponding to the second value may be smaller than a current set value corresponding to the first value.

According to this, if the magnitude of overshoot depends on the partial duty cycle, overshoot can be appropriately mitigated.

Here, control circuit 6 may change the reference value so that the current set value is inversely proportional to the partial duty cycle.

Here, control circuit 6 may change the reference value so as to satisfy the following expression.

$$I1=(Iave/ONd)\times 100$$

Here, I1 denotes the current set value, Iave denotes an average current flowing through the light source when illumination light is not modulated by turning on and off the switch, and ONd denotes a partial duty cycle (whose unit is %) of a communication signal.

According to this, overshoot can be mitigated, and brightness of illumination light not modulated and brightness of illumination light modulated can be caused to appear substantially the same to people.

Here, control circuit 6 may include detector 168 which detects the magnitude of current flowing through the light source, and constant-current feedback circuit 167 which performs feedback control for changing the reference value according to the magnitude of the current detected by the detector, to maintain an average of current flowing through the light source at a constant value.

An illumination light communication apparatus according to Embodiments 14 to 18 includes: light source 53 which emits illumination light; switch SW which is connected in series to the light source, and intermittently interrupts current which flows through the light source; signal generating circuit SG which generates a binary communication signal which controls on and off of the switch to modulate the illumination light; first current limiting circuit 73 which is connected in series to the light source and the switch, and limits the current which flows through first current limiting circuit 73 to prevent the current from exceeding a first current set value corresponding to a first reference value; second current limiting circuit 73b which is connected parallel to the first current limiting circuit, and limits current which flows through second current limiting circuit 73b to prevent the current from exceeding a second current set value corresponding to a second reference value; DC-to-DC converter 64 which applies a direct voltage to the light source, the switch, and the first current limiting circuit which are connected in series; and constant-voltage feedback circuit 67a which controls the DC power supply circuit to maintain an average of output voltage from the DC power supply circuit at a constant value.

According to this, even if light communication using 100% modulation is performed by using a constant-voltage feedback power supply, fall of brightness by turning on and off the switch can be suppressed. In addition, the first current limiting circuit and the second current limiting circuit limit current which flows through the switch so as to prevent the current from exceeding the sum of the first current set value and the second current set value. By setting the first current set value to a fixed value and varying the second current set value, the accuracy of circuit operation can be further improved. Thus, overshoot which occurs in LED current can be reduced and malfunction of a receiving device can be reduced.

Here, the second current limiting circuit may change the second reference value so as to satisfy the following expression.

$$I2=(Iave/ONd)\times 100$$

Here, I2 denotes the second current set value, Iave denotes average current flowing through the light source when illumination light is not modulated by turning on and off the switch, and ONd denotes a partial duty cycle (whose unit is %) of a communication signal.

Here, the second current limiting circuit may include: a detector which detects a magnitude of current flowing through the light source; and constant-current feedback circuit 167 which performs feedback control for changing the reference value according to the magnitude of current detected by the detector, to maintain an average of current through the light source at a constant value.

Here, control circuit 6 may include shift register 6a which shifts and stores leading n-bit data in the binary communication signal, where n is an integer of 2 or more, calculate a moving average of data of a predetermined number of bits from the tail end of shift register 6a, as a partial duty cycle, correct the moving average, based on a bit pattern of n-bit data stored in the shift register, and determine a reference value corresponding to the corrected moving average.

Here, the second current limiting circuit may include control circuit 6 which includes shift register 6a which shifts and stores leading n-bit data in the binary communication signal, where n is an integer of 2 or more, and control circuit 6 may calculate a moving average of data of a predetermined number of bits from the tail end of shift register 6a, as a partial duty cycle, correct the moving average, based on a bit pattern of n-bit data stored in the shift register, and determine a reference value corresponding to the corrected moving average.

Here, when correcting the moving average, if the first bit from the tail end of the shift register is 1, and the second bit and bits following the second bit are 0, control circuit 6 may raise the moving average to the power of a coefficient smaller than 1, the power being the same number as the number of successive bits 0.

Here, when correcting the moving average, if the first bit from the end of the n-bit data is 1 and the second or third bit and bits following the second or third bit 1, the control circuit may raise the moving average to the power of a coefficient larger than 1, the power being the same number as the number of successive bits 1.

Here, the control circuit may use, as a partial duty cycle, $(1-(1/N))\times 100(\%)$ which is an average duty cycle of the communication signal on which N-value pulse position modulation (N is an integer of 2 or more) is performed, instead of calculating the moving average.

Here, the communication signal may have been subjected to N-value pulse position modulation, and the number of bits of the shift register and the number of bits of a moving average may be greater than or equal to N.

Here, the reference source may include a constant voltage source which generates a fixed voltage, a plurality of resistance elements which divide a voltage generated by the constant voltage source, and one or more switch elements connected in series or parallel to the resistance elements, and the control circuit may control on and off of the one or more switch elements according to the corrected value.

Here, the second current limiting circuit may be configured to be attachable to the illumination light communication apparatus.

A communication module according to Embodiments 14 to 18 is communication module 10 which is attachable to a lighting apparatus and modulates illumination light, and includes: switch SW which is to be connected in series to a light source included in the lighting apparatus; signal generating circuit SG which generates a binary communication signal which controls on and off of the switch to modulate the illumination light; current limiting circuit 73 which is connected in series to the light source and the switch, and limits current which flows through the light source; and first, second, and third terminals T1 to T3 for attaching to the lighting apparatus, wherein first terminal T1 is connected to a switch-side terminal of a series circuit of the switch and the current limiting circuit, second terminal T2 is connected to a point of connection between the switch and the current limiting circuit in the series circuit, and third terminal T3 is connected to the other terminal of the series circuit on the current limiting circuit side.

According to this, the communication module can be added to an existing lighting device. Specifically, a light communication function can be readily added while using the existing lighting device as it is, and achieved at a lower cost than the case where a new light communication lighting device is installed. Even if light communication using 100% modulation is performed by using a constant-voltage feedback power supply, fall of brightness due to turning on and off the switch can be suppressed. In addition, overshoot which occurs in current flowing through a light source (that is, load circuit 53) at a moment when switch SW is brought from the off state to the on state is reduced, and thus error in reception by a receiving device can be reduced.

Embodiment 19

In general, in order for a lighting apparatus which dims illumination light by pulse width modulation (PWM) to achieve a visible light communication, a color balance may be upset due to a mix of the PWM control and the modulation for visible light communication.

Thus, an illumination light communication apparatus according to Embodiment 19 can prevent upset of color balance.

An illumination light communication apparatus according to the present embodiment includes: light emitters which emit light having different colors; a dimming controller which controls a dimming level of each of the light emitters; and a modulation controller which superimposes a binary communication signal on light emitted by each of the light emitters by performing modulation of temporally switching each of the light emitters between emitting light and emitting no light, the light emitters each including: the light source which emits the light; the switch which is connected in series to the light source and intermittently interrupts current which flows through the light source; and the power supply circuit which supplies power to the light source, wherein for each of the light emitters, the dimming controller performs, by controlling the power supply, amplitude dimming for controlling an intensity of light emitted by a light emitter when the dimming level of the light emitter is higher than a reference level, and PWM dimming for controlling a duty cycle of the light emitter when the modulation is not performed and the dimming level of the light emitter is lower than the reference level, the duty cycle being a proportion of time in which the light emitter is emitting light over a cycle of the light emitter emitting light and emitting no light, for each of the light emitters, the modulation controller performs, when the modulation is performed and the dimming level of a light emitter is higher than the reference level, the modulation on the light emitter by controlling the switch, and when the modulation is performed and the dimming level of the light emitter is lower than the reference level, a first control on the light emitter, the first control including: (1) not performing the PWM dimming using the power supply circuit; and (2) performing, by controlling the switch, modulation to cause the modulation for superimposing the binary communication signal on the light emitted by the light emitter and the PWM dimming to be simultaneously performed and the light emitter to start emitting light in synchronization with light emitters other than the light emitter.

Moreover, a receiving device according to one aspect of the present embodiment includes: a light receiving portion which receives light beams having different colors, the light beams having a binary communication signal superimposed thereon by modulation of temporally switching each of the light emitters between emitting light and emitting no light; and a demodulator which (1) if a ratio in brightness of each of the light beams received by the light receiving portion relative to any of the other light beams is greater than a predetermined value, demodulates the binary communication signal using all the light beams, and (2) if one of ratios in brightness of the light beams is less than the predetermined value, demodulate the binary communication signal using light beams other than the light beam whose ratio in brightness is less than the predetermined value.

According to the illumination light communication apparatus and the receiving device of the present embodiment, upset of color balance can be prevented.

[19.1 Configuration of Illumination Light Communication Apparatus]

Initially, a configuration of the illumination light communication apparatus according to Embodiment 19 is described. FIG. 113 is a block diagram of a configuration of illumination light communication apparatus 100 according to Embodiment 19.

Illumination light communication apparatus 100 illustrated in FIG. 113 functions as a visible light communication transmitter which transmits a signal by modulating an intensity of illumination light. Illumination light communication apparatus 100 is also, for example, a RGB floodlight which projects color light. Illumination light communication apparatus 100 includes light emitters 201R, 201G, 201B, dimming controller 202, and modulation controller 203.

Light emitter 201R emits red light. Light emitter 201G emits green light. Light emitter 201B emits blue light.

Dimming controller 202 controls dimming levels (brightness) of light emitters 201R, 201G, and 201B. Specifically, dimming controller 202 generates dimming signals S1R, S2R and S3R for controlling the dimming levels of light emitters 201R, 201G, and 201B, according to, for example, a tone or brightness of light to be projected.

Modulation controller 203 superimposes a communication signal (visible light signal) on light emitted by each of light emitters 201R, 201G, and 201B by performing a modulation of temporally switching each of light emitters 201R, 201G, and 201B between emitting light and emitting no light. Specifically, modulation controller 203 generates binary modulating signals S2R, S2G, and S2B, based on a communication signal to be transmitted through visible light communication. It should be noted that modulating-signal generator 123 may repeatedly generate modulating signals S2R, S2G, and S2B indicative of an ID unique to illumination light communication apparatus 100, or may generate modulating signals S2R, S2G, and S2B, according to a communication signal input from an external apparatus.

It should be noted that, in the following, the modulation for superimposing a visible light signal (communication signal) on illumination light is referred to simply as "modulation," and modulation for dimming illumination light using PWM is referred to as "PWM dimming." The PWM dimming is described in detail below.

While illumination light communication apparatus 100 including three light emitters which respectively emit red, green, and blue (RGB) light is described herein, the colors of light emitted by the light emitters and the number of light emitters are not limited thereto. For example, illumination light communication apparatus 100 may include four or more light emitters which emit light having four or more colors.

[19.2 Configuration of Light Emitter]

In the following, configurations of light emitters 201R, 201G, and 201B are described. Light emitters 201R, 201G, and 201B have the same configuration and thus configuration of only light emitter 201R is described below.

FIG. 114 is a diagram illustrating configuration of light emitter 201R. Light emitter 201R includes light source 101, power supply circuit 102, dimming-signal receiver 104, modulation switch 121, current limiting circuit 122, control power supply 126, and drive circuit 128, as illustrated in FIG. 114.

Light source 101 includes at least one light-emitting element (e.g., LED), and emits the illumination light.

Dimming-signal receiver 104 receives dimming signal S1R generated by dimming controller 202.

Power supply circuit 102 supplies light source 101 with power. Power supply circuit 102 includes power supply 111, DC-to-DC converter 112, capacitor 113, sense resistor 114, and constant-current feedback circuit 115.

Power supply 111 outputs a direct-current (DC) voltage to DC-to-DC converter 112. DC-to-DC converter 112 converts the DC voltage supplied from power supply 111 into desired voltage V0, and outputs voltage V0 to light source 101. Capacitor 113 is connected between output terminals of DC-to-DC converter 112.

Sense resistor 114 is used to detect current through light source 101. Constant-current feedback circuit 115 controls output voltage V0 on DC-to-DC converter 112 so that a constant current flows through sense resistor 114, that is, through light source 101.

DC-to-DC converter 112 controls output voltage V0, based on dimming signal S1R received by dimming-signal receiver 104. Specifically, DC-to-DC converter 112 performs amplitude dimming and the PWM dimming. The amplitude dimming controls an intensity of light emitted by light source 101. The PWM dimming controls a duty cycle which is a proportion of time in which light source 101 is emitting light over a cycle of light source 101 emitting light and emitting no light.

Control power supply 126 generates, from voltage V0 output from power supply circuit 102, power supply voltage for current limiting circuit 122, etc. and supplies the power supply voltage to current limiting circuit 122, etc. Control power supply 126 includes PWM detection circuit 127a which detects, based on voltage V0, that the PWM dimming is being performed.

Modulation switch 121 is connected to light source 101 in series and intermittently interrupts the current which is supplied from power supply circuit 102 to light source 101. Modulation switch 121 is, for example, a transistor (e.g., MOSFET).

Drive circuit 128 generates a signal to be supplied to a control terminal (gate) of modulation switch 121, based on modulating signal S2R generated by modulation controller 203.

Current limiting circuit 122 is connected to light source 101 and modulation switch 121 in series and controls current which flows through light source 101. Specifically, current limiting circuit 122 limits (clips) the current which flows through light source 101 so that current through light source 101 does not exceed current set value Is.

Current limiting circuit 122 includes transistor 131 which is a MOSFET, current setting circuit 132, amplifier 133, and current sensing circuit 134 which is a resistor connected to the source of transistor 131.

Current setting circuit 132 outputs a reference value to the positive input terminal of amplifier 133. The reference value defines an upper limit (current set value Is) of the current that can flow through light source 101. For example, the reference value is proportional to current set value Is. Current setting circuit 132 also outputs a variable reference value. It should be noted that current setting circuit 132 may output a fixed reference value.

Transistor 131 is connected to light source 101 and modulation switch 121 in series, and limits (clips) the current which flows through light source 101, based on the reference value.

Current sensing circuit 134 is a source resistor for detecting a magnitude of the current through light source 101. Current sensing circuit 134 has a transistor 131-side terminal connected to the negative input terminal of amplifier 133.

Amplifier 133 has the positive input terminal connected to current setting circuit 132, and the negative input terminal connected to the source terminal of transistor 131. Amplifier 133 amplifies a difference between the reference value output from current setting circuit 132 and the current value detected by current sensing circuit 134, and outputs the amplified difference to the gate of transistor 131.

It should be noted that the circuit configuration illustrated in FIG. 114 is by way of example, and light emitter 201R need not include all the components illustrated in FIG. 114. For example, light emitter 201R may include at least one of current limiting circuit 122 and control power supply 126.

The configuration of power supply circuit 102 is also by way of example, and power supply circuit 102 is not limited thereto. For example, power supply circuit 102 may be provided, without sense resistor 114 and constant-current feedback circuit 115. Moreover, DC-to-DC converter 112 may perform the constant-current control. For example, DC-to-DC converter 112 may control the switching current threshold. Alternatively, power supply circuit 102 may perform constant-voltage control, instead of performing the constant-current control. For example, power supply circuit 102 may include a constant-voltage feedback circuit, instead of including sense resistor 114 and constant-current feedback circuit 115, or DC-to-DC converter 112 may instead perform the constant-voltage control.

The configuration of current limiting circuit 122 is also by way of example, and current limiting circuit 122 is not limited thereto insofar as current limiting circuit 122 can limit (clip) the current which flows through light source 101.

[19.3 Modulation Operation]

In the following, the modulation operation of illumination light communication apparatus 100 is illustrated. FIG. 115 is a diagram illustrating the modulation operation by illumination light communication apparatus 100. As illustrated in FIG. 115, modulation switch 121 turns on/off according to modulating signal S2R. The modulation scheme as used herein complies with, for example, 1-4 PPM transmission scheme defined by JEITA-CP1223. Specifically, 2-bit data is converted into a 4-slot pulse. Three of the four slots are always high (on) and the remaining one slot is always low (off).

In the example illustrated in FIG. 115, current set value Is is constant.

Here, when the illumination light is modulated for visible light communication, overshoot is caused immediately after modulation switch 121 turns on, as illustrated in dotted lines in FIG. 115. The overshoot is an instant increase of LED current which is the current through light source 101. Due to the occurrence of overshoot, a visible light receiver may not correctly receive a signal.

On the other hand, illumination light communication apparatus 100 according to Embodiment 19 includes current limiting circuit 122 to limit the maximum of the LED current to current set value Is. This can suppress the occurrence of overshoot as illustrated in FIG. 115. This allows a reduction of reception error through the visible light communication.

While constant-current feedback circuit 115 illustrated in FIG. 114 has a function of providing a constant LED current, it should be noted that the constant-current control performed by constant-current feedback circuit 115 has a relatively great time constant. In other words, the constant-current control can provide a constant average current in a predetermined period, but cannot mitigate the overshoot that instantly occurs as illustrated in FIG. 115.

Further, in Embodiment 19, as illustrated in FIG. 114, light source 101, modulation switch 121, and current limiting circuit 122 are connected in series in listed order between the power supply terminal and GND terminal of power supply circuit 102. In the meantime, as the connection between light source 101, modulation switch 121 and current limiting circuit 122, it can also be contemplated that light source 101, current limiting circuit 122, and modulation switch 121 are connected in listed order.

However, in such connection, current limiting circuit 122 is not connected to the GND terminal of power supply circuit 102 and thus the operation of current limiting circuit 122 is unstable. Specifically, GND of current limiting circuit 122 is floating when modulation switch 121 is in the off-state. Thus, potential variation in the GND is great. On the other hand, in Embodiment 19, current limiting circuit 122 is always connected to the GND terminal by employing the connection as illustrated in FIG. 114, and thus the operation of current limiting circuit 122 is stable, irrespective of the state of modulation switch 121.

While the modulation scheme in the above description is 100%-modulation scheme which completely blocks the LED current during an off-period, it should be noted that a scheme may be used in which the LED current is reduced during an off-period less than an on-period.

Moreover, Embodiment 19 has been described with reference to light source 101, modulation switch 121, and current limiting circuit 122 being connected in series in listed order as illustrated in FIG. 114. However, the order of the series connection between light source 101, modulation switch 121, and current limiting circuit 122 is not limited thereto.

[19.4 Dimming Operation]

In the following, the dimming operation by illumination light communication apparatus 100 is described. FIG. 116 is a diagram illustrating the dimming operation by illumination light communication apparatus 100.

As illustrated in FIG. 116, when a dimming level of light emitter 201R is higher than a reference level (dimming levels 5 to 3 in FIG. 116), dimming controller 202 performs the amplitude dimming for controlling an intensity of light emitted by light emitter 201R. Specifically, voltage or current output from power supply circuit 102 is controlled according to dimming signal S1R, thereby controlling the current value of the LED current which flows through light source 101. More specifically, the dimming level of light emitter 201R is controlled such that the lower the dimming level is, the less the current value of the LED current is.

Moreover, when the dimming level of light emitter 201R is lower than the reference level (dimming levels 2 and 1 in FIG. 116), dimming controller 202 performs the PWM dimming for controlling a duty cycle. The duty cycle is a proportion of time in which light emitter 201R is emitting light over a cycle of light emitter 201R emitting light and emitting no light. Specifically, the duty cycle of voltage or current output from power supply circuit 102 is controlled according to dimming signal SIR. More specifically, the duty cycle of voltage or current output from power supply circuit 102 is controlled such that the lower the dimming level is, the less the duty cycle is.

[19.5 Problems]

A mere combination of the above modulation operation and dimming operation causes the following problem if the modulation operation and the dimming operation are not considered together. As illustrated in FIG. 117, when the PWM dimming and modulation are carried out simultaneously, the switches are turned off individually for each of the controls described above. This ends up with a reduction of an average luminance. Due to this, if the PWM dimming is performed on only one color (red light in FIG. 117) as illustrated in FIG. 117, the tint of red is shifted from the other colors. Further, when the rising edge of the red light is detected by the receiving device, the red light may be sensed as noise and reception accuracy may decrease because the rising edge is deviating from the rising edges of the other colors in FIG. 117.

[19.6 Overall Operation]

FIG. 118 is a flowchart illustrating operation of illumination light communication apparatus 100. The processing illustrated in FIG. 118 is performed on one color of light after another. The processing is performed when the dimming level is changed or is repeated at predetermined intervals.

If the modulation is not performed (No in S101), dimming controller 202 performs normal dimming control as illustrated in FIG. 116. Specifically, if the PWM modulation is not performed, that is, if a dimming level of color light is higher than the reference level (No in S102), dimming controller 202 performs normal amplitude dimming (S103). If the PWM modulation is performed, that is, if the dimming level is lower than the reference level (Yes in S102), dimming controller 202 performs normal PWM dimming (S104).

On the other hand, if the modulation is performed and the PWM dimming is not performed (Yes in S101 and No in S105), dimming controller 202 performs the amplitude dimming and modulation controller 203 performs normal modulation as illustrated in FIG. 115 (S106). In this case, modulating signals S2R, S2G, and S2B that are supplied to light emitters 201R, 201G, and 201B, respectively, are the same signal and light emitters 201R, 201G, and 201B are switched between emitting light and emitting no light at the same timing.

Alternatively, dimming controller 202 may use the same amplitude dimming method or may use different amplitude dimming methods when the modulation is and is not performed. For example, dimming controller 202 may perform the amplitude dimming so that the average luminance (average LED current) when the modulation is and is not performed is the same. Specifically, in the case of the modulation according to 4 PPM, the luminance value reduces to 75%. Thus, if the modulation is performed, the luminance value (LED current) may increase to cancel that reduction. Stated differently, provided that a designated dimming level is the same, the current value of the LED current (the current value in an on-interval) if the modulation is performed may be higher than the current value of the LED current if the modulation is not performed.

On the other hand, when the modulation and the PWM dimming are performed (Yes in S101 and Yes in S105), illumination light communication apparatus 100 determines whether a dimming level of a target color is sufficiently lower than dimming levels of the other colors (S107). Specifically, illumination light communication apparatus 100 calculates a ratio of the dimming level of the target color (e.g., red) relative to the dimming level of each of the other colors (green and blue). If all the ratios calculated are lower than a predetermined value, illumination light communication apparatus 100 determines the dimming level of the target color to be sufficiently lower than the dimming levels of the other colors. It should be noted that illumination light communication apparatus 100 may calculate a difference of the dimming level of the target color (e.g., red) from the dimming level of each of the other colors (green and blue), and determine the dimming level of the target color to be sufficiently lower than the dimming levels of the other colors if all the differences calculated are greater than a predetermined value.

If the above condition is not met, that is, at least one of the calculated ratios is higher than the predetermined value (No in S107), dimming controller 202 does not perform the PWM dimming, and modulation controller 203 performs the modulation taking the PWM into consideration (S108). The processing is described in detail below.

If the above condition is met, that is, all the calculated ratios are lower than the predetermined value (Yes in S107), modulation controller 203 does not perform the modulation, and dimming controller 202 performs the PWM dimming taking the duty cycle for use in the modulation into consideration (S109). The processing is described in detail below.

[19.7 First Operation Example]

In the following, a first operation example (S108 in FIG. 118) is described in detail in which dimming controller 202 does not perform the PWM dimming and modulation controller 203 performs the modulation taking the PWM into consideration. FIG. 119 is a diagram illustrating the first operation example.

FIG. 119 illustrates an example in which the dimming level of light emitter 201R only is lower than the reference level. A relative intensity (R) of red light is 0.1. A relative intensity (G) of green light is 1.0. A relative intensity (B) of blue light is 0.2. The relative intensity, as used herein, refers to a ratio in signal intensity of each signal relative to the highest signal intensity among the signal intensities of color light where the highest signal intensity is 1.0.

As illustrated in FIG. 119, modulation controller 203 controls light emitter 201R so that light emitter 201R starts emitting light at the same timing as light emitter 201G and 201B start emitting light. Stated differently, if the modulation is performed and the dimming level of light emitter 201R is lower than the reference level, modulation controller 203 controls light emitter 201R so that light emitter 201R starts emitting light at the same timing as it would start emitting light if the modulation were performed and the dimming level of light emitter 201R were higher than the reference level (S106 in FIG. 118).

Moreover, modulation controller 203 sets a duty cycle of the light emitter, taking the PWM dimming into consideration. Specifically, the light emitter is dimmed to have a duty cycle equal to a product of a duty cycle of the light emitter if the modulation were performed and the dimming level were higher than the reference level (S106 in FIG. 118) and a duty cycle of the light emitter if the PWM dimming, which is performed when the modulation is not performed and the dimming level is lower than the reference level, were performed (S104 in FIG. 118). For example, if the modulation according to 4 PPM is performed, the duty cycle of the light emitter if the modulation were performed is 75%. Thus, in the case where the duty cycle when the PWM dimming is performed is 50%, modulation controller 203 performs the modulation so that the light emitter has a duty cycle of 32.25%.

Here, if the duty cycle is greater than or equal to a predetermined threshold (e.g., 75%), the off-interval (a dim interval) is so short that the receiving device may not be able to correctly receive a signal. Thus, in Embodiment 19, the duty cycle is controlled so that it does not exceed the predetermined threshold. In other words, in such a case, the dimming level is adjusted by the amplitude dimming instead of the duty cycle being changed.

As such, illumination light communication apparatus 100 according to Embodiment 19 includes: light emitters 201R, 201G, and 201B which emit light having different colors; dimming controller 202 which controls a dimming level of each of light emitters 201R, 201G, and 201B, and modulation controller 203 which superimposes a binary communication signal on light emitted by each of light emitters 201R, 201G, and 201B by performing modulation of temporally switching each of light emitters 201R, 201G, and 201B between emitting light and emitting no light. Light emitters 201R, 201G, and 201B each include: light source 101 which emits light; modulation switch 121 which is connected in series to light source 101 and intermittently interrupts current which flows through light source 101; and power supply circuit 102 which supplies power to light source 101. For each of light emitters 201R, 201G, and 201B, dimming controller 202 performs, by controlling power supply circuit 102 included in a light emitter, amplitude dimming for controlling an intensity of light emitted by the light emitter when the dimming level of the light emitter is higher than a reference level; (S103 and S106 in FIG. 118), and PWM dimming for controlling a duty cycle of the light emitter when the dimming level is lower than the reference level and the modulation is not performed (S104 in FIG. 118), the duty cycle being a proportion of time in which the light emitter is emitting light over a cycle of the light emitter emitting light and emitting no light. For each of light emitters 201R, 201G, and 201B, modulation controller 203 performs, when the modulation is performed and the dimming level of a light emitter is higher than the reference level (S106 in FIG. 118), the modulation by controlling modulation switch 121, and when the modulation is performed and the dimming level is lower than the reference level, performs a first control (first operation example) on the light emitter (S108 in FIG. 118), the first control including: (1) not performing the PWM dimming using power supply circuit 102 (halting the PWM modulation function); and (2) performing, by controlling modulation switch 121, modulation to cause the modulation for superimposing the binary communication signal on the light emitted by the light emitter and the PWM dimming to be simultaneously performed and the light emitter to start emitting light in synchronization with light emitters other than the light emitter (to cause the modulating signal for the light emitter to rise in synchronization with modulating signals for light emitters other than the light emitter).

This allows, when the PWM dimming and the modulation are to be performed simultaneously, illumination light communication apparatus 100 to inhibit the color signals from being brought out of phase (e.g., timing for the rising edges) and perform the modulation using a duty cycle taking the PWM dimming into consideration. This can prevent upset of color balance.

Further, since modulation controller 203 performs all the controls involved in simultaneous the PWM dimming and the modulation, an increased complexity of the processing can be avoided.

[19.8 Second Operation Example]

In the following, a second operation example (S109 in FIG. 118) is described in detail in which modulation controller 203 does not perform the modulation and dimming controller 202 performs the PWM dimming taking the duty cycle for use in the modulation into consideration. FIG. 120 is a diagram illustrating the second operation example.

FIG. 120 illustrates an example in which the dimming level of light emitter 201R only is lower than the reference level. The relative intensity (R) of red light is 0.1. The relative intensity (G) of green light is 1.0. The relative intensity (B) of blue light is 1.0. In other words, the dimming level of the red light is sufficiently low, as compared to the dimming levels of the other color light.

As illustrated in FIG. 120, the modulation is not performed and only the PWM dimming is performed. Control considering the duty cycle for use in the modulation is performed as the PWM dimming. Specifically, dimming controller 202 performs the PWM dimming on the light emitter so that the light emitter has a duty cycle equal to a product of a duty cycle of the light emitter if the modulation were performed and the dimming level were higher than the reference level (S106 in FIG. 118) and a duty cycle of the light emitter if the PWM dimming, which is performed when the modulation is not performed and the dimming level is lower than the reference level, were performed (S104 in FIG. 118).

For example, if the modulation according to 4 PPM is performed, the duty cycle of the light emitter if the modulation were performed is 75%. Thus, in the case where the duty cycle when the PWM dimming is performed is 50%, dimming controller 202 performs the modulation so that the light emitter has a duty cycle of 32.25%.

Unlike the first operation example, according to the second operation example, the rising edge of red light does not coincide with the rising edges of the other color light.

In this case, if the modulation is performed using every color light in the receiving device, red light is recognized as noise and reception accuracy decreases. In the meantime, if an intensity of only one color light is low, the color light having the low intensity can be readily determined by the receiving device. Thus, the receiving device can demodulate a signal using color light other than the color light having the low intensity, thereby inhibiting a decrease of reception accuracy of the receiving device.

One method for achieving the function of illumination light communication apparatus 100 is attaching, to a lighting apparatus that is not supporting the visible light communication, a communication module for adding a visible light communication function to the lighting apparatus. For example, the lighting apparatus not supporting the visible light communication includes light source 101 and power supply circuit 102 illustrated in FIG. 114. As the communication module is detached from the lighting apparatus, the cathode of light source 101 and the GND terminal of power supply circuit 102 are shorted.

The communication module includes modulation switch 121, current limiting circuit 122, control power supply 126, and drive circuit 128, etc. which are illustrated in FIG. 114, and dimming controller 202 and modulation controller 203 which are illustrated in FIG. 113. It should be noted that the lighting apparatus has a normal dimming control function. Thus, the communication module may have all the functions of dimming controller 202, replacing with the dimming control function of the lighting apparatus. Alternatively, the communication module may have only the functions of dimming controller 202 extended in Embodiment 19, and the extended functions may be added to the dimming control function of the lighting apparatus. Specifically, the extended functions include the control function so that the PWM dimming is not performed in step S108, and the control function so that the PWM dimming considering the duty cycle for use in the modulation is performed in step S109.

In order to use such a communication module that can be retrofitted to illumination light communication apparatus 100, control power supply 126 is used which generates power supply for the communication module from output voltage V0 on power supply circuit 102, as illustrated in FIG. 114. However, voltage V0 varies during the PWM control and thus control power supply 126 has difficulty in stably generating the power supply for the communication module. Thus, the operation of the communication module can be halted during the PWM dimming by a control so that the modulation is not performed while the PWM dimming as illustrated in the second operation example, thereby achieving stable operation of the communication module.

For example, the function (the modulation function) of the communication module can be halted when PWM detection circuit 127*a* illustrated in FIG. 114 senses the PWM control using power supply circuit 102.

As such, when the modulation is performed, if a dimming level of a target light emitter is lower than the reference level and a ratio in dimming level of the target light emitter relative to each of the other light emitters is greater than or equal to the predetermined value (No in S107 of FIG. 118), modulation controller 203 performs a first control (first operation example) on the target light emitter (S108).

When the modulation is performed, if the dimming level of the target light emitter is lower than the reference level and the ratio of the target light emitter mentioned above is greater than or equal to the predetermined value (Yes in S107), dimming controller 202 performs, by controlling power supply circuit 102, the PWM dimming on the target light emitter so that the target light emitter has a duty cycle equal to a product of a first duty cycle of the target light emitter if the modulation were performed and the dimming level were higher than the reference level and a second duty cycle of the target light emitter if the PWM dimming, which is performed when the modulation is not performed and the dimming level is lower than the reference level, were performed, and modulation controller 203 performs a second control (second operation example) in which the target light emitter is not modulated using modulation switch 121 (S109).

This allows, when the PWM dimming and the modulation are to be performed simultaneously, illumination light communication apparatus 100 to perform the PWM control using a duty cycle considering the modulation. This can prevent upset of color balance.

Further, since dimming controller 202 performs all the controls involved in simultaneous the PWM dimming and the modulation, an increased complexity of the processing can be avoided.

Further, since the modulation operation can be halted during the PWM control, stable operation of illumination light communication apparatus 100 is achieved when the communication module that can be retrofitted to illumination light communication apparatus 100 is used, for example.

[19.9 Variation]

While the above description has been set forth with reference to illumination light communication apparatus 100 selectively performing the first operation example and the second operation example, it should be noted that illumination light communication apparatus 100 may have a function of performing only one of the first operation example and the second operation example. In other words, illumination light communication apparatus 100 may always perform one of the first operation example (S108) and the second operation example (S109) when the modulation and the PWM dimming are performed (Yes in S105 of FIG. 118).

[19.10 Receiving Device]

In the following, the receiving device is described which receives the visible light signal transmitted by illumination light communication apparatus 100 set forth above. FIG. 121 is a block diagram of receiving device 300 according to Embodiment 19. As illustrated in FIG. 121, receiving device 300 includes light receiving portion 301 and demodulator 302.

Light receiving portion 301 receives illumination light emitted by illumination light communication apparatus 100. Light receiving portion 301 includes a red light-receiving element which receives red light, a green light-receiving element which receives green light, and a blue light-receiving element which receives blue light. Light receiving portion 301 generates received-light signals S3R, S3G, and S3B based on the light received by the light-receiving elements.

Demodulator 302 demodulates, from received-light signals S3R, S3G, and S3B, the binary communication signal superimposed on the illumination light.

FIG. 122 is a flowchart illustrating operation of receiving device 300. Initially, demodulator 302 determines whether an intensity of one of received-light signals S3R, S3G, and S3B is sufficiently lower than intensities of the other two (S201). Specifically, demodulator 302 calculates a ratio in signal intensity of a received-light signal having a target color to each of received-light signals having the other colors. If all the ratios calculated are lower than a predetermined value, demodulator 302 determines the signal intensity of the target color signal to be sufficiently lower than the signal intensities of the other color signals. It should be noted that demodulator 302 may calculate a difference in signal intensity of the target color signal from each of the other color signals, and determine the signal intensity of the target color signal to be sufficiently lower than the signal intensities of the other color signals if all the differences calculated are greater than a predetermined value.

If the above condition is not met, that is, at least one of the calculated ratios is higher than the predetermined value (No in S201), demodulator 302 demodulates the visible light signal using received-light signals S3R, S3G, and S3B (S202). In other words, demodulator 302 performs a normal demodulation process.

On the other hand, if the above condition is met, that is, all the calculated ratios are lower than the predetermined value (No in S201), demodulator 302 demodulates the visible light signal, using the received-light signals other than the received-light signal having the color whose signal intensity is determined to be sufficiently low, among received-light signals S3R, S3G, and S3B (S203). For example, if the signal intensity of received-light signal S3R is sufficiently low, demodulator 302 demodulates the visible light signal from received-light signals S3G and S3B.

The above operation allows receiving device 300 to stably demodulate the visible light signal from the illumination light undergone the second operation by illumination light communication apparatus 100.

While the above description has been set forth with reference to light receiving portion 301 including light-receiving elements which receive different color light, it should be noted that light receiving portion 301 may include a light-receiving element which receives light comprising all colors. In this case, demodulator 302 may remove a signal component having an intensity lower than a threshold from a signal obtained by light receiving portion 301, and demodulates the visible light signal using a resultant signal. Again, demodulator 302 can perform the demodulation process using only a signal which is modulated and has a high signal intensity, without using a signal not modulated and having a low signal intensity.

As such, receiving device 300 according to Embodiment 19 includes: light receiving portion 301 which receives light beams having different colors, the light beams having a binary communication signal superimposed thereon by modulation of temporally switching each of the light emitters between emitting light and emitting no light; and demodulator 302 which (1) if a ratio in brightness of each of the light beams received by light receiving portion 301 relative to any of the other light beams is greater than a predetermined value, demodulates the signal using the light beams, and (2) if one of ratios in brightness of the light beams is less than the predetermined value, demodulate the signal using light beams other than the light beam whose ratio in brightness is less than the predetermined value.

This allows receiving device 300 to remove color light having a low intensity and not modulated from the illumination light emitted in the second operation by illumination light communication apparatus 100, and demodulate the visible light signal from the remaining light. Thus, receiving device 300 can stably demodulate the visible light signal.

[19.11 Examples of Use of Illumination Light Communication Apparatus]

In the following, examples of use of illumination light communication apparatus 100 are described. The examples of use include an example of use of illumination light communication apparatus 100 as an RGB floodlight as illustrated in FIGS. 77 and 78, and an example of use of the illumination light communication apparatus as an RGB spotlight as illustrated in FIG. 79.

Embodiment 20

In the present embodiment, a variation of Embodiment 10 set forth above is described.

In visible light communication, a required amount of change in illumination light depends on a place at which the illumination light communication apparatus is installed. For example, the illumination light communication apparatus that is installed outdoor in daytime may not be able to correctly sense, by a receiving device, illumination light emitted by the illumination light communication apparatus due to bright ambient light. An illumination light communication apparatus according to the present embodiment reduces reception error in the visible light communication caused by effects of ambient light and inhibits an increase of power consumption.

Initially, a configuration of the illumination light communication apparatus according to the present embodiment is described. FIG. 123 is a block diagram of a configuration of illumination light communication apparatus 100B according to the present embodiment. Illumination light communication apparatus 100B illustrated in FIG. 123 is similar to illumination light communication apparatus 100 illustrated in FIG. 65, except that illumination light communication apparatus 100B includes communication module 103B, in place of communication module 103. Communication module 103B is similar to communication module 103 in FIG. 65, except that communication module 103B further includes mode switch 171 and illuminance sensor 172. Moreover, external synchronization signal input 124 and controller 125 have additional functions.

Illumination light communication apparatus 100B is, for example, a signage light for use in providing directions or the like.

Illuminance sensor 172 senses illuminance (brightness) around illumination light communication apparatus 100B.

Mode switch 171 selects one of a normal mode (first operation mode) and an outdoor mode (second operation mode) based on a sense result by illuminance sensor 172, and generates mode switching signal S6 indicative of the selected operation mode. Mode switching signal S6 is sent to controller 125 via external synchronization signal input 124.

Specifically, mode switch 171 selects the normal mode when illuminance around illumination light communication apparatus 100B is lower than a predetermined threshold, and selects the outdoor mode when illuminance around illumination light communication apparatus 100B is higher than the predetermined threshold. In other words, mode switch 171 selects the normal mode when illumination light communication apparatus 100B is installed indoors. When illumination light communication apparatus 100B is installed indoors, mode switch 171 selects the normal mode if the ambient light level is low (e.g., nighttime and cloudy days). When illumination light communication apparatus 100B is installed indoors, mode switch 171 selects the outdoor mode if the ambient light level is high (e.g., in daytime on a sunny day).

It should be noted that mode switch 171 may use, as ambient illuminance, an amount of light (light intensity or illuminance) of ambient light which has the same frequency as modulated illumination light.

Controller 125 switches, for example, the duty cycle of modulating signal S1, according to an operation mode indicated by mode switching signal S6.

Next, operation of illumination light communication apparatus 100B is described. FIG. 124 is a diagram illustrating operations of illumination light communication apparatus 100B in the normal mode and the outdoor mode.

As illustrated in FIG. 124, the operation of illumination light communication apparatus 100B in the normal mode is the same as the operation of illumination light communication apparatus 100 according to Embodiment 10.

In the outdoor mode, controller 125 decreases the duty cycle of modulating signal S1, that is, decreases the duty cycle of modulation switch 121 lower than the normal mode, and increases current command value S2 greater than the normal mode. For example, in the case of 4 PPM, the duty cycle in the normal mode is 75% and the duty cycle in the outdoor mode is 25%.

Here, the modulation scheme employed in Embodiment 20 is, for example, 4 PPM in which the duty cycle is constant, irrespective of a logic value of a communication signal.

When the duty cycle is changed, power supply circuit 102 performs constant-current feedback operation to control an average current per unit to be constant. Due to this, a current value in an on-interval in the outdoor mode is higher than a current value in an on-interval in the normal mode. Following the increase of the current value, controller 125 sets current set value Is high.

It should be noted that if power supply circuit 102 does not have the constant-current control function, the output current or output voltage of power supply circuit 102 may be controlled based on an instruction from controller 125. For example, the output current or output voltage of power supply circuit 102 is controlled such that a product of a duty cycle and a current value in the outdoor mode and a product of a duty cycle and a current value in the normal mode are substantially equal. In other words, the output current or output voltage of power supply circuit 102 is controlled such that a product of a duty cycle and a current set value Is in the outdoor mode and a product of a duty cycle and a current set value Is in the normal mode are substantially equal.

As described above, the current value in an on-interval in the outdoor mode is set higher than in an on-interval in the normal mode, and thereby the illuminance of the illumination light is increased. This allows the receiving device to correctly sense a visible light signal even outdoor in daytime, for example. Further, the duty cycle in the outdoor mode is set lower than the normal mode. This can inhibit an increase of current draw. This also requires no need for power supply circuit 102 to support high output. Thus, the visible light communication function can be readily added to illumination light communication apparatus 100B by retrofitting communication module 103B thereto, for example.

As such, illumination light communication apparatus 100B according to Embodiment 20 includes: light source 101 which emits illumination light; modulation switch 121 which is connected to light source 101 in series and intermittently interrupts current which flows through light source 101; and controller 125 which controls on and off of modulation switch 121 to superimpose a binary communication signal on the illumination light by modulating the illumination light, and controls a current value of current which flows through light source 101. In the normal mode (first operation mode), controller 125 sets a duty cycle to a first proportion and sets the current value of the current which flows through light source 101 during an on-period of modulation switch 121 to a first current value, the duty cycle being a proportion of time in which modulation switch 121 is on over a cycle of an on-period and an off-period of modulation switch 121. In the outdoor mode (second operation mode), controller 125 sets the duty cycle to a second proportion lower than the first proportion and sets the current value to a second current value greater than the first current value.

This allows illumination light communication apparatus 100B to reduce reception error in the visible light communication caused by effects of ambient light, and inhibit an increase of power consumed by the entirety of illumination light communication apparatus 100B in the outdoor mode.

Illumination light communication apparatus 100B further includes illuminance sensor 172 which senses ambient illuminance around illumination light communication apparatus 100B. Controller 125 operates in the normal mode when illuminance sensed by illuminance sensor 172 is lower than a predetermined threshold, and operates in the outdoor mode when the illuminance sensed by illuminance sensor 172 is higher than the threshold.

This allows illumination light communication apparatus 100B to select an appropriate operation mode according to ambient illuminance around illumination light communication apparatus 100B.

Moreover, illumination light communication apparatus 100B further includes current limiting circuit 122 which is connected to light source 101 and modulation switch 121 in series, and limits the current which flows through light source 101 so that the current through light source 101 does not exceed current set value Is. Controller 125 sets current set value Is higher in the outdoor mode than the normal mode.

This allows illumination light communication apparatus 100B to appropriately control the current value according to an operation mode.

Moreover, communication module 103B according to Embodiment 20 is detachable from a lighting apparatus and modulates illumination light, communication module 103B being connected to light source 101 included in the lighting apparatus in series and including: modulation switch 121 which intermittently interrupts current which flows through light source 101; and controller 125 which controls on and off of modulation switch 121 to superimpose a binary communication signal on the illumination light by modulating the illumination light, and controls a current value of current which flows through light source 101. In the normal mode (first operation mode), controller 125 sets a duty cycle to a first proportion and sets the current value of the current which flows through light source 101 during an on-period of modulation switch 121 to a first current value, the duty cycle being a proportion of time in which modulation switch 121 is on over a cycle of an on-period and an off-period of modulation switch 121. In the outdoor mode (second operation mode), controller 125 sets the duty cycle to a second proportion lower than the first proportion and sets the current value to a second current value greater than the first current value.

While the above description has been set forth with reference to mode switch 171 switching the operation modes according to ambient illuminance, it should be noted that the operation modes may be switched according to a time as illumination light communication apparatus 100C in FIG. 125. Illumination light communication apparatus 100C illustrated in FIG. 125 is similar to illumination light communication apparatus 100B in FIG. 123, except that communication module 103C included in illumination light communication apparatus 100C includes timer 173 which senses a time, in place of illuminance sensor 172.

If a time sensed by timer 173 is within a predetermined set period of time, controller 125 operates in the normal mode. If the time sensed by timer 173 falls out of the set period of time, controller 125 operates in the outdoor mode. For example, the set period of time is a time zone in daytime.

This can achieve operation mode switching using a simpler configuration than using illuminance sensor 172.

It should be noted that the above set period of time may be set by a user. Moreover, the operation modes may be switched by user operation or an instruction from an external apparatus. Further, these controls may be combined. For example, a user may configure the settings for indoors or outdoors so that the normal mode is always selected if indoors settings are configured, and the operation modes are switched based on a sense result by illuminance sensor 172 or timer 173 if outdoors settings are configured.

While Embodiment 20 has been described with reference to light source 101, modulation switch 121, and current limiting circuit 122 being connected in series in listed order as with Embodiment 10, it should be noted that the order of the series connection between light source 101, modulation switch 121, and current limiting circuit 122 is not limited thereto.

In the following, an example of use of illumination light communication apparatus 100B (100C) is described. FIG. 126 is a diagram illustrating an example of use of illumination light communication apparatus 100B. For example, illumination light communication apparatus 100B is a signage light for use in providing directions or the like, as illustrated in FIG. 126. As a user captures, by a visible light receiver such as a smart phone, a video of light emitted by illumination light communication apparatus 100B, the visible light receiver receives a visible light signal.

Embodiment 21

When there is a ripple on power supply current, an illumination light communication apparatus and a communication module according to Embodiment 21 inhibits degradation of reception error rate caused by the ripple. Embodiment 21 further describes the illumination light communication apparatus and a communication module which inhibit an increase of power loss caused by a current limiting circuit limiting a current, when there is a ripple on power supply current.

In general, output current of a power supply circuit is often a rippled current having a frequency twice as much as a mains power frequency. A magnitude of the ripple (variations) is not constant and greatly depends on an amount of load.

The ripple on power supply current in the illumination light communication apparatus manifests itself in variations in brightness of the illumination light. The variations in brightness can cause reception error in a visible light communication. Moreover, the above-mentioned current limiting circuit limits the current which flows through a light source so that the current through the light source does not to exceed a current set value, and thus the power loss caused by limiting the current through the light source may be increased if there is a ripple on power supply current.

In light of the above, the illumination light communication apparatus according to Embodiment 21 is, for example, the illumination light communication apparatus according to Embodiment 1 further including: a current sensor which detects a current value of current through the light source, wherein the current limiting circuit includes: a reference source which outputs a reference value which is variable and corresponding to the current set value; a transistor connected in series to the light source and the switch, the transistor limiting current which flows through the light source based on the reference value; and a control circuit which determines the reference value, according to the current value detected by the current sensor, wherein the reference value is determined according to a value based on one of a lowest ripple value and a highest ripple value of the current value detected by the current sensor. The value based on the one of the lowest value and the highest value may be, for example, a lowest value, a highest value, or an average. The reference value is determined so that the current set value is a value based on one of the lowest ripple value and the highest ripple value.

Next, a configuration of the illumination light communication apparatus according to Embodiment 21 is described.

FIG. 127 is a block diagram of an example of a configuration of the illumination light communication apparatus according to the present embodiment. The illumination light communication apparatus illustrated in FIG. 127 is similar to the illumination light communication apparatus illustrated in FIG. 1A or 30A, except that the illumination light communication apparatus according to the present embodiment includes control circuit 6k in place of control circuit 6, and signal generating circuit SGa in place of signal generating circuit SG. In the following, description is given, focusing on differences from the illumination light communication apparatus illustrated in FIG. 1A or 30A.

Control circuit 6k determines the reference value, according to the current value detected by the current sensor. The current sensor is, for example, sense resistor 66. The power supply current is detected from a potential at a current limiting circuit 1 side terminal of sense resistor 66. Control circuit 6k detects, from the current value detected by the current sensor, a highest ripple value and a lowest ripple value of power supply current during a period of time, and determines the reference value so that a current set value set by current limiting circuit 1 is a value (e.g., the lowest value) based on one of the lowest ripple value or the highest ripple value.

Signal generating circuit SGa, in first, second, and third operation examples described below, may be equivalent to signal generating circuit SG. Signal generating circuit SGa, in fourth, fifth, sixth, seventh, and eighth operation examples described below, further generates a PWM signal having a frequency more than five times as much as a communication signal, and superimposes the PWM signal on an OFF period of the communication signal.

In the following, the first to eighth operation examples of Embodiment 21 are described.

First Operation Example

The first operation example of Embodiment 21 is now described.

FIG. 128 is a waveform diagram illustrating the first operation example of the illumination light communication apparatus according to Embodiment 21. The upper graph shows a current value detected by the current detector and control circuit 6k. The detected current value has a ripple having a frequency twice as much as a mains power frequency, for example. The lower graph shows LED current (current through load circuit 53). In the example, control circuit 6k performs control of changing the reference value of reference source 4 according to a lowest value of a ripple current, to cause reference source 4 to output a variable reference value. Specifically, control circuit 6k determines the reference value so that a current set value for current limiting circuit 1 is a lowest ripple value. Current limiting circuit 1 limits current which flows through a light source (load circuit 53 which is an LED) so that the current through the light source does not exceed the current set value (here, lowest ripple value).

As illustrated in the lower graph in FIG. 128, according to the first operation example, the variations in LED current indicated by a thin solid line and dotted lines, that is, the portion of LED current above the current set value (here, lowest ripple value) is limited. Doing so shapes the LED current in a collection of rectangular waves having the same amplitude across all intervals in which the illumination light is modulated using a communication signal. This allows variations in illumination light to be reduced and occurrence of reception error in the receiving device to be inhibited, even if there is a ripple on power supply current.

Second Operation Example

Next, the second operation example according to Embodiment 21 is described.

FIG. 129A is a waveform diagram illustrating the second example of the operation of the illumination light communication apparatus according to Embodiment 21. The lower graph shows LED current (current through load circuit 53). In the example, control circuit 6k determines the reference value so that the reference value is equal to a given value greater than the lowest value of a ripple current and smaller than the highest value of the ripple current.

According to the second operation example, the portion of the LED current indicated by a thin solid line and dotted lines, that is, the LED current above the current set value (here, given value) is limited. The portions of the LED current indicated by the thin solid line and dotted lines in FIGS. 128 and 129A are limited by current limiting circuit 1 and turn into power loss. As compared to FIG. 128, the operation illustrated in FIG. 129A can reduce the power loss caused by current limiting circuit 1 limiting the LED current. Even if there is a ripple on power supply current, the operation allows variations in illumination light to be reduced and occurrence of reception error in the receiving device to be inhibited.

FIG. 129B is a waveform diagram illustrating the second example of the operation of the illumination light communication apparatus according to Embodiment 21. In the figure, the given value in FIG. 129A is, specifically, an average ripple current.

It should be noted that the given value in FIG. 129A is not limited to an average of the ripple current, insofar as a duration where the portion of the LED current in the form of rectangular waves in FIG. 129A (portion corresponding to thin solid lines and dotted lines) is greater than or equal to an amount of transmission data (e.g., communication ID) which is transmitted through illumination light communication.

Third Operation Example

FIG. 130 is a waveform diagram illustrating the third example of the operation of the illumination light communication apparatus according to Embodiment 21. The figure shows a detected current value, a current set value or reference value, and an LED current. The current set value is set to the same value as the detected current value. In other words, control circuit 6k sets the reference value so that the current set value varies in the same cycle as the detected current value. In the figure, peaks of the LED current in the form of rectangular waves vary according to the detected current value. However, as shown in a magnified view indicated by a dotted bubble, only the overshoot portion of each rectangular wave (each pulse) is mitigated. Accordingly, power loss caused by current limiting circuit 1 can be minimized and the LED current can be converted into have rectangular waves across all intervals in which the illumination light is modulated using a communication signal, thereby causing reception error in the receiving device unlikely to occur.

Fourth Operation Example

FIG. 131 is a waveform diagram illustrating the fourth operation example of the illumination light communication apparatus according to Embodiment 21. The current set value in the figure is the same as the third operation example with respect to the fact that it varies in the same cycle as a detected current value.

Signal generating circuit SGa generates a PWM signal having a frequency more than five times as much as a communication signal, and superimposes the PWM signal on a low-level interval of the communication signal.

An on-interval in the figure corresponds to a high-level interval of the communication signal and transistor 2 is on in the on-interval. An off-interval in the figure corresponds to a low-level interval of the communication signal and the PWM signal is superimposed on a low-level interval of the communication signal in the off-interval. Transistor 2 is not turned off in all the off-intervals in the figure, but is switched fast between on and off by the PWM signal.

In the magnified view indicated by a dotted box in the figure, Ion indicates the LED current (here, the LED current has the same value as the current set value) in an on-interval. Ioff_max indicates a maximum of the LED current in an off-interval. Ioff_ave indicates an average LED current value in an off-interval and is represented by (Ioff_max)×(duty cycle of the PWM signal). Ioff_min indicates a minimum (here, 0) of the LED current value in an off-interval.

Average Ioff_ave is set so as to satisfy: (immediately preceding Ion)−(lowest ripple value), stated differently, (current set value)−(lowest ripple value). In other words, average Ioff_ave is set so that a difference between Ion and Ioff_ave is constant in rectangular waves. This allows contrast between an on-interval and an off-interval of the communication signal to be maintained constant.

As described above, as with the third operation example, control circuit 6k performs the control of changing the reference value of reference source 4 so that the current set value is the same value as a detected current value.

In order to provide constant contrast between an on-interval and an off-interval, signal generating circuit SGa generates a PWM signal so that the LED current in an off-interval satisfies: average current Ioff_ave=(immediately preceding Ion)−(lowest ripple value), and signal generating circuit SGa superimposes the PWM signal on the off-interval of the communication signal.

This allows overshoot to be mitigated in the rectangular waves of the communication signal in an on-interval, thereby minimizing power loss in current limiting circuit 1. Even if LED current (I_on) is increased by a ripple, an increase of power loss caused by current limiting circuit 1 is inhibited. Since the contrast between an on-interval and an off-interval of the communication signal is constant, reception error in the receiving device is unlikely to occur.

Fifth Operation Example

FIG. 132 is a waveform diagram illustrating the fifth example of the operation of the illumination light communication apparatus according to Embodiment 21. The fifth operation example illustrated in the figure is similar to the fourth operation example, except that a depth of modulation using a communication signal is reduced when the LED current (or current set value) is the threshold or less in the fifth operation example. In the following, description is given, focusing on differences from the fourth operation example. The modulation depth, as used herein, refers to Ion-Ioff_ave, or a contrast of the illumination light between an on-interval and an off-interval.

Signal generating circuit SGa changes a modulation depth between interval A and interval B in the figure. Stated differently, signal generating circuit SGa reduces a modulation depth in interval B. Interval A is where the current set value (or LED current) is greater than a threshold. Interval B is where the current set value (or LED current) is less than or equal to the threshold.

In interval A, signal generating circuit SGa generates a PWM signal so that the LED current in an off-interval satisfies: average current Ioff_ave=(immediately preceding Ion)−(lowest ripple value). In interval B, signal generating circuit SGa generates a PWM signal so that the LED current in an off-interval satisfies: average current Ioff_ave=(immediately preceding Ion)−(lowest ripple value)−α1, that is, the modulation depth is reduced by α1, where α1 satisfies: 0<α1<(lowest ripple value).

According to the fifth operation example, an amount of change in current is reduced by reducing the modulation depth in interval B, thereby reducing more power loss than the fourth operation example.

Sixth Operation Example

FIG. 133 is a waveform diagram illustrating the sixth example of the operation of the illumination light communication apparatus according to Embodiment 21. The figure is similar to the fifth operation example illustrated in FIG. 132, except that the modulation using a communication signal is not carried out nor is transistor 2 switched fast between on and off in interval B. In the following, description is given, focusing on differences from the fifth operation example.

In interval B, signal generating circuit SG generates neither a communication signal nor a PWM signal for switching fast transistor 2 between on and off. Stated differently, the modulation depth is reduced to 0 (zero).

In this case, interval A may be greater than or equal to an amount of transmission data (e.g., communication ID) which is transmitted through illumination light communication.

According to the sixth operation example, the loss caused by current limiting circuit 1 can further be reduced, while inhibiting occurrence of reception error in the receiving device.

Seventh Operation Example

FIG. 134 is a waveform diagram illustrating the seventh operation example of the illumination light communication apparatus according to Embodiment 21. The figure is the same as the fifth operation example illustrated in FIG. 132, except that the modulation depth is reduced in interval A, rather than reducing it in interval B. In the following, description is given, focusing on differences from the fifth operation example.

In interval A, signal generating circuit SGa generates a PWM signal so that the LED current in an off-interval satisfies: average current Ioff_ave=(immediately preceding Ion)−(lowest ripple value)−al. In interval B, signal generating circuit SGa generates a PWM signal so that the LED current in an off-interval satisfies: average current Ioff_ave=(immediately preceding Ion)−(lowest ripple value).

According to the seventh operation example, as compared to the fifth operation example, the loss caused by current limiting circuit 1 is further reduced by reducing a modulation depth in interval A where a change in current is greater than in interval B.

Eighth Operation Example

FIG. 135 is a waveform diagram illustrating eighth operation example of the illumination light communication apparatus according to Embodiment 21. The figure is similar to the sixth operation example illustrated in FIG. 134, except that the modulation using a communication signal is not carried out nor is transistor 2 switched fast between on and off in interval A. In the following, description is given, focusing on differences from the sixth operation example.

In interval A, signal generating circuit SG generates neither a communication signal nor a PWM signal for switching fast transistor 2 between on and off. Stated differently, the modulation depth is reduced to 0 (zero).

In this case, interval B may be greater than or equal to an amount of transmission data (e.g., communication ID) which is transmitted through illumination light communication.

According to the eighth operation example, the loss caused by current limiting circuit 1 can further be reduced, while inhibiting occurrence of reception error in the receiving device.

Embodiment 22

An illumination light communication apparatus according to Embodiment 22 is highly reliable and, when voltage on a reference power supply for current limiting circuit 1 or multi-operation control circuit 1b included in the illumination light communication apparatus indicates an undesired value and an excessive power loss may result, promptly detects so in a simple manner and enters a protection mode.

FIG. 136 is a diagram illustrating an example of configuration of modulation circuit 70b which is a precondition for Embodiment 22. Modulation circuit 70b is a specific example of multi-operation control circuit 1b according to Embodiment 7 as illustrated in FIG. 50A, and is a part of the illumination light communication apparatus or communication module 10. FIG. 136 illustrates an instance in which an optimal current set value is indirectly obtained by feeding a voltage applied to modulation circuit 70b back to a reference power supply only in an energized period of modulation circuit 70b. In FIG. 136, MOSFET n71 and source resistor n72 form a primary constant current circuit. A voltage drop in source resistor n72 is input to the negative terminal of operational amplifier n73 via resistor n76. The positive terminal of operational amplifier n73 is connected to a parallel circuit formed of capacitor n80 and resistor n81. Electric charge is accumulated in capacitor n80 via resistor n82 and MOSFET n83. It should be noted that a communication signal (e.g., ID signal) is input to the negative terminal of operational amplifier n73 via inverter n86 and resistor n77 to turn MOSFET n71 on and off, and turns MOSFET n83 ON-OFF via resistor n84. This turns on MOSFET n71 and MOSFET n83 during the ON period of the communication signal and capacitor n80 is charged by the voltage drop in MOSFET n71 and resistor n72 caused during the energized period of modulation circuit 70b. Resistor n78 and resistor n85 are gate resistors. Resistor n81 is a discharge resistor. Capacitor n79 is a speed-up capacitor.

The method as illustrated in FIG. 136 by which modulation circuit 70b generates voltage on the reference power supply utilizing a voltage drop occurred in modulation circuit 70b is unlikely to cause an extreme increase of circuit loss that is attributed to a small constant current set value as illustrated in FIG. 8, for the following reasons. Since an average LED current is controlled to be generally constant by an LED power supply, a great loss in modulation circuit 70b means a great voltage drop. However, as a voltage drop is to increase, the feedback functions to increase the reference power supply to reduce the voltage drop. As illustrated in FIG. 12, an increase of the loss when DUTY CYCLE is extremely short is also unlikely. This is because the target communication signal is generated according to 4 PPM and thus an average DUTY CYCLE is 75%. Even if the target communication signal varies locally, it is transiently and thus does not greatly affect an average power loss.

However, as an extreme case, loss in the primary constant current circuit may increase and the primary constant current circuit may be heated due to a fault such as an interruption of circuitry for generating a reference potential for capacitor n80 or a short of capacitor n80 or resistor n81.

In order to resolve such situations, the illumination light communication apparatus according to Embodiment 22 includes a sensing circuit which senses whether current through the light source and the current limiting circuit have exceeded a predetermined amount, and if the sensing circuit senses that the current have exceeded the predetermined amount, the current limiting circuit is controlled to limit the current.

The illumination light communication apparatus according to Embodiment 22 may further include: a power supply circuit; a smoothing circuit; a load circuit; an on/off switch; modulation circuit 70b provided in series with the load circuit and the on/off switch; a feedback circuit which generates a constant current value utilizing a voltage across modulation circuit 70b; a sensing circuit which is provided in parallel with modulation circuit 70b and detects a voltage drop during an ON period of the on/off switch; and a protection circuit which determines output of the sensing circuit and causes the illumination light communication apparatus to enter the protection mode. The sensing circuit may be an overpower sensing circuit or an overvoltage sensing circuit.

Preferably, the sensing circuit included in the illumination light communication apparatus includes: a divider resistor which divides applied voltage during an OFF period of the on/off switch; a means for clamping the divided voltage; an integration capacitor which is charged via the divider resistor; a discharge circuit which is formed of a diode and a discharge resistor and discharges, during an ON period of the on/off switch, electric charge charged in the integration capacitor to modulation circuit 70b including the on/off switch; a comparator which determines a voltage value on the integration capacitor; and a threshold voltage source.

Preferably, in the sensing circuit, the capacitor is charged using the control power supply, instead of the divider resistors and the clamp means.

Preferably, the sensing circuit included in the illumination light communication apparatus has a second charge path for the integration capacitor, wherein the second charge path is configured by including a Zener diode in the discharge circuit.

Preferably, the sensing circuit included in the illumination light communication apparatus includes an integration capacitor for the second charge path that is configured by including the Zener diode in the discharge circuit, wherein the integration capacitor is wired-OR'd to potential at a first integration capacitor and configured so that a second integration capacitor is sufficiently smaller than the first integration capacitor.

Preferably, the illumination light communication apparatus includes: a latch circuit which, if output (comparator output) of the sensing circuit changes to High, holds that condition; and a shorting switch which shorts modulation circuit 70b using output of the latch circuit.

Next, the illumination light communication apparatus according to Embodiment 22 is described with reference to FIG. 137. As illustrated in, for example, FIGS. 1 and 50A, the illumination light communication apparatus also includes: power supply circuit 52a having a function of outputting a constant current; smoothing capacitor (smoothing circuit) 65; load circuit 53 which is an LED; and modulation circuit 70b configured of a constant current circuit having an on/off function. The illumination light communication apparatus further includes overpower sensing circuit 90a provided in parallel with modulation circuit 70b.

Overpower sensing circuit 90a includes: a switch circuit formed of P-type MOSFET n90, gate protection resistor n91 for P-type MOSFET n90, N-type MOSFET n92 between a gate terminal of P-type MOSFET n90 and the circuit ground, gate protection resistor n93 for N-type MOSFET n92, and gate resistor n94; an integration circuit that is formed of diode n95, resistor n96, capacitor n97, and discharge resistor n98 for capacitor n97 which are disposed between a drain terminal of P-type MOSFET n90 and circuit ground; comparator n100 which determines whether a potential at capacitor n97 has reached a predetermined value; and threshold power supply n99 for comparator n100. The switch circuit is driven by a communication signal. In a High period of the communication signal, P-type MOSFET n90 turns ON and a drain voltage of the on/off switch (MOSFET n71) for the modulation in an energized state is applied to the anode of diode n95. The voltage applied to the anode of diode n95 is charged at capacitor n97 via resistor n96. As a potential at capacitor n97 increases greater than or equal to a threshold of reference power supply n99, output of comparator n100 changes to High. It should be noted that resistor n98 is a discharge resistor.

Since an average current which flows through the primary circuit (MOSFET n71 and resistor n72) of modulation circuit 70b is controlled to be generally constant by the constant-current control function of power supply circuit 52a, a voltage drop at the primary circuit in the energized state is proportional to the power loss. Therefore, detecting an excessive voltage drop at the primary circuit means detecting overpower.

FIG. 138 illustrates waveforms of each component in normal operation. During a High period of an inverted communication signal (a), MOSFET n71 forming a primary constant current circuit turns ON and LED current (b) flows. As a result, a voltage drop across MOSFET n71 and resistor n72 during an energized period is as illustrated in (c). A product of the LED current (b) and the voltage drop (c) is the power loss illustrated in (d). The power loss is integrated by resistor n96 and capacitor n97, and detection potential of generally-direct current is generated at capacitor n97. However, the detection potential does not reach a threshold of reference power supply n99, and the comparator output maintains Low.

FIG. 139 illustrates waveforms of each component when a normal reference power supply is, for some reason, not generated at the positive terminal of operational amplifier n73 included in modulation circuit 70b and an excessive loss in modulation circuit 70b is caused. During a High period of the inverted communication signal (a), MOSFET n71 forming the primary constant current circuit turns ON and the LED current (b) flows. However, a waveform of a voltage across MOSFET n71 and resistor n72 during an energized period is greater than normal as illustrated in (c). Therefore, the power loss in the primary constant current circuit is great as illustrated in (d), increasing a detection voltage generated by capacitor n97 above the threshold of reference power supply n99, and the comparator output changes to High.

FIG. 140 is a diagram illustrating primary circuit losses and detected overpower levels in six different models of LED loads. The figure shows results of measurement using the six different LED load having different load capacities, with respect to loss at modulation circuit 70b for each model when a normal modulation is performed using a communication signal. In either case, resistor n81 is adjusted to set the model to its optimal operating point to yield a minimum circuit loss within a range that can maintain the LED current waveform to a generally rectangular wave. The magnitude of the primary circuit loss is proportional to the LED current value. As the resistance of resistor n81 in each model is gradually reduced from a value which is the optimal operating point of the model, the primary circuit loss increases. Eventually, the detection voltage (capacitor n97) increases to the threshold of reference power supply n99 and output of comparator n100 changes to High. Thus, the illumination light communication apparatus transitions to a power protection operation. In the present embodiment, the power protection operation point is substantially a constant value, irrespective of differences in model.

Embodiment 23

An illumination light communication apparatus according to Embodiment 23 is described with reference to FIG. 141. As illustrated in, for example, FIGS. 1 and 50A, the illumination light communication apparatus also includes: power supply circuit 52a having a function of outputting a constant current; smoothing capacitor (smoothing circuit) 65; load circuit 53 which is an LED; and modulation circuit 70b configured of a constant current circuit having an on/off function. The illumination light communication apparatus further includes overpower sensing circuit 90b provided in parallel with modulation circuit 70b.

Overpower sensing circuit 90b includes: an integration circuit formed of resistor n101, resistor n103, and capacitor n97; Zener diode n102 which clamps a potential at a point of connection between resistors n101 and n103 to a constant value; a discharge circuit formed of resistor n104 and diode n105 which is for discharging electric charge stored in capacitor n97 via MOSFET n71 and resistor n72 included in modulation circuit 70b; comparator n100 which determines whether the potential at capacitor n97 has reached a predetermined value; and threshold power supply n99 for comparator n100. As the potential at capacitor n97 increases greater than or equal to a threshold of reference power supply n99, output of comparator n100 changes to High. It should be noted that resistor n98 is a discharge resistor.

In the present embodiment, a charging voltage which charges capacitor n97 is mainly an applied voltage in an OFF period of MOSFET n71 included in modulation circuit 70b. While the applied voltage depends greatly on an LED load to which the voltage is to be applied or power source characteristics of the LED load, the clamping action by Zener diode n102 can eliminate the difference in applied voltage between the models. In other words, the difference in charging voltage can be ignored by clamping the voltages on the models lower than or equal to a voltage on a model having the smallest applied voltage among the target models.

Electric charge charged in capacitor n97 is discharged during an ON period of MOSFET n71 via diode n105 and resistor n104 and via MOSFET n71 and resistor n72 included in modulation circuit 70b, provided that an amount of the discharge from capacitor n97 depends on a voltage drop during the ON period. If the voltage drop is great, electric charge in capacitor n97 is unlikely to discharge. If an amount of the discharge from capacitor n97 is constant, the potential in capacitor n97 increases. Since occurrence of a large voltage drop indicates a large power loss, overpower can be detected.

FIG. 142 illustrates waveforms of each component in normal operation. During a High period of an inverted communication signal (a), MOSFET n71 forming a primary constant current circuit turns ON and LED current (b) flows. As a result, a voltage drop across MOSFET n71 and resistor n72 during an energized period is as illustrated in (c). A product of the LED current (b) and the voltage drop (c) is the power loss illustrated in (d). Since a clamped charging voltage is charged at capacitor n97, charge curve is the same in each cycle as illustrated in (e). However, a discharge curve depends on the waveform illustrated in (c) or (d). To be more specific, capacitor n97 is unlikely to discharge in a period where a voltage drop in the primary circuit is great, whereas capacitor n97 is likely to discharge in a period where a voltage drop in the primary circuit is small. The charging and discharging are balanced in normal operation, and thus the potential in capacitor n97 does not reach the threshold of reference power supply n99 and the comparator output maintains Low.

FIG. 143 illustrates waveforms of each component when a normal reference power supply is, for some reason, not generated at the positive terminal of operational amplifier n73 included in modulation circuit 70b and an excessive loss in modulation circuit 70b is caused. During a High period of the inverted communication signal (a), MOSFET n71 forming the primary constant current circuit turns ON and the LED current (b) flows. However, a waveform of a voltage across MOSFET n71 and resistor n72 during an energized period is greater than normal as illustrated in (c). Therefore, the power loss in the primary constant current circuit is great as illustrated in (d), making discharging of capacitor n97 difficult. As a result, the potential at capacitor n97 increases above the threshold of reference power supply n99, and the comparator output changes to High.

FIG. 144 shows results of measurement using the six different LED load having different load capacities, with respect to loss at modulation circuit 70b for each model when a normal modulation is performed using a communication signal. In either case, resistor n81 is adjusted to set the model to its optimal operating point to yield a minimum circuit loss within a range that can maintain the LED current waveform to a generally rectangular wave. The magnitude of the primary circuit loss is proportional to the LED current value. As the resistance of resistor n81 in each model is gradually reduced from a value which is the optimal operating point of the model, the primary circuit loss increases. Eventually the detection voltage (capacitor n97) increases to the threshold of reference power supply n99 and output of comparator n100 changes to High. Thus, the illumination light communication apparatus transitions to a power protection operation. According to the present embodiment, the power protection operation point depends on a model and is substantially proportional to a primary circuit loss in normal operation.

The characteristics stated above are effective when the same modulator is used for different models. To be more specific, since the power protection operation point depends on the main circuit loss in normal operation, the characteristics stated above alleviate disadvantages of variations in margin in detecting the power protection operation in a specific model.

Embodiment 24

An illumination light communication apparatus according to Embodiment 24 is described with reference to FIG. 145. As illustrated in, for example, FIGS. 1 and 50A, the illumination light communication apparatus also includes: power supply circuit 52a having a function of outputting a constant current; smoothing capacitor (smoothing circuit) 65; load circuit 53; and modulation circuit 70b configured of a constant current circuit having an on/off function. The illumination light communication apparatus further includes overpower sensing circuit 90c provided in parallel with modulation circuit 70b.

Overpower sensing circuit 90c includes: an integration circuit for charging capacitor n97 by a control power supply via resistor n101; a discharge circuit formed of resistor n104 and diode n105 which is for discharging electric charge stored in capacitor n97 via MOSFET n71 and resistor n72 included in modulation circuit 70b; comparator n100 which determines whether the potential at capacitor n97 has reached a predetermined value; and threshold power supply n99 for comparator n100. As the potential at capacitor n97 increases greater than or equal to a threshold of reference power supply n99, output of comparator n100 changes to High. It should be noted that resistor n98 is a discharge resistor.

In the present embodiment, capacitor n97 is charged using the control power supply via resistor n101, thereby simplifying the circuit configuration. Main operation and characteristics of the present embodiment are similar to Embodiment 2. Compared to Embodiment 2, charging power is generated even during discharging from capacitor n97. Thus, the control circuit power increases more or less.

Embodiment 25

An illumination light communication apparatus according to Embodiment 25 is described with reference to FIG. 146. As illustrated in, for example, FIGS. 1 and 50A, the illumination light communication apparatus also includes: power supply circuit 52a having a function of outputting a constant current; smoothing capacitor (smoothing circuit) 65; load circuit 53; and modulation circuit 70b configured of a constant current circuit having an on/off function. The illumination light communication apparatus further includes overpower sensing circuit 90d provided in parallel with modulation circuit 70b.

Overpower sensing circuit 90d is almost the same as one described in Embodiment 23 with reference to FIG. 141, except that overpower sensing circuit 90d includes Zener diode n106 in place of diode n105 included in the discharge circuit in FIG. 141. In addition to the overpower protection function, overvoltage protection function can be added almost in the same configuration, as are the charge-discharge operations. The main purpose of the overpower protection function is to prevent the element overheating. Although thermal time constant is relatively great and immediacy of a detection response time cannot be obtained a prompt detection and protection are required when overvoltage is applied to MOSFET n71 included in modulation circuit 70b so that breakdown voltage is not reached. Discharge time constant of capacitor n97 is set sufficiently smaller than charge time constant in the present disclosure. Thus, use of a Zener diode having an appropriate value for the discharge circuit requires a small time constant for charging capacitor n97 beyond Zener voltage, thereby achieving responsivity to overvoltage.

Embodiment 26

An illumination light communication apparatus according to Embodiment 26 is described with reference to FIG. 147. As illustrated in, for example, FIGS. 1 and 50A, the illumination light communication apparatus also includes: power supply circuit 52a having a function of outputting a constant current; smoothing capacitor (smoothing circuit) 65; load circuit 53; and modulation circuit 70b configured of a constant current circuit having an on/off function. The illumination light communication apparatus further includes overpower sensing circuit 90e provided in parallel with modulation circuit 70b.

Overpower sensing circuit 90e is a combination of Embodiment 23 and Embodiment 26. Specifically, overpower sensing circuit 90e includes: a first integration circuit which charges capacitor n97 via resistor n101 and resistor n103; Zener diode n102 which clamps a potential at a point of connection between resistor n101 and resistor n102; a second integration circuit which charges capacitor n108 via resistor n104 and Zener diode n106; diode n107 connected in a direction from capacitor n97 to capacitor n108; comparator n100 which determines whether a potential at capacitor n108 has reached a predetermined value; and threshold power supply n99 for comparator n100. As the potential at capacitor n108 increases greater than or equal to a threshold of reference power supply n99, output of comparator n100 changes to High. It should be noted that resistor n98 is a discharge resistor. Moreover, a time constant for the second integration circuit is set sufficiently smaller than a time constant for the first integration circuit.

Operation of the first integration circuit is similar to Embodiment 23. Moreover, a discharge circuit for capacitor n97 includes diode n107, Zener diode n106, and resistor n104, which is also similar to Embodiment 23. Thus, a charge path for the second integration circuit is common to a discharge path for capacitor n97.

The time constant for the second integration circuit can be reduced extremely low by setting the capacitance value of capacitor n108 extremely small, thereby markedly improving the responsivity as overvoltage protection.

Embodiment 27

An illumination light communication apparatus according to Embodiment 27 is described with reference to FIG. 148. As illustrated in, for example, FIGS. 1 and 50A, the illumination light communication apparatus also includes: power supply circuit 52a having a function of outputting a constant current; smoothing capacitor (smoothing circuit) 65; load circuit 53; and modulation circuit 70b configured of a constant current circuit having an on/off function. The illumination light communication apparatus further includes overpower sensing circuit 90 provided in parallel with modulation circuit 70b, wherein output of overpower sensing circuit 90 is held at hold circuit 110 and drives MOSFET 111 to cause a short across modulation circuit 70b. Overpower sensing circuit 90 is one of overpower sensing circuits 90a to 90e.

Assuming that the output of overpower sensing circuits 90a to 90e being high indicates that a normal modulation operation cannot be operated for some reason, the primary function of the illumination light communication apparatus as an illumination light is retained, despite the fact that the function of illumination light communication apparatus as a light communication apparatus is lost, by promptly shorting the modulation circuit as if the modulation circuit is not present between the illumination light communication apparatus and the overpower sensing circuit.

Such an action minimizes the effects of the modulation circuit on the LED power supply, thereby contributing to increased system reliability as well.

Embodiment 28

An illumination light communication apparatus according to Embodiment 28 is inexpensive and reliable and, irrespective of an element used, performs, by current limiting circuit 1 or multi-operation control circuit 1b, an appropriate feedback control on power loss and also contributes to achieving manufacturing technology (MT) which supports various models.

FIG. 149 is a diagram illustrating an example of configuration of modulation circuit 70b which is a precondition for Embodiment 28. Modulation circuit 70b is a specific example of multi-operation control circuit 1b according to Embodiment 7 as illustrated in FIG. 50A, and is a part of the illumination light communication apparatus or communication module 10. FIG. 149 illustrates an instance in which an optimal current set value is indirectly obtained by feeding a voltage applied to modulation circuit 70b back to a reference power supply only in an energized period of modulation circuit 70b. In FIG. 149, MOSFET n71 and source resistor n72 form a primary constant current circuit. A voltage drop in source resistor n72 is input to the negative terminal of operational amplifier n73 via resistor n76. The positive terminal of operational amplifier n73 is connected to a parallel circuit formed of capacitor n80 and resistor n81. Electric charge is accumulated in capacitor n80 via resistor n82 and MOSFET n83. It should be noted that a communication signal is input to the negative terminal of operational amplifier n73 via inverter n86 and resistor n77 to turn MOSFET n71 on and off, and turns MOSFET n83 ON-OFF via resistor n84. This turns on MOSFET n71 and MOSFET n83 during the ON-period of the communication signal and capacitor n80 is charged by the voltage drop in MOSFET n71 and resistor n72 caused during the energized period of modulation circuit 70b. Resistor n78 and resistor n85 are gate resistors. Resistor n81 is a discharge resistor. Capacitor n79 is a speed-up capacitor.

Operation of the circuit in FIG. 149 is described with reference to operational waveforms illustrated in FIG. 150. An inverted communication signal is input to the negative terminal of operational amplifier n73 via resistor n77. Output of operational amplifier n73 changes to Low by setting the potential at the negative input terminal of operational amplifier n73 higher than at the positive terminal during a High period of the inverted communication signal, thereby turning MOSFET n71 OFF. The output of operational amplifier n73 changes to High by setting higher potential at the positive terminal of operational amplifier n73 than at the negative input terminal during a Low period of the communication signal, thereby turning MOSFET n71 ON and causing the LED current to flow. These states are as illustrated in (a) to (c) of FIG. 150. A voltage drop in resistor n72 caused by the LED current is divided by resistor n76 and resistor n77 and applied to the negative terminal of operational amplifier n73, and output of operational amplifier n73 is controlled so that the potential at the negative terminal is substantially equal to the potential at the positive terminal.

A gate voltage in MOSFET n71 at this time is generally gate threshold Vth plus the voltage drop caused in resistor n72.

Part (d) of FIG. 150 illustrates a waveform of voltage applied to a primary constant current circuit (MOSFET n71 and resistor n72) in the modulation operation. MOSFET n71 is OFF during a High period of the inverted communication signal and thus the voltage applied to the primary constant current circuit is, generally, output voltage of the LED power supply minus a cut-off voltage of the LED load. During a Low period of the inverted communication signal, MOSFET n71 turns ON and constant current operation is performed. Thus, MOSFET n71 operates in an amplification region, causing a voltage drop, and the voltage drop caused in resistor n72 is also added. Part (e) of FIG. 150 illustrates the above voltage drop only. The graph shows the power loss as well since the LED current flows during the voltage drop.

MOSFET n71, as well as MOSFET n83, performs ON-OFF operation by the inverted communication signal. The inverted communication signal is inverted by inverter n86 (i.e., non-inverted communication signal) and applied to the gate terminal of MOSFET n83 via resistor n84. Thus, MOSFET n83 performs an inverse ON-OFF operation as compared to MOSFET n71. To be more specific, since a Low period of the inverted communication signal is an ON period of MOSFET n83, and capacitor n80 is charged by the voltage drop illustrated in (e) of FIG. 150 via resistor n82. As a result, a reference potential as depicted in dotted lines in (e) of FIG. 150 is generated and a current value of modulation circuit 70b is set based on the reference potential. The reference potential is adjustable by resistor n82 and resistor n81. The reference potential set as appropriate provides a function of feeding back the power loss. In other words, as the voltage drop at modulation circuit 70b increases for some reason, an amount of charge in capacitor n80 increase as well. This increases the gate voltage of MOSFET n71, thereby facilitating a current to flow. Consequently, the voltage drop at modulation circuit 70b is reduced.

These are switching operations using the operational amplifier and greatly depend on the characteristics of the operational amplifier. FIG. 151 is a diagram illustrating a simulation result for rising waveforms of the gate voltage of MOSFET n71 and the LED current at a falling edge of the inverted communication signal. The upper graph in FIG. 151 illustrates the falling waveform of the inverted communication signal and the rising waveform of the LED current. The lower graph in FIG. 151 illustrates the waveform of the rising edge of the gate voltage.

FIG. 152 is a diagram illustrating a simulation result for falling waveforms of the gate voltage of MOSFET n71 and the LED current at a rising edge of the inverted communication signal. The upper graph in FIG. 152 illustrates the waveform of the rising edge of the inverted communication signal and the waveform of the falling edge of the LED current. The lower graph in FIG. 152 illustrates the waveform of the falling edge of the gate voltage.

As mentioned above, as the inverted communication signal is inverted from High to Low, output of the operational amplifier, that is, the gate voltage of MOSFET n71 changes to High but the rising edge of the gate voltage has a slope. A degree of the slope greatly depends on output characteristics of the operational amplifier and presented as through-rate characteristics.

The degree of the slope is also affected by capacitive components in a vicinity of operational amplifier n73. In particular, for example, capacitance of a capacitor between an output end and a negative input end, and gate capacitance (Ciss) of MOSFET have particularly great effects.

The rising slope and falling slope of the gate voltage can be steepened by minimizing capacitance of a capacitor, such as capacitor n79, connected to an output of the operational amplifier, using the operational amplifier having a large through rate and MOSFET having a small gate capacitance.

In FIG. 151, the gate voltage of MOSFET n71 increases with a slope, starting at the falling edge of the inverted communication signal, and as the gate voltage reaches a gate threshold (Vth) of MOSFET n71, the LED current starts flowing. The gate voltage further increases by the voltage drop caused in resistor n72 by the LED current, and the LED current becomes flat.

Time from the falling edge of the inverted communication signal until the LED current reaches 10% of the flat portion thereof is referred to as a rising delay time.

In FIG. 152, the gate voltage of MOSFET n71 decreases with a slope, starting at the rising edge of the inverted communication signal, and as the gate voltage reaches the gate threshold (Vth) of MOSFET n71, the LED current is interrupted. Time from the rising edge of the inverted communication signal until the LED current reaches 90% of the flat portion thereof is referred to as a falling delay time. Comparing the rising delay time and the falling delay time, it can be seen that the rising delay time is much great.

FIG. 153 illustrates waveforms during the modulation operation involving a rising delay time. The gate voltage of MOSFET n71 turns on and off with slopes (b), according to the inverted communication signal (a). Thus, the LED current waveform (c) rises with delay.

As a result, voltage applied to the primary circuit (d) also rises with delay. So, a voltage other than the voltage drop is superimposed on a waveform (e) desired to be used to detect a voltage drop during a Low period of the inverted communication signal. Consequently, a reference potential generated in capacitor n80 is level 2 (depicted in dot-dash lines) higher than level 1 (depicted in dotted lines) which the reference potential is expected to be. Consequently, an expected feedback function for power loss cannot be achieved.

In order to solve the problem, the current limiting circuit included in the illumination light communication apparatus according to Embodiment 28 includes: a reference source which dynamically generates a reference value which is variable and corresponding to the current set value, according to a current value of current which flows through the switch and the current limiting circuit; and a delay circuit which delays the reference value generated by the reference source, by a predetermined length of time, wherein the current limiting circuit limits the current which flows through the light source, based on the reference value delayed by the delay circuit.

Moreover, the illumination light communication apparatus according to Embodiment 28 may include: a power supply circuit; a smoothing circuit; a load circuit; a modulation on/off switch; modulation circuit 70b provided in series with the load circuit and the modulation on/off switch; a feedback circuit which generates a constant current value, utilizing a voltage across modulation circuit 70b; and a delaying means in the feedback circuit, which causes a delay in a timing at which a feedback switch turns ON, the feedback switch performing a reverse operation to the on/off switch.

Preferably, the feedback circuit included in the illumination light communication apparatus includes a voltage clamping means.

Preferably, the delay time set by the delaying means of the feedback circuit included in the illumination light communication apparatus is sufficiently greater than the rising delay time of the modulation on/off switch.

Preferably, the delay time set by the delaying means of the feedback circuit included in the illumination light communication apparatus is greater than the rising delay time of the modulation on/off switch and less than the shortest width among widths of pulses included in the communication signal.

Preferably, the feedback switch included in the illumination light communication apparatus has at least a capacitor element between a control terminal of the feedback switch and the circuit ground.

The illumination light communication apparatus according to Embodiment 28 is described with reference to FIG. 154. As illustrated in, for example, FIGS. 1A and 50A, the illumination light communication apparatus also includes: power supply circuit 52a having a function of outputting a constant current; smoothing capacitor (smoothing circuit) 65; load circuit 53; and a modulation circuit configured of a constant current circuit having an on/off function. Modifications are made to the modulation circuit. Specifically, a delay circuit is attached to a gate driving circuit of a second switch (the feedback switch: MOSFET n83) which turns ON-OFF in synchronization with a constant current switch (the modulation on/off switch: MOSFET n71) which also have a function of turning on an off according to the inverted communication signal. The delay circuit causes a delay in the timing at which the second switch turns ON.

The delay circuit includes: an integration circuit formed of inverter n86 which inverts (i.e., non-inversion) the inverted communication signal, resistor n90, and capacitor n89; a withdrawal circuit formed of diode n92 and resistor n93; and waveform-shaping buffer element n88. The inverted communication signal is inverted by inverter n86, after which the slope of the rising edge of the gate voltage of MOSFET n83 is dampened by the integration circuit and the rising delay time is generated utilizing an input threshold of buffer element n88. As the inverted communication signal switches to High, electric charge in capacitor n89 is promptly discharged via the withdrawal circuit.

The operation illustrated in Embodiment 28 with reference to FIG. 154 is described with reference to FIG. 155. The gate voltage of the modulation on/off switch, which is MOSFET n71, turns on and off with slopes (b), according to the inverted communication signal (a) and thus the LED current waveform rises with delay (c). As a result, voltage applied to the primary circuit (d) also falls with delay. However, the gate voltage of the feedback switch, namely, MOSFET n83 rises with delay (e) owing to the delay circuit according to the present disclosure. Consequently, voltage components other than the voltage drop at modulation circuit 70b are removed and a reference potential can be generated at capacitor n80 using the voltage drop only, as illustrated in (f). The reference potential obtained as such is close to level 1 (depicted in dotted lines) which the reference potential is expected to be, thereby providing an appropriate feedback function for power loss.

It should be noted that modulation circuit 70c illustrated in FIG. 154 includes Zener diode z94 between the drain terminal of MOSFET n83 and the circuit ground. The main purpose is to reduce a withstand voltage on the feedback switch, namely, MOSFET n83. The feedback circuit is only intended for a voltage drop during an ON period of the modulation on/off switch which is MOSFET n71, and voltage applied to MOSFET n71 in an OFF period is not required.

Therefore, clamping the voltage that is applied to MOSFET n71 in an OFF period, using Zener diode z94, has no adversely affect on the feedback performance. Rather, use of MOSFET n83 having a reduced withstand voltage and a reduced capacitance allows a reduction of parasitic capacitance, thereby achieving more accurate feedback performance.

An example of the main advantageous effects of Embodiment 28 is achievement of what is called MT'd (manufacturing technology) effects in which a light communication function can be added to LED lighting devices using one modulator. Compared to the case requiring a modulator for each LED lighting device, profound effects on promotion of visible light communication can be expected, in addition to cost effectiveness owing to a reduction of parts.

FIG. 156 to FIG. 159 illustrates various characteristics of LED current, and different models having different load capacities attached to the delay circuit for delaying the rising edge of the gate voltage of MOSFET n83 according to the present disclosure. FIG. 156 depicts actual measurements of LED current versus primary constant current circuit loss, using three different LED lighting devices having different LED current ratings. It can be seen from the figure that the primary circuit loss increases substantially in proportional to the value of the LED current, and has little dependence on the rising delay time of the gate voltage of MOSFET n83. FIG. 157 depicts actual measurements of LED load power versus the primary constant current circuit loss, and that the primary constant current circuit loss has little dependence on the rising delay time of the gate voltage of MOSFET n83. Compared to the result in FIG. 156, it is clearer that the primary constant current circuit loss depends on LED current more than on load power. These results are obtained by measuring power loss in a primary constant current circuit at points (optimal resistance) where the LED current waveform have substantially rectangular waves, while adjusting each time resistor n81 (reference resistor) that is provided in parallel with capacitor n80.

FIG. 158 depicts actual measurements of LED current versus a resistance (resistor n81), using three different LED lighting devices having different LED current ratings. As the rising delay time of the gate voltage of MOSFET n83 is extended, the optimal resistance on resistor n81 in the three models shifts toward a great value. An increase of the rising delay time reduces a duration for detecting the voltage drop at modulation circuit 70b, thereby reducing the voltage formed on capacitor n80. Consequently, the primary constant current circuit loss increases (the LED current waveform maintains rectangular wave). Since the optimal adjusted point can be found by increasing the resistance value of reference resistor n81, the optimal adjusted resistance value of resistor n81 increases over the rising delay time. It should be noted that the rising delay time of the modulation on/off switch (MOSFET n71) in this case is, generally, 5 μsec. Moreover, the large difference in the optimal resistance between with delay and without delay is contemplated to be due to the fact that, without delay, the voltage other than the voltage drop at the primary circuit is also captured. FIG. 159 depicts actual measurements of LED load power (load capacity) versus the optimal resistance (resistor n81), using the three different LED lighting devices mentioned above. As with the case illustrated in FIG. 158, as the rising delay time of the gate voltage of MOSFET 83 is extended, the optimal resistance on resistor n81 shifts toward a great value, the reason for which is the same as for the case on FIG. 158.

Considering the results in FIGS. 158 and 159 from the standpoint of what is called MT'd in which the light communication function can be added to LED lighting devices using one modulator, desirably, three reference resistance values for different current or different load power are close in value because the optimal resistance is strictly fixed to one resistance value. Thus, it can be seen that with delay is preferred to without delay, and a greater delay time tends to be more preferable within a range of 9 μsec to 24 μsec. It should be noted that the characteristics when the delay time is 50 μsec are translation of the diagram depicting the characteristics when the delay time is 24 μsec. Thus, increasing the delay time more than necessary merely increases the optimal resistance and does not bring the three optimal resistances close in value. Additionally, to increase the optimal resistance, a care must be taken in input bias current characteristics of operational amplifier n73. While the voltage drop due to the current through modulation circuit 70*b* is fed back to the positive terminal of the operational amplifier to obtain a reference potential in the present disclosure, if the optimal reference value is great, the input bias current cannot be ignored. In other words, ideally, the reference potential is generated on capacitor n80 using the current by feeding the entirety of the voltage drop at modulation circuit 70*b* back to the positive terminal of the operational amplifier. However, presence of current which flows from internal circuitry of operational amplifier n73 into the input positive terminal thereof inhibits an ideal feedback control. Consequently, an operational amplifier having a small input bias current needs to be used. This is, in general, expensive. Based on this regard, preferably, the delay time of MOSFET n83 is 24 μsec, rather than 50 μsec.

According to JEITA-CP1223 which is the standard for the visible light communication, one slot in 1-4 PPM transmission scheme is 104.167 μsec. Thus, a voltage drop for one slot cannot be detected at all if the rising delay time for the gate voltage of MOSFET 83 is increased to 104 μsec. Therefore, the delay time needs to be less than 104 μsec. The delay time of 50 μsec used for the actual measurement depicted in FIG. 156 to FIG. 159 is about 50% of the one slot period mentioned above. From these results, preferably, the rising delay time of the gate voltage of MOSFET n83 is set in a range greater than the rising delay time of the modulation on/off switch (MOSFET n71) and less than the shortest width among widths of pulses included in the communication signal. Further, preferably, the rising delay time of the gate voltage of MOSFET n83 is set within a range more than twice as much as the rising delay time of the modulation on/off switch (MOSFET n71) and less than half the shortest width among widths of pulses included in the communication signal.

Embodiment 29

FIG. 160 illustrates only the feedback circuit portion in FIG. 154, showing that gate capacitance Ciss is of course present on the feedback switch, namely, MOSFET n83. How the gate capacitance affects reference potential to be generated at capacitor n80 is described with reference to FIG. 161.

A falling waveform of an inverted communication signal is inverted by inverter n86 into a rising waveform as illustrated in (a) of FIG. 161. Capacitor n89 is charged via resistor n90 to have an integrated waveform as illustrated in (b). As the voltage reaches input threshold Vth of buffer element n88, output of buffer element n88 is delayed with delay time T as illustrated in (c) and is supplied to the gate terminal of MOSFET n83 via resistor n84. Since gate capacitance Ciss is present at MOSFET n83 as mentioned above, a current via the gate capacitance and having a derivative waveform flows through MOSFET n83 as the gate voltage of MOSFET n83 rises as illustrated in (d). Consequently, potential at capacitor n80 increases as illustrated in (e), causing pulsation on the reference potential for modulation circuit 70*b*. Although the reference potential is generated at capacitor n80 using current used to feed back a voltage drop at modulation circuit 70*b*, the current from the gate circuit of MOSFET n83 is supplied to capacitor n80.

Embodiment 29 according to the present disclosure is made in view of the above problem. FIG. 162 illustrates a specific circuit configuration according to Embodiment 29. A delay circuit according to Embodiment 29 includes: inverter n86 to which the inverted communication signal is input; resistor n90 and capacitor n89 which form an integration circuit via diode n92; and a withdrawal circuit configured of transistor n96 and resistor n85. FIG. 163 illustrates operation of the delay circuit, showing that capacitor n89 is charged with a falling edge of the inverted communication signal, to be more specific, a rising voltage of inverter n86 output (a), via resistor n90 and diode n92. The integrated voltage waveform of capacitor n89 is applied as is to the gate terminal of MOSFET n83. However, voltage on capacitor n89 has an integrated waveform as illustrated in (b) and the slope of the rising voltage is gentle. Thus, the current via gate capacitance Ciss of MOSFET n83 is minute as illustrated in (d), thereby reducing the effects thereof on reference potential to be generated at capacitor n80. MOSFET n83 turns ON with delay time T by which the gate voltage reaches gate threshold Vth. While the rising edge of the communication signal is not illustrated in the figure, it should be noted that current flows into inverter n86 via resistor n90 by voltage on capacitor n89 at a moment output of inverter n86 changes to Low.

Since the current is the base current of transistor n96, transistor n96 turns ON and electric charge at capacitor n89 dissipates in resistor n85. Transistor n96 and resistor n85 form a withdrawal circuit for capacitor n89 and promptly turn OFF MOSFET 83.

According to Embodiment 29, the rising delay time can be set for the gate voltage of MOSFET n83 included in the feedback circuit and the current which flows from the gate circuit into capacitor n80, at which the reference potential for modulation circuit 70*b* is generated, can be limited, thereby achieving more accurate feedback control. This contributes to enhancing what is called MT'd in which the light communication function can be added to LED lighting devices using one modulator.

While the illumination light communication apparatus and the communication module according to the present disclosure have been described with reference to the embodiments, the present disclosure is not limited to the embodiments. The embodiments to which various modifications that may be conceived by a person skilled in the art are made or other embodiments from any combinations of some of the components according to the embodiments are intended to be included within the scope of the present disclosure, without departing from the spirit of the present disclosure.

While the illumination light communication apparatus according to the embodiments of the present disclosure has been described above, the present disclosure is not limited to the embodiments.

For example, some or the whole of each of the processing units included in the illumination light communication apparatus according to the above embodiments may be implemented in LSIs which are integrated circuits. They may be mounted on one chip, or a part or the whole of the system LSIs may be mounted on one chip.

Moreover, the integrated circuit is not limited to the LSI and may be implemented in a dedicated circuit or a general-purpose processor. A field programmable gate array (FPGA) which is programmable after manufacturing the LSI, or a reconfigurable processor in which connection or settings of circuit cells within LSI is reconfigurable may be used.

In other words, the components according to the above embodiments may be implemented in a form of dedicated hardware. Alternatively, the components may be implemented through execution of a software program suited for each component. Each component may be implemented by a program execution unit, such as central processing unit or processor, loading and executing the software program stored in a storage medium such as a hard disk or a semiconductor memory.

Moreover, the circuit configurations illustrated in the circuit diagrams are merely by way of example and the present disclosure is not limited to the circuit configurations. Specifically, circuits which can implement the characteristic features of the present disclosure as with the circuit structures described above are included in the present disclosure. For example, a certain element having an element, such as a switching element (transistor), a resistance element, or a capacitor element connected thereto in series or in parallel is also included in the present disclosure to an extent that can achieve the same or similar functionality obtained from the circuit structures described above. In other words, "connected" in the above embodiments is not limited to directly connecting two terminals (nodes), and includes connecting two terminals (nodes) via an element to an extent that can achieve the same or similar functionality obtained from the circuit structures described above.

The logic levels represented by high/low and the switching states represented by on/off are illustration to specifically illustrate the present disclosure. Different combinations of the logic levels and switching states illustrated can also obtain comparable results.

Moreover, the division of the functional blocks in the block diagrams is by way of example. Functional blocks may be implemented in one functional block, one functional block may be divided into plural, or part of the functionality may be moved to another functional block, for example. Moreover, similar functionality among functional blocks may be processed by a single piece of hardware or software in parallel or in a time-sharing manner.

While the illumination light communication apparatus according to one or more aspects of the present disclosure has been described with reference to the embodiments, the present disclosure is not limited to the embodiments. Various modifications to the embodiments that may be conceived by a person skilled in the art or combinations of the components of different embodiments are intended to be included within the scope of the one or more aspects of the present disclosure, without departing from the spirit of the present disclosure.

What is claimed is:

1. An illumination light communication apparatus comprising:
    a light source which emits illumination light;
    a power supply circuit for supplying constant current to the light source;
    a switch which is connected in series to the light source, and intermittently interrupts current which flows through the light source;
    a signal generating circuit which generates a binary communication signal which controls on and off of the switch to modulate the illumination light; and
    a current limiting circuit which is connected in series to the light source and the switch, and limits the current which flows through the light source to prevent the current from exceeding a current set value which is variable.

2. The illumination light communication apparatus according to claim 1, wherein:
    the current limiting circuit includes:
        a reference source which outputs a reference value corresponding to the current set value, the reference value being variable;
        a transistor which is connected in series to the light source and the switch, and limits the current which flows through the light source, based on the reference value; and
        a control circuit which sets the reference value to a first value when a partial duty cycle of a part of the binary communication signal is a first proportion, and sets the reference value to a second value smaller than the first value when the partial duty cycle is a second proportion higher than the first proportion, and
    the current set value corresponding to the second value is smaller than the current set value corresponding to the first value.

3. The illumination light communication apparatus according to claim 1, wherein
    the power supply circuit performs feedback control for maintaining an average of current to be supplied at a constant value.

4. The illumination light communication apparatus according to claim 1, wherein:
    the switch is connected in series between the light source and the current limiting circuit, and
    the current limiting circuit is connected to ground potential.

5. The illumination light communication apparatus according to claim 1, wherein:
    the current limiting circuit includes:
        a reference source which outputs a reference value corresponding to the current set value, the reference value being variable;
        a transistor which is connected in series to the light source and the switch, and limits the current which flows through the light source, based on the reference value; and
        a control circuit which includes a shift register which shifts and stores n-bit data in the binary communication signal, where n is an integer of 2 or more, and
    the control circuit calculates a partial duty cycle of a part of the binary communication signal based on the n-bit data, and determines the reference value according to the partial duty cycle.

6. The illumination light communication apparatus according to claim 1, comprising:
  light emitters which emit light having different colors from each other;
  a dimming controller which controls a dimming level of each of the light emitters; and
  a modulation controller which superimposes the binary communication signal on light emitted by each of the light emitters by performing modulation of temporally switching each of the light emitters between emitting light and emitting no light wherein:
  each of the light emitters includes:
    the light source;
    the switch;
    the power supply circuit; and
    the current limiting circuit,
  for each of the light emitters, the dimming controller performs, by controlling the power supply:
    amplitude dimming for controlling an intensity of light emitted by a light emitter when the dimming level of the light emitter is higher than a reference level; and
    PWM dimming for controlling a duty cycle of the light emitter when the modulation is not performed and the dimming level of the light emitter is lower than the reference level, the duty cycle being a proportion of time in which the light emitter is emitting light over a cycle of the light emitter emitting light and emitting no light,
  for each of the light emitters, the modulation controller performs:
    when the modulation is performed and the dimming level of a light emitter is higher than the reference level, the modulation on the light emitter by controlling the switch; and
    when the modulation is performed and the dimming level of the light emitter is lower than the reference level, a first control on the light emitter, the first control including:
      (1) not performing the PWM dimming using the power supply circuit; and
      (2) performing, by controlling the switch, modulation to cause the modulation for superimposing the binary communication signal on the light emitted by the light emitter and the PWM dimming to be simultaneously performed and the light emitter to start emitting light in synchronization with light emitters other than the light emitter.

7. The illumination light communication apparatus to according to claim 1, further comprising
  a controller which controls on and off of the switch to superimpose a binary communication signal on the illumination light by modulating the illumination light, and controls a current value of the current which flows through the light source, wherein:
  the controller in a first operation mode sets a duty cycle to a first proportion, and sets the current value of the current which flows through the light source in an on-period of the switch to a first current value, the duty cycle being a proportion of time in which the switch is on over a cycle of an on-period and an off-period of the switch, and
  the controller in a second operation mode sets the duty cycle to a second proportion lower than the first proportion, and sets the current value to a second current value greater than the first current value,
  the illumination light communication apparatus further comprising
  an illuminance sensor for sensing ambient illuminance of the illumination light communication apparatus, wherein
  the controller operates in the first operation mode when illuminance sensed by the illuminance sensor is lower than a predetermined threshold, and the controller operates in the second operation mode when the illuminance sensed by the illuminance sensor is higher than the predetermined threshold.

8. The illumination light communication apparatus to according to claim 1, further comprising
  a controller which controls on and off of the switch to superimpose a binary communication signal on the illumination light by modulating the illumination light, and controls a current value of the current which flows through the light source, wherein:
  the controller in a first operation mode sets a duty cycle to a first proportion, and sets the current value of the current which flows through the light source in an on-period of the switch to a first current value, the duty cycle being a proportion of time in which the switch is on over a cycle of an on-period and an off-period of the switch, and
  the controller in a second operation mode sets the duty cycle to a second proportion lower than the first proportion, and sets the current value to a second current value greater than the first current value,
  the illumination light communication apparatus further comprising
  a timer for detecting time, wherein
  the controller operates in the first operation mode when the time sensed by the timer is within a predetermined time period, and the controller operates in the second operation mode when the time sensed by the timer falls out of the predetermined time period.

9. The illumination light communication apparatus according to claim 1, wherein:
  the illumination light communication apparatus modulates the illumination light by causing an on state and an off state of the illumination light in accordance with the binary communication signal,
  the power supply circuit includes an overvoltage protection circuit which stops supply of power when an output voltage reaches an overvoltage, and
  the illumination light communication apparatus comprises:
    the switch as a first switch element;
    a bias circuit which supplies a bias voltage which turns on the first switch element to a control terminal of the first switch element in a period after power on and until the signal generating circuit starts generating the binary communication signal; and
    a second switch element which is connected to the control terminal of the first switch element, and turns on and off in accordance with the binary communication signal.

10. The illumination light communication apparatus according to claim 1, further comprising
  a current sensor which detects a current value of current through the light source, wherein:
  the current limiting circuit includes:
    a reference source which outputs a reference value which is variable and corresponding to the current set value;

a transistor connected in series to the light source and the switch, the transistor limiting the current which flows through the light source based on the reference value; and a control circuit which determines the reference value, according to the current value detected by the current sensor, and the reference value is determined according to a value obtained based on one of a lowest ripple value and a highest ripple value of the current value detected by the current sensor.

11. The illumination light communication apparatus according to claim 1, further comprising a sensing circuit which senses whether the current which flows through the light source and the current limiting circuit has exceeded a predetermined amount, wherein when the sensing circuit senses that the current has exceeded the predetermined amount, the illumination light communication apparatus controls the current limiting circuit to limit the current.

12. The illumination light communication apparatus according to claim 1, wherein:

the current limiting circuit includes:

a reference source which dynamically generates a reference value which is variable and corresponding to the current set value, according to a current value of current which flows through the switch and the current limiting circuit; and a delay circuit which delays the reference value generated by the reference source, by a predetermined length of time, and the current limiting circuit limits the current which flows through the light source, based on the reference value delayed by the delay circuit.

13. An illumination light communication apparatus comprising:

a light source which emits illumination light;

a power supply circuit for supplying constant current to the light source;

a transistor which is connected in series to the light source, and intermittently interrupts current which flows through the light source;

a signal generating circuit which generates a binary communication signal which controls on and off of the transistor to modulate the illumination light; and a current limiting circuit which causes the transistor to modulate the illumination light and limits the current which flows through the light source to prevent the current from exceeding a current set value which is variable, by controlling the transistor.

14. A communication module which is attachable to a lighting apparatus and modulates illumination light, the communication module comprising:

a switch which is to be connected in series to a light source included in the lighting apparatus;

a signal generating circuit which generates a binary communication signal which controls on and off of the switch to modulate the illumination light; and a current limiting circuit which is connected in series to the light source and the switch, and limits current which flows through the light source, to prevent the current from exceeding a current set value which is variable.

15. The communication module according to claim 14, wherein the switch is a transistor, and the current limiting circuit causes the transistor to modulate the illumination light and limit the current which flows through the light source.

16. The communication module according to claim 14, wherein the switch is connected in series between the light source and the current limiting circuit, and the current limiting circuit is connected to ground potential.

17. The communication module according to claim 14, wherein the current limiting circuit includes:

a reference source which outputs the reference value;

a transistor which is connected in series to the light source and the switch, and limits current which flows through the light source, based on the reference value; and a control circuit which includes a shift register which shifts and stores n-bit data in the binary communication signal, where n is an integer of 2 or more, and the control circuit calculates a partial duty cycle of the binary communication signal based on the n-bit data, and determines the reference value according to the partial duty cycle.

\* \* \* \* \*